(12) United States Patent
Dawson et al.

(10) Patent No.: US 11,862,358 B2
(45) Date of Patent: *Jan. 2, 2024

(54) ELECTRICAL BUSBAR AND METHOD OF FABRICATING THE SAME

(71) Applicant: Eaton Intelligent Power Limited, Dublin (IE)

(72) Inventors: James Dawson, Carol Stream, IL (US); Jason Degen, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,116

(22) Filed: Oct. 20, 2022

(65) Prior Publication Data

US 2023/0154644 A1     May 18, 2023

Related U.S. Application Data

(63) Continuation of application No. 17/016,321, filed on Sep. 9, 2020, now Pat. No. 11,488,742.

(Continued)

(51) Int. Cl.
*H01B 5/02*         (2006.01)
*G06F 30/10*      (2020.01)
(Continued)

(52) U.S. Cl.
CPC .............. *H01B 5/02* (2013.01); *G06F 30/10* (2020.01); *H01B 7/0009* (2013.01);
(Continued)

(58) Field of Classification Search
CPC . H01B 1/026; H01B 5/02; H01B 7/04; H01B 7/009; H01B 13/003; H01B 13/14;
(Continued)

(56) References Cited

U.S. PATENT DOCUMENTS 3,706,955 A    12/1972   Bunnell
4,593,464 A     6/1986   Williams
(Continued)

FOREIGN PATENT DOCUMENTS

CN         203193080       9/2013
CN     2015100485492       5/2015
(Continued)

OTHER PUBLICATIONS

DW07 Series High-current Busbar Connector Product Information Module; Japan Aviation Electronics Industry, Ltd.; 2016 (14 pages).
(Continued)

*Primary Examiner* — William H. Mayo, III
(74) *Attorney, Agent, or Firm* — Barnes & Thornburg LLP

(57) ABSTRACT

A busbar for use in mechanically and electrically connecting components in a device or system. The busbar includes a plurality of conductors arranged to provide two opposed end portions and an intermediate portion, wherein each of the conductors has a plurality of intermediate extents that traverse the intermediate portion. The intermediate portion including: (A) an unfused segment where no intermediate extents of the conductors are fused together to form a single consolidated conductor, and (B) a fused segment that includes (i) a partial solidification zone where a majority of the intermediate extents of the conductors are fused together to form a partially solidified region that provides a single consolidated conductor, (ii) a full solidification zone where all of intermediate extents of the conductors are fused together to form a fully solidified region that provides a single consolidated conductor, and (iii) an unsolidified region where all of the intermediate extents of the conductors are not fused together.

21 Claims, 80 Drawing Sheets

Related U.S. Application Data

(60) Provisional application No. 63/051,639, filed on Jul. 14, 2020, provisional application No. 62/988,972, filed on Mar. 13, 2020, provisional application No. 62/897,962, filed on Sep. 9, 2019.

(51) Int. Cl.
  *H01M 50/505* (2021.01)
  *H01B 7/00* (2006.01)
  *H01B 13/00* (2006.01)
  *G06F 111/04* (2020.01)
  *H01B 13/14* (2006.01)
  *H01R 13/05* (2006.01)

(52) U.S. Cl.
  CPC ........ *H01B 13/003* (2013.01); *H01M 50/505* (2021.01); *G06F 2111/04* (2020.01); *H01B 13/14* (2013.01); *H01M 2220/20* (2013.01); *H01R 13/05* (2013.01)

(58) Field of Classification Search
  CPC .. H01M 50/505; H01M 2220/20; H01R 13/05
  USPC .............................. 174/74 R, 78, 84 R, 84 C
  See application file for complete search history.

(56) References Cited

U.S. PATENT DOCUMENTS

| | | | |
|---|---|---|---|
| 4,922,068 A | 5/1990 | Bangs | |
| 4,973,370 A | 11/1990 | Kreinberg | |
| 5,102,752 A | 4/1992 | Hope | |
| 5,393,951 A | 2/1995 | Kasper | |
| 5,541,380 A | 7/1996 | Ogden | |
| 6,264,510 B1 | 7/2001 | Onizuka | |
| 6,390,830 B1 | 5/2002 | Onizuka | |
| 6,402,543 B1* | 6/2002 | Abe | H01R 4/185 439/877 |
| 6,468,116 B2* | 10/2002 | Koide | H01R 4/184 439/867 |
| 6,646,222 B1 | 11/2003 | Burlingame | |
| 6,722,926 B2 | 4/2004 | Chevassus-More | |
| 7,175,488 B2 | 2/2007 | Pavlovic | |
| 7,503,776 B1 | 3/2009 | Pavlovic | |
| 7,568,921 B2 | 8/2009 | Pavlovic | |
| 7,595,715 B2 | 9/2009 | Pavlovic | |
| 7,613,003 B2 | 11/2009 | Pavlovic | |
| 7,651,344 B2 | 1/2010 | Wu | |
| 7,713,096 B2 | 5/2010 | Pavlovic | |
| 7,766,706 B2 | 8/2010 | Kawamura | |
| 7,876,193 B2 | 1/2011 | Pavlovic | |
| 7,892,050 B2 | 2/2011 | Pavlovic | |
| 8,202,124 B1 | 6/2012 | Natter | |
| 8,366,497 B2 | 2/2013 | Glick | |
| 8,388,389 B2 | 3/2013 | Costello | |
| 8,475,220 B2 | 7/2013 | Glick | |
| 8,859,897 B2 | 10/2014 | Hadi | |
| 8,911,250 B2 | 12/2014 | Ehlen | |
| 8,956,190 B2 | 2/2015 | Natter | |
| 9,033,748 B2 | 5/2015 | Ramey | |
| 9,077,114 B2 | 7/2015 | Oh | |
| 9,105,912 B2 | 8/2015 | Zhao | |
| 9,190,756 B2 | 11/2015 | Glick | |
| 9,225,116 B2 | 12/2015 | Mckibben | |
| 9,257,804 B1 | 2/2016 | Beck | |
| 9,300,069 B2 | 3/2016 | Morello | |
| 9,318,734 B2 | 4/2016 | Zhao | |
| 9,356,394 B2 | 5/2016 | Kennedy | |
| 9,368,904 B2 | 6/2016 | Natter | |
| 9,379,489 B2 | 6/2016 | Ebisawa | |
| 9,437,974 B2 | 9/2016 | Glick | |
| 9,502,783 B2 | 11/2016 | Bleicher | |
| 9,525,254 B2 | 12/2016 | Chen | |
| 9,608,369 B1 | 3/2017 | Brandt | |
| 9,853,435 B1 | 12/2017 | Burkman | |
| 9,905,953 B1 | 2/2018 | Pavlovic | |
| 9,948,044 B2 | 4/2018 | Harris, III | |
| 10,003,112 B1 | 6/2018 | Boor | |
| 10,044,126 B2 | 8/2018 | Krebs | |
| 10,122,004 B2 | 11/2018 | De Souza | |
| 10,122,117 B2 | 11/2018 | Miller | |
| 10,135,168 B2 | 11/2018 | Pavlovic | |
| 10,164,366 B2 | 12/2018 | Kataoka | |
| 10,395,793 B2 | 8/2019 | Satou | |
| 10,515,739 B2 | 12/2019 | Satou | |
| 10,693,252 B2 | 6/2020 | Pavlovic | |
| 10,821,554 B2 | 11/2020 | Satou | |
| 11,223,150 B2 | 1/2022 | Pavlovic | |
| 11,271,330 B2 | 3/2022 | Dawson | |
| 11,488,742 B2 | 11/2022 | Dawson | |
| 2002/0081888 A1 | 6/2002 | Regnier | |
| 2002/0180272 A1 | 12/2002 | Yuasa et al. | |
| 2007/0149050 A1 | 6/2007 | Oka | |
| 2015/0004852 A1 | 1/2015 | Hildebrand et al. | |
| 2015/0079825 A1* | 3/2015 | Miyamoto | H01R 4/62 439/152 |
| 2015/0079859 A1 | 3/2015 | Glick | |
| 2015/0162706 A1 | 6/2015 | Kennedy | |
| 2015/0255912 A1 | 9/2015 | Natter | |
| 2016/0308187 A1 | 10/2016 | Subramanian | |
| 2016/0308455 A1 | 10/2016 | Ratadiya et al. | |
| 2018/0138601 A1* | 5/2018 | Hamada | H01R 4/185 |
| 2018/0145428 A1 | 5/2018 | Meyer et al. | |
| 2018/0175535 A1 | 6/2018 | Sato et al. | |
| 2018/0191095 A1 | 7/2018 | Pavlovic | |
| 2018/0219305 A1 | 8/2018 | Wavering et al. | |
| 2018/0269454 A1 | 9/2018 | De Souza et al. | |
| 2019/0006652 A1 | 1/2019 | Kim | |
| 2019/0044120 A1 | 2/2019 | Ota | |
| 2019/0044197 A1 | 2/2019 | Ota et al. | |
| 2021/0351523 A1 | 11/2021 | Dawson | |

FOREIGN PATENT DOCUMENTS

| | | |
|---|---|---|
| CN | 107863610 | 3/2018 |
| CN | 108923007 | 11/2018 |
| DE | 19817924 | 10/1999 |
| EP | 2535965 | 12/2012 |
| EP | 2871695 | 5/2015 |
| JP | H06140020 | 5/1994 |
| JP | 2017091860 A | 5/2017 |
| JP | 2017091861 A | 5/2017 |

OTHER PUBLICATIONS

Busbar Connectivity Quick Reference Guide; TE Connectivity Ltd.; 2017 (7 pages).
International Search Report and Written Opinion issued in PCT/US20/50016, dated Nov. 30, 2020, 14 pages.
International Search Report and Written Opinion issued in PCT/US20/50018, dated Nov. 30, 2020, 14 pages.
International Search Report and Written Opinion issued in PCT/US20/14484, dated Mar. 31, 2020, 7 pages.
International Search Report and Written Opinion issued in PCT/IB2022/057772, dated Jan. 30, 2023, 26 pages.

* cited by examiner

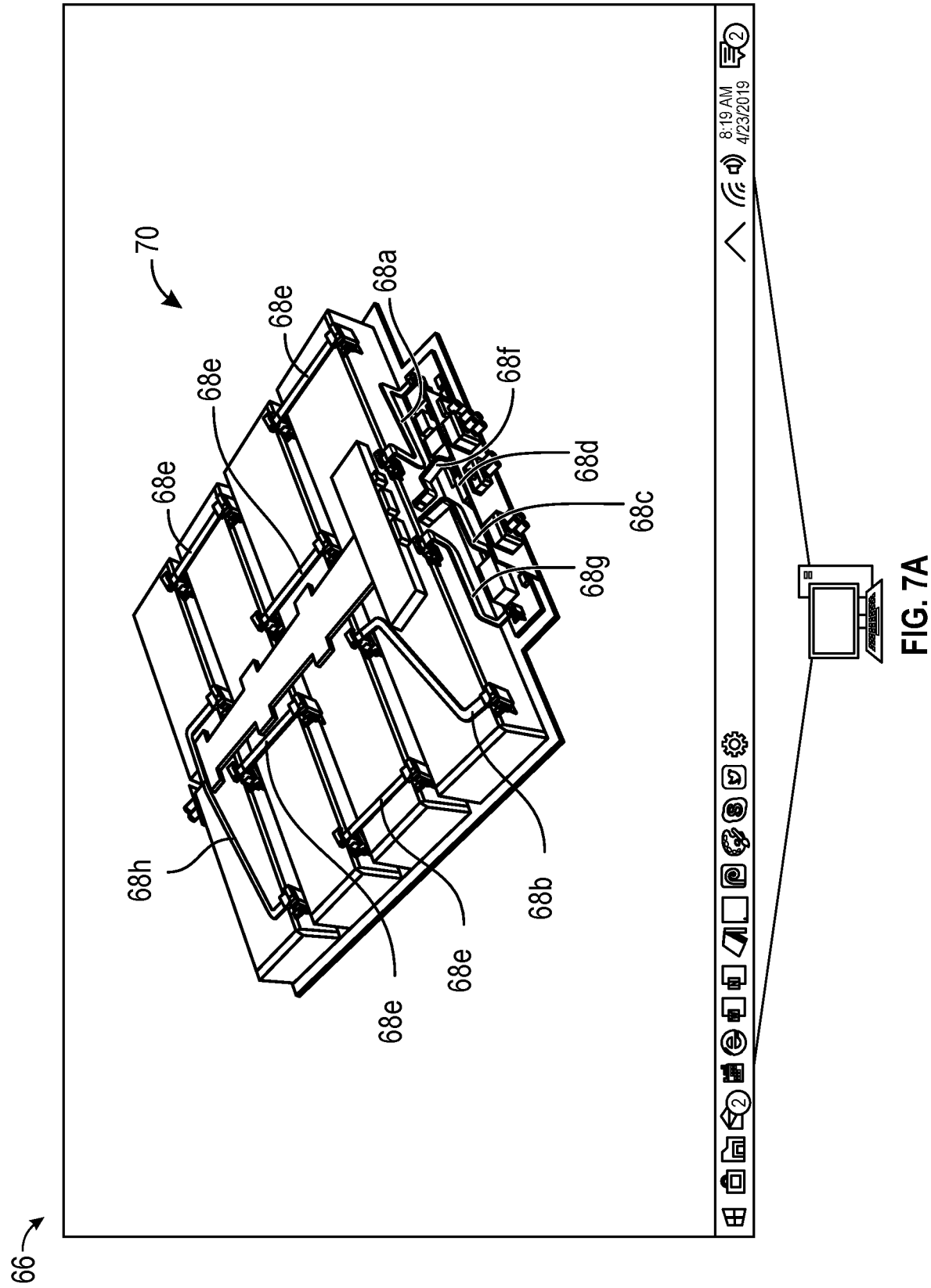

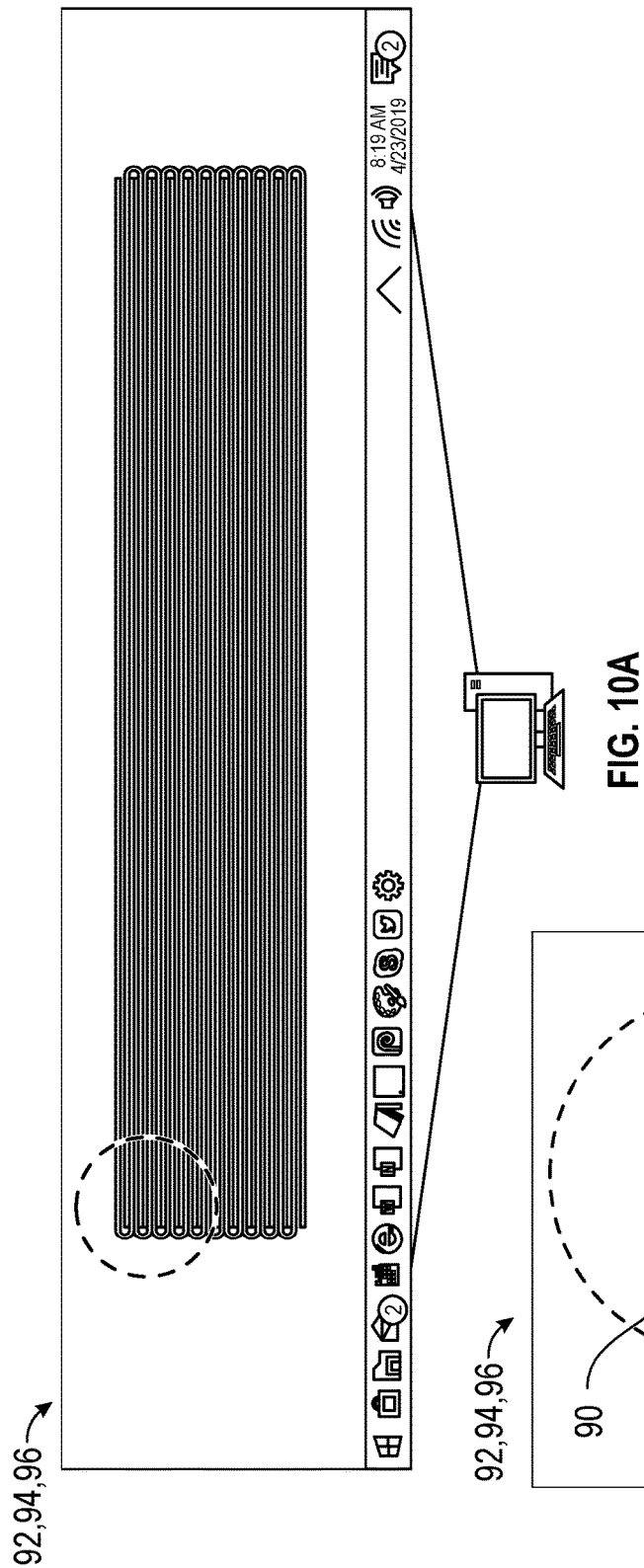
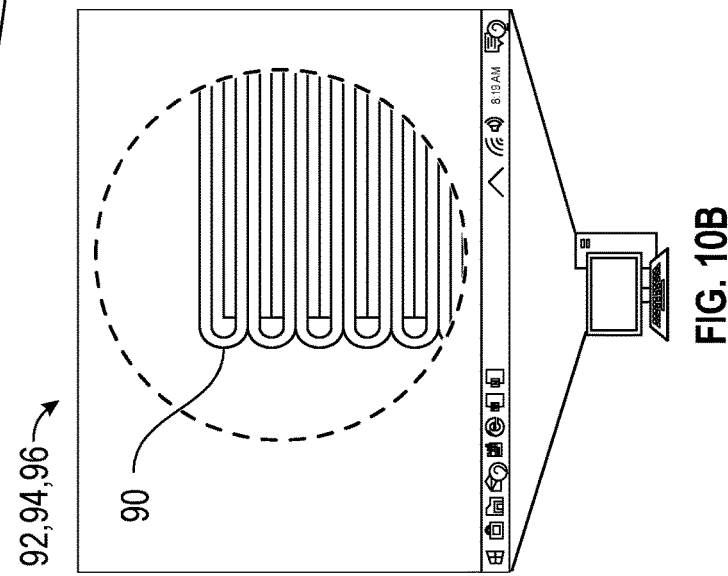

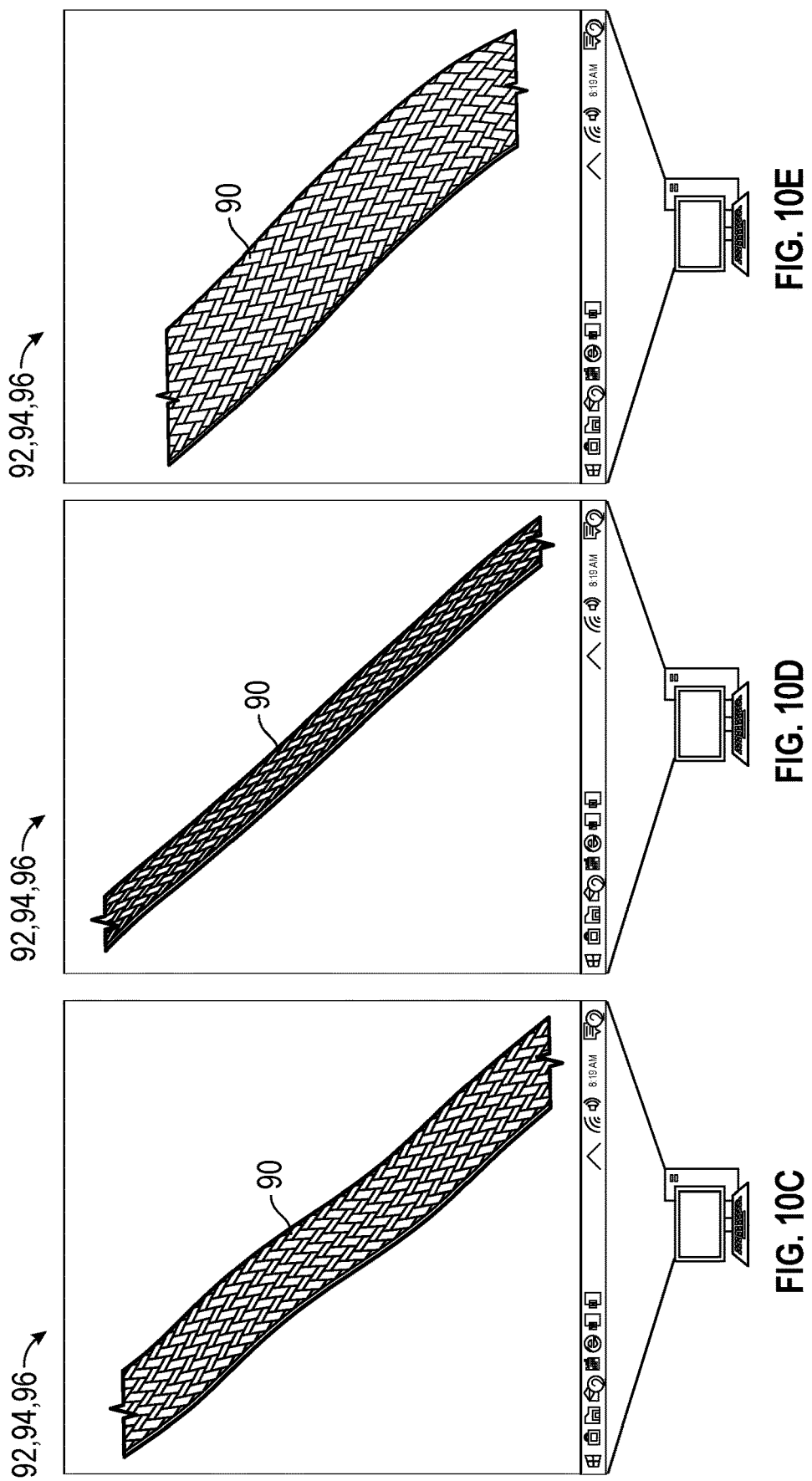

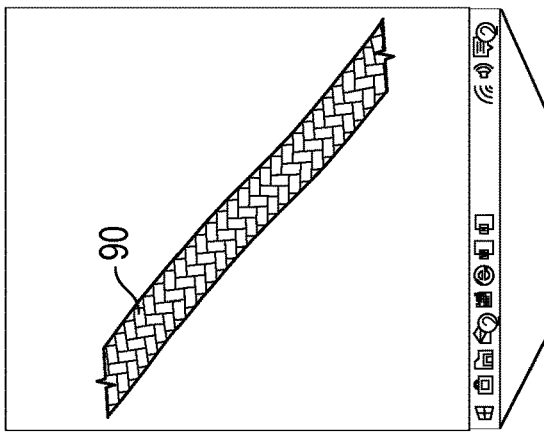
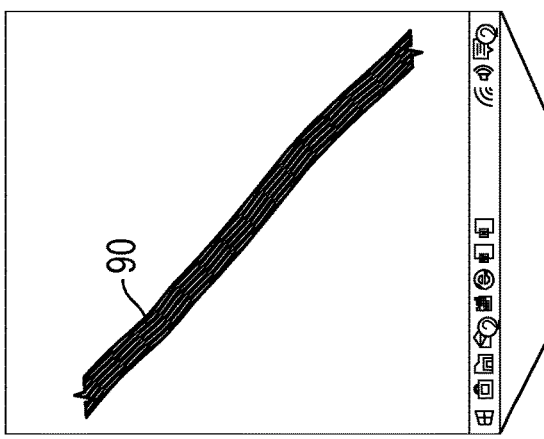
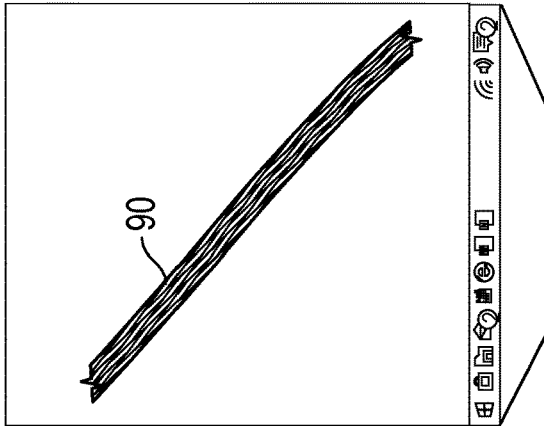
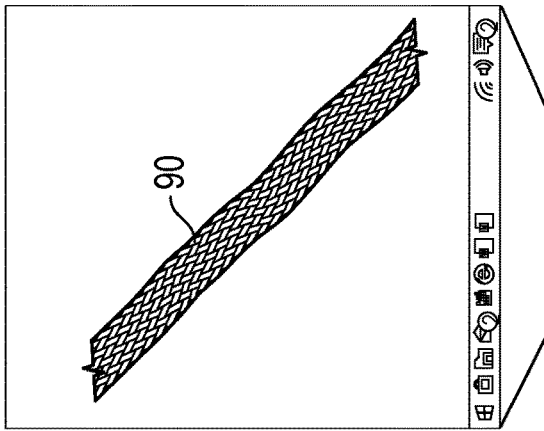

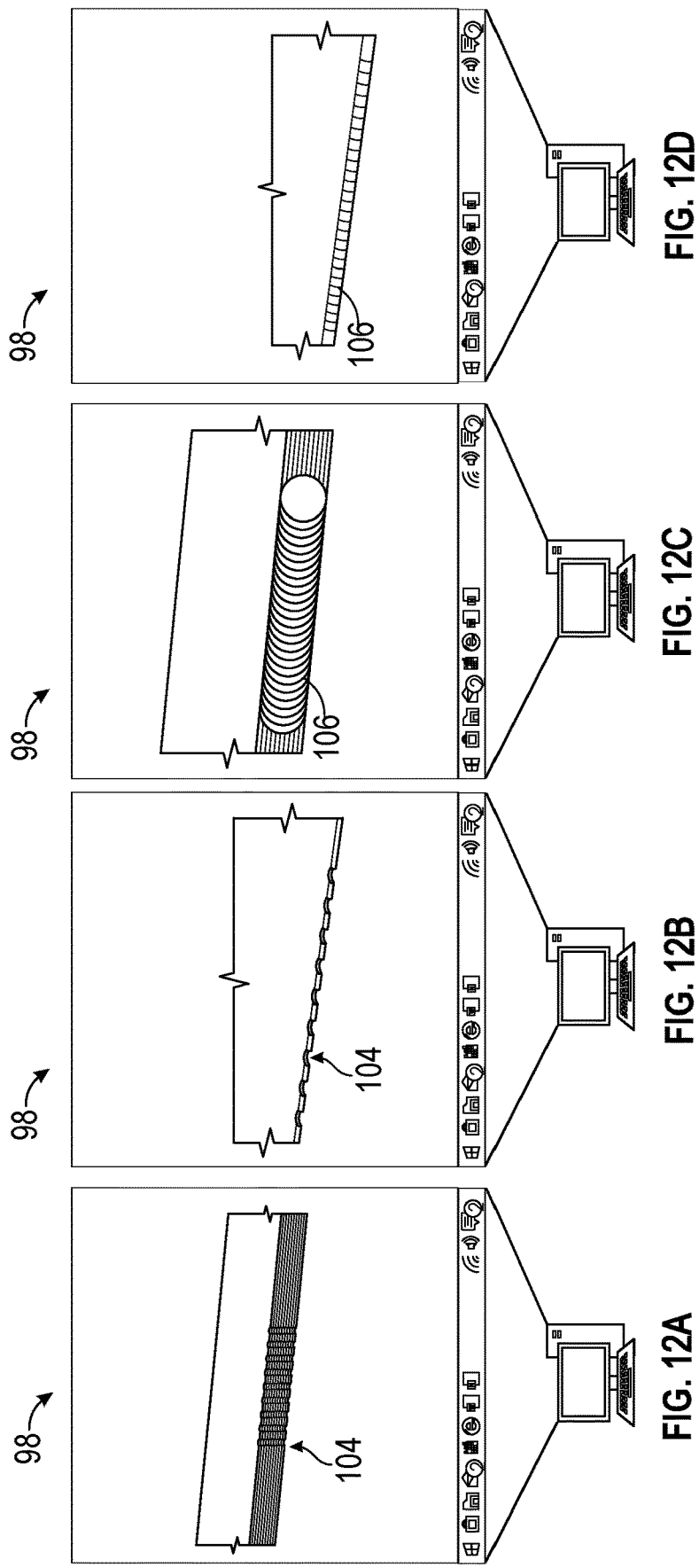

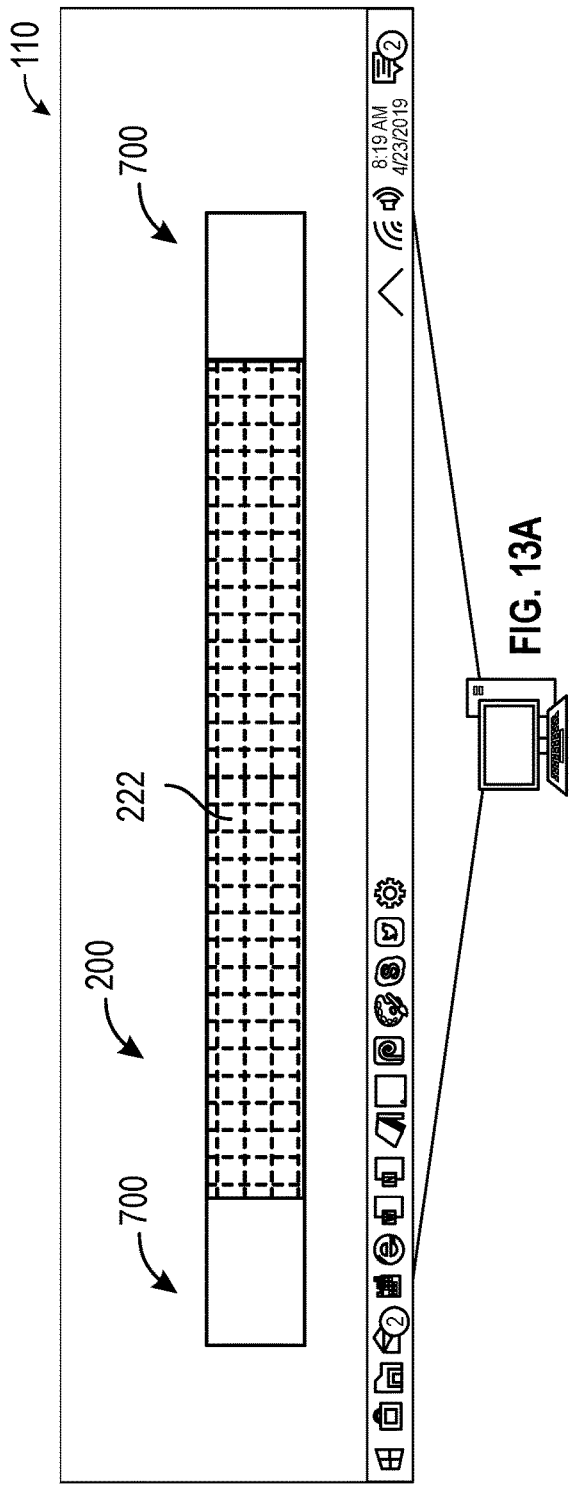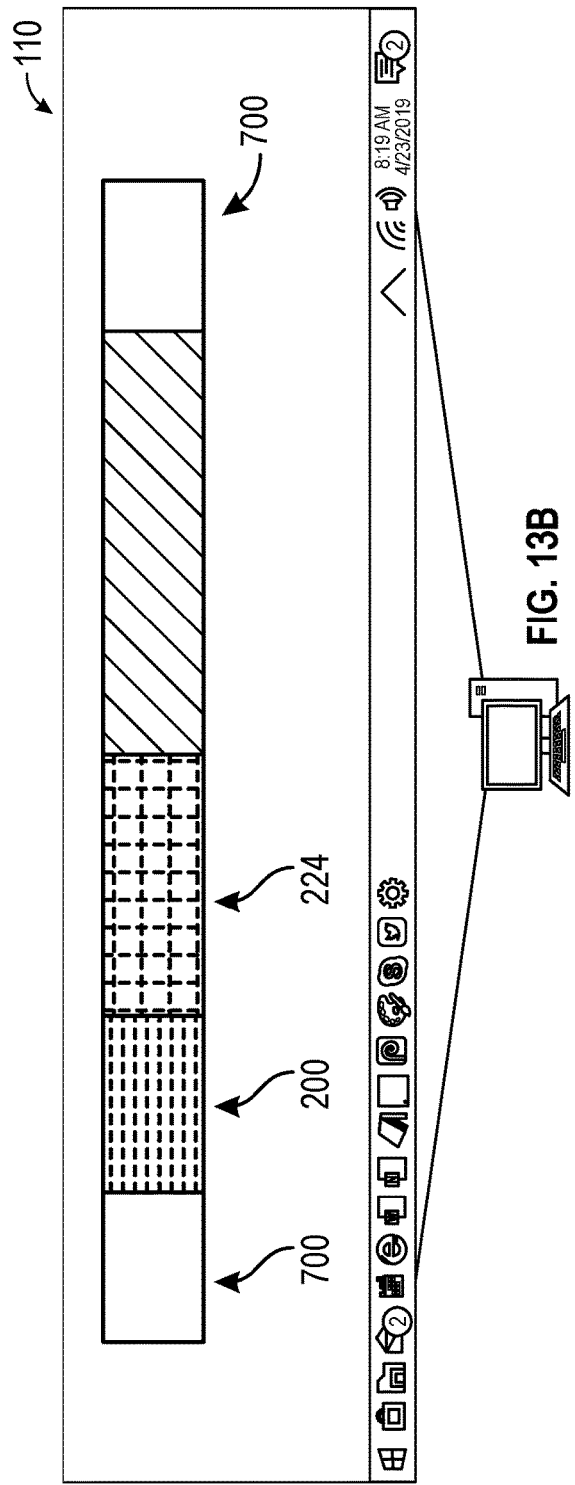

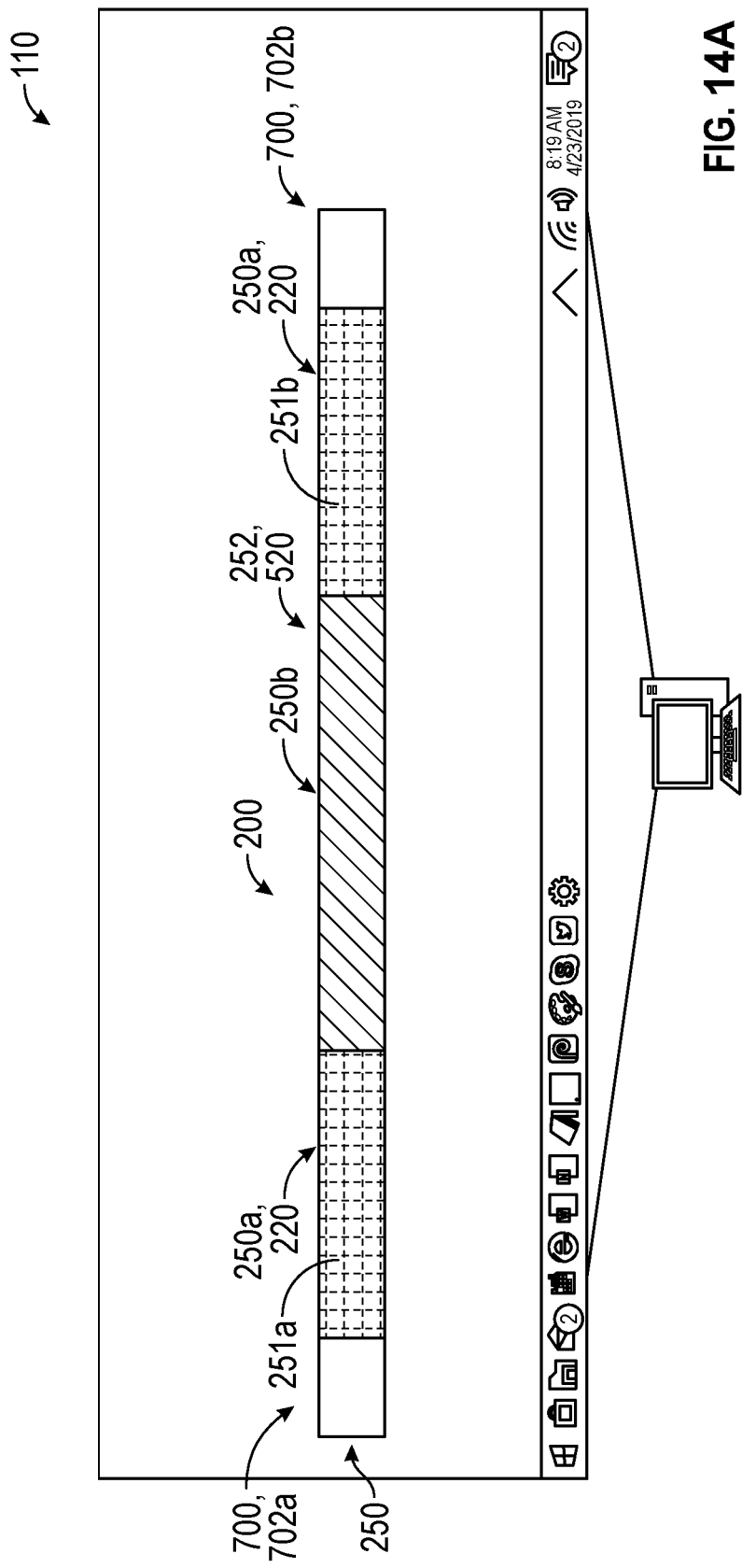

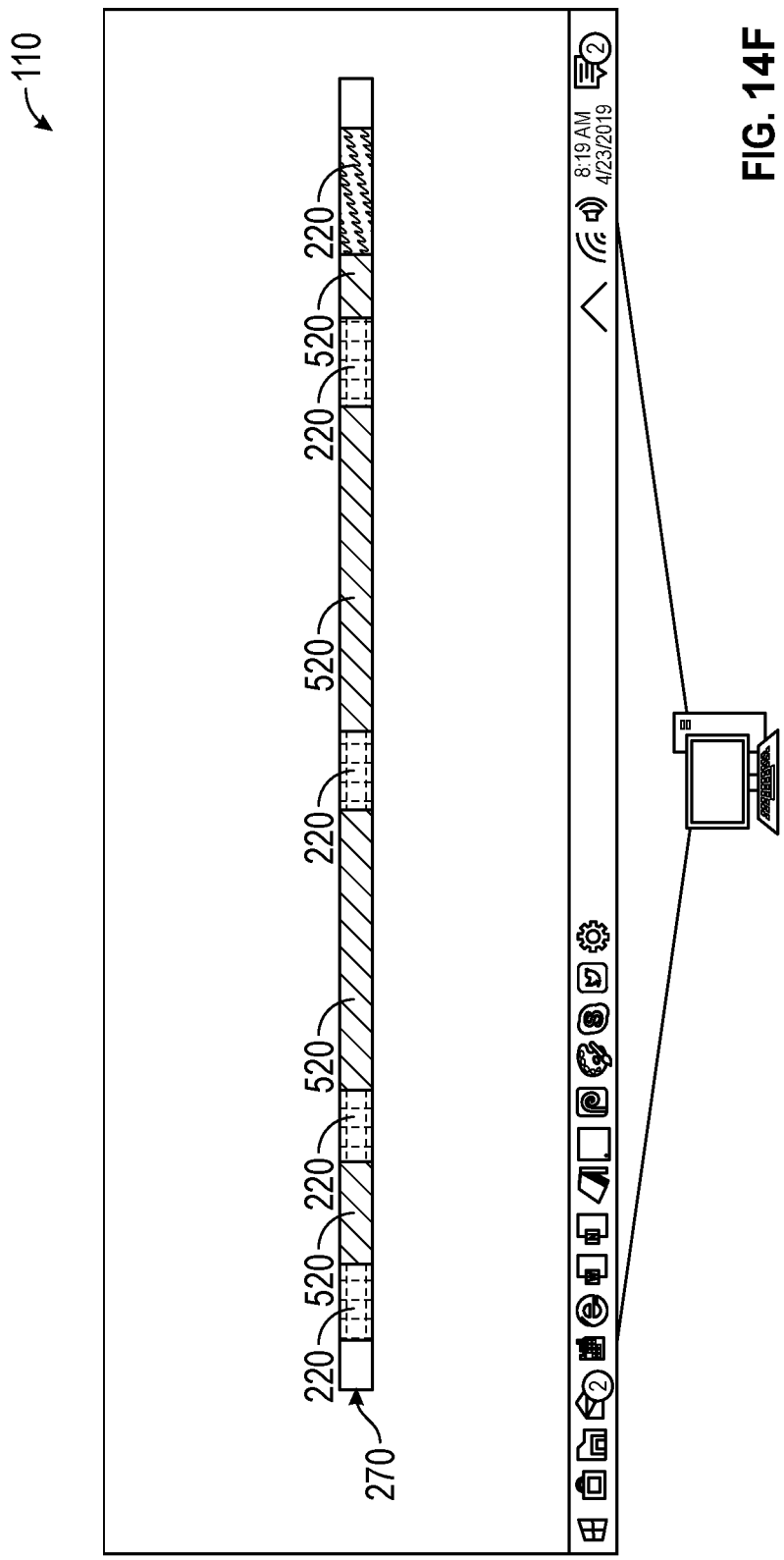

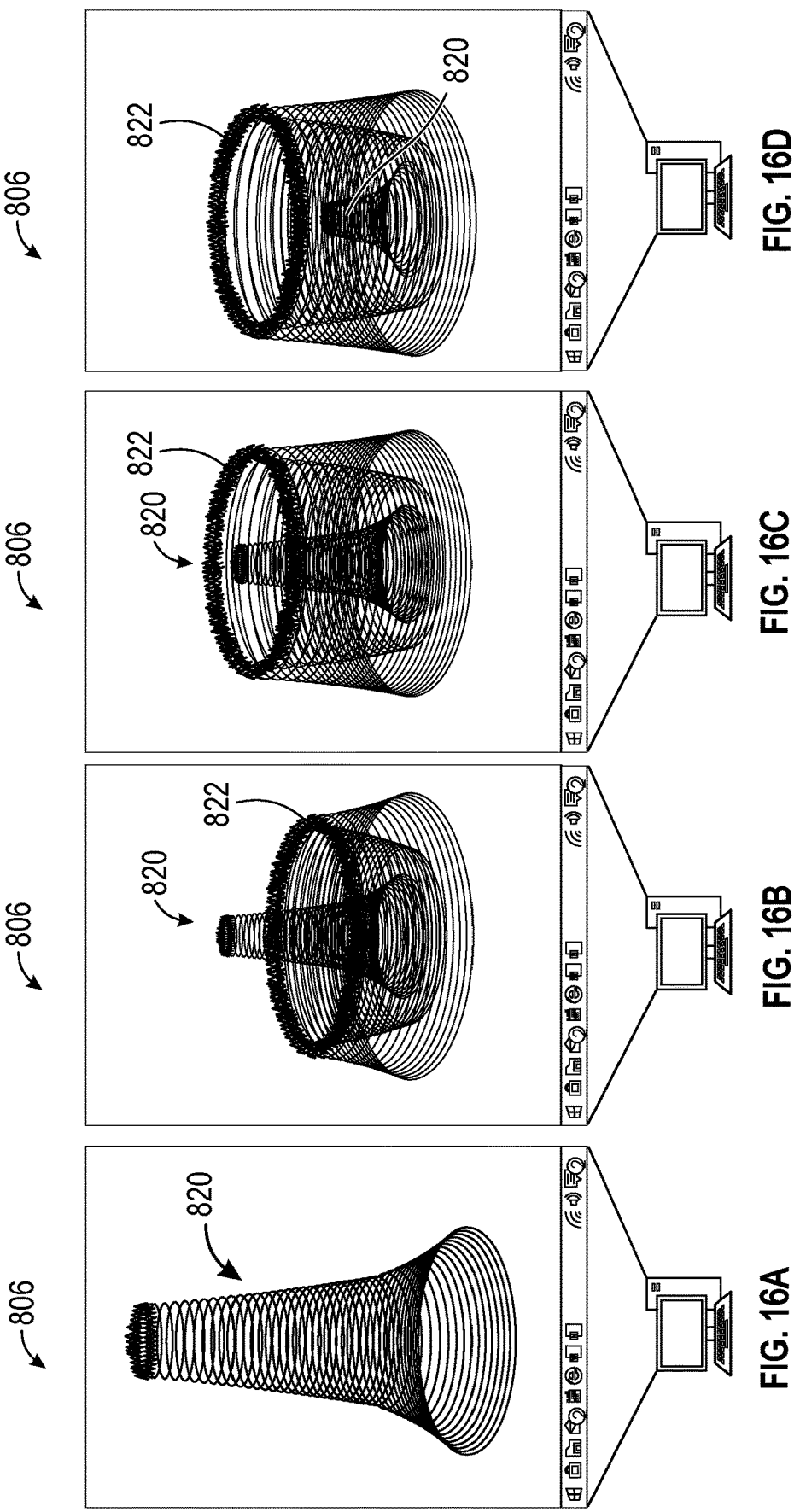

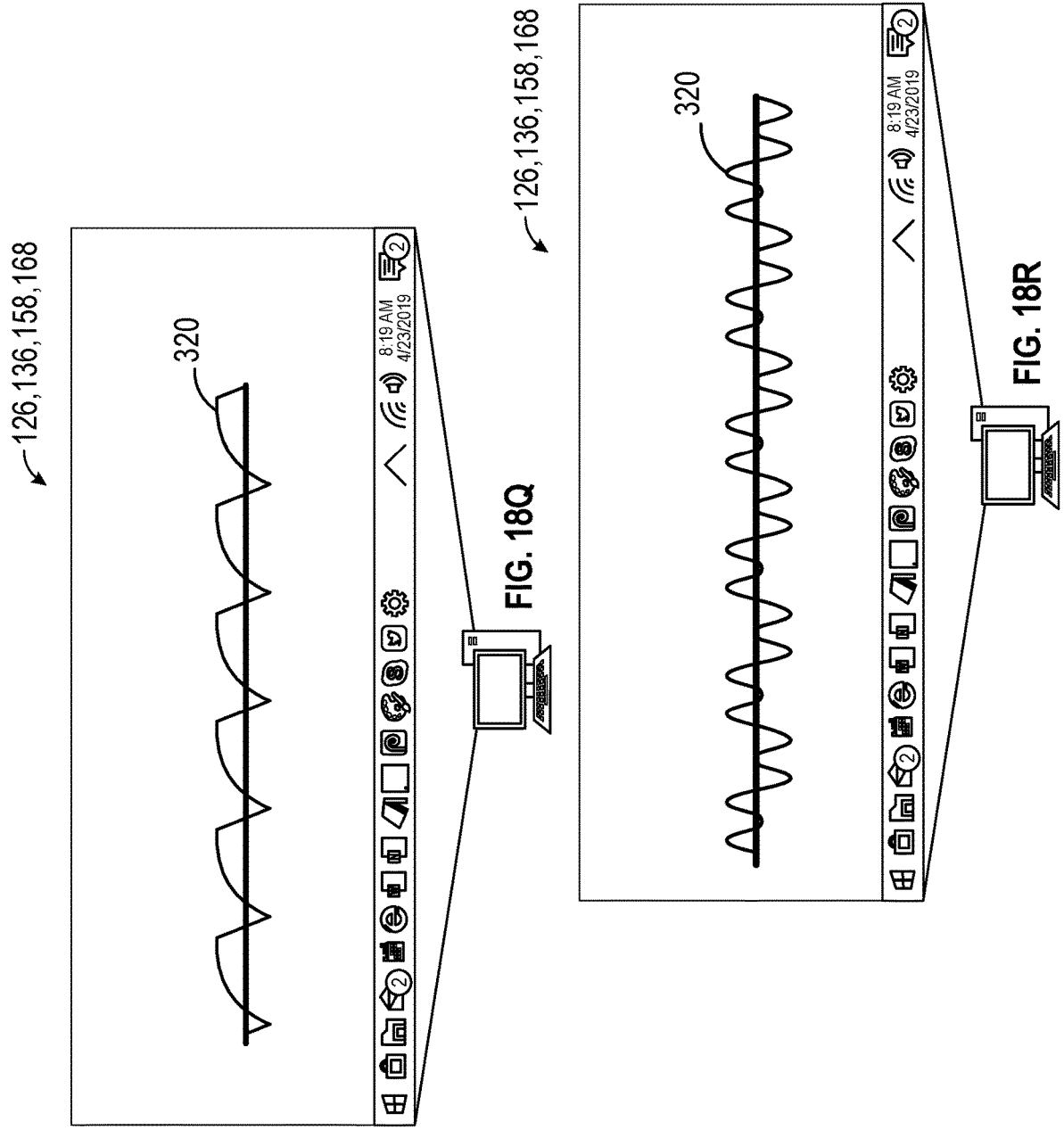

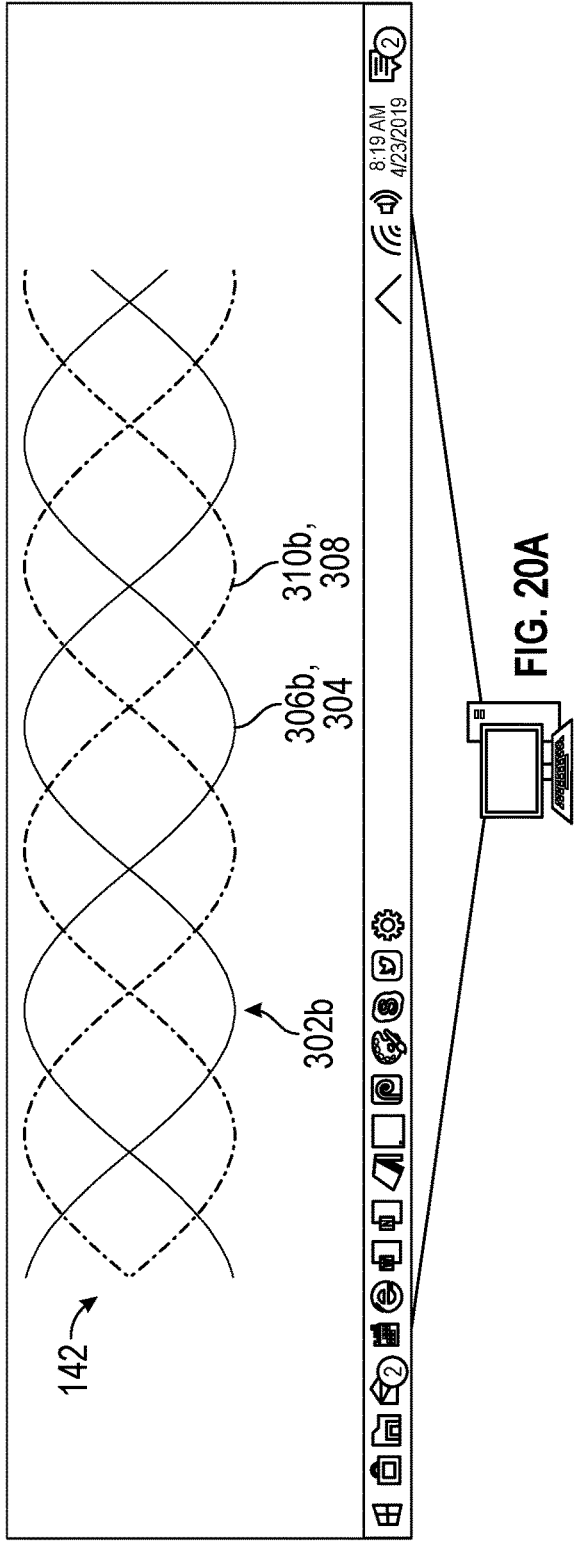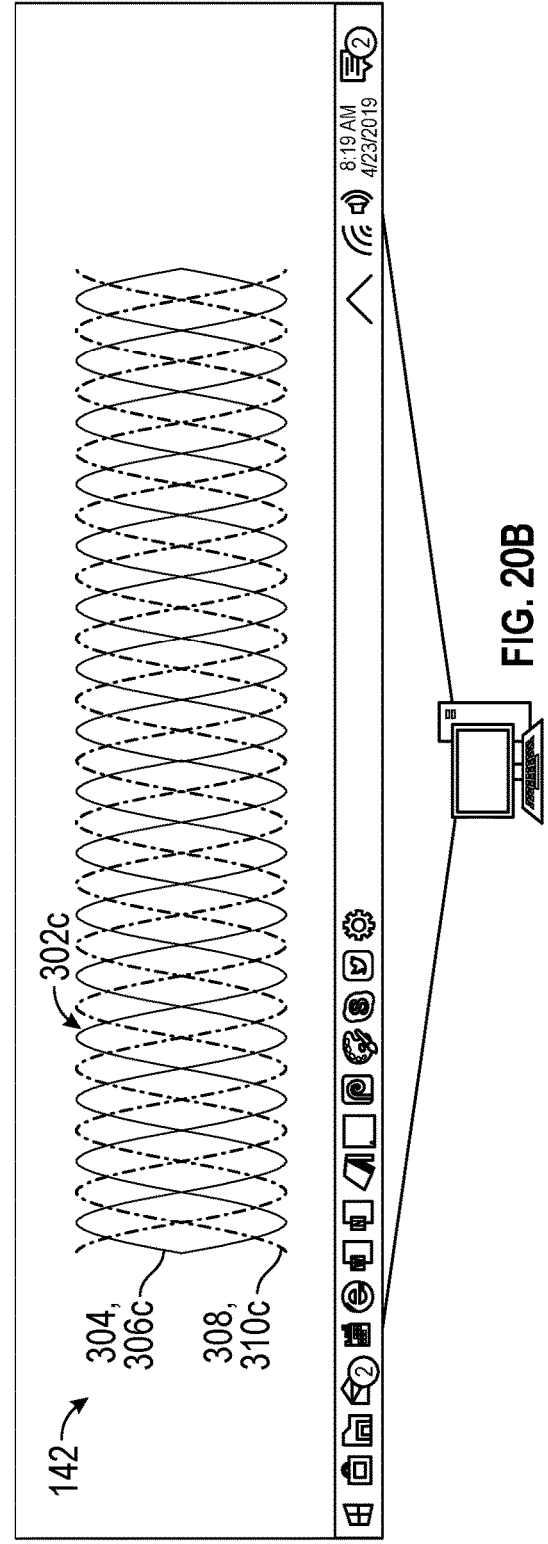

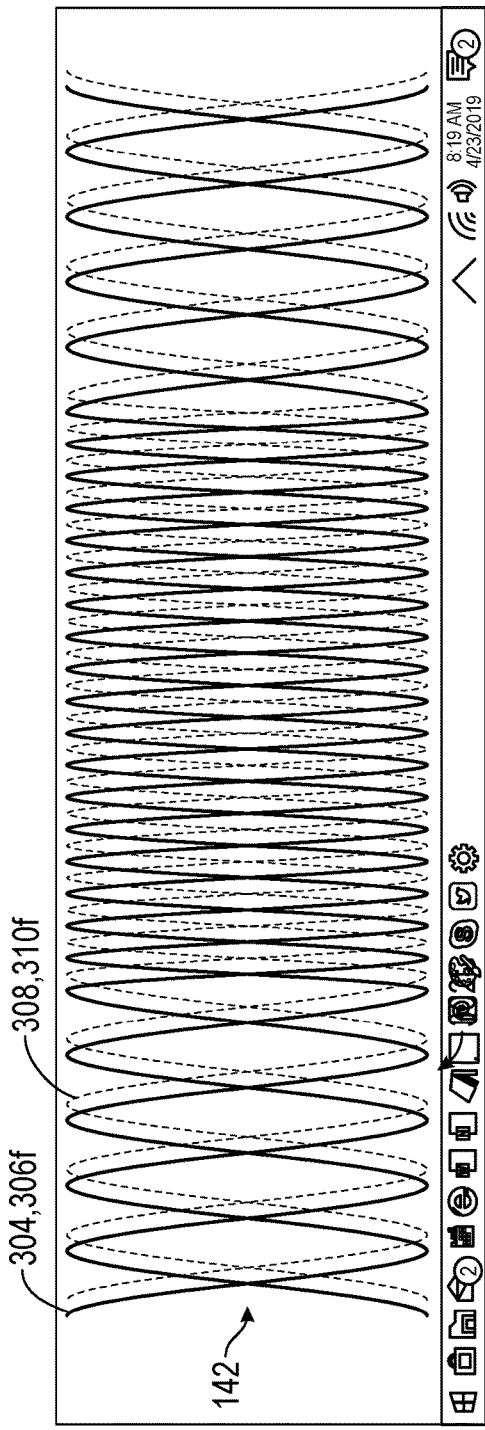
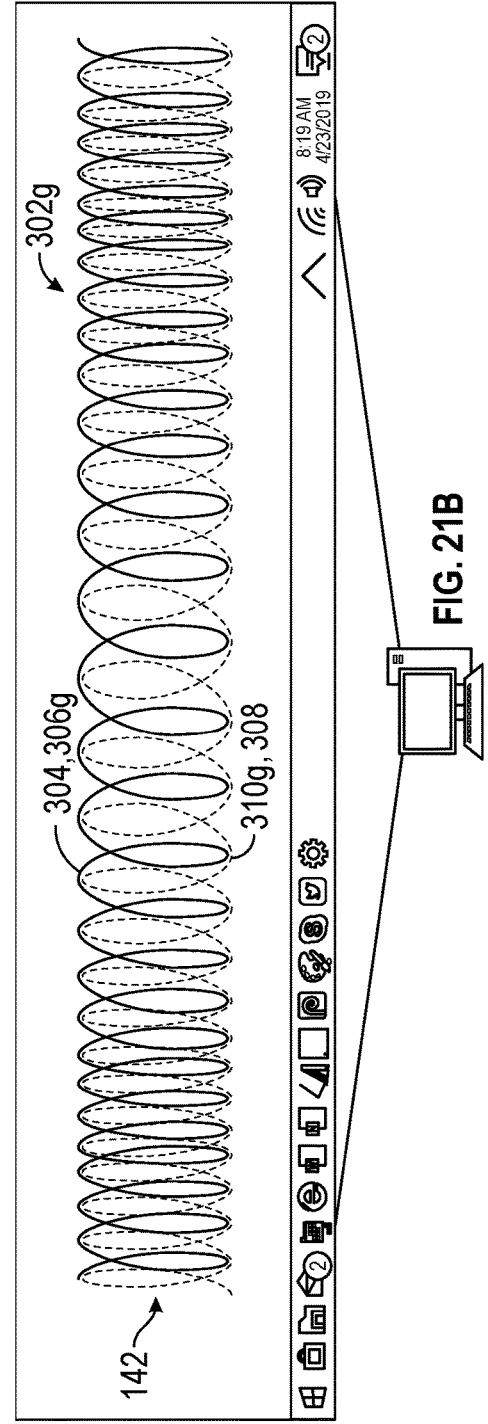
FIG. 21A
FIG. 21B

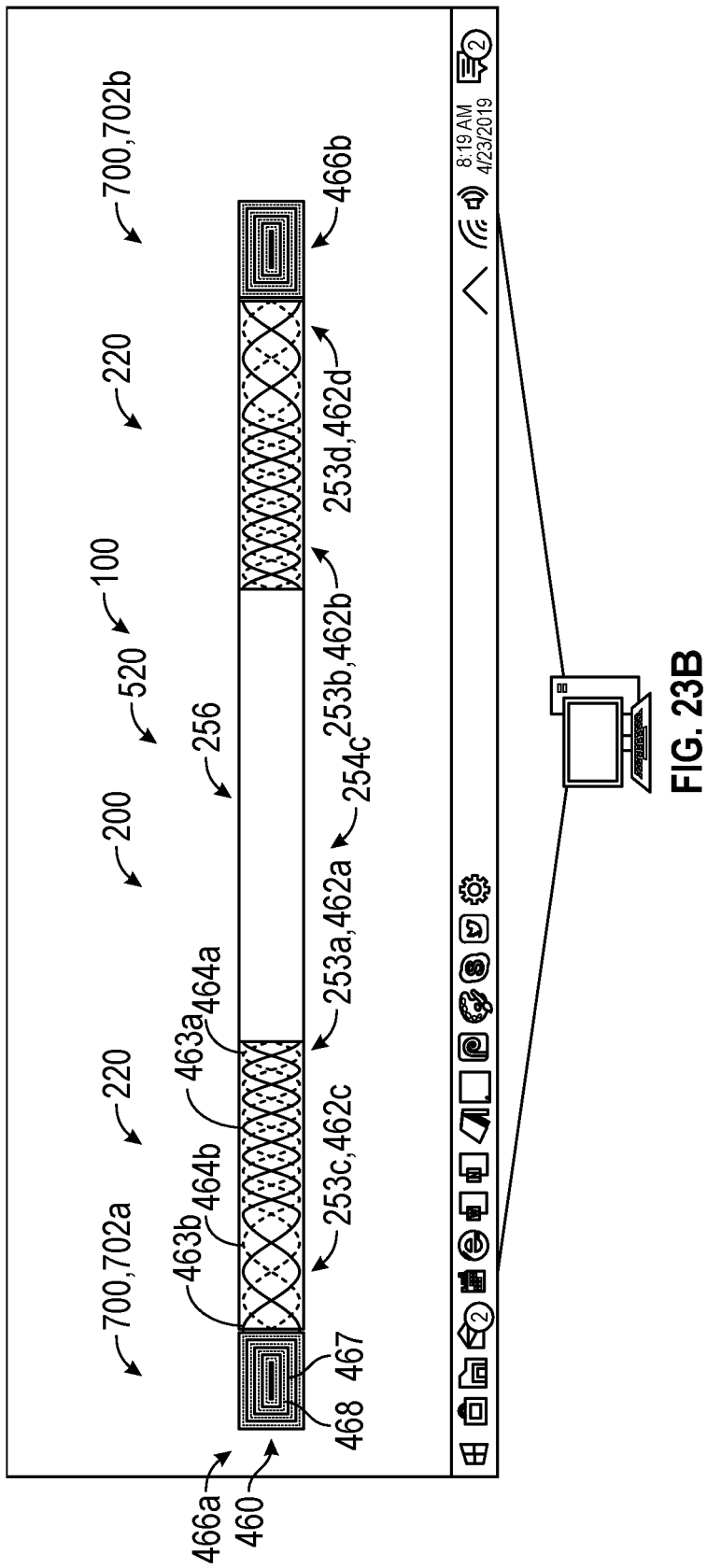

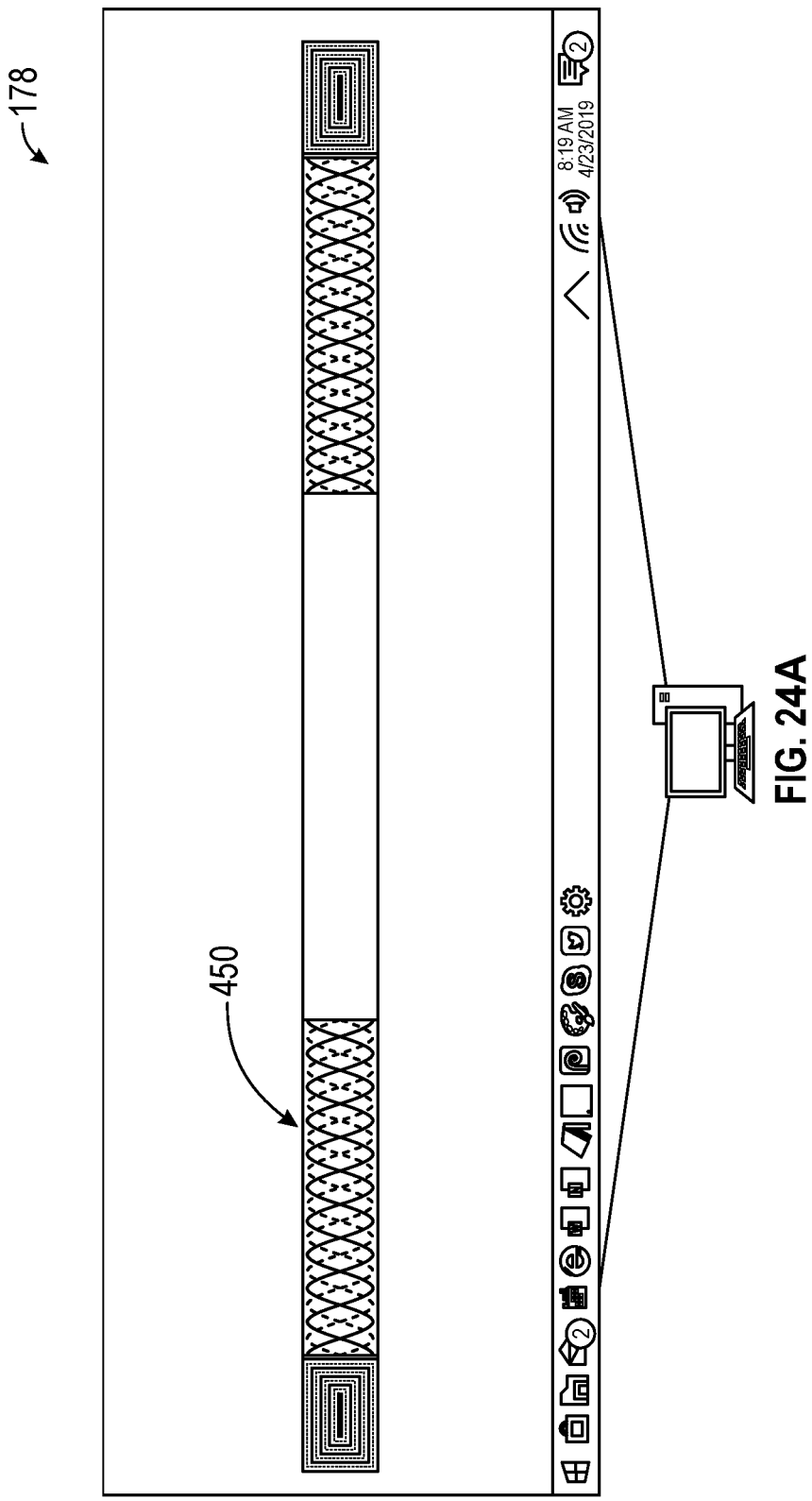

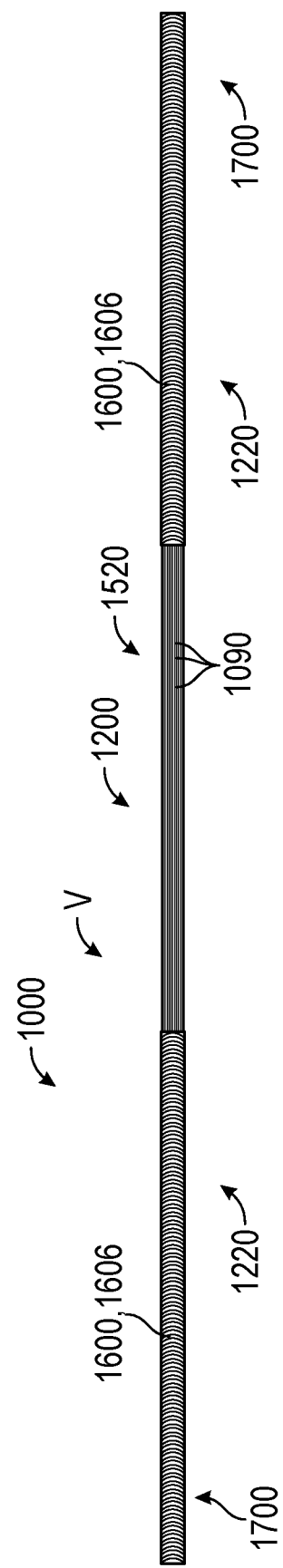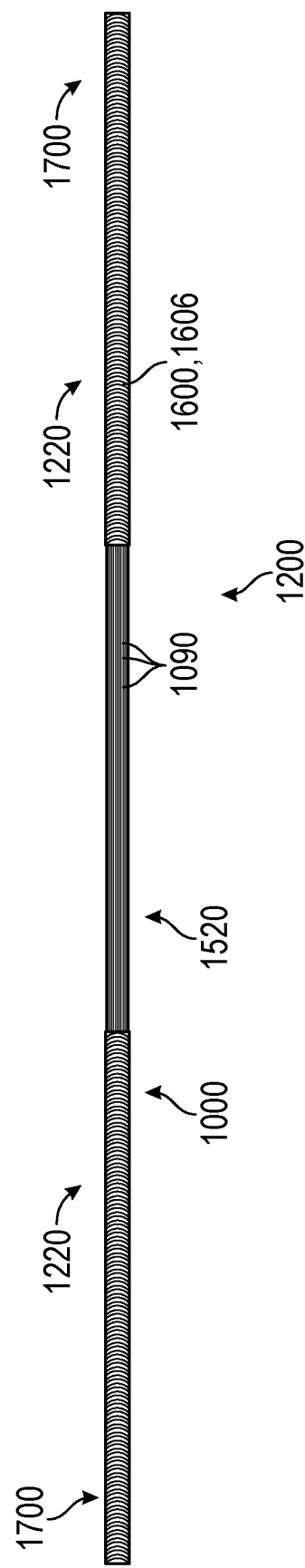

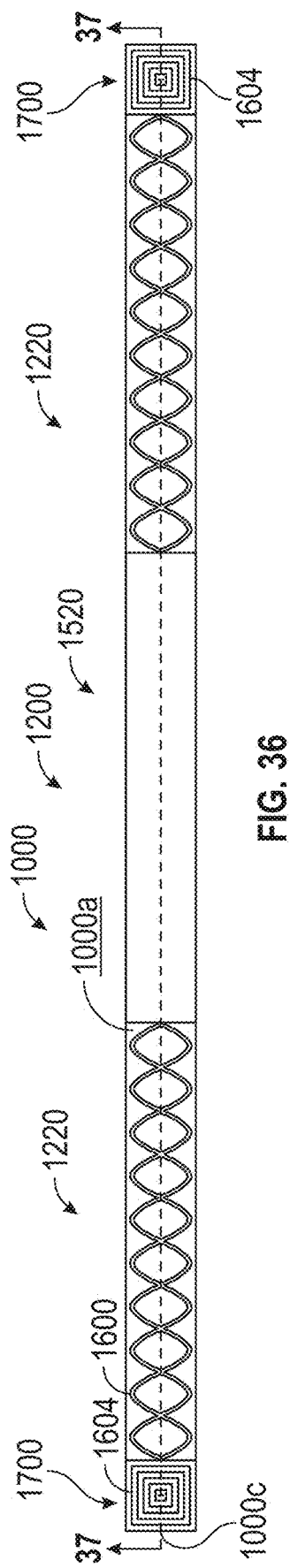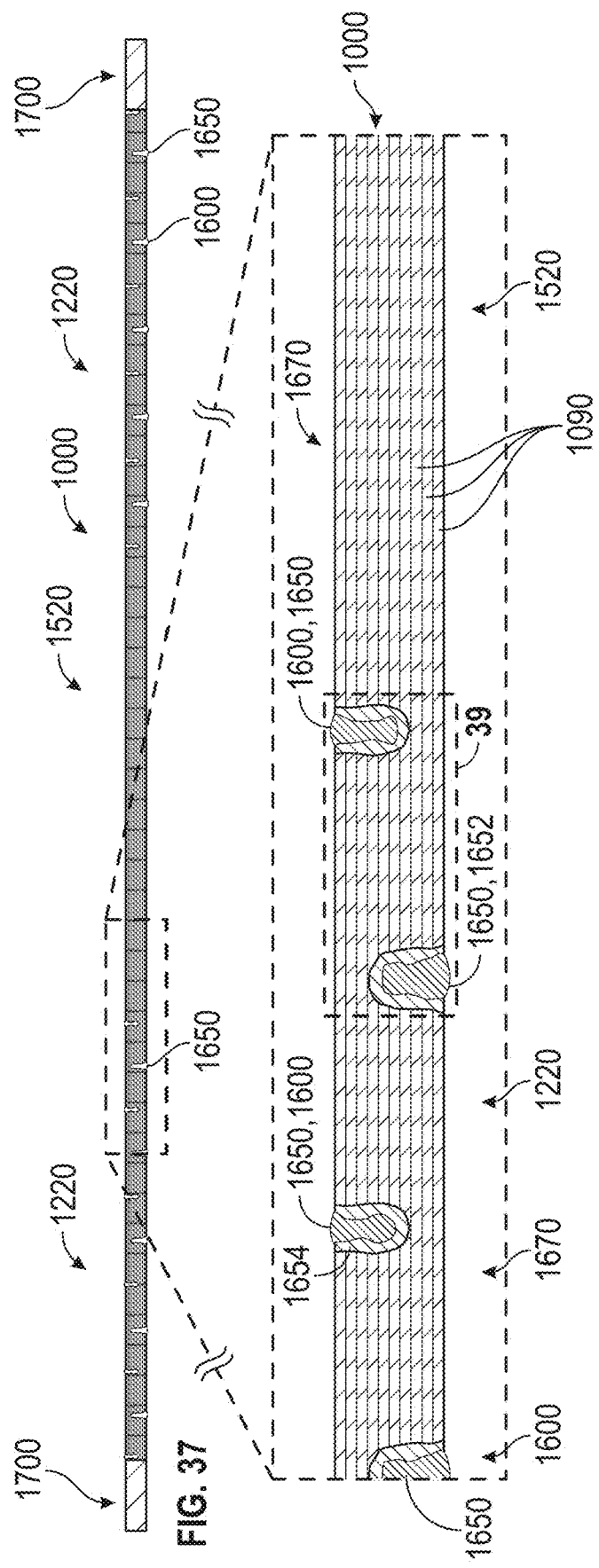

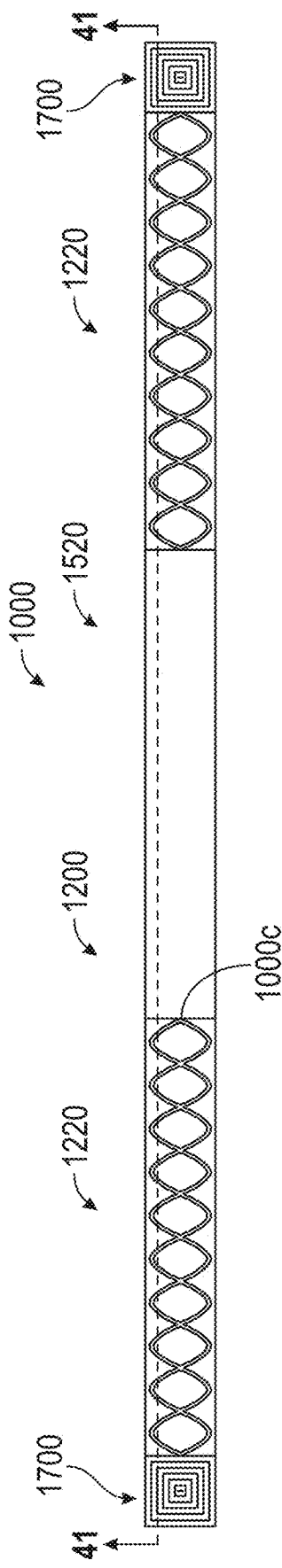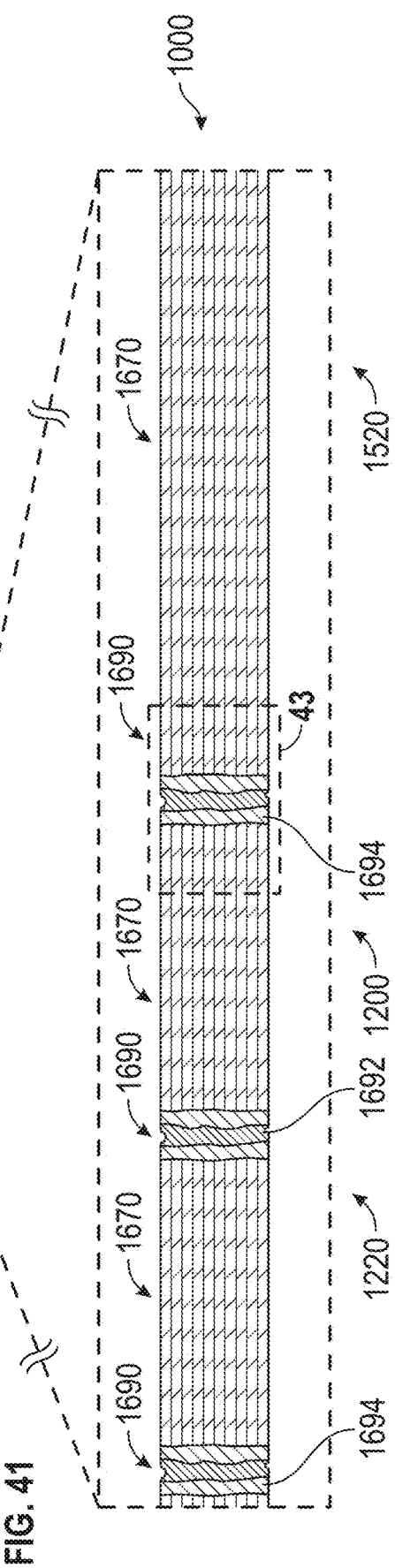

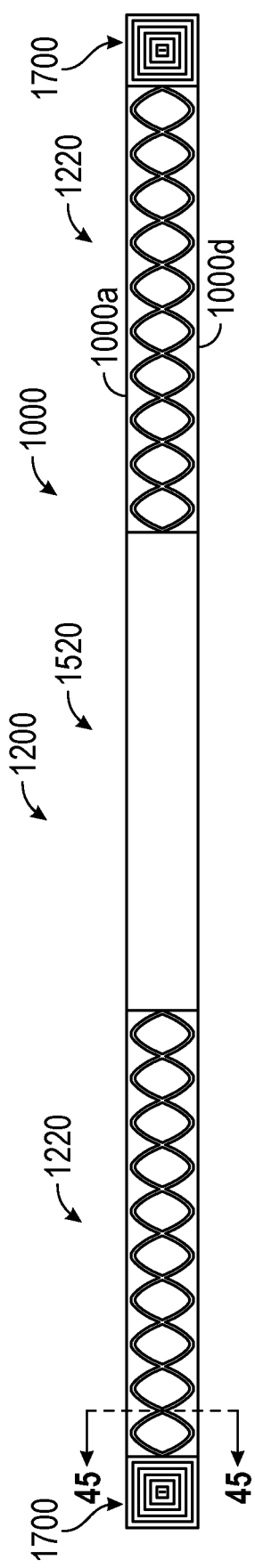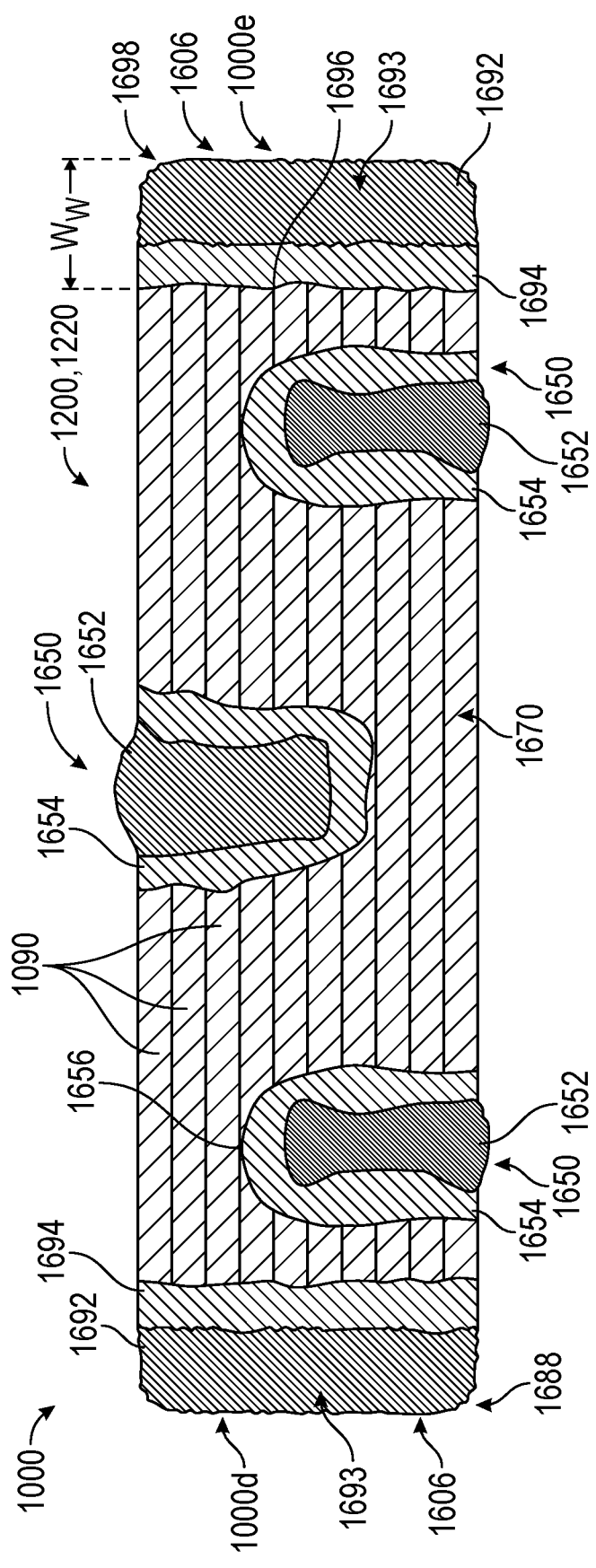

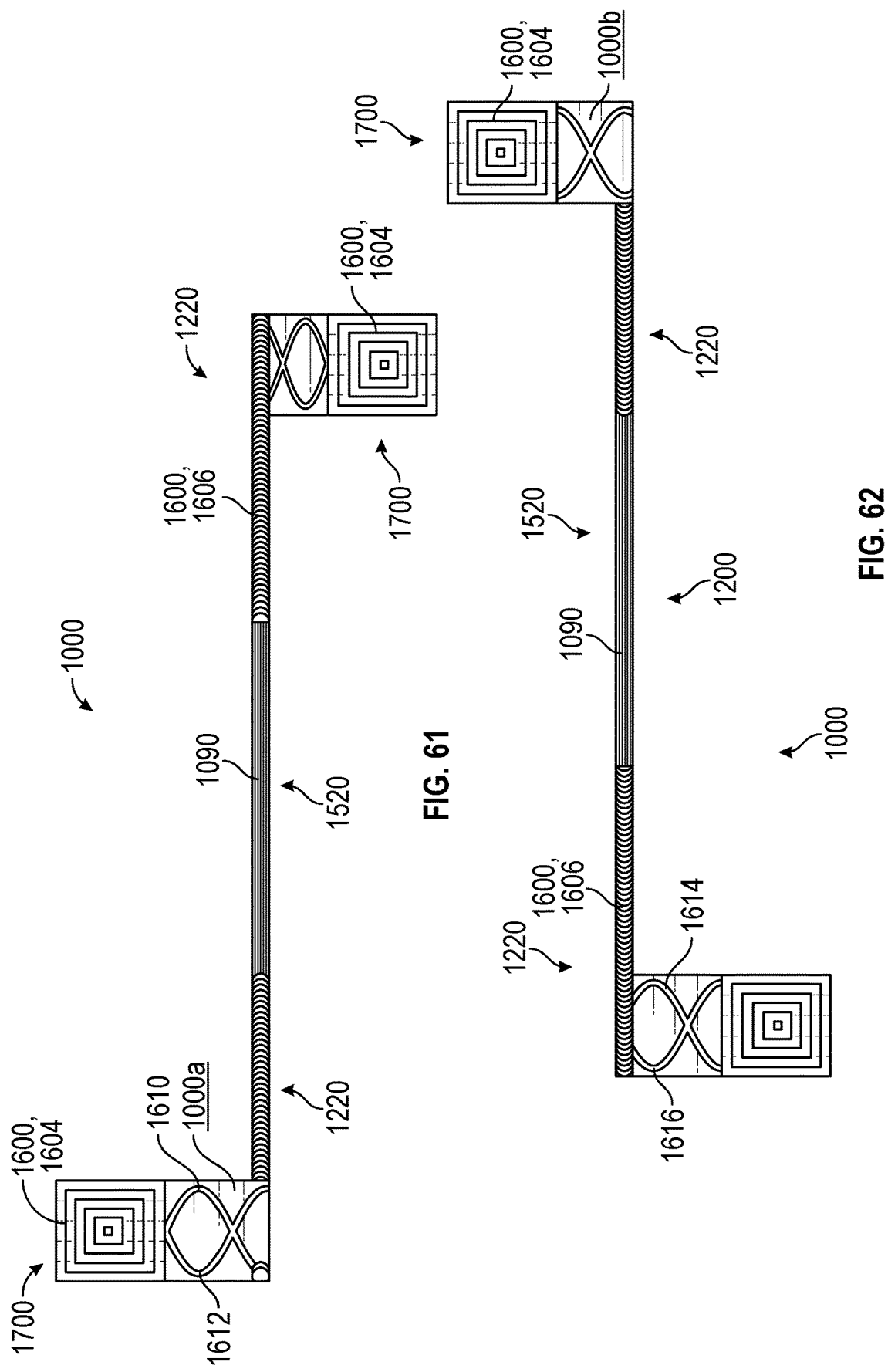

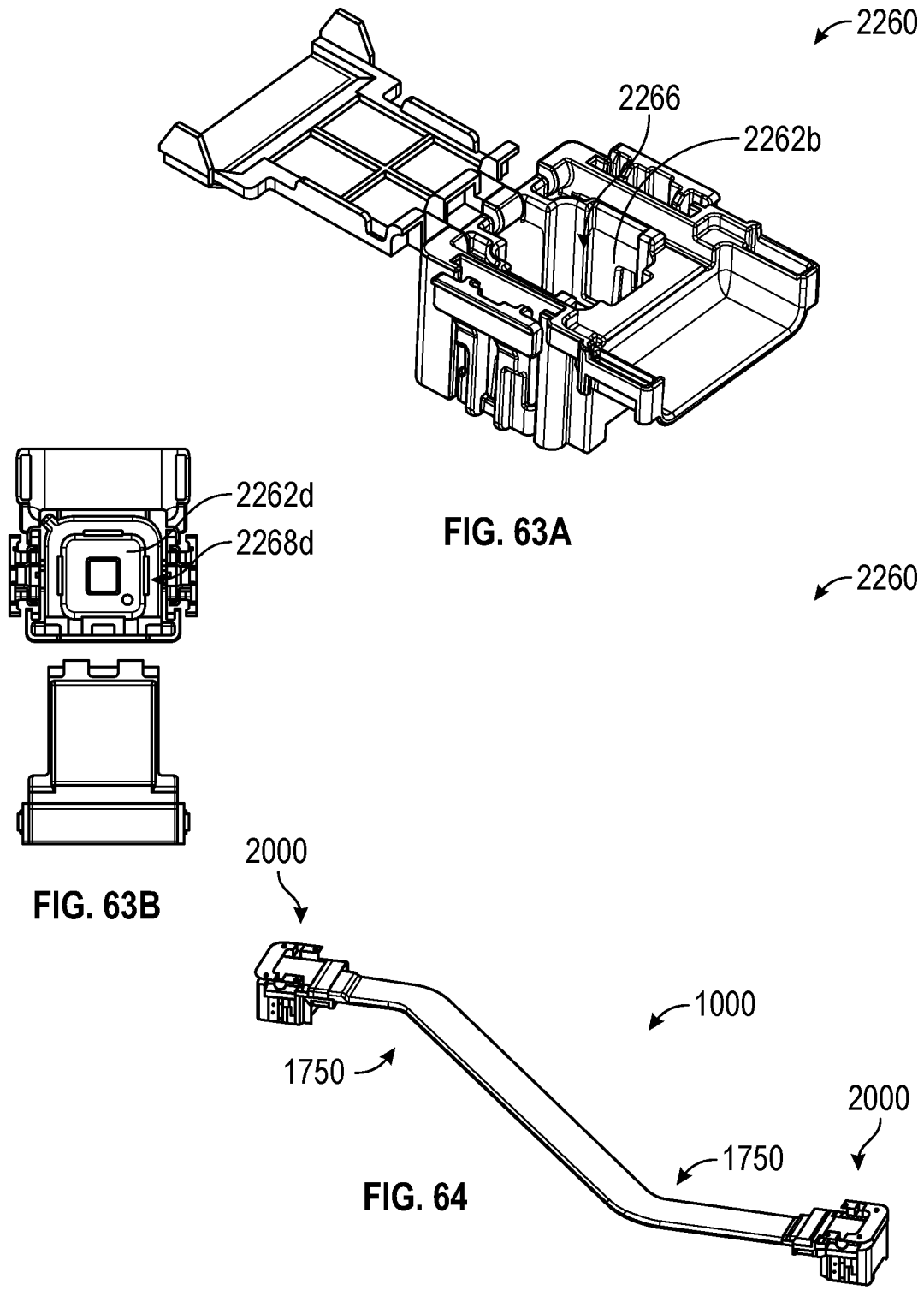

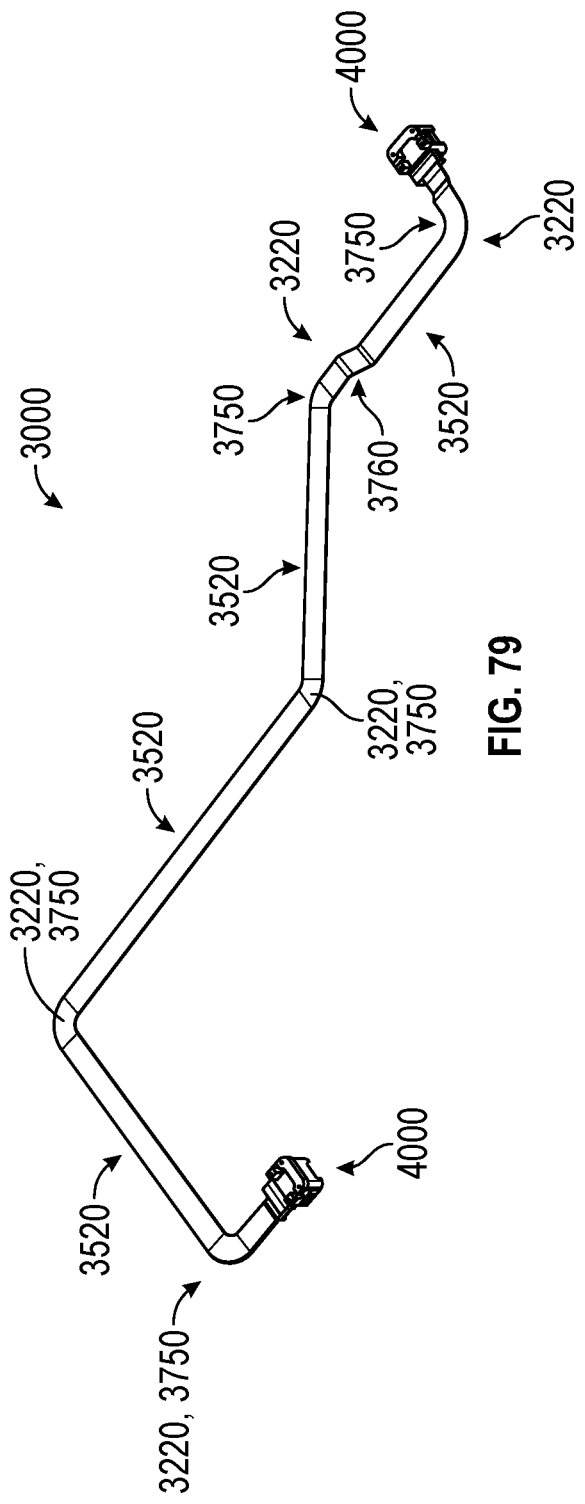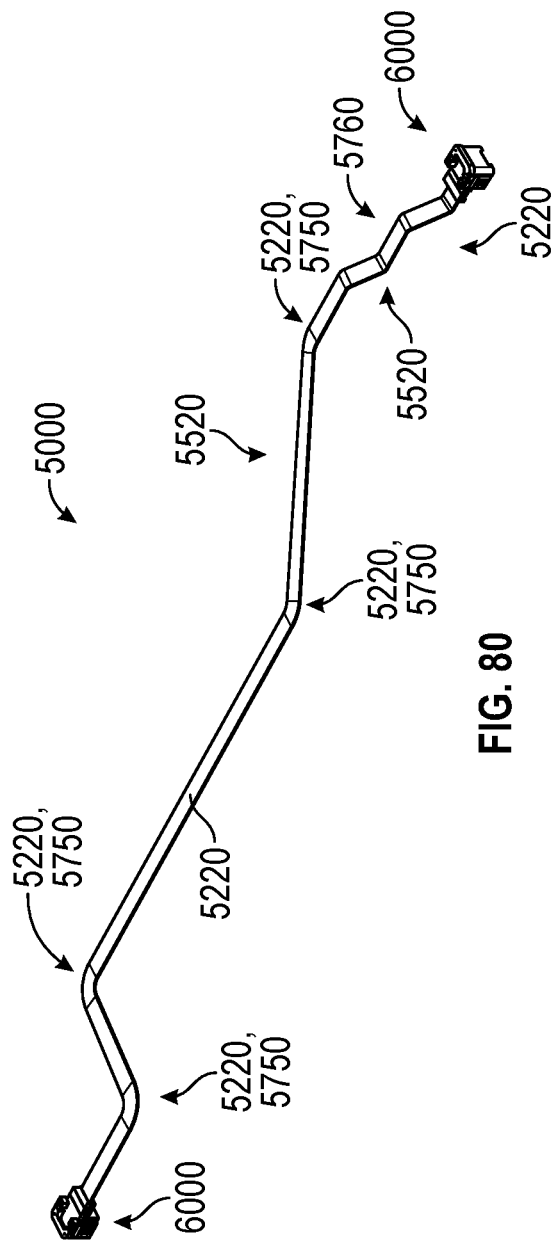

ELECTRICAL BUSBAR AND METHOD OF FABRICATING THE SAME

CROSS-REFERENCE TO RELATED APPLICATIONS

This application is claims priority from U.S. Utility patent application Ser. No. 17/016,321, filed Sep. 9, 2020, U.S. Provisional Patent Application No. 62/897,962, filed Sep. 9, 2019, U.S. Provisional Patent Application No. 62/988,972, filed Mar. 13, 2020, and U.S. Provisional Patent Application No. 63/051,639, filed Jul. 14, 2020, all of which are incorporated herein by referenced and made a part hereof.

FIELD OF DISCLOSURE

The present disclosure relates to electrical connectors, and, in particular, to a busbar for use in electrical signal and power distribution systems like those found in automotive, military, marine and aviation applications. The inventive busbar features at least one fused segment with a solidified region and one potentially unfused segment, which enables the busbar to be formed with complex geometric configurations that are necessary in electrical signal and power distribution systems.

BACKGROUND

Over the past several decades, the number of electronic devices, components, and systems in the automotive, military, marine and aviation sectors have dramatically increased and are expected to continue to increase in the future. The performance of devices, components, and systems comply with and/or conform to industry performance standards, as well as production and reliability requirements. As an example, in the automotive segment, automobiles, and other on-road and off-road vehicles such as pick-up trucks, commercial trucks, semi-trucks, motorcycles, all-terrain vehicles, and sports utility vehicles (collectively "motor vehicles") have experienced a dramatic increase in the number and complexity of electronic devices, components, and systems. Electronics are used to improve performance, manage safety features, control emissions, and provide creature comforts to the occupants and users of the motor vehicles. For motor vehicles, a number of electronic components and devices provide critical signal connections for automotive airbags, batteries, battery power packs, and advanced driver-assistance systems (ADAS).

However, motor vehicles are challenging operating environments due to vibration, heat, and moisture, all of which can limit the performance, reliability and operating life of electronic devices and the connectors used to install them in the vehicles. The same challenges apply in the military marine and aviation sectors. For example, heat, vibration and moisture can all lead to premature wear and eventual failure of the connector and/or the devices themselves. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

In light of these challenging electrical environments, considerable time, money, and energy have been expended to develop power distribution assemblies that meet all of the needs of these markets. Most conventional power distribution assemblies use custom fabricated busbars which are expensive to fabricate and install. By utilizing custom fabricated busbars, any alterations to the power distribution system may require altering the configuration of one or more busbars. These alterations are time-consuming to develop and they further increase labor and installation costs. Once the configuration of these custom-fabricated busbars is finalized and the busbars are manufactured, installers typically couple the busbars to power sources, power distribution components, or other devices with a combination of conventional fasteners (e.g., elongated fasteners, washers, nuts and/or studs). These conventional fasteners make installing the busbars within the application extremely difficult due to the protective equipment that an installer may be required to wear in order to protect themselves during this process. Finally, after the conventional busbars are properly installed within the application, they are prone to high failure rates due to their complex geometric configuration. Accordingly, there is an unmet need for an improved busbar that is boltless, modular suitable, and is suitable for use in power distribution systems that require complex geometries and that are typically found in automotive, military, marine and aviation applications.

The description provided in the background section should not be assumed to be prior art merely because it is mentioned in or associated with the background section. The background section may include information that describes one or more aspects of the subject technology.

SUMMARY

The present disclosure relates to a busbar with at least one fused, stiffer segment and one unfused, flexible segment which enable the busbar to be formed with a complex geometry in the three dimensional Cartesian X, Y and Z coordinate system. The fused segment of the busbar contains at least one region of conductors that has been partially solidified or fully solidified, which increases the stiffness of the fused segment of the busbar. The unfused segment of the busbar contains unsolidified regions of conductors, not partially solidified or fully solidified regions of conductors, that cause the unfused segment to be flexible and capable of being bent in the in-plane X-Y direction or the out-of-plane Z direction.

As such, the inventive busbar can be installed in electrical signal and power distribution systems that require complex geometric configurations. These electrical signal and power distribution systems are prevalent in automotive, military, marine and aviation applications, which have industry performance standards and production and reliability requirements that the inventive busbar can meet due to its unique properties.

Other aspects and advantages of the present disclosure will become apparent upon consideration of the following detailed description and the attached drawings wherein like numerals designate like structures throughout the specification.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7A shows a computer generated model with a layout of busbars that meet the customer's device specifications and requirements;

FIG. 10A-10I show a plurality of different conductor configurations that may be selected during the busbar design process, wherein the conductors vary in width, height, shape, orientation, and number;

FIGS. 12A-12D show two different edge details that may be selected in the busbar design process, wherein FIG. 12B is an enlarged view of one conductor shown in FIG. 12A and FIG. 12D is an enlarged view of one conductor shown in FIG. 12C;

FIGS. 13A and 13B show an intermediate busbar portion having one consistent segment or multiple segments that vary, wherein the segment design is based upon the geometry of the bends contained within the busbar;

FIGS. 14A-14G show a plurality of different segments of a busbar, wherein the design of the selected segments is based upon the geometry of the bends contained within the busbar;

FIGS. 16A-16D show exemplary shapes of the laser beam that may be utilized to fuse the selected segments of the busbar;

FIG. 20A shows a combined fusion pattern that is designed to undergo an out-of-plane;

FIG. 20B shows a combined fusion pattern that is designed to undergo an in-plane;

FIG. 21A shows variance of the frequency of the waveforms contained within the combined fusion pattern within a single fused segment of the busbar;

FIG. 21B shows another exemplary combined fusion pattern, wherein the frequency of the waveforms vary within a single fused segment of the busbar;

FIGS. 23A-23D show exemplary embodiments of combined fusion patterns that may be utilized with the intermediate portion of the busbar;

FIGS. 24A-C shows machines for the digital testing of the busbar design to ensure that it meets the customer's busbar specifications;

FIG. 32 is a first side view of the busbar of FIG. 29;

FIG. 33 is a second side view of the busbar of FIG. 29;

FIG. 34 is a first end view of the busbar of FIG. 29;

FIG. 35 is a second end view of the busbar of FIG. 29;

FIG. 36 is a top view of the busbar of FIG. 29;

FIG. 37 is a cross-sectional view of FIG. 36 taken along line 37-37 of FIG. 36;

FIG. 38 is a zoomed-in view of FIG. 37 showing a fused segment and an unfused segment including partially solidified regions and unsolidified regions;

FIG. 40 is a top view of the busbar of FIG. 29;

FIG. 41 is a cross-sectional view of FIG. 40 taken along line 41-41 of FIG. 40;

FIG. 42 is a zoomed-in view of FIG. 41 showing a fused segment and a unfused segment, wherein the fused segment includes fully solidified regions and unsolidified regions;

FIG. 44 is a top view of the busbar of FIG. 29;

FIG. 45 is a cross-sectional view of FIG. 44 taken along line 45-45 of FIG. 44 showing a fused segment including fully solidified regions, partially solidified regions, and unsolidified regions;

FIG. 42E is a busbar that has been insulated using the insulating machine of FIG. 48A;

FIG. 61 is a top view of the busbar of FIG. 56;

FIG. 62 is a bottom view of the busbar of FIG. 56;

FIG. 63A is a perspective view of a housing for the electrical connector assembly with an internal spring component prior to coupling to the busbar;

FIG. 63B is a bottom view of the housing shown in FIG. 68A;

FIG. 64 is a perspective view of the inventive busbar, wherein insulation surrounds the busbar and the busbar has two electrical connector assemblies that are partially surrounded by housings;

FIG. 79 is a perspective view of a second embodiment of the inventive busbar with the insulation extending between opposed electrical connector assemblies;

FIG. 80 is a perspective view of a third embodiment of the inventive busbar with the insulation extending between opposed electrical connector assemblies;

DETAILED DESCRIPTION

Figure 1B:
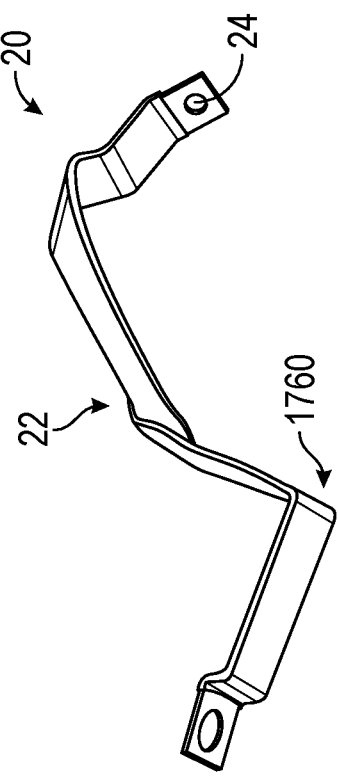
FIG. 1B is a conventional rigid busbar with a configuration having multiple out-of-plane bends.

In the following detailed description, numerous specific details are set forth by way of examples in order to provide a thorough understanding of the relevant teachings.

However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. As such, one or more steps from the flowcharts or components in the Figures may be selectively omitted and/or combined consistently with the disclosed methods and systems. In addition, the steps contained within the flowcharts can be performed in different orders. In other words, the order of the steps described below does not have to be strictly followed and instead steps can be performed out of order. Accordingly, the drawings, flow charts and detailed descriptions are to be regarded as illustrative in nature, not restrictive or limiting.

1) Definitions

The following terms appear through this specification and are defined as follows. The term "partial solidification zone" is an area of the fused segment of the intermediate portion of the busbar, where the zone extends from the lowermost conductor in the fused segment to the upper most conductor in the fused segment. For example, in FIG. 39 zone 1660 of the busbar 1000 that extends between the top surface 1000*a* and the bottom surface 1000*b* that has undergone a partial penetration weldment process.

Figure 39:
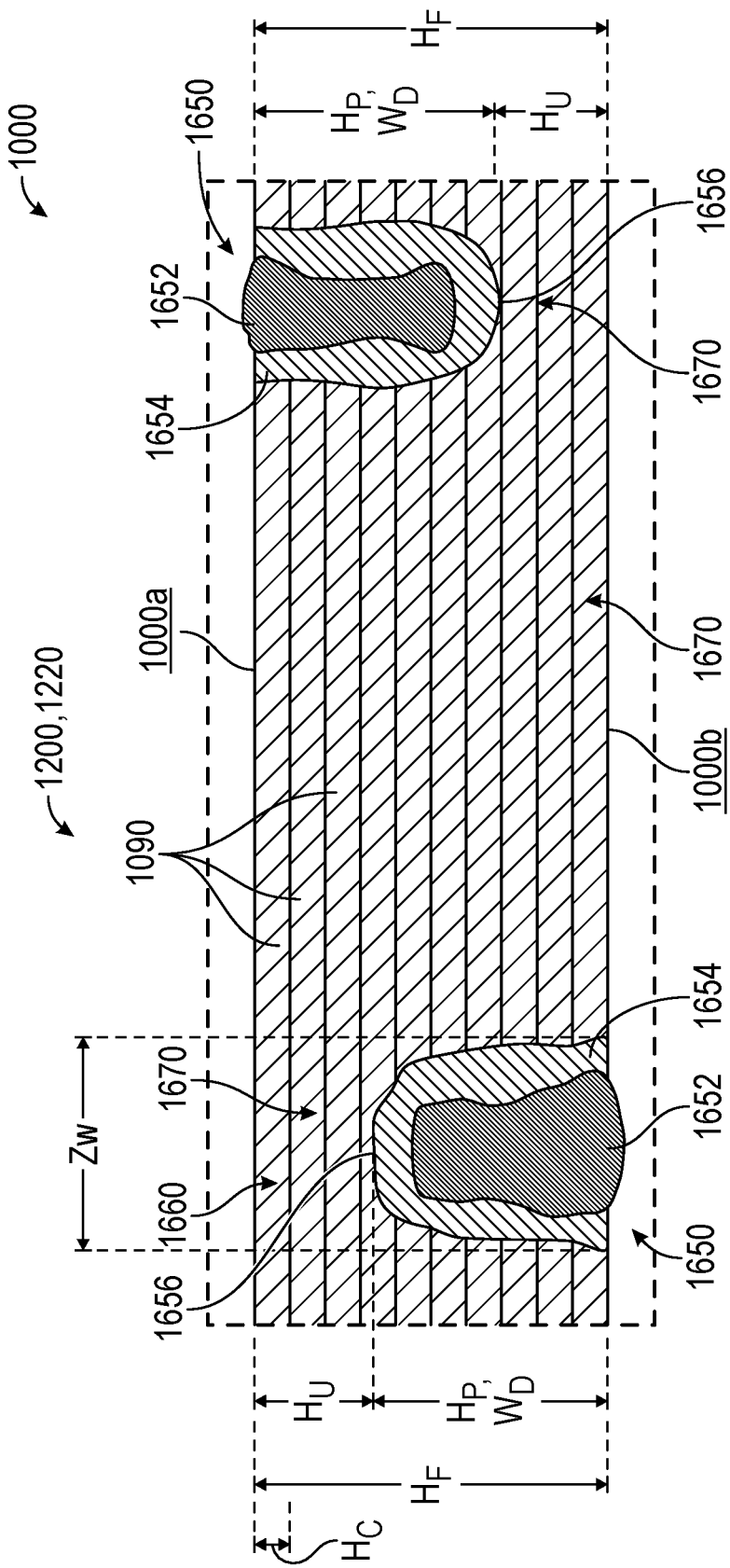
FIG. 39 is a zoomed-in view of FIG. 38 showing the fused segment including partially solidified regions and unsolidified regions.

The term "partially solidified region" means an extent of the partial solidification zone of the busbar that has undergone a partial penetration weldment process. This process combines or fuses some, but not all, of the intermediate extents of conductors contained within the partial solidification zone to form the partially solidified region that provides a single consolidated conductor. Examples of partially solidified regions 1650 are shown in FIGS. 38, 39, and 45. In the partially solidified region 1650, a significant amount (e.g., approximately 70%) of the conductors 1090 located within the partial solidification zone 1660 are combined into a single consolidated conductor and a lesser amount (e.g., approximately 30%) of the conductors located within the partial solidification zone 1660 and beyond the partially solidified region 1650 remain as individual conductors 1090—meaning that they are not combined or fused into a single combined conductor.

The term "unsolidified region" means an extent of the busbar that has not undergone a weldment process to combine or fuse any of the conductors contained within that extent of the busbar. As such, all of the conductors located within an unsolidified region remain as individual conductors. For example, FIG. 39 shows unsolidified regions 1670 adjacent to and between the two partially solidified regions 1650 within the fused segment 1220 of the intermediate portion 1200 of the inventive busbar 1000.

Figure 43:
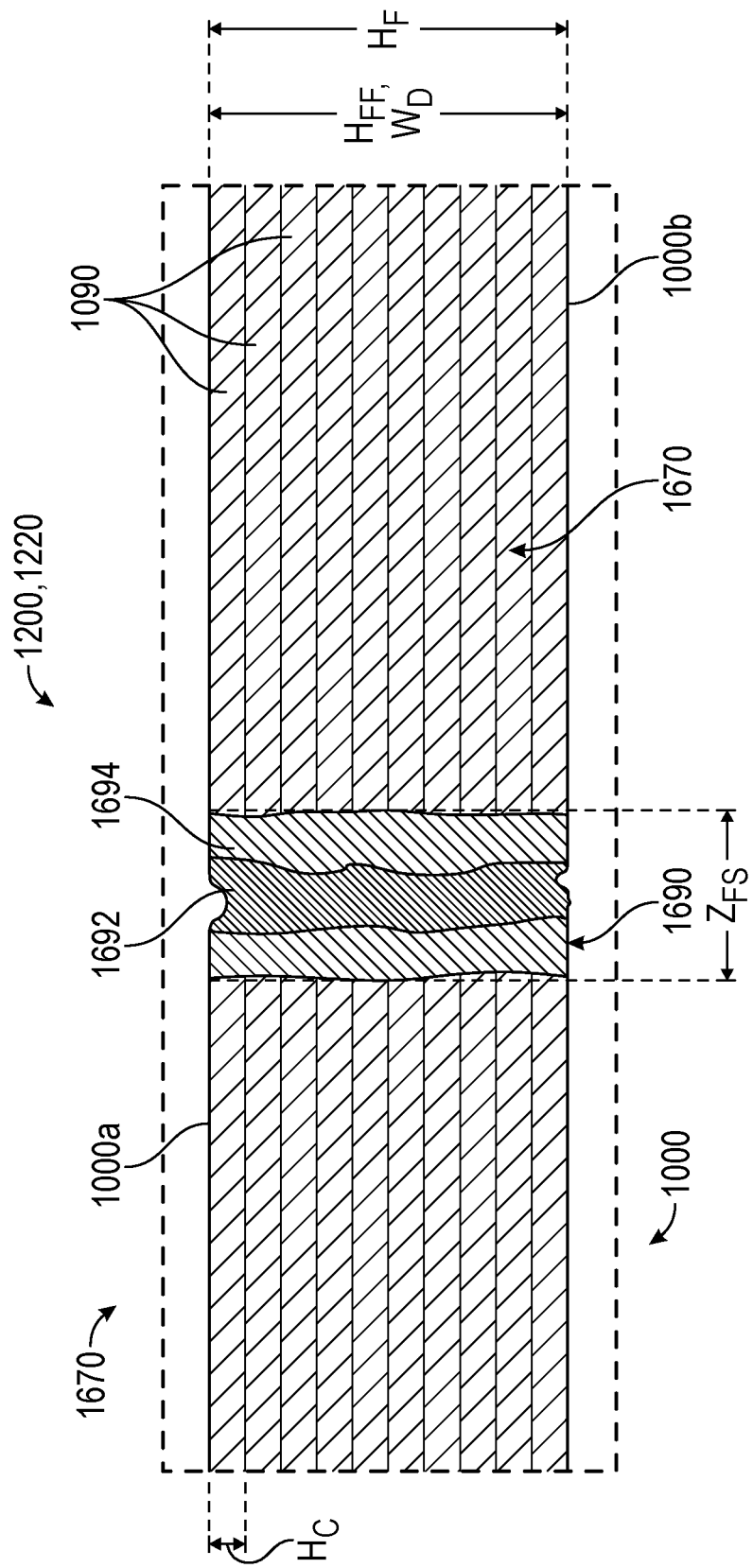
FIG. 43 is a zoomed-in view of FIG. 42 showing a fused segment including fully solidified regions and unsolidified regions.

The term "fully solidified region" means an extent of the busbar that has undergone a full penetration weldment process to combine or fuse all conductors contained within that extent of the busbar into a single consolidated conductor. For example, FIG. 43 shows one fully solidified region 1690 flaked by unsolidified region 1670 within the fused segment 1220 of the intermediate portion 1200 of the inventive busbar 1000.

The term "fused segment" is an extent of the busbar that contains at least one partially solidified region or fully solidified region, or both. The fused segment may also include an unsolidified regions. For example, FIG. 39 shows unsolidified regions 1670 and partially solidified regions 1650, and FIG. 43 shows unsolidified regions 1670 surrounding a fully solidified region 1690, both within the fused segment 1220 of the intermediate portion 1200 of the inventive busbar 1000.

The term "unfused segment" is an extent of the busbar that does not contain a either a partially solidified region or a fully solidified region. Thus, the unfused segment only contains an unsolidified region(s). For example, FIGS. 38 and 42 shows unsolidified regions 1670 within the unfused segment 1520 of the intermediate portion 1200 of the inventive busbar 1000.

Figure 1A:
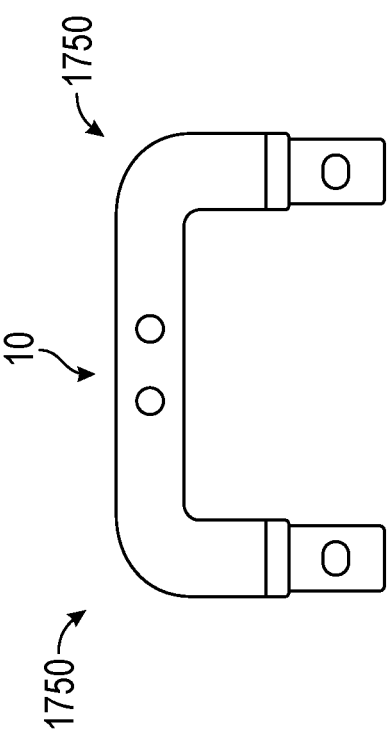
FIG. 1A is a conventional rigid busbar with a configuration having in-plane bends.
Figure 3A:
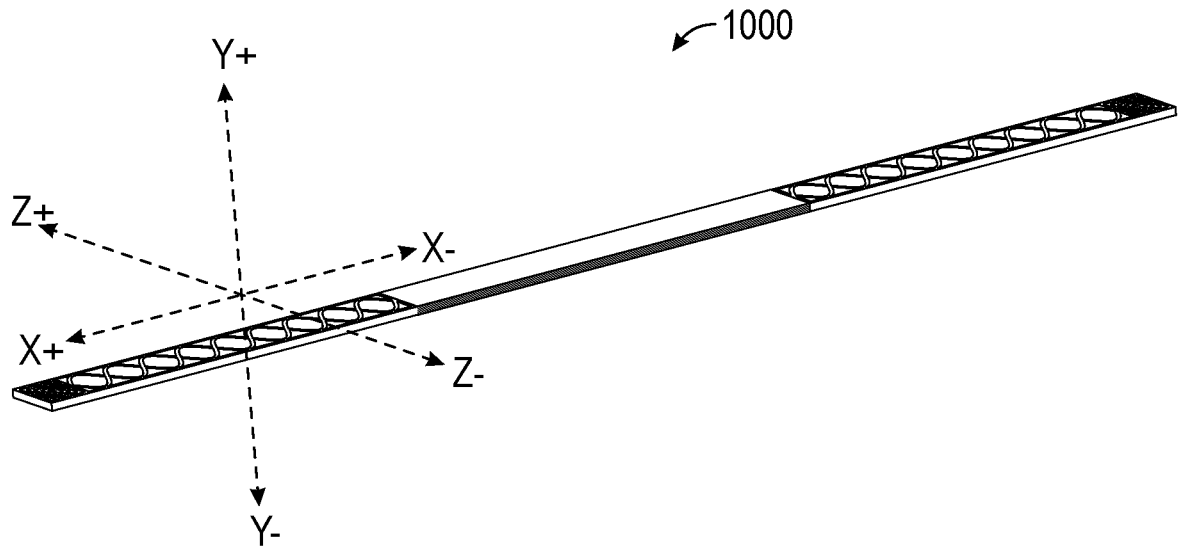
FIGS. 3A and 3B show the orientation of a three dimensional X, Y and Z Cartesian coordinate system for straight and bent busbar configurations.
Figure 3B:
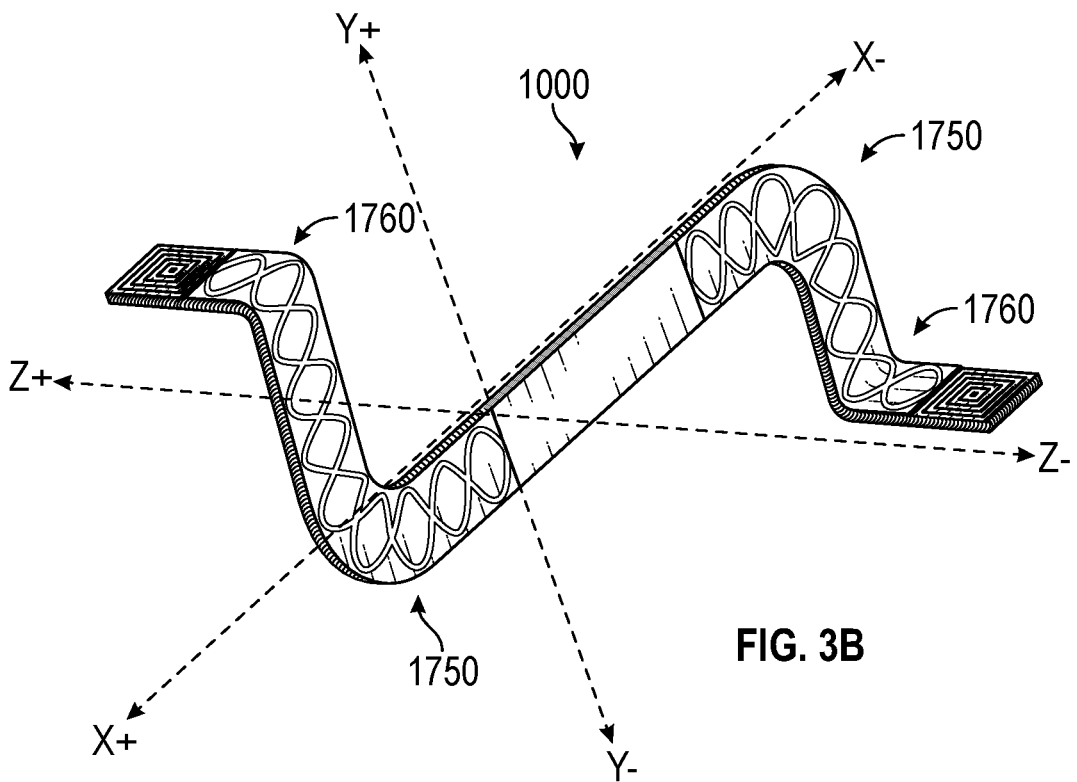

The term "in-plane" refers to the X and Y directions in a three dimensional Cartesian X, Y and Z coordinate system, as shown in FIGS. 3A-3B. The term "in-plane bend" is a type of bend of the busbar that is oriented in the X-Y plane and that is oriented transverse, typically perpendicular to the width of the busbar. FIG. 1A shows a busbar 10 with two exemplary in-plane bends 1750 in the X-Y plane, which were formed within the fused segment 1220 of the intermediate portion 1200 of the inventive busbar 1000.

The term "out-of-plane" refers to the Z direction in the three dimensional Cartesian X, Y and Z coordinate system, as shown in FIG. 3. The term "out-of-plane bend" is a type of bend of the busbar that is oriented in the Z direction and that is perpendicular to X-Y plane. FIG. 1B shows a busbar 20 with two out-of-plane bends 1760 in the Z-direction.

The term "High power" shall mean (i) voltage between 20 volts to 600 volts regardless of current or (ii) at any current greater than or equal to 80 amps regardless of voltage.

The term "High current" shall mean current greater than or equal to 80 amps regardless of voltage.

The term "High voltage" shall mean a voltage between 20 volts to 600 volts regardless of current.

2) Overview of Conventional Busbars

Figure 2B:
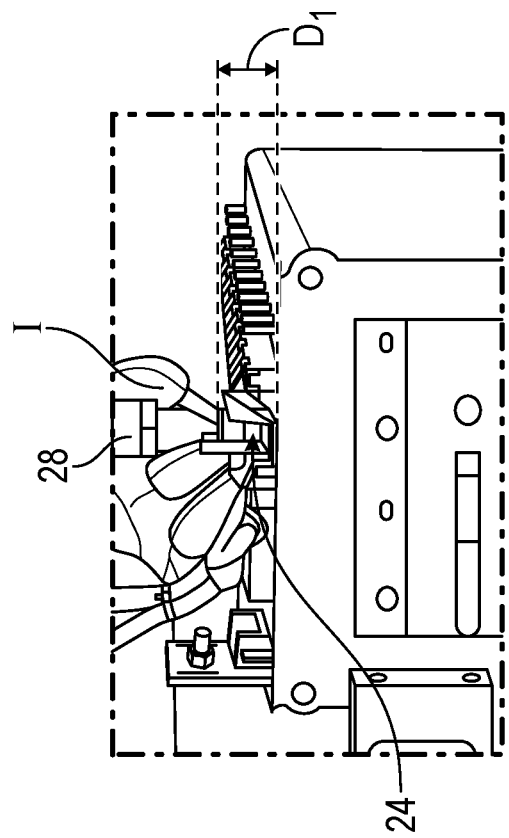
FIGS. 2A and 2B show the installation of a conventional busbar to a component within an application, such as an automotive vehicle.
Figure 2A:
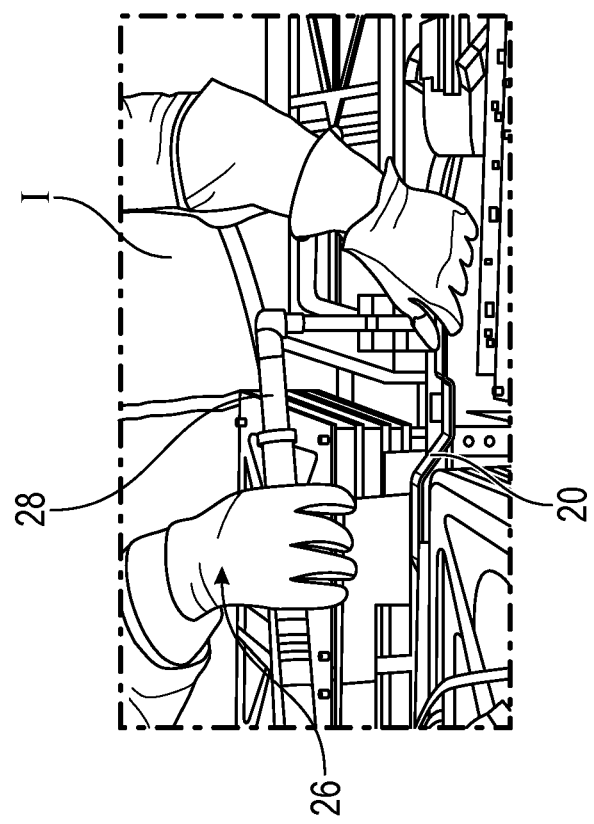

A conventional rigid busbar 10 is shown in FIG. 1 and a conventional flexible busbar 20 is shown in FIG. 2, wherein both of these conventional busbars 10, 20 suffer from numerous limitations. For example, conventional rigid busbars 10: (i) have high manufacturing costs, (ii) cannot effectively account for manufacturing tolerances, and (iii) cannot properly expand or contract during battery charging and discharging cycles. While conventional flexible busbars 20 address some of the problems associated with conventional rigid busbars 10, flexible busbars 20 have their own significant limitations. For example, conventional flexible busbars 10: (i) cannot be easily connected to other objects, (ii) can be expensive to fabricate, and (iii) cannot maintain an in-plane bend busbar without creating large gaps (e.g., delamination) between the conductors contained within the flexible busbar 20, which in turn reduces current flow within the busbar 20. In order to achieve the configuration of an in-plane bend using a flexible busbar 20, the flexible busbar 20 is folded 22 in a manner that causes a first extent of the busbar 20 to overlap with a second extent of the busbar 20 (see FIG. 2). This folded configuration increases the height required for the busbar 20 and the geometry of the fold limits the current flow of the busbar 20. Additionally, even out-of-plane bends can cause an increase in the resistance of the busbar 20, which may lead to hot spots in the insulation and even failure of the busbar 20. Further, the edges of the flexible busbar 20 tear into or wear away the insulation; thereby leading to the failure of the entire busbar 20. To solve some of these issues, companies have attempted to join separate and distinct flexible busbars with separate and distinct rigid busbars. The cobbling together of these two separate and distinct types of busbars is expensive, time consuming, their junction regions are prone to extremely high failure rates, and a substantial amount of material is wasted in attempting to form these busbars.

On top of these issues, conventional busbars 10, 20 that are connected to components using conventional connectors 24 also suffer from a number of problems. For example, conventional busbars 10, 20 and connectors 24 suffer from: (i) time consuming installation, (ii) requiring a high level of skill and dexterity to perform the installation, (iii) high number of safety concerns, (iv) may require disassembly of the entire battery pack, if a conventional connector is dropped or misplaced within the pack during the installation process, (v) subject to high failure rates, (vi) requires multiple people to confirm that a single installation has been properly performed, and (vii) requires a substantial amount of space and weight. As shown in FIGS. 3A and B, a number of safety concerns exist when an installer, I, is working over an open battery pack. To mitigate some of these concerns, the installer I wears thick protective gloves 26 and utilizes custom designed tools 28. The custom designed tools 28 are expensive to obtain and the thick protective gloves 26 requires that the installer I have a high level of skill and dexterity to ensure that the conventional connector 24 is not accidently dropped within the battery pack or the surrounding environment. If a mishap like this occurs, then the installation process needs to be halted and the entire battery pack must be disassembled in order to find the misplaced conventional connector 24. Even assuming that the installation goes as planned, a second person (other than the installer I) is typically required to check the torque of the conventional connectors 24 and apply a marking or indicia to show that such the requisite check was made. Because the conformation of the connection is done by hand, the manufacturing company may not have a digital record showing when and if the conventional connector was properly connected.

3) Design and Fabrication of the Inventive Busbar

The inventive busbar 1000 disclosed herein overcomes a number of the limitations disclosed above while meeting automotive, military, marine and aviation performance, production and reliability requirements. In particular, the busbar 1000 includes a plurality of conductors 1090 arranged to provide two opposed end portions 1700 and an intermediate portion 1200, wherein each of the conductors 1090 has a plurality of intermediate extents that traverse or span the intermediate portion 1200. The intermediate portion 1200 includes: (i) a first or fused segment 1220 and (ii) a second or unfused segment 1520. First, integrally forming fused and unfused segments 1220, 1520 into a single busbar 1000 allows the busbar 1000 to combine the best features of the conventional rigid busbars 10 and conventional flexible busbars 20 into a single unit, while limiting the negative features associated with these conventional busbars 10, 20. For example, the unfused segments 1520 are flexible which allows the busbar 1000 to: (i) adjust for manufacturing tolerances, (ii) expand and contract during thermal expansion and contraction events, such as battery charging and battery discharging cycles, and (iii) help absorb vibrations caused by the environment (e.g., under the hood of a vehicle) that the busbar 1000 is installed within, instead of transferring these vibrations into the connectors. Additionally, the fused segments 1220 of the busbar 1000 are stiffer which allows the busbar 1000 to be accurately bent both out-of-plane and in-plane and especially maintain that in-plane bend over time without causing the conductors contained within the busbar 1000 to delaminate and thus reduce current flow. This attribute of the busbar 1000 is beneficial because: (i) it reduces the overall height required for the busbar 1000 and (ii) does not limit the current flow through the fused segments, which in turn allows the busbar 1000 to carry more current without creating hotpots or causing a substantial rise in temperature. Further, the edges of the busbar 1000 can be modified to reduce the probability that the conductors contained within the busbar 1000 tear into or wear away the surrounding insulation. Moreover, the high cost, extremely high failure rates and material waste associated with the cobbled together conventional busbars are eliminated by integrally forming the fused and unfused segments 1220, 1520 into a single busbar 1000. Finally, the inclusion of fused and unfused segments 1220, 1520 allows the busbar 1000 to be: (i) formed without custom molds and (ii) shipped to a customer in a substantially flat configuration, which reduces packaging, handling, and shipping costs and also reduces the chance the busbar 1000 may be damaged either in transit or while being handled prior to being installed in a component, device or vehicle.

The inventive busbar 1000 can utilize either conventional connectors 24 or a boltless connector system 2000. The boltless connector system 2000 does not utilize bolts, screws, fasteners, or the like to connect at least an extent of a busbar 1000 between: (i) power sources (e.g., alternator or battery), (ii) a power source and a power distribution/control component, or (iii) a power source and a device (e.g., radiator fan, heated seat, power distribution component, or another current drawing component). This boltless connector system 2000 and its features are described within at least PCT/US20/14484, which is incorporated by reference, and overcomes a number of the limitations related to conventional busbar connectors 24. For example, the boltless connector system 2000 only requires a single person to connect the male connector assembly 2200 into the female connector assembly 2600, hear an audible signal (e.g., a "click"), tug on the connector assemblies 2200, 2600 to ensure they are properly coupled together, and read an extent of the system (push, click, tug, read—"PCTR" compliant). In other words, the busbar 1000 can be coupled to another component or device without the use of a separate tool, which reduces safety concerns, reduces assembly and handling times, and does not require a high level of skill and dexterity required to install a conventional busbar connector 24. Manufacturing times remain consistent because there are no loose parts that may be lost within the battery pack or surrounding environment. Furthermore, labor costs are better managed and reduced because handling and installation of the busbar 1000 (i) only requires one person a shorter amount of time to install the busbar 1000, (ii) requires less space (e.g., the conventional connector height (D1 shown in FIG. 3B) is reduced from approximately 40 mm to 16 mm), and (iii) is easier because the busbar 100 is approximately 50% lighter than conventional busbar.

In addition to being utilized within a vehicle battery pack, the busbar 1000 may be used to provide mechanical and electrical connection in other electrical systems that are found in an airplane, a motor vehicle, a military vehicle (e.g., tank, personnel carrier, heavy-duty truck, and troop transporter), a bus, a locomotive, a tractor, a boat, a submarine, a battery pack, a volt system that has more than 24 volts, power storage system, in a high-power application, in a high-current application, in a high-voltage application, or in another application where busbars 1000 are essential to meet industry standards and production requirements.

A. Designing the Inventive Busbar

Figure 4:
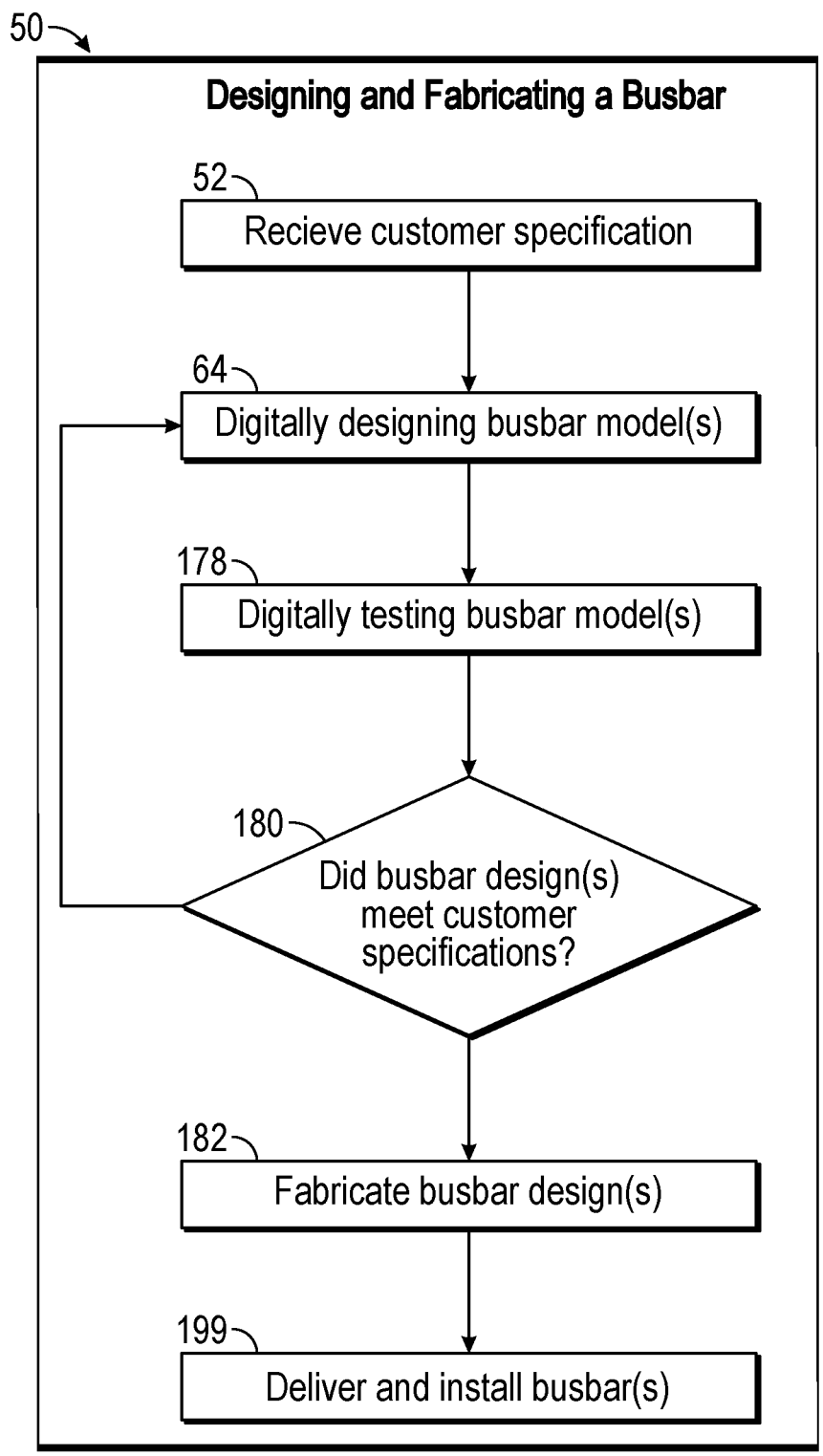
FIG. 4 is a flowchart showing the steps for creating the inventive busbar.
Figure 5A:
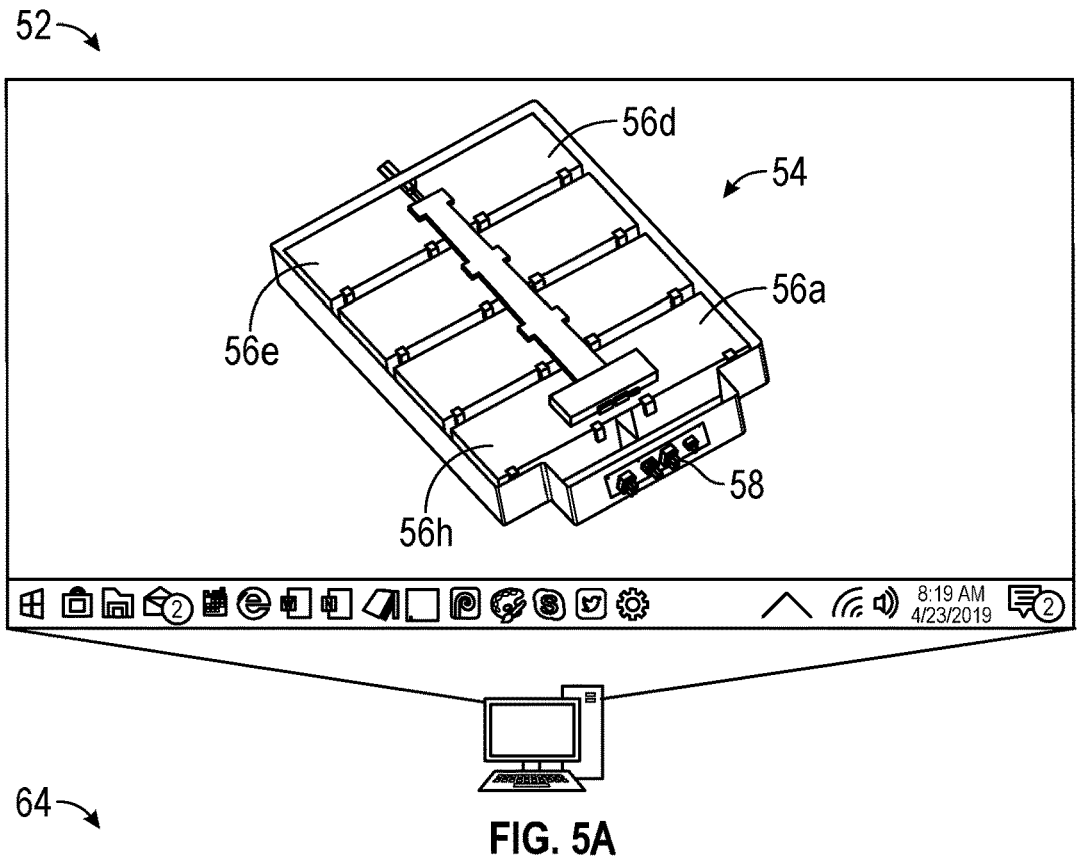
FIG. 5A shows a digital request from a customer for a plurality of busbars to be installed within a battery pack, wherein the specifications and requirements for said busbars are contained within the customer's request.

Designing and fabricating a busbar 1000 is a multi-step process 50 that is described at a high level in connection with FIG. 4. As shown in FIG. 4, this multi-step process 50 starts by receiving specifications from the customer in step 52. These customer specifications may include a multitude of different requirements, including but not limited to: (i) current carrying capacity, (ii) geometry constraints, (iii) material and/or chemical constrains, (iv) manufacturing repeatability, (v) durability, (vi) compliance with standard setting bodies, (viii) environmental constraints, (ix) manufacturing requirements, and (x) other requirements. The customer specifications may be sent to the busbar designer in any manner and the specifications may take any form including data sheets and CAD models. For example, FIG. 5 shows an example of a portion of the customer specifications that were received within step 52. Specifically, FIG. 5 shows a digital 3D CAD model of a battery pack 54 that includes eight battery modules 56a-56h. The customer is requesting busbars 1000 that can: (i) mechanically and electrically couple the external battery pack connectors 58 to the battery modules 56a-56h and (ii) couple the battery models 56a-56h to one another. Once the customer specifications are received, the busbar designer can take the specifications and move on to step 64 of this multi-step process 50.

Figure 7C:
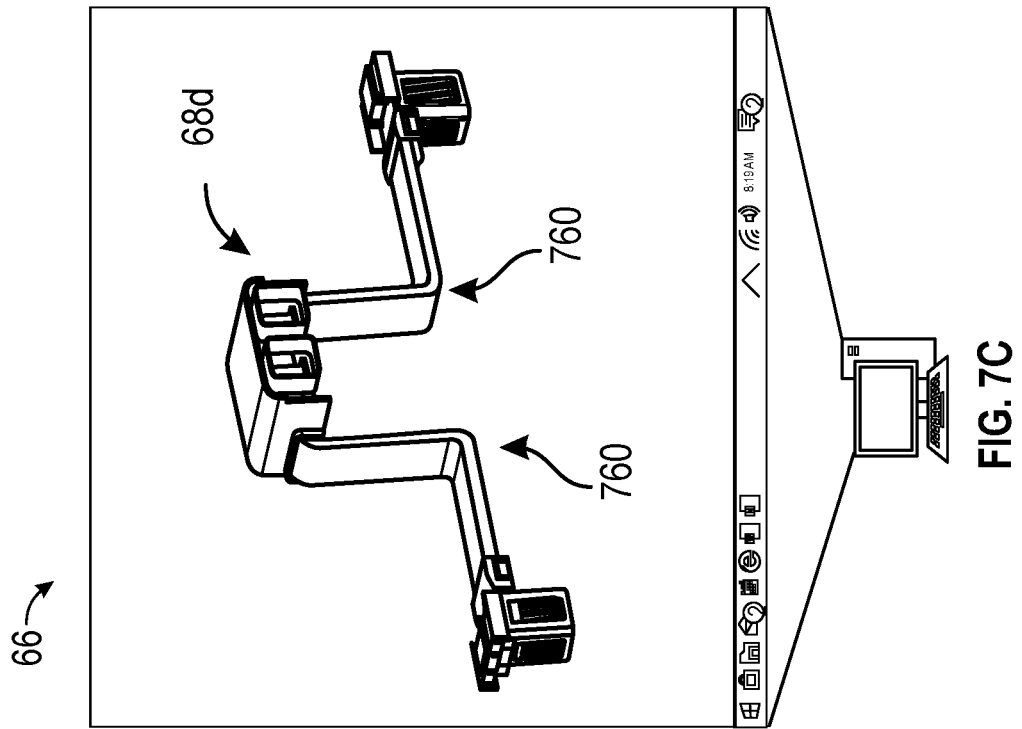
FIGS. 7B-7F show perspect views of busbar that comprise the layout in FIG. 7A.
Figure 7B:
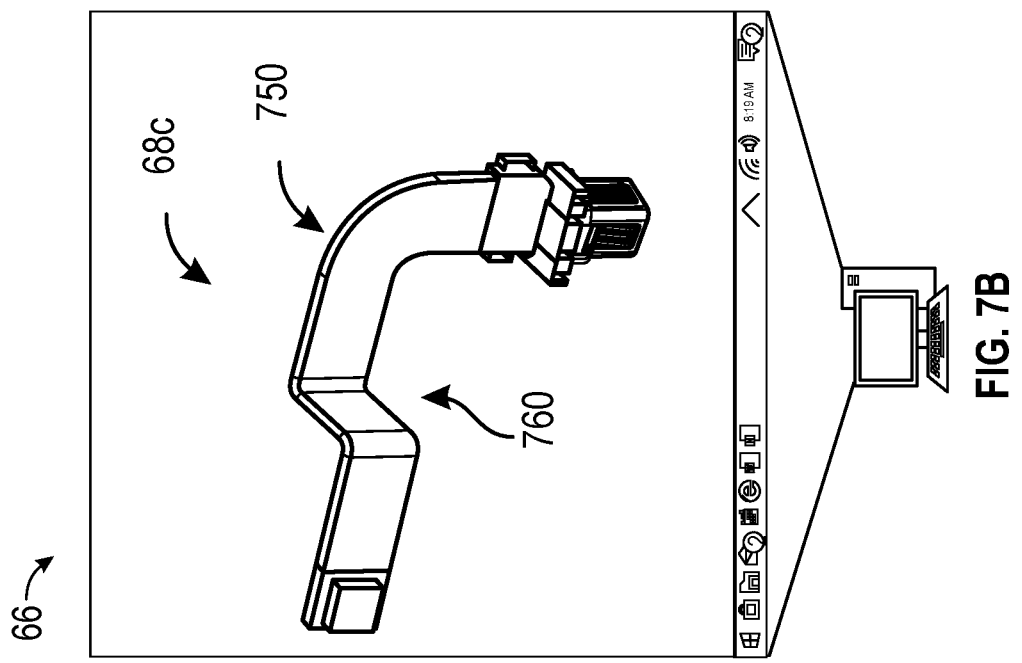
Figure 7E:
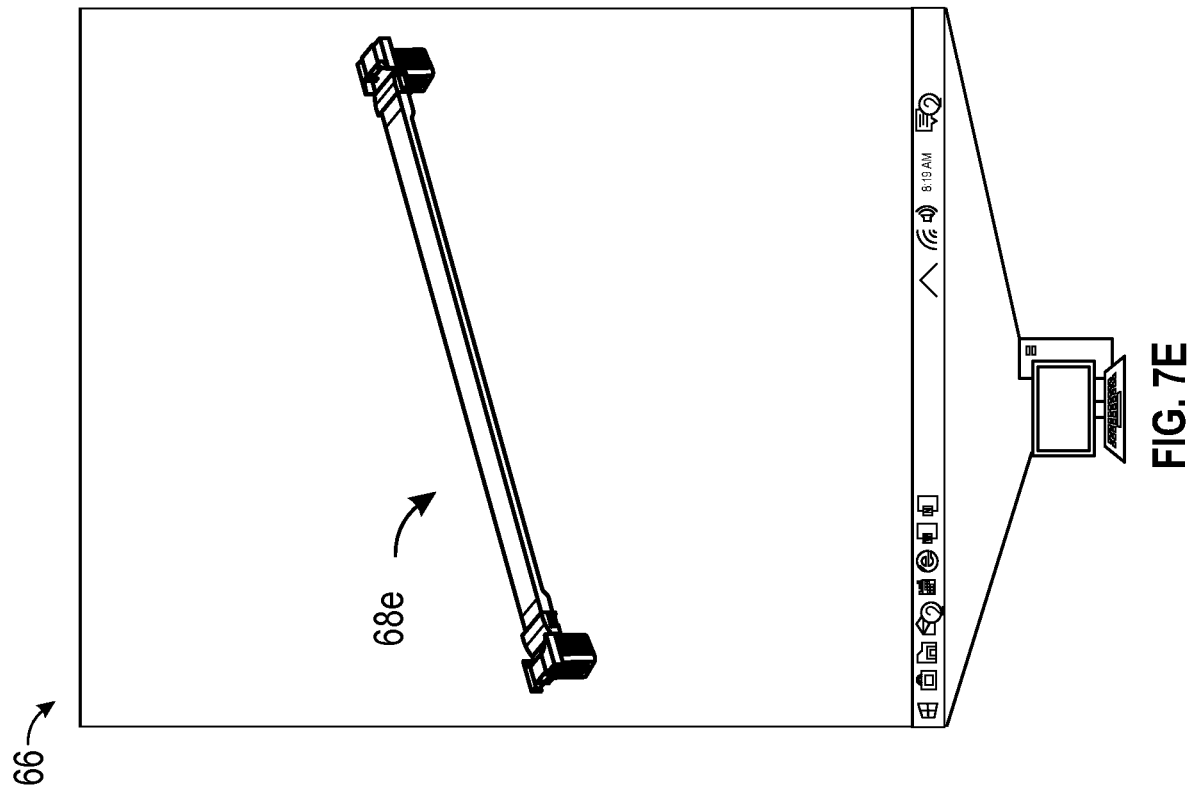
Figure 7D:
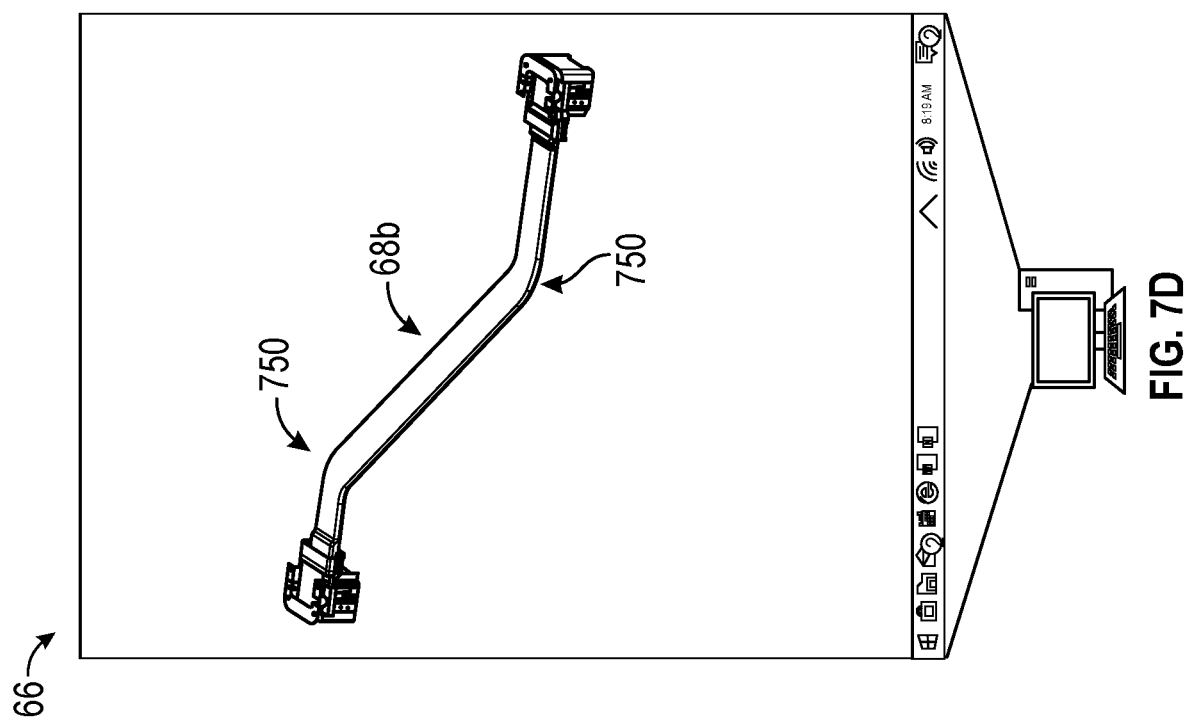
Figure 7F:
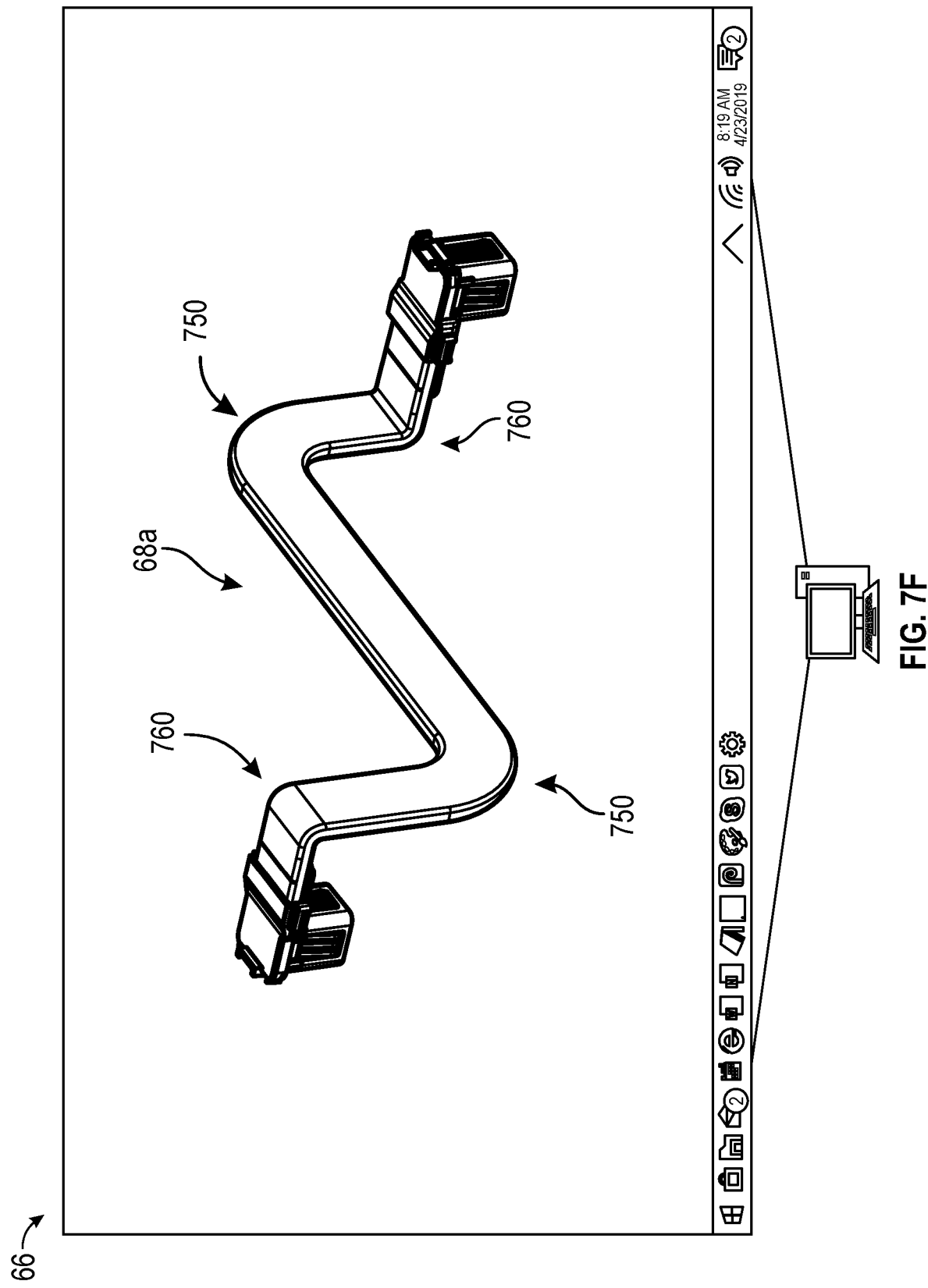

The next step in the multi-step process 50 of designing and manufacturing a busbar 1000 is step 64 (see FIG. 4), which entails digitally designing engineering busbar models 100 that meet the customer specifications that were received within step 52. In designing these engineering busbar models 100, it may be desirable to understand how electricity will be routed within the customer's application, product, component, or device. In particular, it may be desirable to gain an understanding of how busbars will route the electricity within the application, product, component, or device to enable the busbar designer to create engineering busbar models 100 that: (i) meets the customer's specifications, (ii) minimizes the length and weight of the busbar, (iii) allows for proper electrical and mechanical connections, (iv) minimizes the height required for the busbar, and (v) minimizes overlapping busbar. To gain this understanding, the designer may create a model of the busbar layout 70 within the application, product, component, or device (step 66). An example of a model of this busbar layout 70 is shown in FIG. 7A. In particular, FIG. 7A shows eight different non-engineering busbar models 68a-68h that may be used within the customer's application, product, component, or device shown in FIG. 5. FIGS. 7B-7F show isolated views of a few of these non-engineering busbar models 68a-68e. While these non-engineering models 68a-68h are not suitable for manufacturing purposes, they provide the general overall geometry of the busbar. The next steps described herein will work to turn these non-engineering models 68a-68h into engineering models 100 that can be manufactured.

Figure 6:
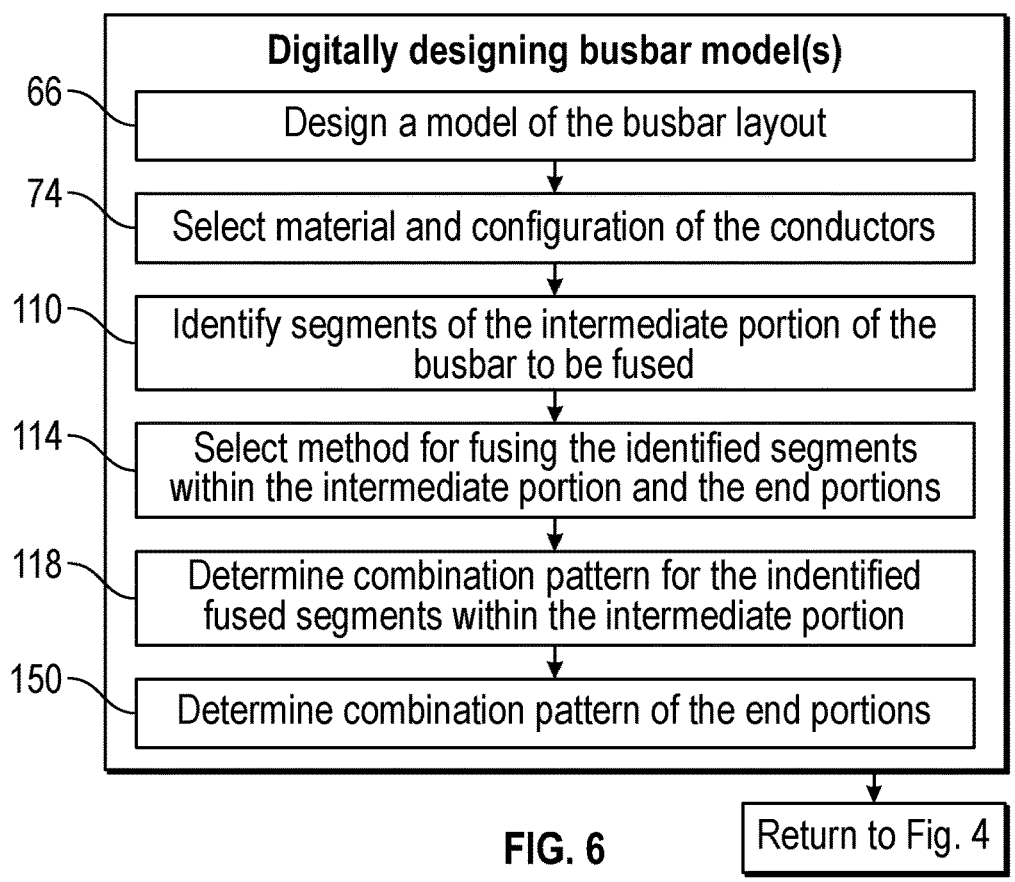
FIG. 6 is a flowchart showing the steps for digitally designing the busbars.
Figure 8:
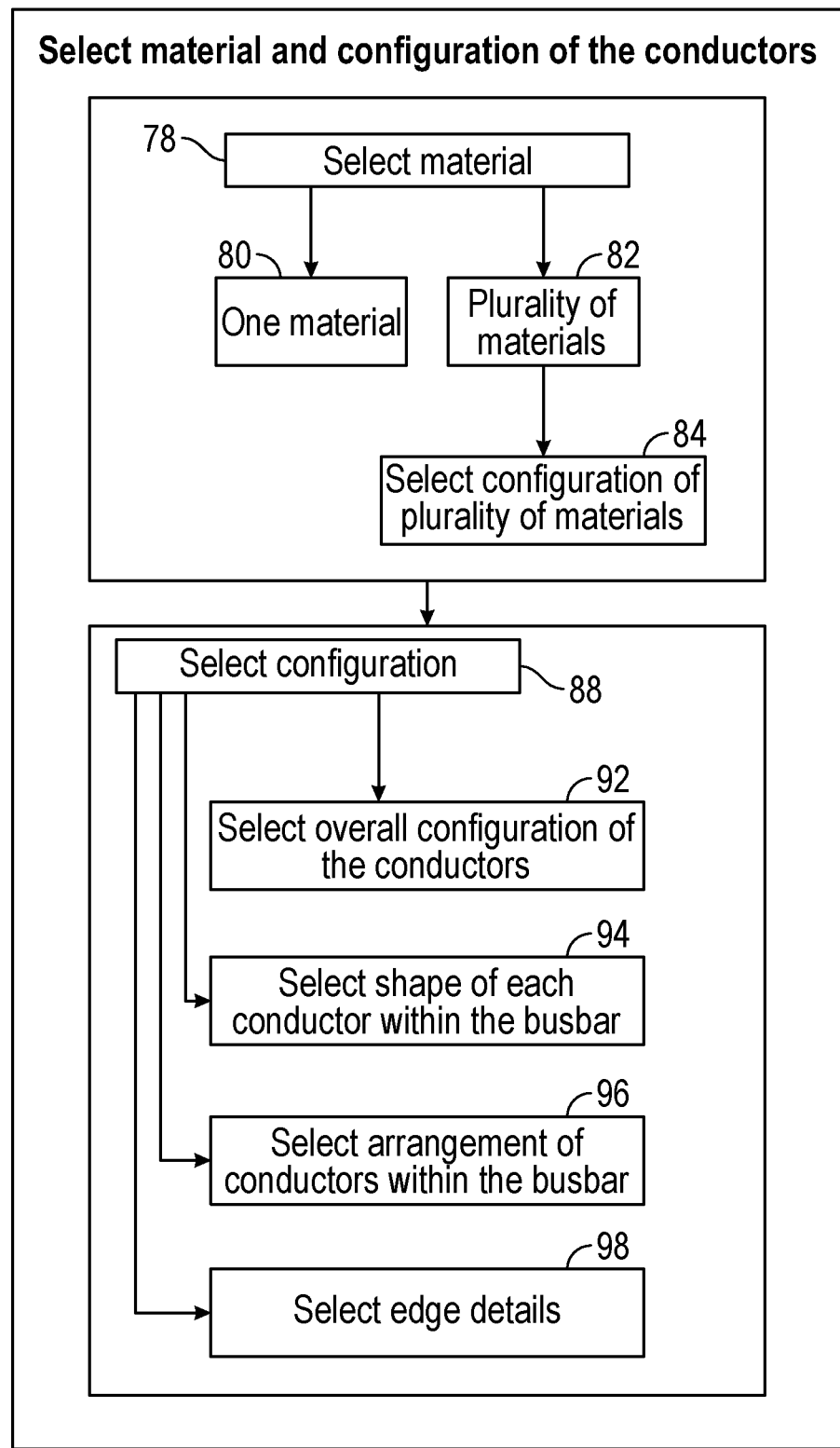
FIG. 8 is a flowchart showing the steps for selecting the material(s) and configuration of the conductors within the busbar based on the selected busbar design.

Returning to FIG. 6, the next step in digitally designing the engineering busbar models 100 is selecting the material and configuration of the conductors 90 contained within the busbar model 100 (step 74). Specifically, process of step 74 is described in greater detail within FIG. 8. With the non-engineering model in hand 68a-68h, the busbar designer can select the materials that will be used in the engineering busbar model 100 (step 78). As shown in FIG. 8, the busbar designer may choose to make the busbar model 100 from a single material in step 80. Such materials may include, but are not limited to, stainless steel, nickel, aluminum, silver, gold, copper, steel, zinc, brass, bronze, iron, platinum, lead, molybdenum, calcium, tungsten, lithium, tin, a combination of the listed materials, or other similar metals. For example, the busbar designer may choose to utilize C10200 copper alloy in connection with non-engineering busbar model 68a, 68b. This copper alloy has an electrical conductivity of more than 80% of IACS (International Annealed Copper Standard, i.e., the empirically derived standard value for the electrical conductivity of commercially available copper), is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius).

Figure 9A:
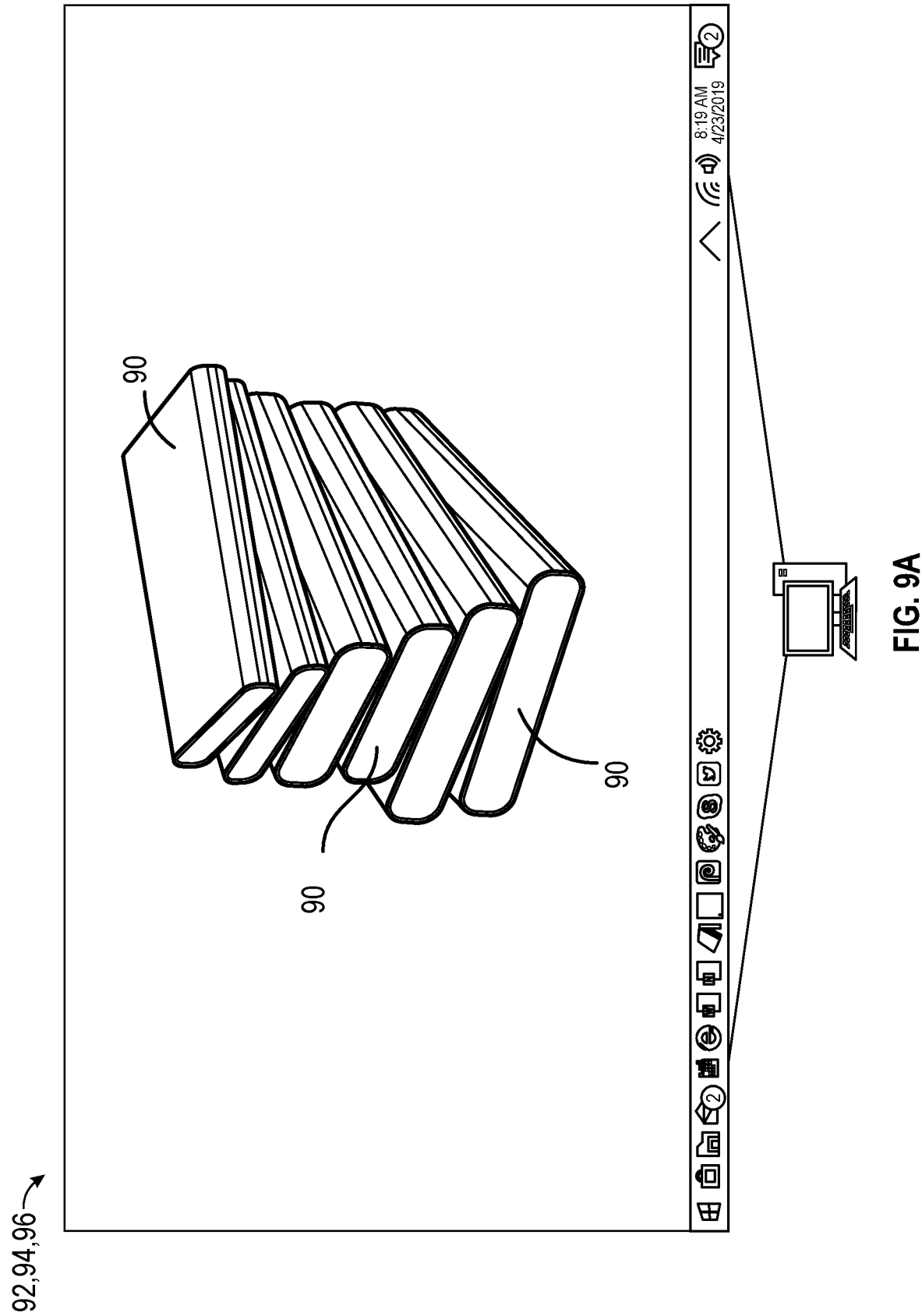
FIGS. 9A and 9B show a plurality of different conductor configurations that may be selected during the busbar design process, wherein the conductors vary in width, height, layout, shape, orientation, and number.

Alternatively, the busbar designer may choose to use a plurality of materials in step 82. If the busbar designer makes this selection, then the designer must select the configuration of the materials in step 84. For example, the busbar designer may choose to alternate materials within the busbar model 100 or may interweave two different materials within the busbar model 100. More specifically, the model 100 may include alternating layers of copper and aluminum or may include a plated conductor (FIG. 9A) 90, which includes an aluminum core and a copper plating. It should be understood that the above materials and configurations of materials are only examples and other similar materials and configurations are contemplated by this disclosure.

Figure 9B:
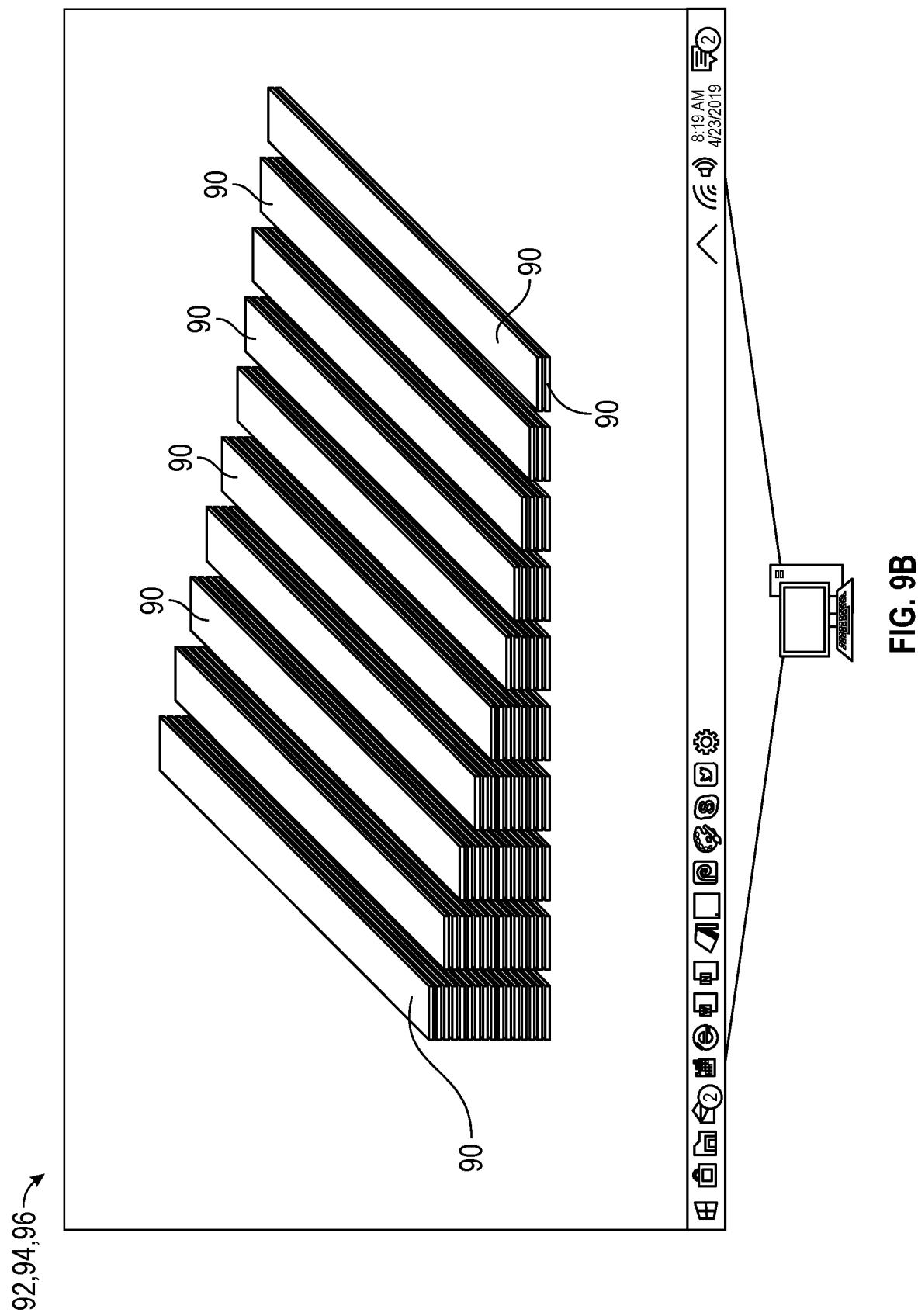
Figure 11C:
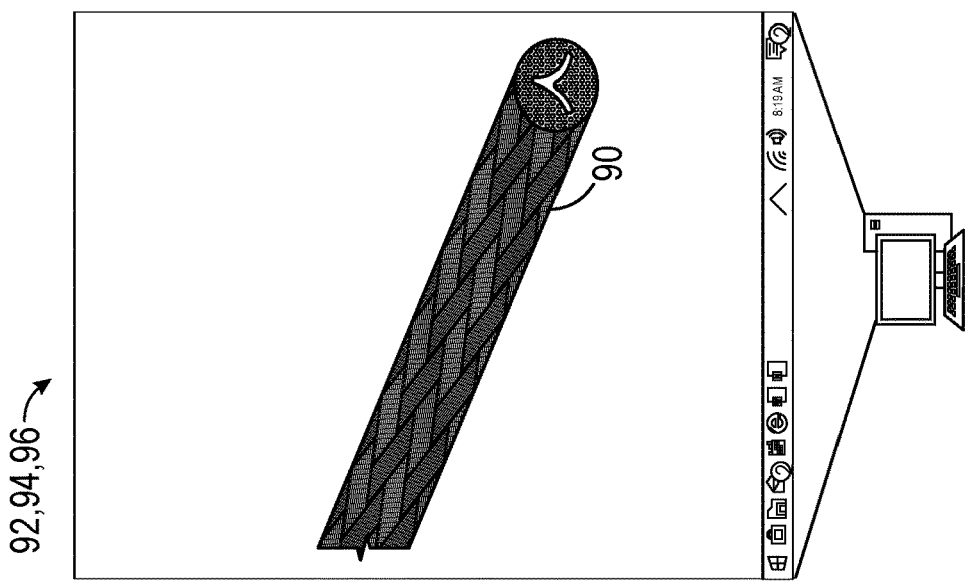
FIG. 11A-11F show a plurality of different conductor configurations that may be selected during the busbar design process, wherein the conductors vary in width, diameter, layout, shape, orientation, and number.
Figure 11B:
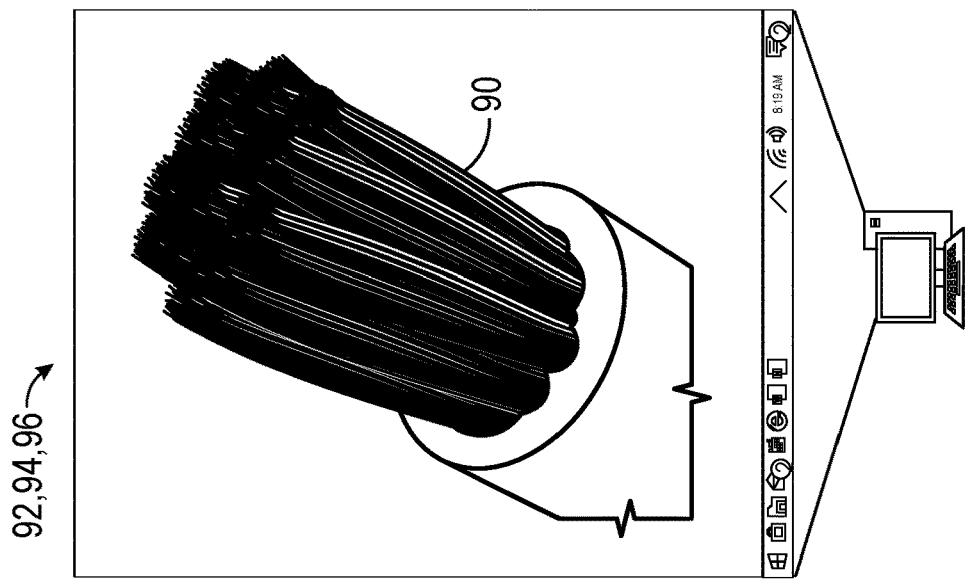
Figure 11A:
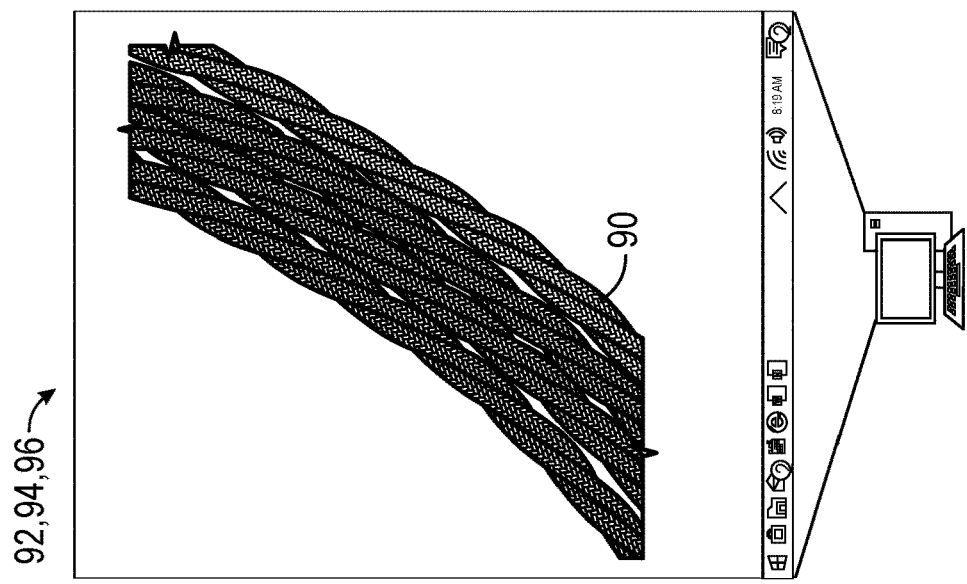
Figure 11F:
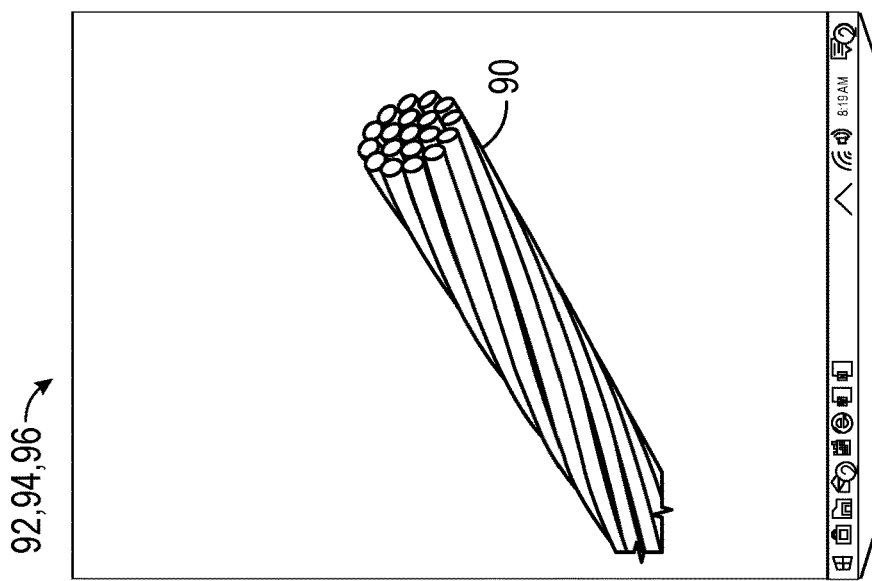
Figure 11E:
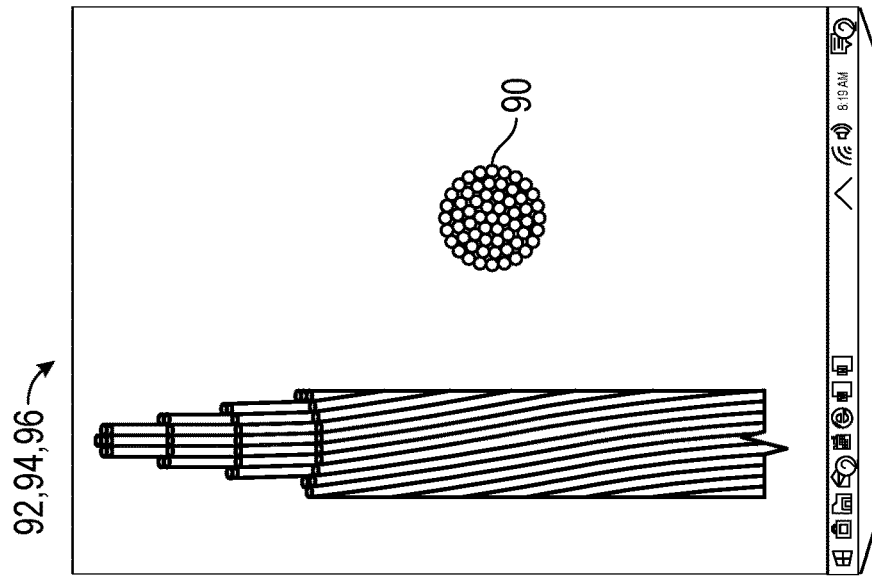
Figure 11D:
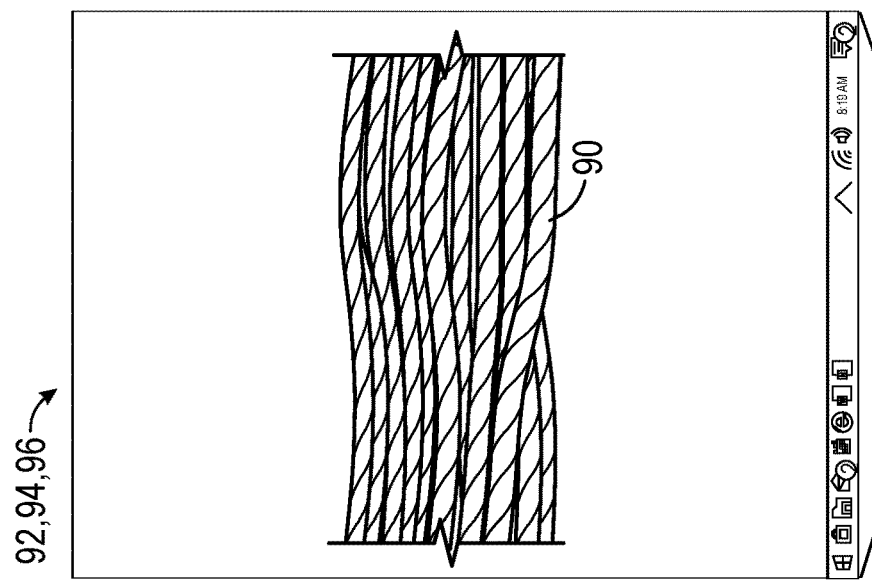

Once the materials and their configuration are selected in step 78, the busbar design can then select the configuration of the conductors 90 in step 88. Step 88 is comprised of multiple sub-steps, which are shown in FIG. 8. One of these sub-steps included within step 88 requires the selection of the overall configuration of the conductors 90 in step 92. Non-limiting examples of configurations that the designer may select include: (i) a vertical stack or laminated stack (see FIG. 9B), (ii) a woven, knitted or braided pattern (see FIG. 9C), or (iii) other configurations (see FIGS. 11A-11F). In addition, the selection of the overall configuration of the conductors 90 in step 92 includes selecting the number of conductors 90 that are contained within the busbar model 100. In making this selection, the busbar designer may keep the number of conductors 90 consistence throughout the busbar model 100 or may vary the number of conductors 90 contained within the model 100. For example, the design may choose to increase the number of conductors 90 near the end portion or may be decreased the number of conductors 90 within an intermediate portion of the busbar model 100. It should be understood that the exemplary non-engineering busbar models 68a, 68b may utilize a laminated stack of ten conductors 90, wherein the number of conductors 90 does not vary across the length of the busbar model 100.

Another one of these sub-steps in step 88 requires selecting the shape of each conductor 90 within the busbar model 100 in step 94. Exemplary shapes include, but are not limited to, rectangular prism or bar (see FIG. 9B), a "U-shaped" plate (see FIG. 9C), cylinder, a pentagonal prism, a hexagonal prism, octagonal prism, a cone, a tetrahedron, or any other similar shape. In making this selection, the busbar designer may keep the shape of conductors 90 consistence throughout the busbar model 100 or may vary the shape of conductors 90 contained within the model 100. Changes in the shape of the conductors 90 may be desirable to add mechanical strength or electrical current capacity within certain segments of the busbar model 100. It should be understood that the shape of the conductors 90 contained within the exemplary non-engineering busbar models 68a, 68b may be rectangular prisms or bars.

In addition, the selection of the shape of each conductor 90 in step 94 includes selecting the thickness of conductors 90 that are contained within the busbar model 100. In making this selection, the busbar designer may keep the thickness of conductors 90 consistence throughout the busbar model 100 or may vary the thickness of conductors 90 contained within the model 100. Changes in the thickness of the conductors 90 may be desirable to add mechanical strength or electrical current capacity within certain segments of the busbar model 100. Further, the selection of the shape of each conductor 90 in step 94 includes selecting whether the conductors 90 contained within the busbar model 100 have a solid, partially solid or a hollow configuration. It should be understood that the conductors 90 contained within the exemplary non-engineering busbar models 68a, 68b may be solid, have a substantially constant thickness of 0.01 inches or 0.254 mms, have a length that is 13.5 inches or 344 mm, and a width that is 0.78 inches or 20 mm.

Another one of these sub-steps in step 88 requires selecting the arrangement of the conductors 90 within the busbar model 100 in step 96. For example, the busbar designer may desire a specific circular configuration, shown in FIG. 11E, over another circular configuration, shown in FIG. 11F. The last sub-step in step 88 is the selection of the edge detail of the busbar model 100, as shown in step 98. For example, the designer may select a coined edge detail 104, as shown in FIGS. 12A-12B, or a circular weld pattern 106, as shown in FIGS. 12C-12D. It should be understood that any weld pattern shown in 16F-16H may be utilized instead of the circular weld pattern shown in 16E. In making this selection, the busbar designer may keep the edge detail consistence throughout the busbar model 100 or may vary the edge detail contained within the model 100. Changes in the edge detail may be desirable to aid in the bending of the busbar. For example, the design may choose to use a combination of a weld pattern and the coined edge detail in the areas that will be bent, while only using a weld pattern in other fused segments 220 of the busbar 100. It should be understood that the exemplary non-engineering busbar models 68a, 68b may utilize the edge detail that is shown by the circular weld pattern 106.

When making the above selections, it may desirable for the designer to ensure that: (i) the thickness of the conductors 90 is greater than 0.01 mm, (ii) the width of the conductors 90 is greater than 1 mm and preferably between 10-25 mm, and (iii) there are more than two conductors 90 within the busbar and preferably between 5 and 35 conductors 13. It should be understood that the above described configurations, shapes, arrangements, and edge details are only examples of possible selections and other similar configurations, shapes, arrangements, and edge details are contemplated by this disclosure.

Returning to FIG. 6, once the materials and configuration of the conductors 90 is selected in step 74, then the busbar designer can identify segments 220 of the intermediate portion 200 of the busbar 100 to be fused in step 110. In turn by identifying the segments 220 of the intermediate portion 200 of the busbar 100 that are to be fused, the design is also identifying the segments 520 of the busbar 100 that are to be left unfused. The designer will identify these segments 220 based upon a number of factors, which may include: (i) width of the busbar, (ii) the geometry of the bend (e.g., in-plane 750 or out-of-plane 760) contained within the busbar, (iii) the number of conductors 90 contained, (iv) thickness of the conductors 90, (v) material properties of the conductors 90, (vi) fusion type or method, (vii) commercial throughput of the machine performing the fusion, (viii) total number of bends contained within the busbar, (ix) spacing of the bends within the busbar, (x) other customer specifications, and (xi) other factors that are obvious to one of skill in the art based upon the above list of factors. Once the designer has analyzed some or all of the above factors, the designer can determine whether the intermediate portion 200 of the busbar model 100 should contain: (i) no fused segments 220 and only unfused segments 520, (ii) only one fused segment 220 (see FIG. 13A) 222 that extends between both end portions 720, or (iii) contain multiple fused segments 220 (see FIG. 13B) 224. It should be understood that a fused segment 220 is less flexible or more rigid, or more stiff then an unfused segment 520.

The following are non-limiting examples of how the fused segments 220 and unfused segments 520 may be selected and arranged within a busbar 100. In one example, the intermediate portion 200 may not include any fused segments 220, if: (i) the busbar 100 does not contain any bends (see 68e), (ii) the bends contained within the busbar 100 are out-of-plane 760 and have a wide bend radius, or (iii) the designer determines that the busbar 100 does not need to include such segments. If the busbar designer determines that the busbar model 100 does not need to contain any fused segments 220, then the designer can move onto the next step in this process. In a second example, the intermediate portion 200 may only include one fused segment 220 (shown in FIG. 13A), if: (i) the busbar 100 only contains a single bend, (ii) if the overall length of the busbar 100 is short (e.g., less than 8 inches) and the busbar 100 includes multiple bends, (iii) if the overall length of the busbar 100 is not long (e.g., greater than 3 feet) and the busbar 100 only contains a single bend type (e.g., in-plane 750 or out-of-plane 760) or (iv) the designer determines that the busbar 100 only needs to include this single segment. One of the primary reasons that a designer may choose to use only a single fused segment 220 is because the variance in manufacturing times between using a single segment and multiple segments does not justify trying to create multiple segments. Determining that the busbar 100 should include one fused segment 220 requires the busbar designer determine the general properties of that segment 220. These general properties are based on the designer's analysis of the some or all of the factors described above.

Alternatively, if the busbar model 100 contains non-bent extents, out-of-plane bends 760, and in-plane bends 750, then the designer may choose to utilize multiple fused segments 220. This may be desirable because the designer can vary the properties of each fused segment 220, which in turn provides the welds that are necessary for certain extents of the busbar 100 but does not require that the entire busbar 100 be welded at a frequency that is only adapted to the bend that requires the most force. Varying of the properties permits improved manufacturing times and eliminates the possible of over welding the busbar 100. Determining that the busbar should include multiple segment 220 within the busbar requires the busbar designer determine the location and general properties of each segment 220 contained within the busbar 100.

Various examples 250, 254, 258, 262, 266, 270, 274 of busbar models 100 that contain multiple fused segments 220 are shown in FIGS. 14A-14G. For example, the designer may choose to utilize the busbar design 250 shown in FIG. 14A in order to build the busbar 100 shown in the non-engineering busbar model 68b. This is because the intermediate portion 200 of the non-engineering busbar model 68b only contains two similar in-plane bends 750 and thus both of the fused segments 220, 251 can have the same general properties 250a. These general properties 250a include: (i) stiffness, (ii) ductility, (iii) flexibility, (iv) flexural modulus, (v) resilience, or (vi) other similar properties. Additionally, the non-engineering busbar model 68b has a non-bent extent 252 that is positioned between the two fused segments 220. The designer can choose to use an unfused segment 520 for this non-bent extent 252 of the busbar 100. Accordingly, this example layout for the non-engineering busbar model 68b will contains: (i) two end portions 700, 702a, 702b and (ii) an intermediate portion 200. The intermediate portion 200 includes: (i) two fused segments 220, 251a-251b that has the same general properties 250a and (ii) one unfused segment 520 that has the general properties 250b that are associated within the individual conductors 90 in their specific arrangement, which are contained within that segment 520. This exemplary configuration of fused and unfused segments 220, 520 contained within non-engineering busbar model 68b will allow the busbar 100 to achieve the in-plane bends 750 that are shown in connection with the model 68b and will allow the non-bent extent 252 to flex, expand, contract, absorb vibration, or move as required by the busbar 100 during operation of the customer's application, product, component, or device that is shown in FIG. 5. This provides a significant advantage over conventional busbars 10, 20, as described above.

Figure 14B:
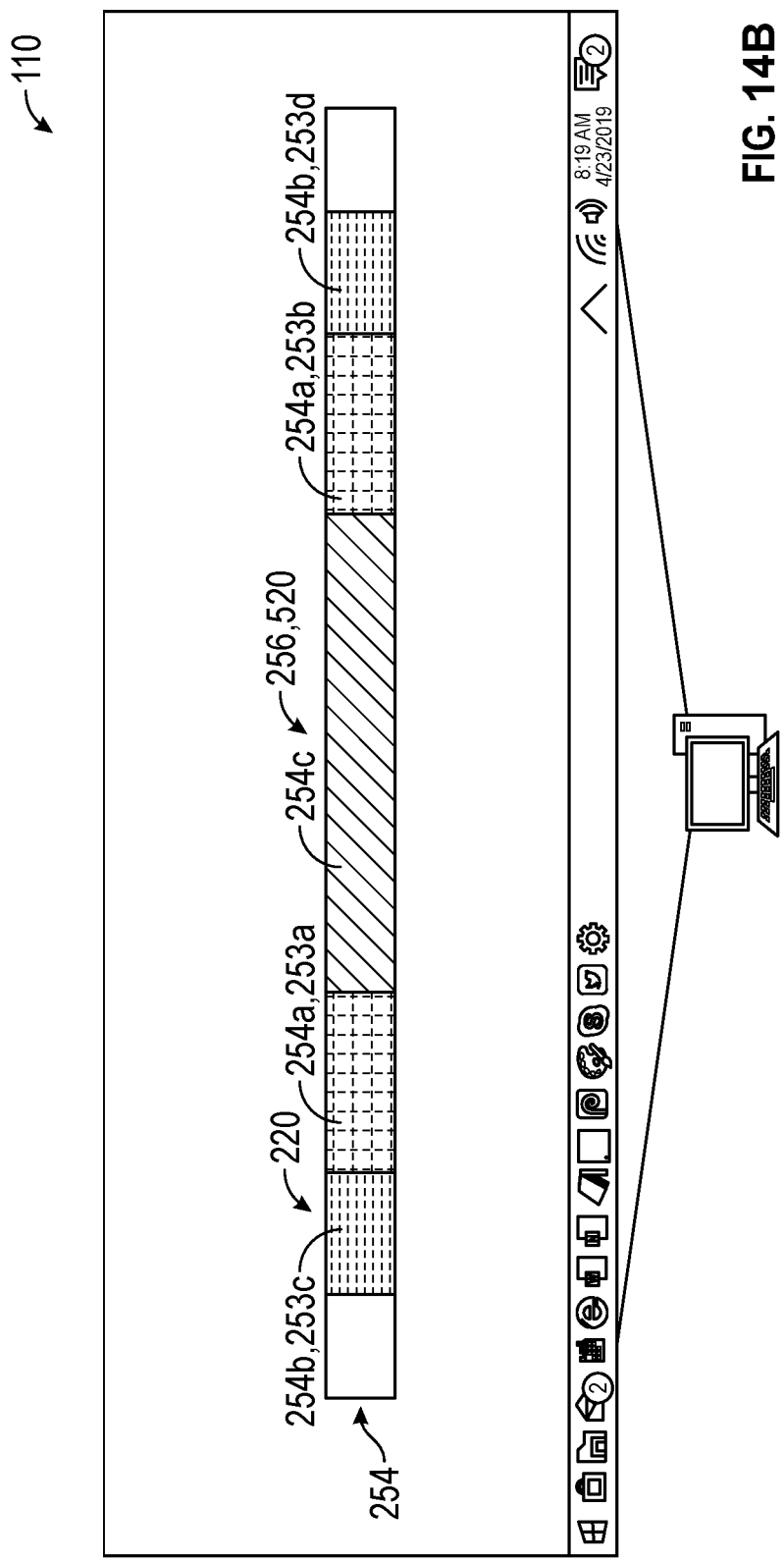

In another example, the designer may choose to utilize the busbar design 254 shown in FIG. 14B in order to build the busbar 100 shown in the non-engineering busbar model 68a. This is because the intermediate portion 200 of the non-engineering busbar model 68a contains: (i) two similar in-plane bends 750 and thus both of these fused segments 220, 253a-253b can have the same first set of general properties 254a, and (ii) two similar out-of-plane bends 760 and thus both of these fused segments 220, 253c-253d can have the same second set of general properties 254b. However, as shown in FIG. 14B, the first set of general properties 254a is different from the second set of general properties 254b. These first and second sets of general properties 254a, 254b are different because the bends are different. For example, the welds contained within the first set of general properties 254a will need to be more frequent than the welds contained within the second set of general properties 254b due to the fact that the in-plane bends 750 place a higher amount of force on the conductors 90 in comparison to force placed on the conductors 90 due to the out-of-plane bends 760. Additionally, the non-engineering busbar model 68a has a non-bent extent 256 that is positioned between the innermost fused segments 220, 253a. The designer can choose to use an unfused segment 520 for this non-bent extent 256 of the busbar 100.

Accordingly, the above example layout for the non-engineering busbar model 68a will contains: (i) two end portions 700, 702a, 702b and (ii) an intermediate portion 200. The intermediate portion 200 includes: (i) two fused segments 220, 253a-253b, wherein each segment has a first set of general properties 254a, (i) two fused segments 220, 253c-253d, wherein each segment has a second set of general properties 254b, and (ii) one unfused segment 520 that has the general properties 254c that are associated within the individual conductors 90 in their specific arrangement, which are contained within that segment 520. This exemplary configuration of fused and unfused segments 220, 520 contained within non-engineering busbar model 68a will allow the busbar 100 to achieve the in-plane bends 750 that are shown in connection with the model 68a and will allow the non-bent extent 256 to flex, expand, contract, absorb vibration, or move as required by the busbar 100 during operation of the customer's application, product, component, or device that is shown in FIG. 5. This provides a significant advantage over conventional busbars 10, 20, as described above.

Figure 14C:
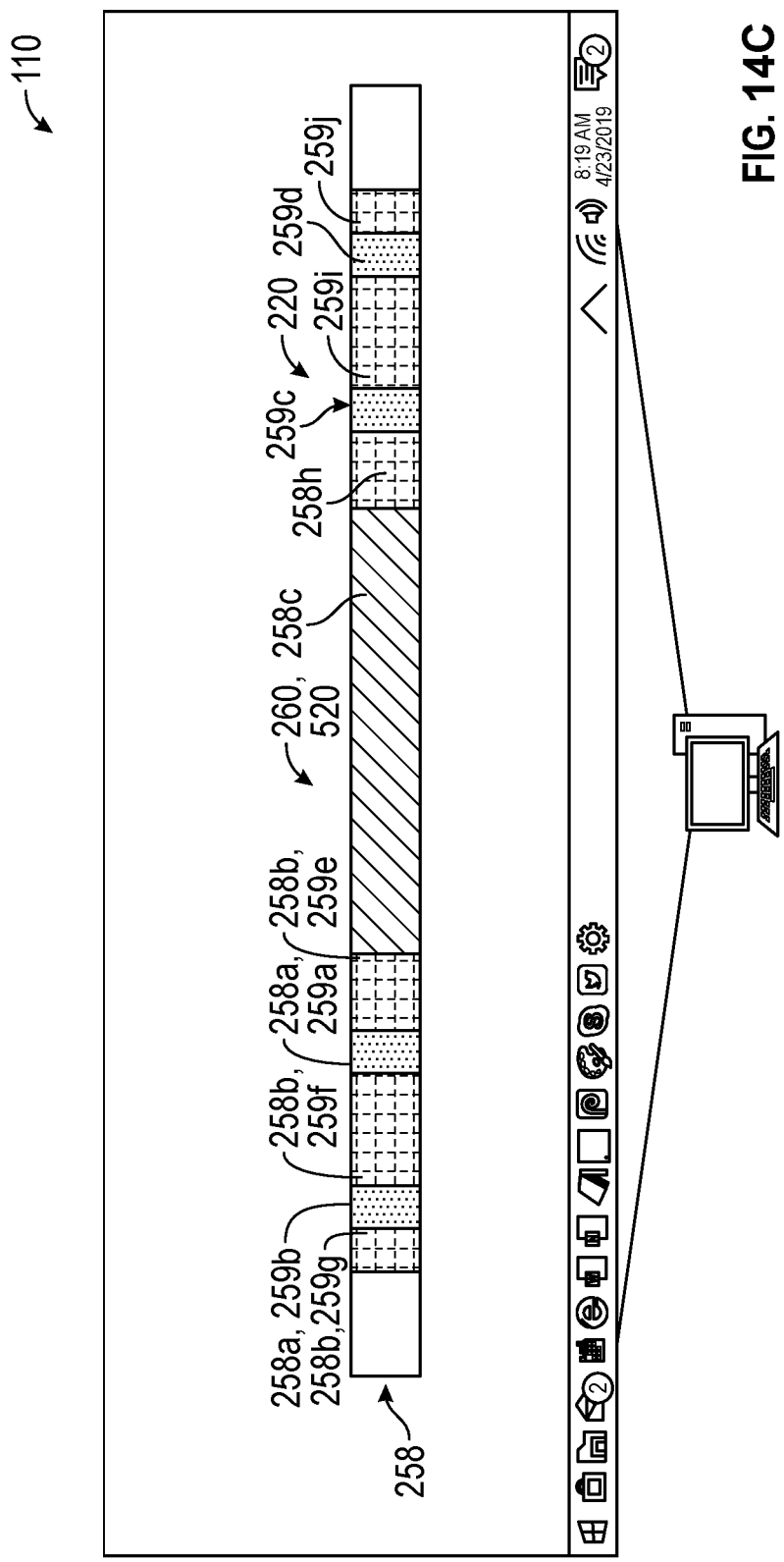

Alternatively, the designer may choose to utilize the busbar design 258 shown in FIG. 14C in order to build the busbar 100 shown in the non-engineering busbar model 68a. This is because the intermediate portion 200 of the non-engineering busbar model 68a contains: (i) four bends and thus these fused segments 220, 259a-259d, can have a first set of general properties 258a, and (ii) three extents that are positioned between these bends that can account for forces that radiate from the four bends and thus these fused segments 220, 259e-259j can have a second set of general properties 258b. As shown in FIG. 14B, the first set of general properties 258a is different from the second set of general properties 258b.

These first and second sets of general properties 258a, 258b are different because the forces experienced by these regions are different. Additionally, the non-engineering busbar model 68a has a non-bent extent 260 that is positioned between the innermost fused segments 220, 259b. The designer can choose to use an unfused segment 520 for this non-bent extent 256 of the busbar 100. Accordingly, the above example layout for the non-engineering busbar model 68a will contains: (i) two end portions 720a, 702b and (ii) an intermediate portion 200. The intermediate portion 200 includes: (i) four fused segments 220, 259a-259d, wherein each segment has a first set of general properties 258a, (i) three fused segments 220, 259e-259j, wherein each segment has a second set of general properties 258b, and (ii) one unfused segment 520 that has the general properties 258c that are associated within the individual conductors 90 in their specific arrangement, which are contained within that segment 520.

Figure 14D:
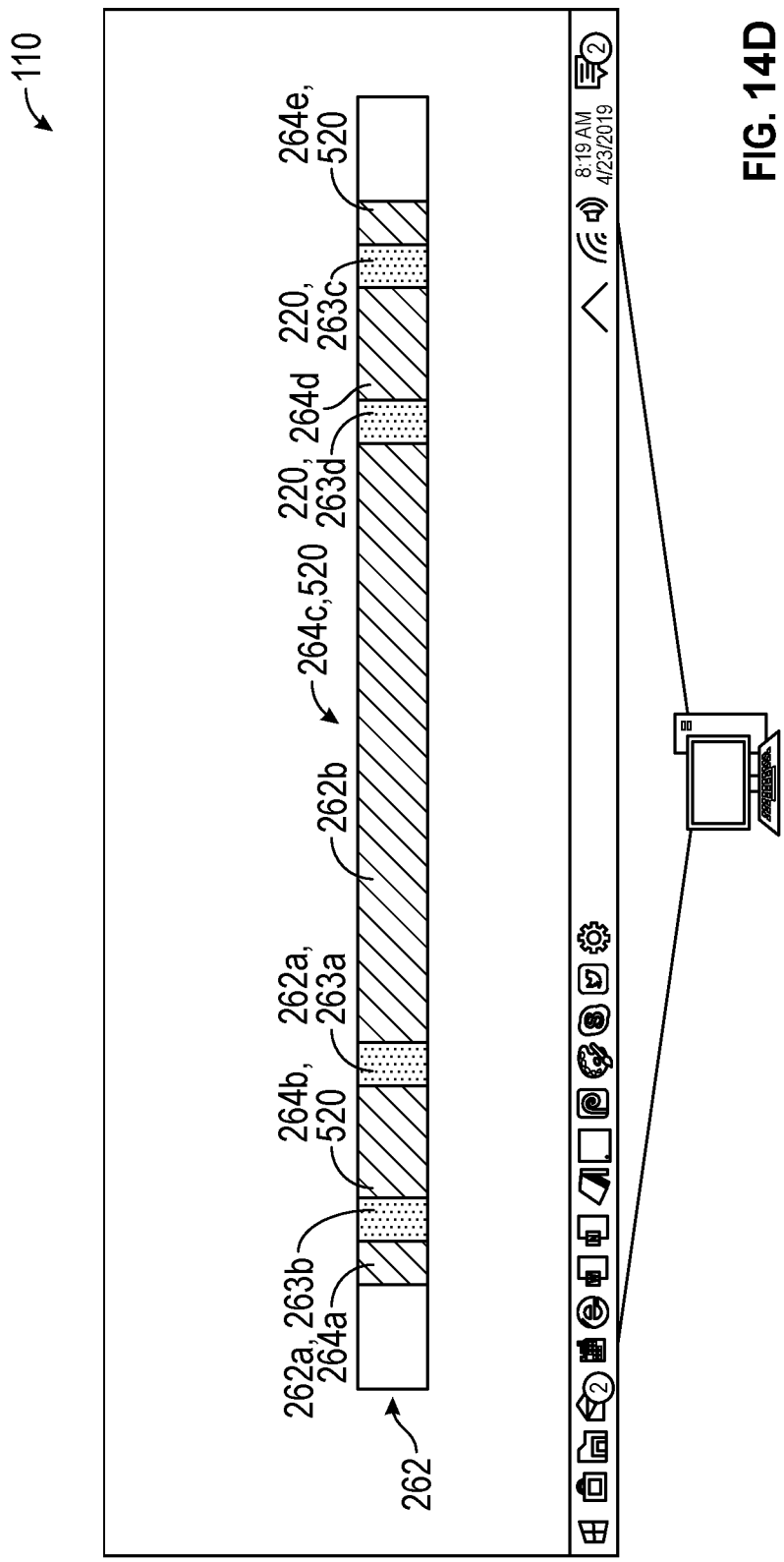
Figure 14E:
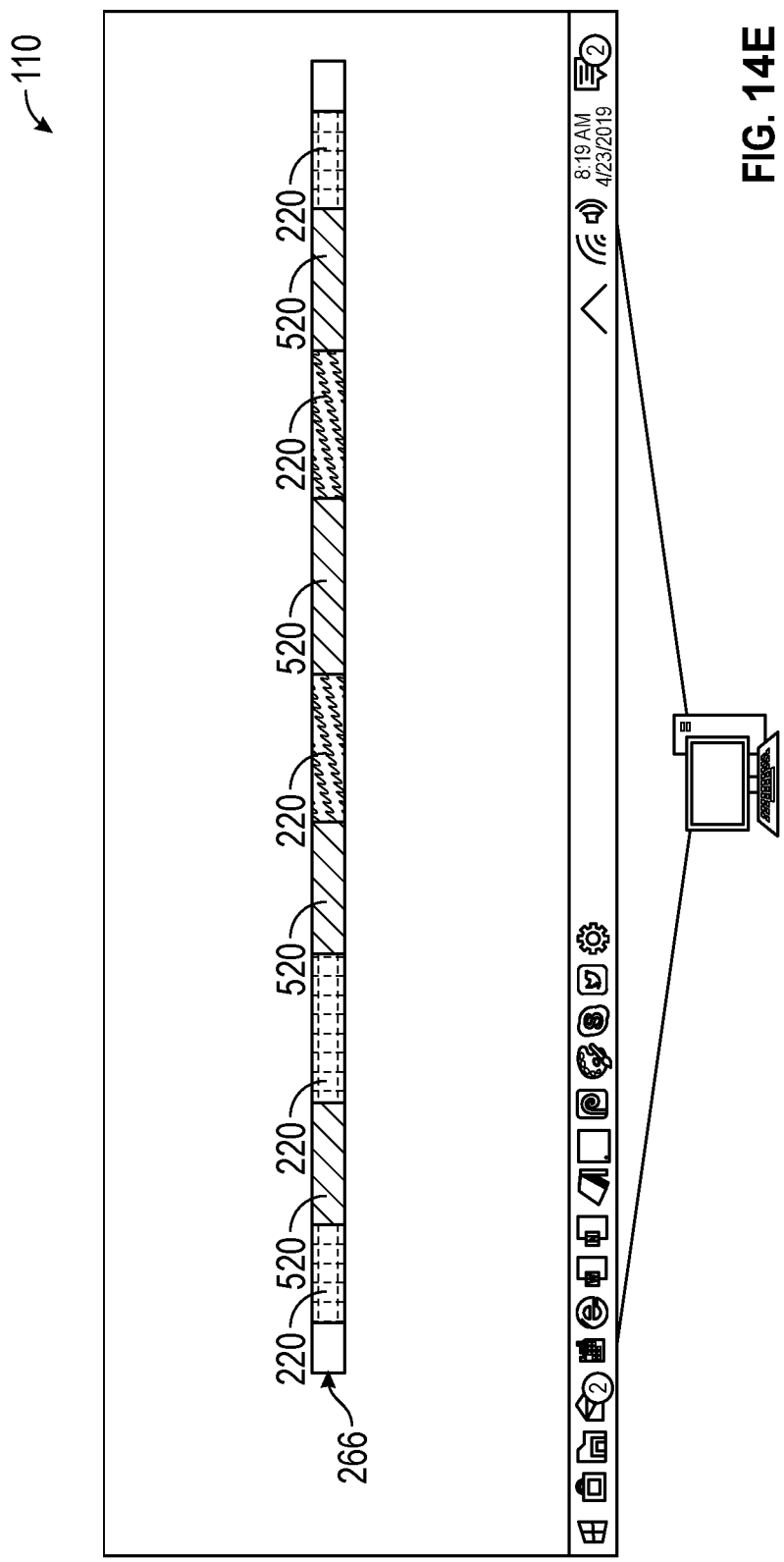
Figure 14G:
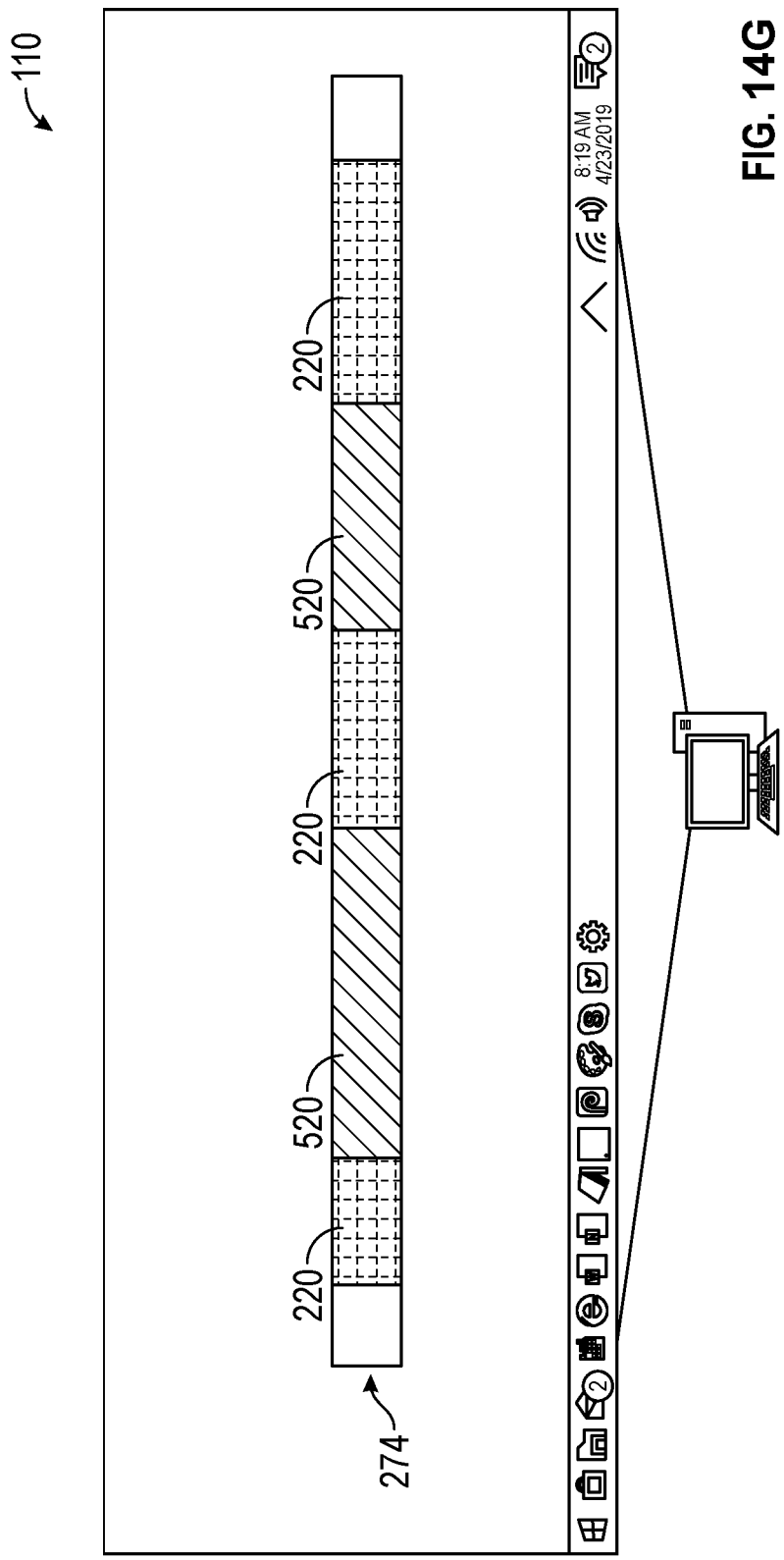

In a second alternative, the designer may choose to utilize the busbar design 262 shown in FIG. 14D in order to build the busbar 100 shown in the non-engineering busbar model 68a. This is because the intermediate portion 200 of the non-engineering busbar model 68a contains four bends and thus these fused segments 220, 263 can have a first set of general properties 262a. Additionally, the non-engineering busbar model 68a has non-bent extents 264a-264e that surround the fused segments 220, 263 that have a second set of general properties 262b. The designer can choose to use an unfused segment 520 for these non-bent extents 264a-264e of the busbar 100. Accordingly, the above example layout for the non-engineering busbar model 68a will contains: (i) two end portions 702a, 702b and (ii) an intermediate portion 200. The intermediate portion 200 includes: (i) four fused segments 220, 264a, wherein each segment has a first set of general properties 258a, and (ii) five unfused segment 520 that has the general properties 264c that are associated within the individual conductors 90 in their specific arrangement, which are contained within that segment 520.

In a third alternative, the designer may choose to utilize the busbar design 250 shown in FIG. 14A in order to build the busbar 100 shown in the non-engineering busbar model 68a. In this alternative example, the designer may utilize the weld frequency required for the in-plane bends 750 for all four bend regions. This may be beneficial because the manufacturing times may not vary enough to alter the general properties for each of type of bend. Finally, busbar layouts 266, 270, and 274 may contain multiple fused segments 220 and multiple unfused segments 520. Specifically, busbar design 266 may be used in the creation of the busbar 1000c shown in FIG. 79. While busbar design 270 may be used in the creation of the busbar 1000d shown in FIG. 80, busbar bar design 274 may be used in the creation of the busbar 1000e shown in FIG. 81. Overall, it should be understood that the intermediate portion 200 may contain any number (e.g., 0-1000) of fused regions 220 and any number (e.g., 0-1000) of unfused regions 520. For example, the intermediate portion 200 may only contain a single fused region 220.

Figure 15:
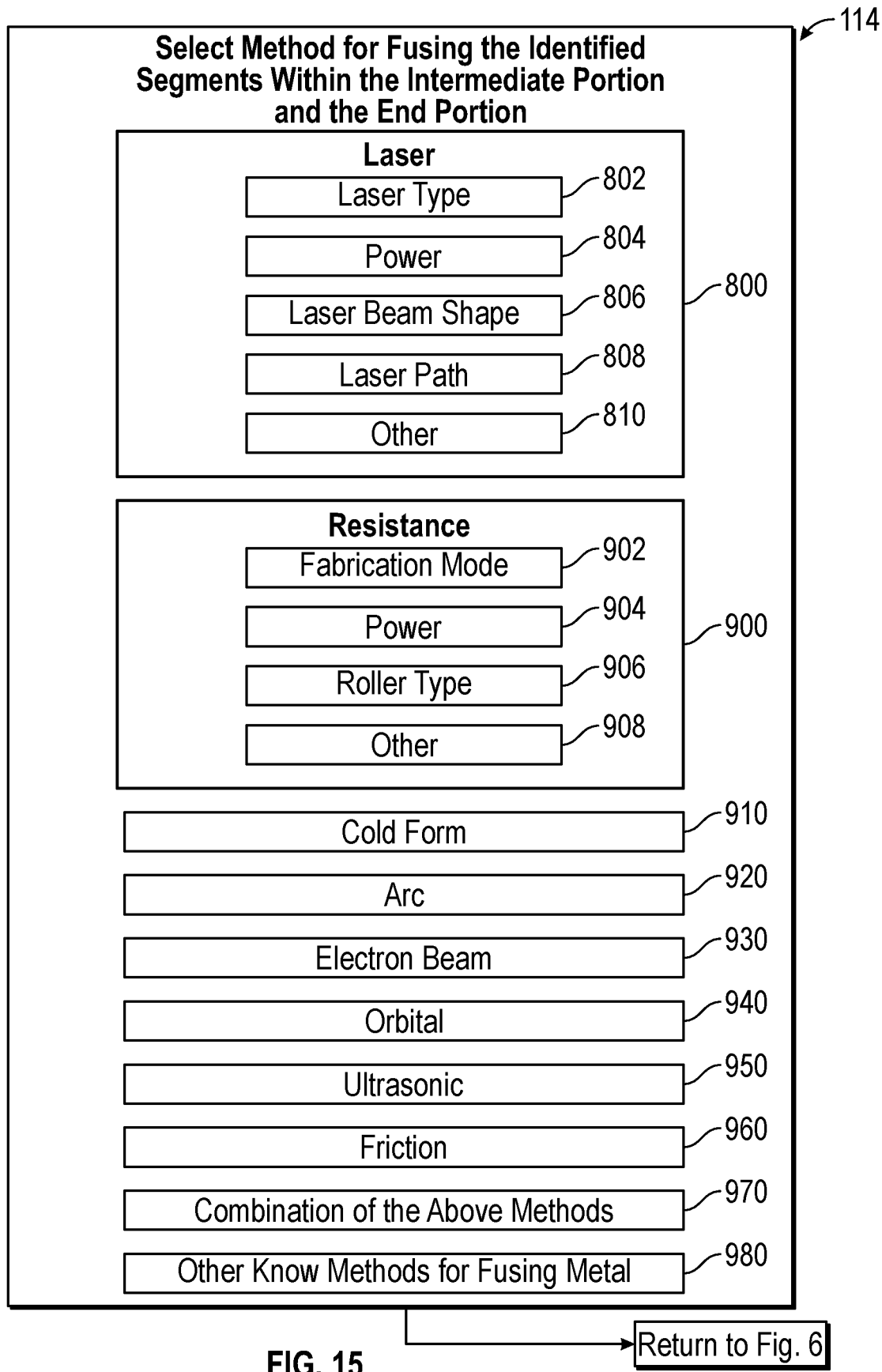
FIG. 15 is a flowchart showing different methods that can be used to fuse the selected segments of the busbar.
Figure 16H:
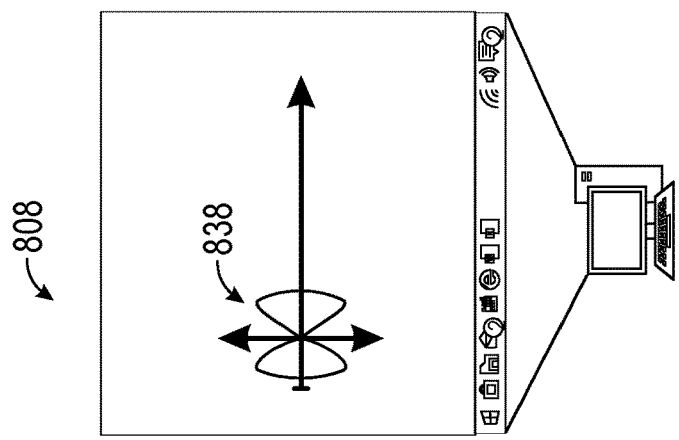
FIGS. 16E-16H show exemplary laser paths that the laser may utilize to fuse the selected segments of the busbar.

Returning to FIG. 6, once the fused segments 220 of the intermediate portion 200 of the busbar 100 have been identified in step 110, then the busbar designer can select a method of fusing the identified segments 220 within the intermediate portion 200 and end portions 700 in step 114. Examples of fusion methods that may be selected are shown within FIG. 15. In particular, these fusion methods include: (i) laser welding 800, (ii) resistance welding 900, (iii) cold form 910, (iv) arc welding 920, (v) electron beam welding 930, (v) orbital welding 940, (vi) ultrasonic welding 950, (vii) friction welding 960, (viii) any combination of the above methods 970, or (ix) other known methods for fusing metal 980. In making this selection, the designer may consider some or all of the following: (i) configuration of conductors 90, (ii) number of conductors 90, (iii) density of the conductors 90, (iv) thickness of the conductors 90, (v) material properties of the conductors 90, (vi) general properties of the fused segments 220, (vii) number of fused segments 220, (viii) frequency of the fused segments 220, (ix) commercial throughput requirements, (x) width of the busbar, (xi) other customer specifications, and (xii) other factors that are obvious to one of skill in the art based upon the above list of factors If the designer selects laser welding 800, then the designer may select: (i) laser type 802, (ii) laser power 804, (iii) laser beam shape 806, (iv) laser path 808, and/or (v) other factors 810. The laser type 802 may be any type of laser that is designed to solidify, weld, or cut metal. For example, the laser type 802 that may be used is a fiber-based laser that has a wavelength that is between 688 nm and 1080 nm. The laser power 804 may be any power that is configured to weld the busbar 100 in the desired manner. For example, the laser power 804 may be between 0.5-25 kW, preferably between 1-6 kW, and most preferably between 2-5 kW. The laser beam shape 806 may also take any desirable shape, including only a central core 820 (shown in FIG. 16A), a ring 822 surrounding a central core 820 (shown in FIGS. 16B-16D), a central core and two adjacent cores, wherein these adjacent cores are positioned in front of the central core when utilizing the laser, or other similar configurations. Not only can the general shape of the laser beam be controlled, the power and size associated with each of these features may also be controlled. Examples of how these power levels may be changed are shown in FIGS. 16B-16D. Specifically, FIG. 16B shows a beam shape 806 where the central core 820 is set to a first power level and the ring 822 is set to a second power level that is lower than the first power level. For frame of reference, the central core power may vary between 0.5-12 kW, preferably between 1-5 kW, and most preferably between 2-4 kW, while the ring power may vary between 0.5-15 kW, preferably between 1-4 kW, and most preferably between 1-2.5 kW. Additionally, the diameter of the central core 820 and the diameter of the ring may be changed. For example, these diameters by vary between 50 and 600 μm.

Figure 16G:
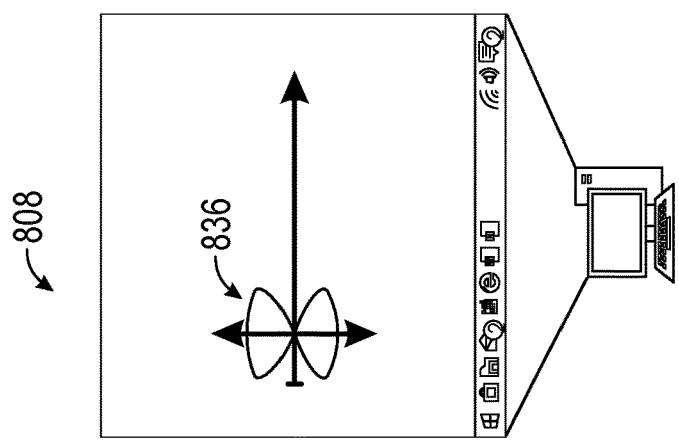
Figure 16F:
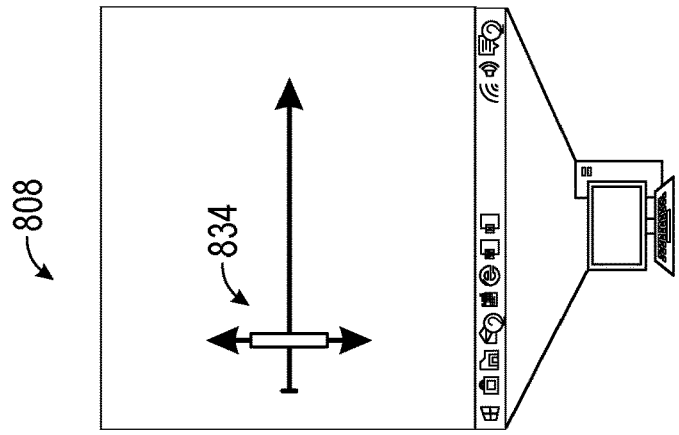

After selecting the laser type 802, laser power 804, and laser beam shape 806, the designer may select the laser path 808. Exemplary laser paths 808 are shown in FIGS. 16E-16H. It should be understood that these laser paths 808 are not the overall path the laser will follow on the busbar 100. Instead, these laser paths 808 are a component of the overall path the laser will follow. For example, the laser may oscillate in a circular path 832 while following a sine pattern on the top of busbar 100. Alternatively, the laser may oscillate in a circular path 832 while following a linear edge of the busbar 100. As shown in FIGS. 16F-16G, shapes other than a circle may be followed, such as a line 834, a figure eight 836, or an infinity sign 838. Finally, the designer can select other variables like processing times, cool down times, and the alike.

Figure 73:
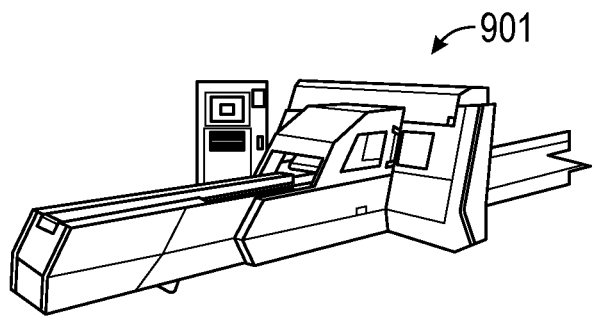
FIG. 73 is a perspective view of a resistive welding machine.
Figure 74:
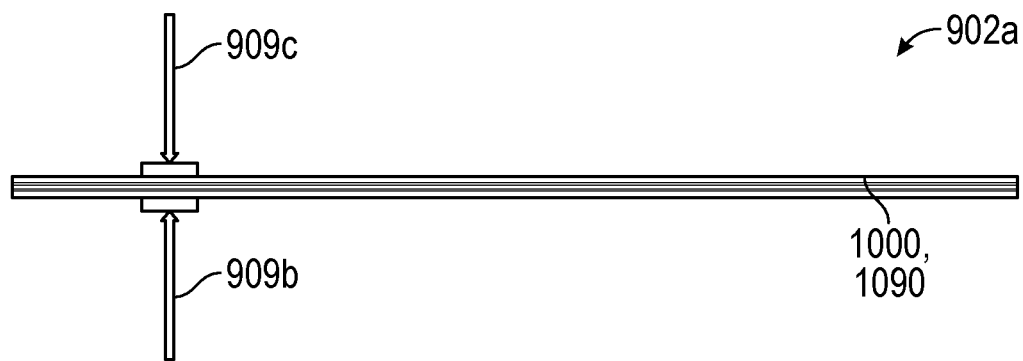
FIG. 74 is a cross-sectional view of a busbar and an extent of the resistive welding machine of FIG. 73, wherein the welding machine is set to a prototype fabrication mode.
Figure 75:
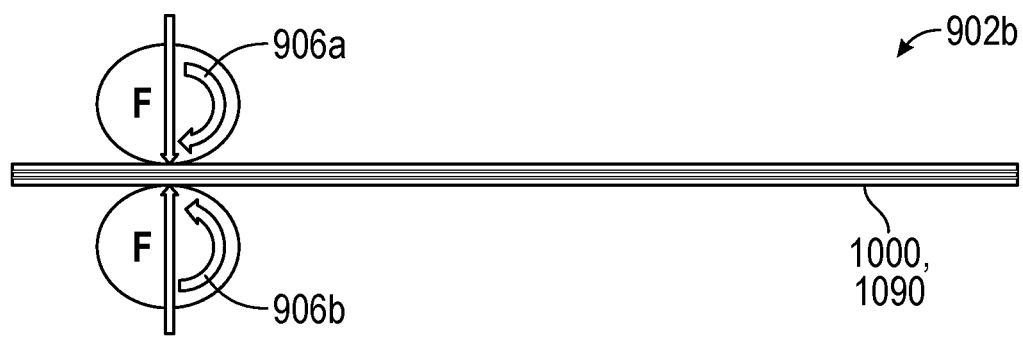
FIG. 75 is a cross-sectional view of a busbar and an extent of the resistive welding machine of FIG. 73, wherein the welding machine is set to a mass production fabrication mode.

Instead of going with a laser based fusion process, the designer may choose to go with a resistance spot welding fusion process 900. Here, the designer will select: (i) the fabrication mode 902, (ii) the power level that is applied to the electrode 904, (iii) the roller type 906, if the mass fabrication mode is selected in 902, and (iv) other like variables 908. This process will be discussed in greater detail below in connection with FIGS. 73-75. It should be understood that the designer may choose to use any one of the above fusion methods in connection with applying an external pressure to the conductors 90 in order to keep the conductors 90 properly arranged when the conductors 90 are undergoing this fusion process.

It should also be understood that different fusion methods may be utilized in connection with different portions, segments, regions of the busbar 100. For example, the end portions 700 may be formed using a resistance welding method 900, while the intermediate portion 200 may be formed using a laser welding method 800. In further alternative embodiments, the fused segments 220 may be created using a process that deposits material around the conductors 90 within the busbar 100. For example, this may use a 3D printer or may slip a material sleeve over the conductors 90 to form this fused region 220. Upon selecting the fusion method for the identified segments within the intermediate portion 200 and the end portions 700 in step 114, the designer proceeds to determine the combination pattern for the identified fused segments 220 within the intermediate portion 200 of the busbar 100.

Returning to FIG. 6, once the fusion method has been selected in step 114, then the busbar designer can determine the combination pattern for the identified fused segments 220 within the intermediate portion 200 of the busbar 100 in step 118. Because the general properties of each fused segment 220 were already identified in connection with step 110, step 118 focuses on converting these general properties (e.g., 250a, 254a, 258a) into manufacturable properties. The designer analyses these general properties (e.g., 250a, 254a, 258a), the properties associated with selected the fusion process, and other relevant properties in order to determine the combination pattern for the identified fused segments 220. This combination pattern or specifically this segment combination pattern 300 can be generated from two components, a top segment fusion pattern 304 and a bottom segment fusion pattern 308. Forming the segment combination pattern 300 from these two components 304, 308 is desirable because the fusion method is typically configured to only partially penetrate the conductors 90 contained within the busbar 100 due to the fact that full penetration of all conductors 90 may mechanically weaken the busbar 100. To reduce the number of fully solidified regions, the busbar 100 is welded from the top of the busbar 100 and the bottom of the busbar 100 in a manner that does not fully penetrate all conductors 90 contained within the busbar 100. In other words, the top and bottom welds are typically configured to be partial solidified regions. These welds will be discussed in greater detail in connection with FIGS. 36-47. While it may be desirable to split the segment combination pattern 300 into two components, it should be understood that the segment combination pattern 300 may remain as a single component and the fusion of the segment 220 may only occur on a single side (e.g., top or bottom) of the busbar 100.

Figure 17A:
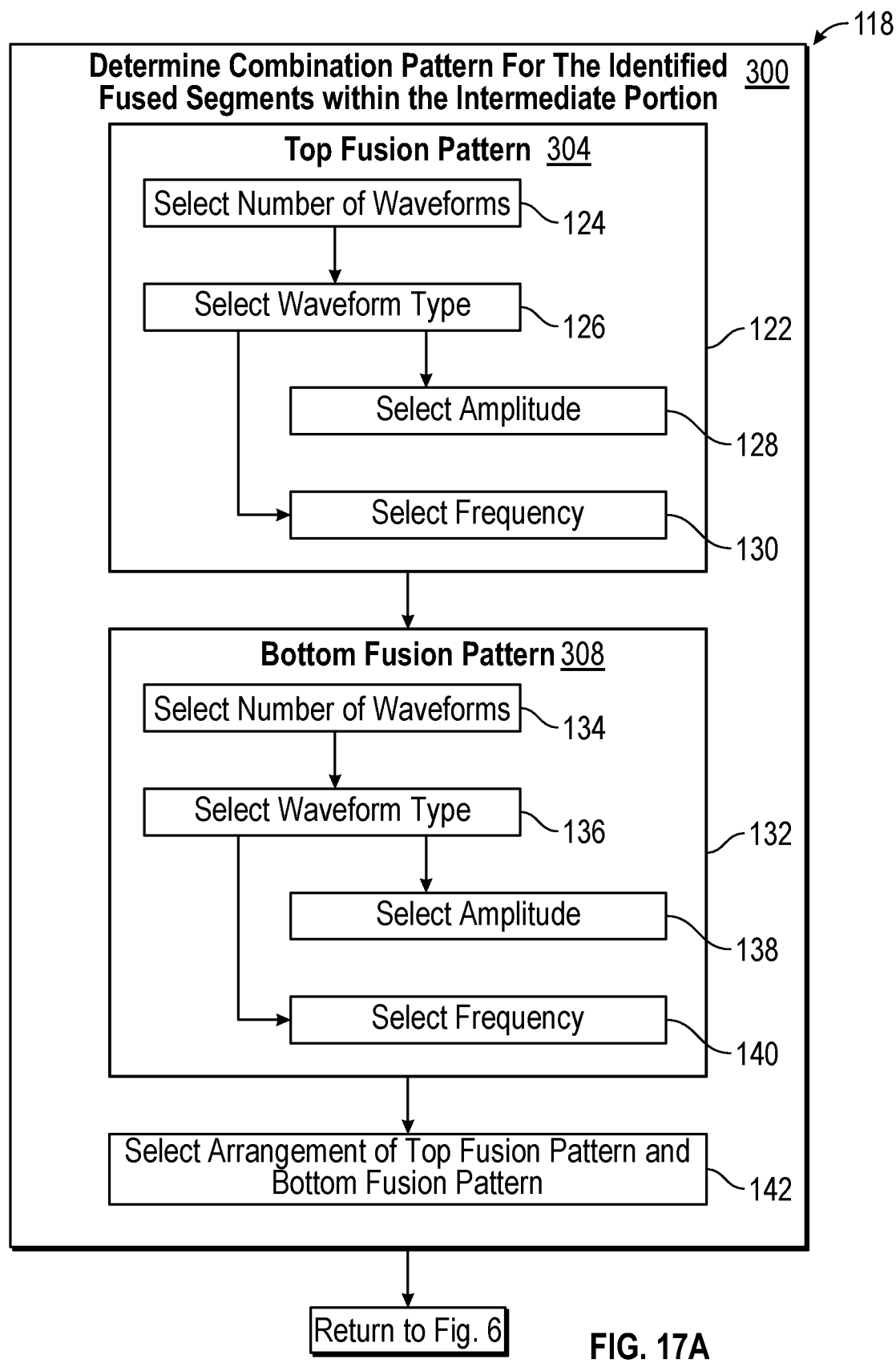
FIG. 17A is a flowchart for determination of the combination pattern for the identified fused segments of the intermediate portion of the busbar.
Figure 17B:
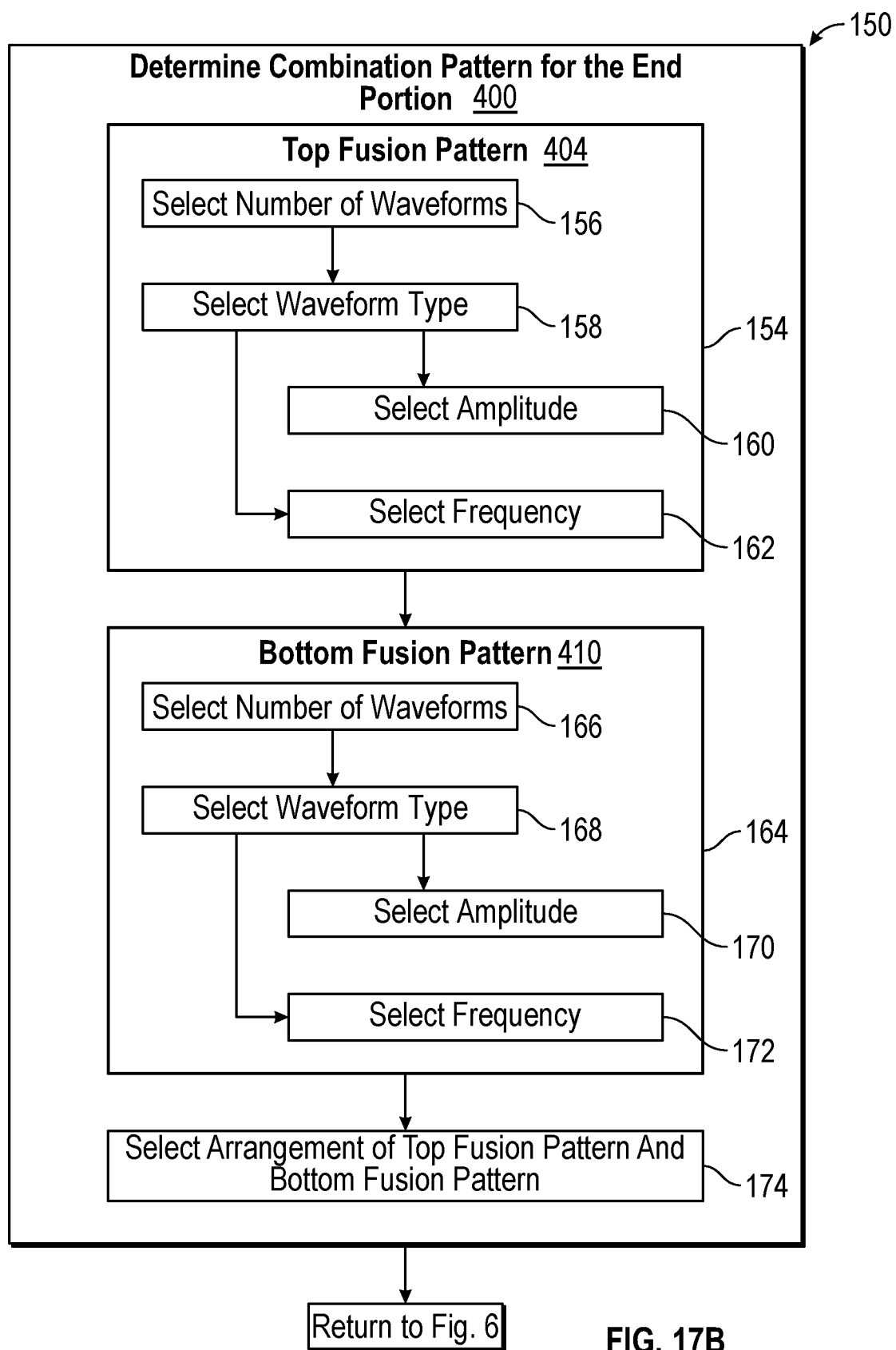
FIG. 17B is a flowchart for determination of the combination pattern for the end portion(s) of the busbar.
Figure 18A:
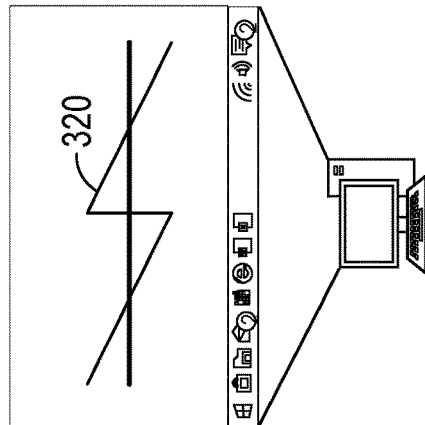
FIGS. 18A-18R show exemplary waveform types that may be used in the creation of the top and/or bottom fusion patterns.
Figure 18B:
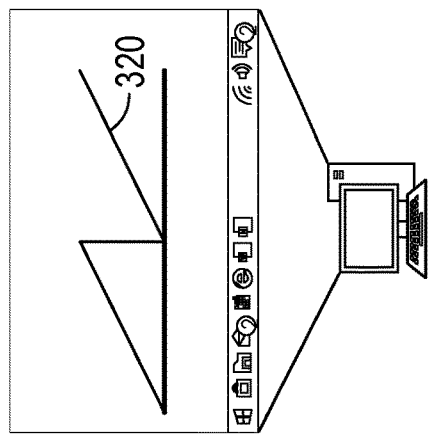
Figure 18C:
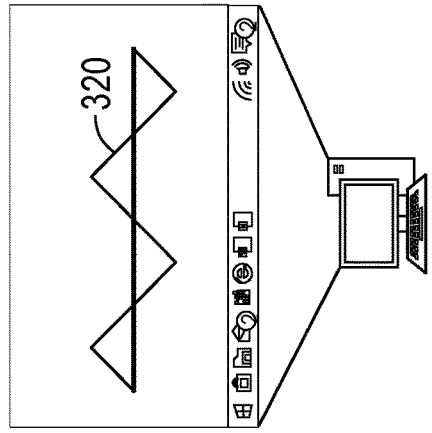
Figure 18D:
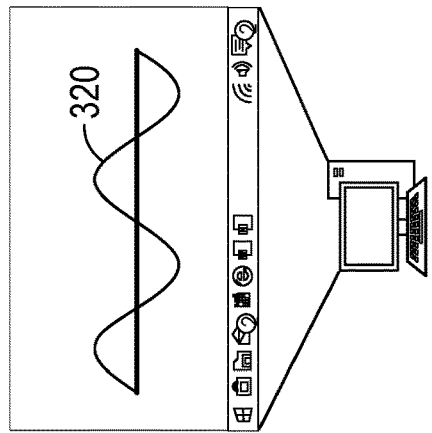
Figure 18E:
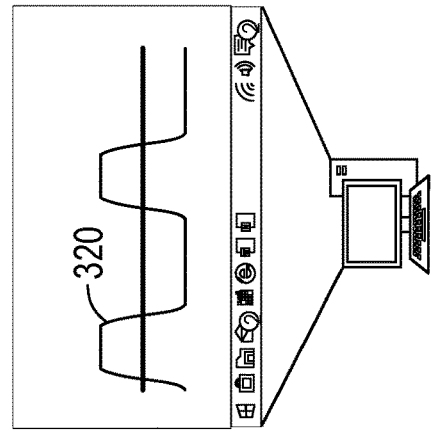
Figure 18F:
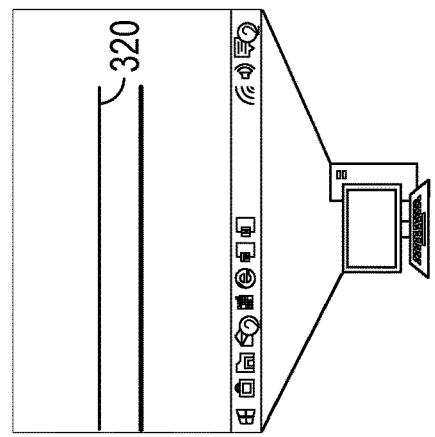
Figure 18G:
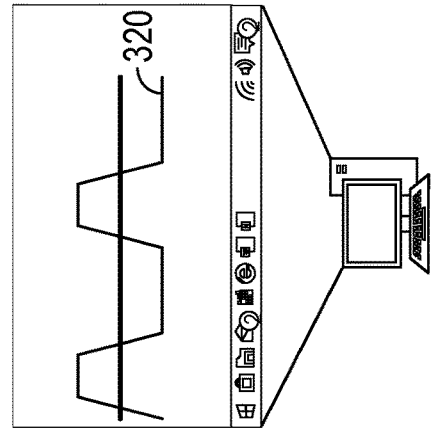
Figure 18H:
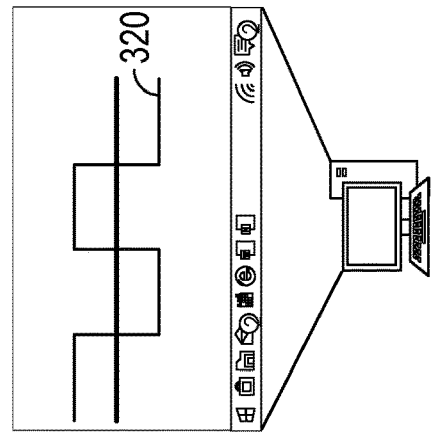
Figure 18I:
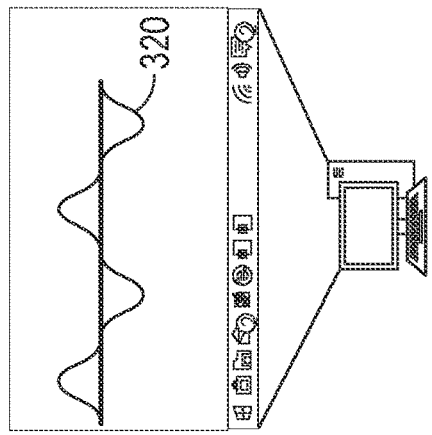
Figure 18M:
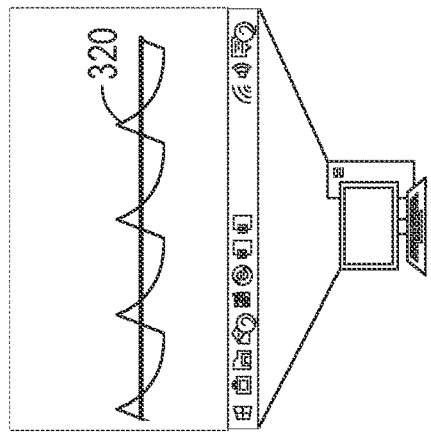
Figure 18J:
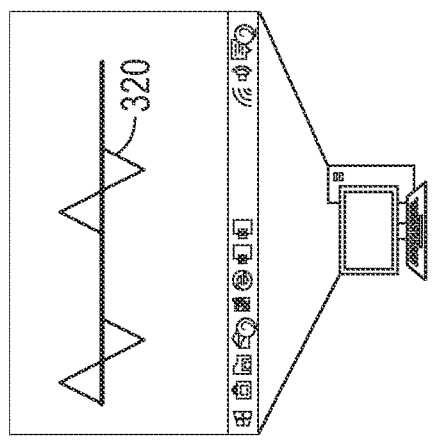
Figure 18N:
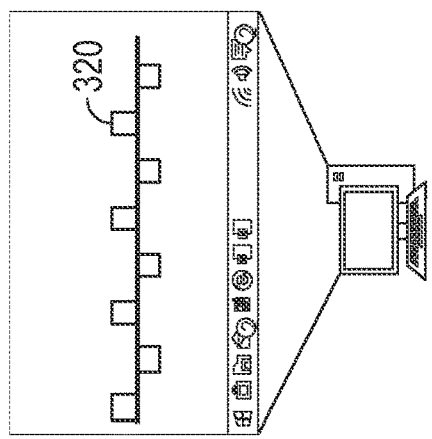
Figure 18K:
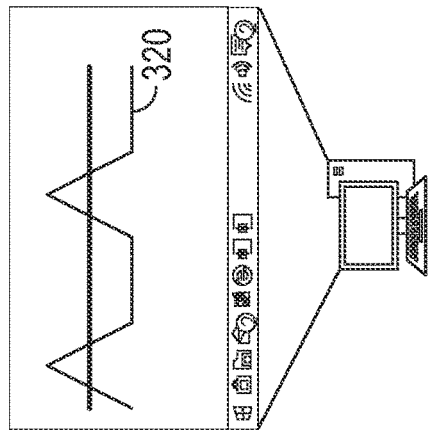
Figure 18O:
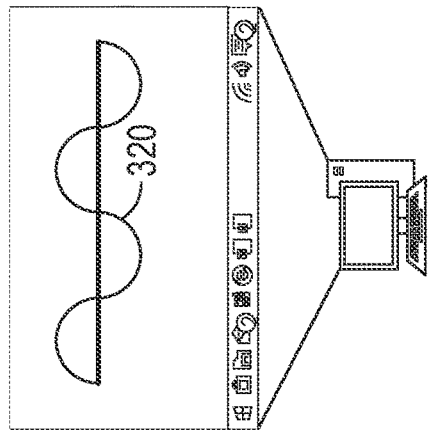
Figure 18L:
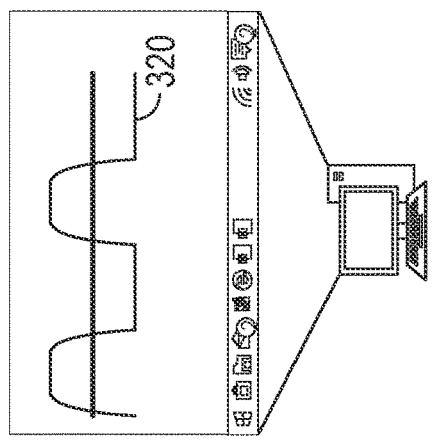
Figure 18P:
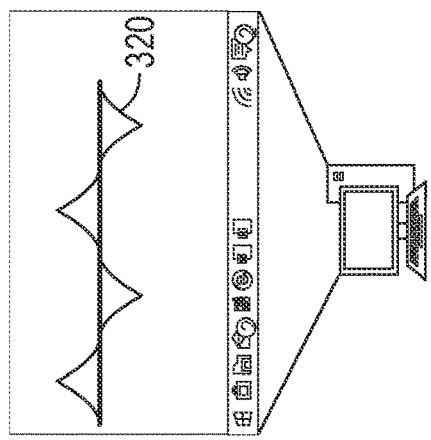
Figure 19A:
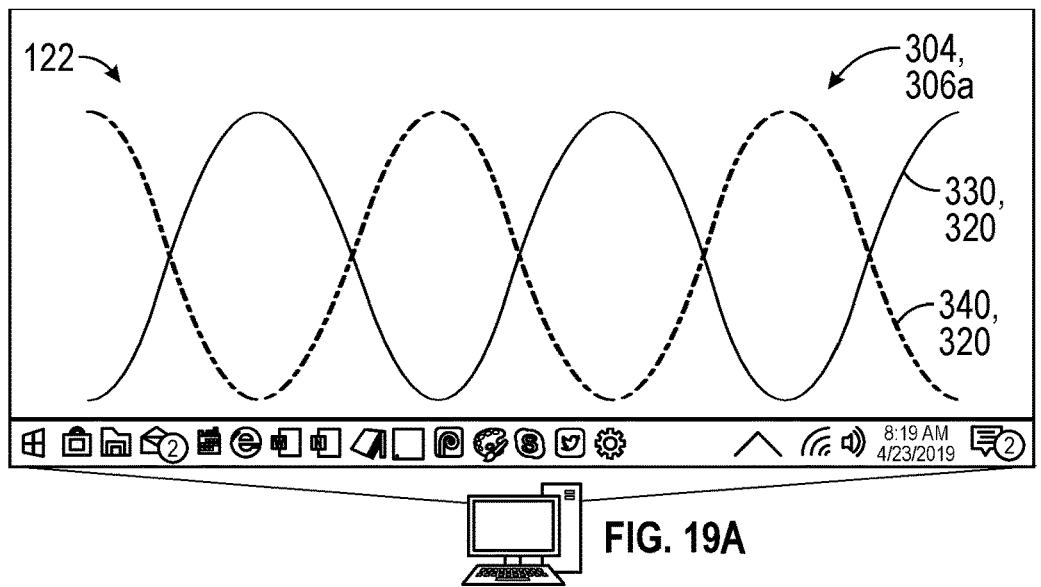
FIG. 19A shows a top fusion pattern that includes two exemplary waveforms, said top fusion pattern is configured to be disposed on the top surface of a fused segment contained within an intermediate portion of the busbar.
Figure 19B:
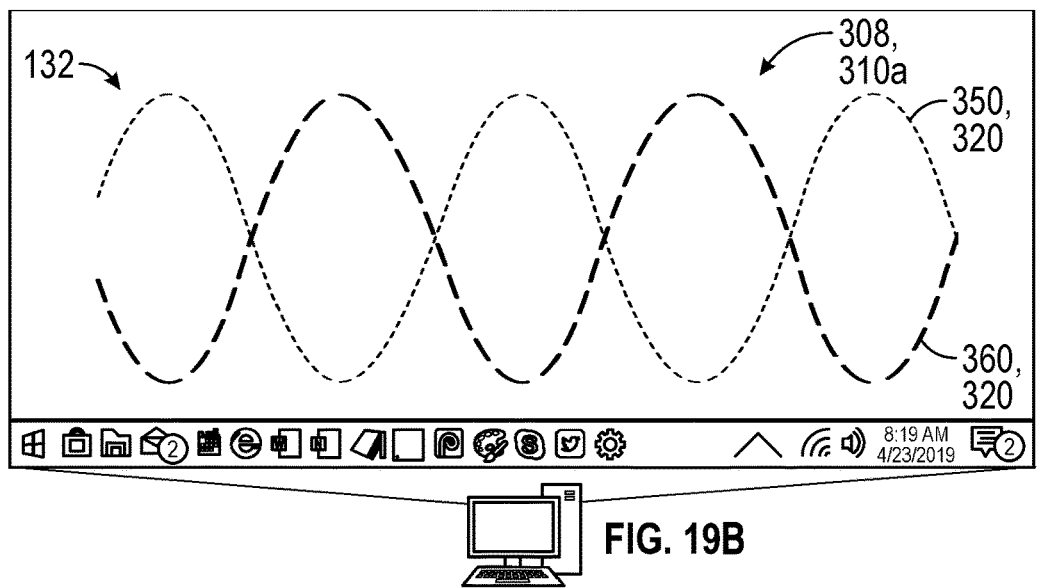
FIG. 19B shows a bottom fusion pattern that includes two exemplary waveforms, said bottom fusion pattern is configured to be disposed on the bottom surface of a fused segment contained within an intermediate portion of the busbar.
Figure 19C:
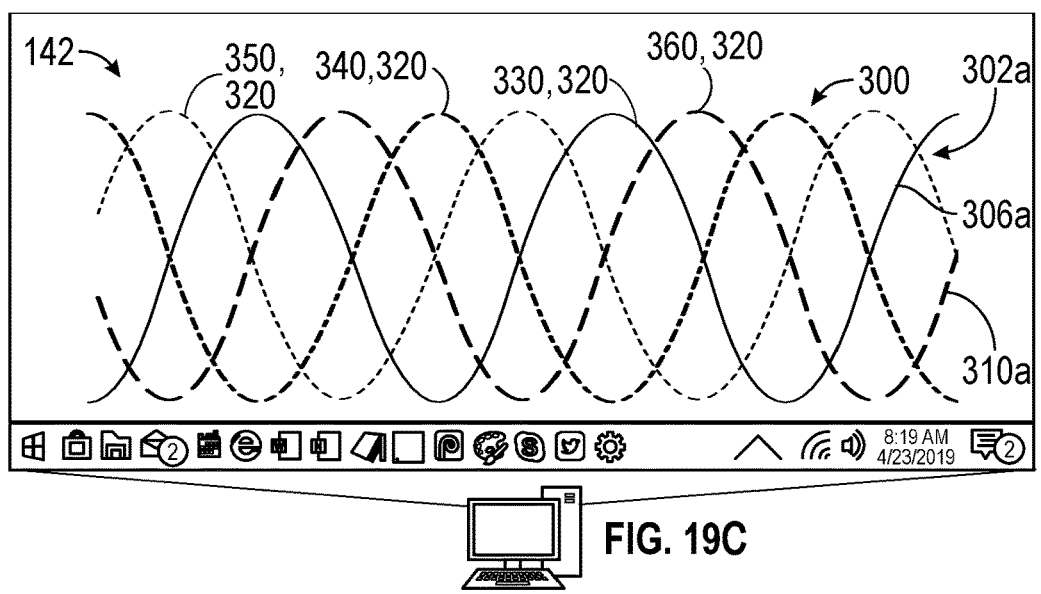
FIG. 19C shows a combined fusion pattern that includes the top fusion pattern and the bottom fusion pattern, wherein the top fusion pattern and the bottom fusion pattern are arranged such that they minimize the direct overlap with one another.

Creating the top and bottom segment fusion patters 304, 306, whose combination form the segment combination pattern 300, is a multiple step process that is described in connection with FIG. 17A. Here, the first step in this process is selecting the number of waveforms 320 in step 124. The number of waveforms 320 that may be selected can be any number (e.g., 0-100), is preferably between 1-6, and most preferably is two 330, 340. It is desirable to use two waveforms 330, 340 because: (i) the waveforms 330, 340 can be arranged to minimize the distance along the edges of the busbar 100 that do not contain welds and (ii) it limits regions that will overlap with the bottom fusion pattern 306. After selecting the number of waveforms 320 in step 124, the designer can select the type of waveform 320 in step 126. Exemplary waveform types are shown in FIGS. 18A-18R. Examples of the waveforms contained within FIG. 18 are: (i) sine wave (FIG. 18A), (ii) triangle (FIG. 18B), (iii) ramp up (FIG. 18C), (iv) ramp down (FIG. 18D), (v) square (FIG. 18E), (vi) pulse (FIG. 18F), (vii) line (FIG. 18G), (viii) rounded pulse (FIG. 18H), (ix) circular pulse (FIG. 18I), (x) triangular pulse (FIG. 18J), (xi) ramp pulse (FIG. 18K), (xii) sine cubed (FIG. 18L), (xiii) flame (FIG. 18M), (ixv) semicircle (FIG. 18N), (xv) and other waveforms (FIGS. 180-18R). It may be desirable to use a waveform 320 that contains curvilinear shapes because these waveforms do not contain multiple acute angles that may introduce additional stresses into the busbar 100 when it is manipulated. Nevertheless, waveforms that include acute angles may be used if the designer takes adequate precautions (e.g., only using them in segments that will undergo an out-of-plane bend 760). Additionally, it should be understood that the waveform types shown in FIG. 18 are only exemplary waveform types and that other types may be used.

Once the designer selects the waveform type in step 126, the designer then selects the amplitude of the waveform 320 in step 128 and the frequency of the waveform 320 in step 130. While any amplitude may be selected in step 128, it may be desirable to select an amplitude of the waveform 320 that enables the apex of the waveform to come close to the edges of the busbar 100 but not extend over the edges of the busbar 100. This may be desirable because this will reduce welding spatter, if the designer is utilizing a laser welding fusion process 800, and in turn reduces the number of sharp edges contained within the busbar 100. Similarly, while any frequency may be selected in step 130, it should be understood that the frequency of the waveform 320 is one of the leading factors that alters the properties of the busbar 100. Thus, the frequency of the waveform 320 should be selected such that the top segment fusion pattern 304 meets a portion of the general property requirements (e.g., 250a, 254a, 258a), which in turn allows the fused region to meet the requirements associated with the bend, and this in turn allows the busbar 100 to meet at least some of the customer specifications 50 that were received within step 52. Once this process is completed for the top segment fusion pattern 304, the designer can then perform the same steps to create the bottom fusion pattern 308. In particular, the designer will: (i) select the number of waveforms in step 134, (ii) select the waveform type in step 136, (iii) select the amplitude in step 138, and (iv) select the frequency in step 140.

Finally, after both the top and bottom segment fusion patterns 304, 308 are created, the designer can then align these patterns 304, 308 on the busbar 100 to form the segment combination pattern 300. In particular, it may be desirable to align the patterns 304, 308 in a manner that minimizes overlap between the patterns 304, 308 because their alignment or intersection will create a fully solidified region. For example, the designer may offset the patterns 304, 308 by 90 degrees in order to minimize this overlap. Other methods of minimizing the number of fully solidified region include: (i) stopping and starting the waveforms 320 to avoid creating overlapping areas, (ii) decreasing the number of conductors 90 that are fused within these overlapping/intersecting regions/points by the selected fusion process, or (iii) choosing a different waveform type that minimizes the number of overlapping areas (see FIG. 21B).

In summary, the combination segment fusion pattern 300 includes a top segment fusion pattern 304 and a bottom segment fusion pattern 308, wherein the top and bottom fusion patterns 304, 308 comprise of at least one waveform 320 that has an amplitude and a frequency. It should be understood that in alternative embodiments, the top segment fusion pattern 304 or the bottom segment fusion pattern 308 may be omitted, the top or bottom segment fusion patterns may include only a single waveform, and/or the waveform may be a straight line (i.e., have an amplitude of zero).

Figure 20C:
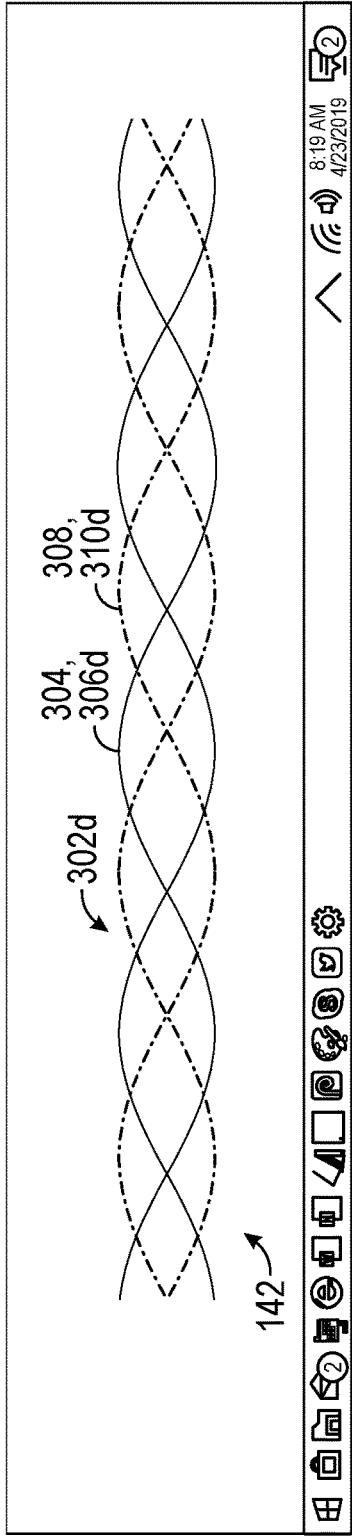
FIG. 20C-20D shows variance of the frequency of the waveforms contained within the combined fusion pattern based upon the width of the busbar.
Figure 20D:
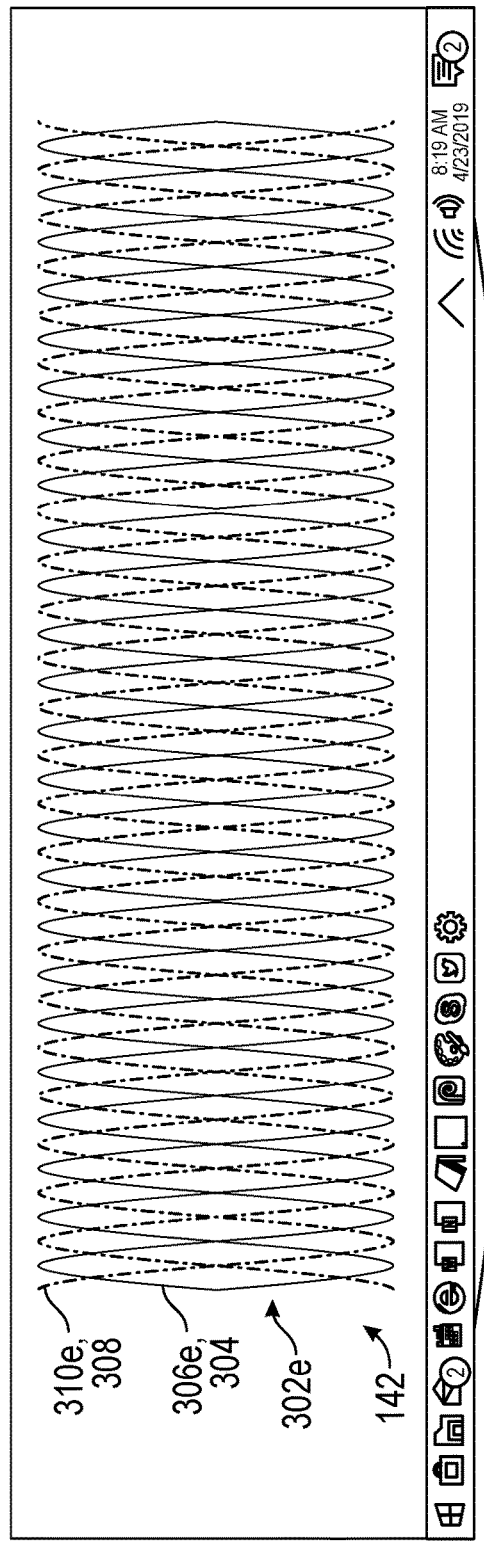

As discussed above, numerous factors are considered in formulating the general properties (e.g., 250a, 254a, 258a) of each of the fused segments 220 in step 110, which in turn means that numerous factors are considered when generating the segment combination pattern 300. In considering these numerous factors, it should be understood that the bend geometry may be one of the leading factors in determining the waveform type, amplitude, and frequency. This is because significantly different forces are placed on the conductors 90 that are contained within the busbar 100 in connection with the in-plane bends 750 in comparison to the out-of-plane bends 760. Also, as discussed above, the frequency of the waveform 320 is one of the leading factors that alters the properties of the busbar 100 within the fused segment 220. Taking these specific factors into consideration, it can be seen that the frequency of the waveforms contained within the segment combination pattern 302b, 302c increases between FIGS. 20A-20B. This increase in frequency is designed to account for the fact that FIG. 20A is designed for an out-of-plane bend 760, while FIG. 20B is designed for an in-plane bend 750. Another leading factor that alters the properties of the busbar 100 within the fused segment 220 is the width of the busbar 100. Taking this and other factors into consideration, it can be seen that the frequency of the waveforms contained within the segment combination pattern 302d, 302e increases between FIGS. 20C-20D. This increase in frequency is designed to account for the fact that FIG. 20C is designed for a busbar that has a first width, while FIG. 20D is designed for a busbar that has a second width that is larger than the first width.

It should be understood that the number, type, amplitude, frequency of the waveforms contained within the may be: (i) consistent across the entire fused segment 220, or (ii) may not be consistent across the entire fused segment 220. For example, the frequency of the waveform 320 may vary within a single fused segment 220. Examples showing a segment combination pattern 302f, 302g that contain waveforms that have varying frequency are shown in FIGS. 21A-21B. In particular, the waveforms contained within these segment combination pattern 300 increase their frequency as they approach the center of the fused segment 220. This configuration may be desirable, if the center of the fused segment 220 is centered over a bend in the busbar 100 because it will provide additional rigidity to the busbar 100 in this region and in turn will reduce the probability of delamination of the conductors 90 contained within the busbar 100. Additionally, it should be understood that the designer may change other variables to achieve the desired properties of the busbar 100.
Examples include, but are not limited to: (i) the width of each of the waveforms 330, 340, 350, 360 may be the same, different or may vary across the fused segment 220, and (ii) the number of conductors 90 that are solidified by each waveform 330, 340, 350, 360 may be the same, different, or may vary across the fused segment 220.

Figure 22C:
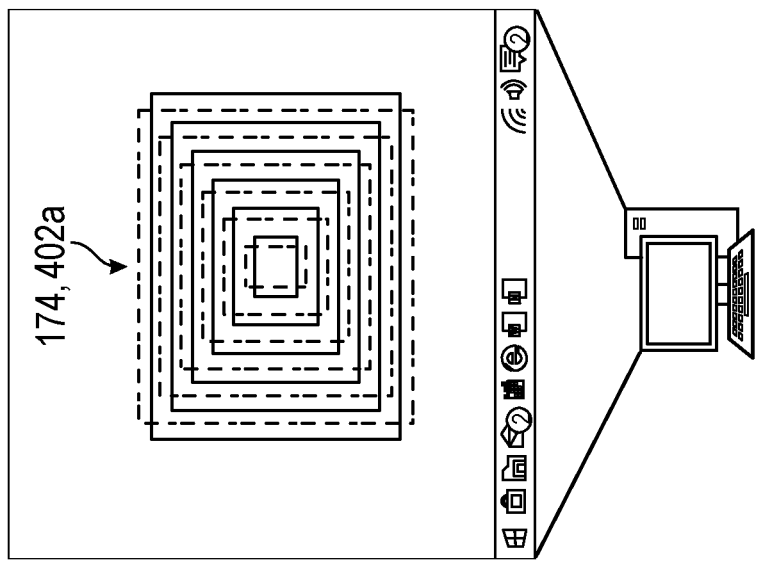
FIG. 22C shows a combined fusion pattern that is comprised of the top fusion pattern and the bottom fusion pattern, wherein the top fusion pattern and bottom fusion pattern are arranged such that they minimize the direct overlap with each other.
Figure 22B:
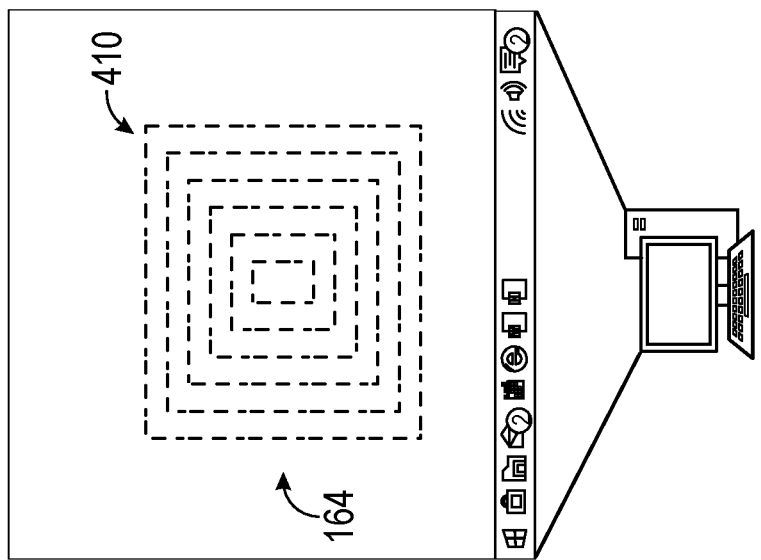
FIG. 22B shows a bottom fusion pattern configured to be disposed on the bottom surface of a fused segment of the end portion of the busbar.
Figure 22A:
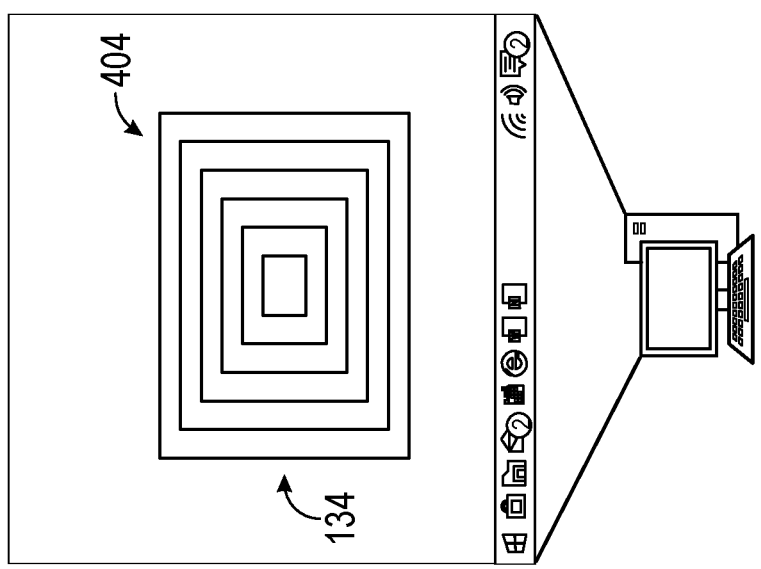
FIG. 22A shows a top fusion pattern configured to be disposed on the top surface of a fused segment of the end portion of the busbar.

Like the process that is described above in connection with determining the combination pattern for the identified fused segments 220 in step 118, the busbar designer can determine the combination pattern for the end portions 700 of the busbar 100 in step 150. Specifically, the end combination pattern 400 may be determined based upon the connector that the designer plans on attaching to the busbar 100. For example, a first end combination pattern 400a may be used in connection with end portions 700 designed to receive a connector 2000, while a second end combination pattern 402b may be used for the end portions 700 designed to receive an aperture formed therethrough. After selecting the desired properties, the designer may follow the same steps that are described above in connection with determining the segment combination pattern 300. Specifically, the top fusion pattern 404 is determined in step 154 by: (i) selecting the number of waveforms in step 156, (ii) the waveform types are selected in step 158, (iii) the amplitude of the waveforms is selected in step 160, and (iv) the frequency of the waveforms is elected in step 162. Next, the bottom fusion pattern 410 is determined in step 164 by: (i) selecting the number of waveforms in step 166, (ii) the waveform types are selected in step 168, (iii) the amplitude of the waveforms is selected in step 170, and (iv) the frequency of the waveforms is elected in step 172. Finally, in step 174, the top and bottom fusion patterns 404, 410 are arranged in a manner that minimize overlap between the top and bottom fusion patterns 404, 410 in step 174. As shown in FIGS. 22A-22E, the end combination pattern 400 may take the form of: (i) overlapping rectangles 402a, as shown in FIG. 22C, (ii) spiraling rectangles 402b, as shown in FIG. 22B, or (iii) spiraling circles 402c, as shown in FIG. 22C. It should be understood that the spiraling circles or rectangles 402, 404 may be desirable because there is no overlap between the end fusion patterns 404, 410.

Once the segment combination pattern 300 and end combination pattern 400 are determined, the designer can replace the general properties (e.g., 250a, 254a, 258a) with these combination patterns 300, 400. An example of this replacement is shown in connection with FIGS. 23A-23D. Specifically, the general properties that were determined in connection with the exemplary 250, 254, 258, 262 busbar models 100 in FIGS. 14A-14D are replaced by the combination patters 300, 400 that meet these general properties in FIGS. 23A-23D. Focusing first on FIG. 23A, the intermediate portion 200 includes: (i) two fused segments 220, 251a-251b and (ii) one unfused segment 520, 252. The general properties 250a of fused segments 220, 251a-251b have been replaced by segment combination patterns 452a-452b, wherein each pattern 452a-452b includes a top fusion pattern 453 that is shown in solid lines and a bottom fusion pattern 454 that is shown in broken lines. The top and bottom fusion patterns 453, 454 are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 453, 454 are offset by 90 degrees from one another in order to minimize their overlap with one another. As described above, the unfused segment 520, 252 that is positioned between the fused segments 251a-251b maintains the same properties 250b, described above in connection with FIG. 14A, because this extent of the busbar 100 is not modified by a fusion process. Finally, the end portions 700, 702a, 702b have been modified to include end combination pattern 456a-256b, wherein each pattern 456a-456b includes a top fusion pattern 457 that is shown in solid lines and a bottom fusion pattern 458 that is shown in broken lines. The top and bottom fusion patterns 457, 458 are comprised of concentric rectangles are offset from each other in order to minimize their overlap.

Focusing next on FIG. 23B, the intermediate portion 200 includes: (i) four fused segments 220, 253a-253d and (ii) one unfused segment 520, 256. The general properties 254a of the first two fused segments 220, 253a-253b have been replaced by segment combination patterns 462a-462b, wherein each pattern 262a-462b includes a top fusion pattern 463a that is shown in solid lines and a bottom fusion pattern 464a that is shown in broken lines. The top and bottom fusion patterns 463a, 464a are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 463a, 464a are offset by 90 degrees from one another in order to minimize their overlap with one another. The general properties 254b of the second two fused segments 220, 253c-253d have been replaced by segment combination patterns 462c-462d, wherein each pattern 262c-462d includes a top fusion pattern 463b that is shown in solid lines and a bottom fusion pattern 464b that is shown in broken lines. The top and bottom fusion patterns 463b, 464b are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 463b, 464b are offset by 90 degrees from one another in order to minimize their overlap with one another.

As shown in FIG. 23B, the waveforms contained within the segment combination patterns 462c-462d have a lower frequency than the waveforms contained within the segment combination patterns 462a-462b. This lower frequency is selected because segments 253c, 253d are configured to be bent out-of-plane 760, while segments 253a, 253b are configured to be bent in-plane 750. As described above, the unfused segment 520, 256 that is positioned between the fused segments 253a maintains the same properties 254c, described above in connection with FIG. 14B, because this extent of the busbar 100 is not modified by a fusion process. The end portions 700, 702a, 702b have been modified to include end combination pattern 466a-466b, wherein each pattern 466a-466b includes a top fusion pattern 467 that is shown in solid lines and a bottom fusion pattern 468 that is shown in broken lines. The top and bottom fusion patterns 467, 468 are comprised of concentric rectangles are offset from each other in order to minimize their overlap.

Figure 23A:
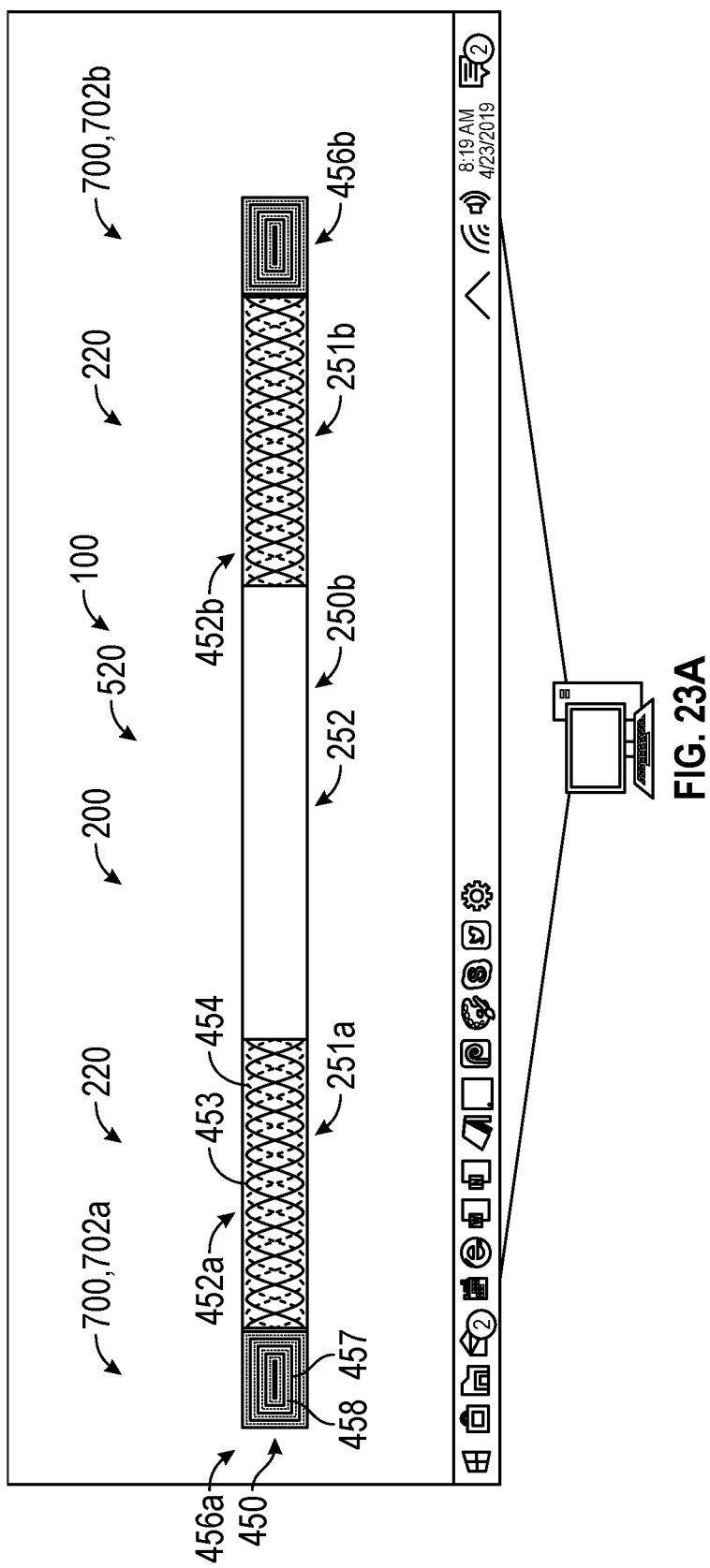
Figure 23C:
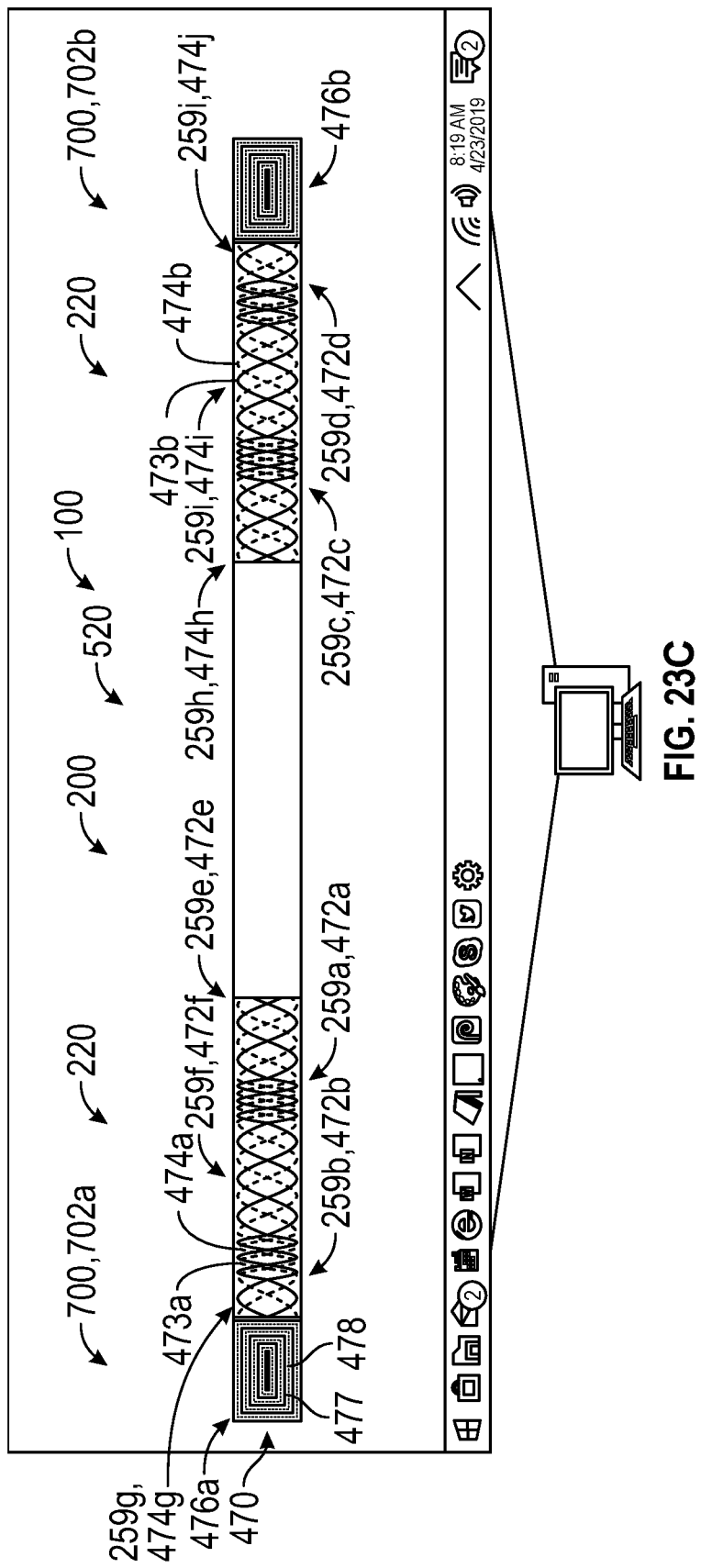

Focusing next on FIG. 23C, the intermediate portion 200 includes: (i) ten fused segments 220, 259a-259j and (ii) one unfused segment 520, 260. The general properties 254a of the four of the fused segments 220, 259a-259d have been replaced by segment combination patterns 472a-472d, wherein each pattern 272a-472d includes a top fusion pattern 473a that is shown in solid lines and a bottom fusion pattern 474a that is shown in broken lines. The top and bottom fusion patterns 473a, 474a are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 473a, 474a are offset by 90 degrees from one another in order to minimize their overlap with one another. The general properties 254b of the other six fused segments 220, 259e-259j have been replaced by segment combination patterns 472e-472j, wherein each pattern 272e-274j includes a top fusion pattern 473b that is shown in solid lines and a bottom fusion pattern 474b that is shown in broken lines. The top and bottom fusion patterns 473b, 474b are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 473b, 474b are offset by 90 degrees from one another in order to minimize their overlap with one another.

As shown in FIG. 23C, the waveforms contained within the segment combination patterns 472c-472d have a higher frequency than the waveforms contained within the segment combination patterns 472e-472j. This higher frequency is selected because segments 259a-259d are configured to be bent in-plane 750, while segments 259e-472j are configured to account for forces that radiate from the four in-plane bends 750 in segments 259a-259d. As described above, the unfused segment 520, 260 that is positioned between the fused segments 259e, 259h maintains the same properties 258c, described above in connection with FIG. 14C, because this extent of the busbar 100 is not modified by the fusion process. The end portions 700, 702a, 702b have been modified to include end combination pattern 476a-476b, wherein each pattern 476a-476b includes a top fusion pattern 477 that is shown in solid lines and a bottom fusion pattern 478 that is shown in broken lines. The top and bottom fusion patterns 477, 478 are comprised of concentric rectangles are offset from each other in order to minimize their overlap.

Figure 23D:
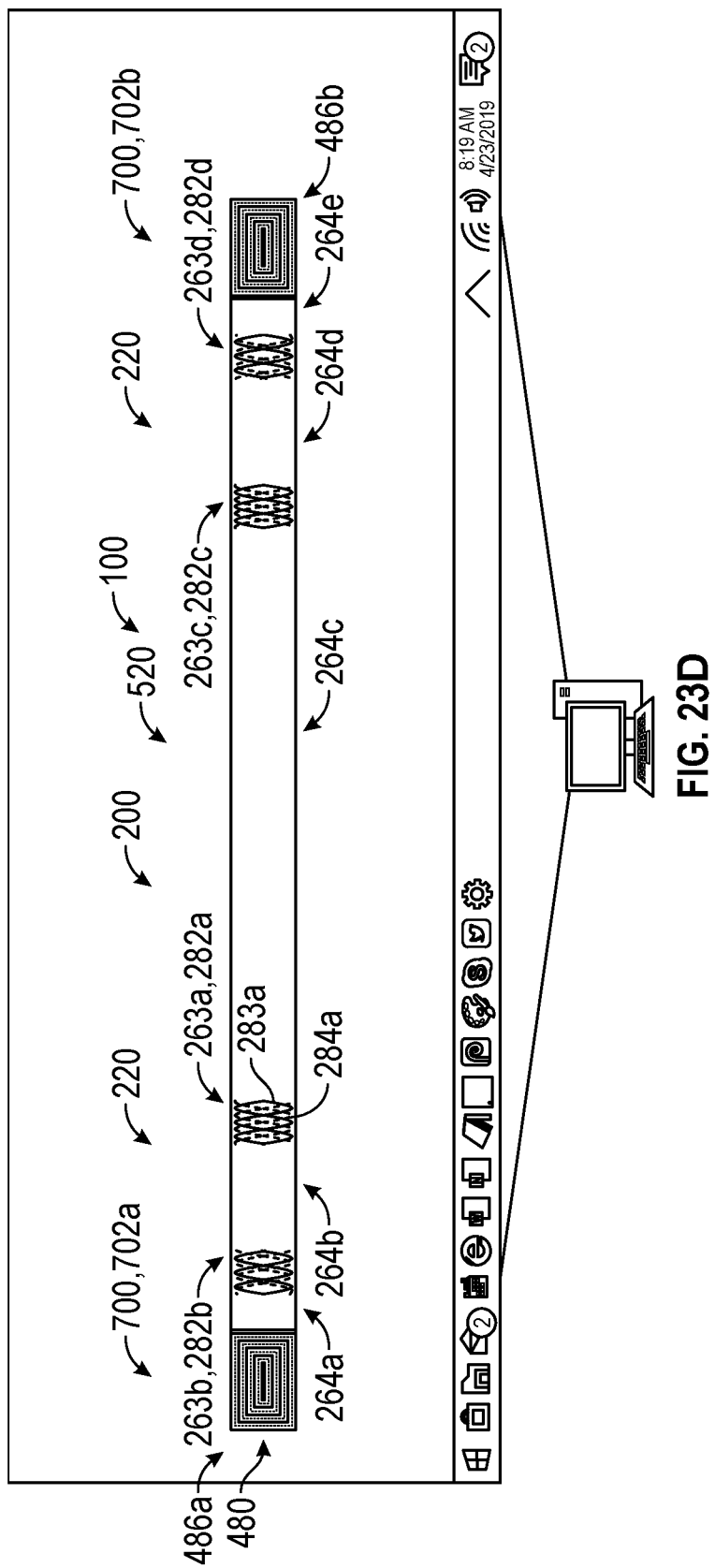
Figure 24C:
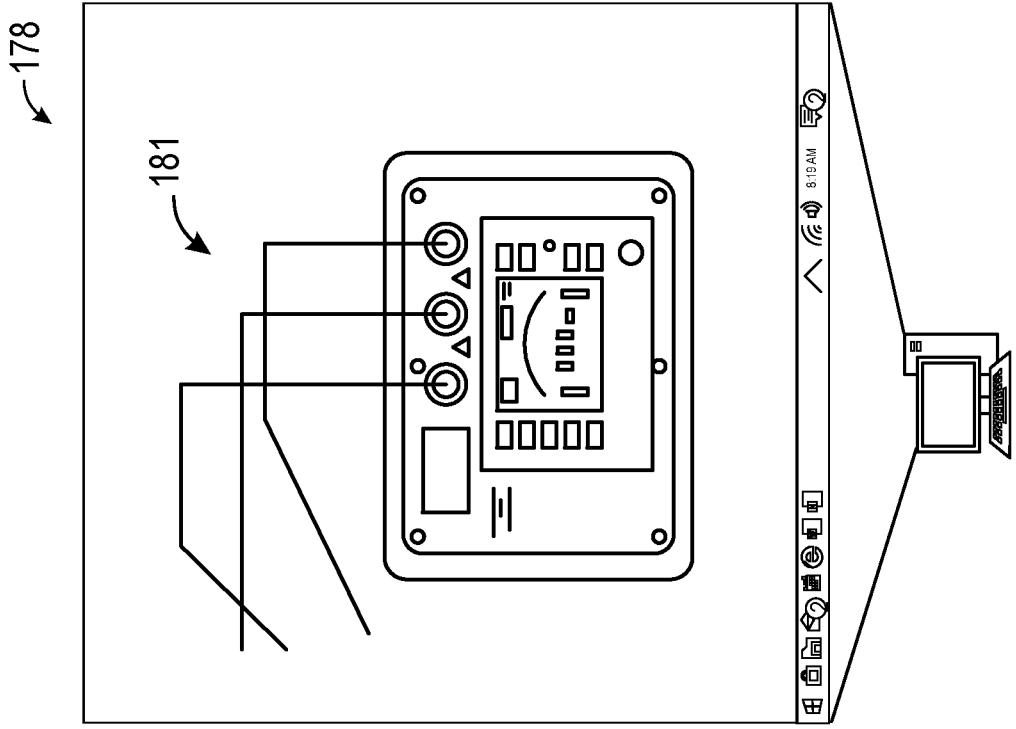
Figure 24B:
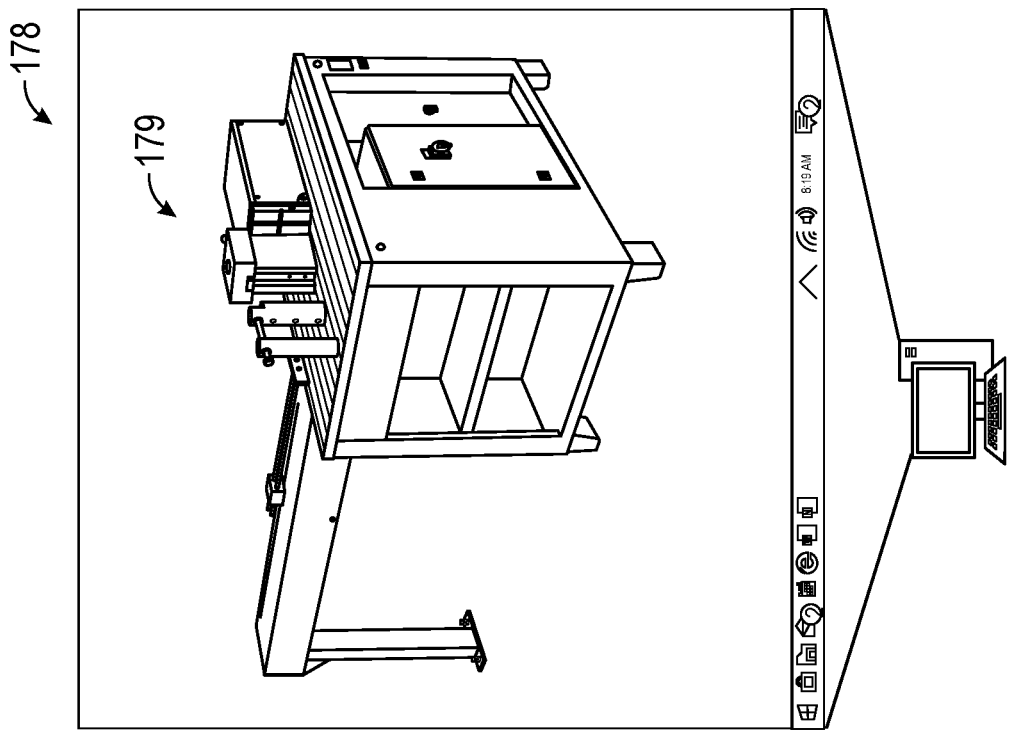

Focusing next on FIG. 23D, the intermediate portion 200 includes: (i) four fused segments 220, 263a-263d and (ii) five unfused segments 520, 264a-264e. The general properties 262a of the four of the fused segments 220, 263a-263d have been replaced by segment combination patterns 482a-487d, wherein each pattern 282a-482d includes a top fusion pattern 483a that is shown in solid lines and a bottom fusion pattern 484a that is shown in broken lines. The top and bottom fusion patterns 483a, 484a are comprised of two waveforms, wherein each waveform has a waveform type that is a sine wave, has an amplitude that is just shorter than the width of the busbar 100, has a consistent frequency, and is offset from the other waveform by 180 degrees. The top and bottom fusion patterns 483a, 484a are offset by 90 degrees from one another in order to minimize their overlap with one another. As described above, the unfused segment 520, 264a-264e that are positioned between the fused segments 263a-263d maintain the same properties 264c, described above in connection with FIG. 14D, because this extent of the busbar 100 is not modified by the fusion process. The end portions 700, 702a, 702b have been modified to include end combination pattern 486a-486b, wherein each pattern 486a-486b includes a top fusion pattern 487 that is shown in solid lines and a bottom fusion pattern 488 that is shown in broken lines. The top and bottom fusion patterns 487, 488 are comprised of concentric rectangles are offset from each other in order to minimize their overlap.

Once the engineering model 100 are created, the designer can then digitally test these models 100 (e.g., 450 from FIG. 23A) to determine if a busbar manufactured based upon the model 100 will meet the customer specifications 50. Here, the model is bent using a digital bending machine 179 and the electrical properties of model are tested using a voltage testing system 181. Such testing can be accomplished using a finite element (FE) model of the busbar 100. If the busbar model 100 passes these tests then the designer can proceed to the next step the process. However, if the busbar model 100 fails these tests 179, 181, then the designer can start the designing process all over again.

B. Fabricating the Inventive Busbar

Returning to FIG. 4, once the engineering model 100 has passed the digital tests that are set forth in step 180, the designer can start the fabrication process in step 182. This fabrication process 182 is a multiple step process that is described in greater detail within FIG. 25. At a high level, this process 182 includes: (i) obtaining a plurality of conductors 1090, (ii) fusing the identified segments 1220 within the intermediate portion 1200 according to the engineering model 100 in step 184, (iii) fusing the end portion(s) 1700 of the busbar 1000 according to the engineering model 100 in step 186, (iv) adding the selected edge detail to the busbar 1000 in step 188, and (v) performing optional fabrication steps such as adding in connectors in step 190, insulating the busbar 1000 in step 192, and/or plating an extent of the busbar 1000 in step 194.

Figure 25:
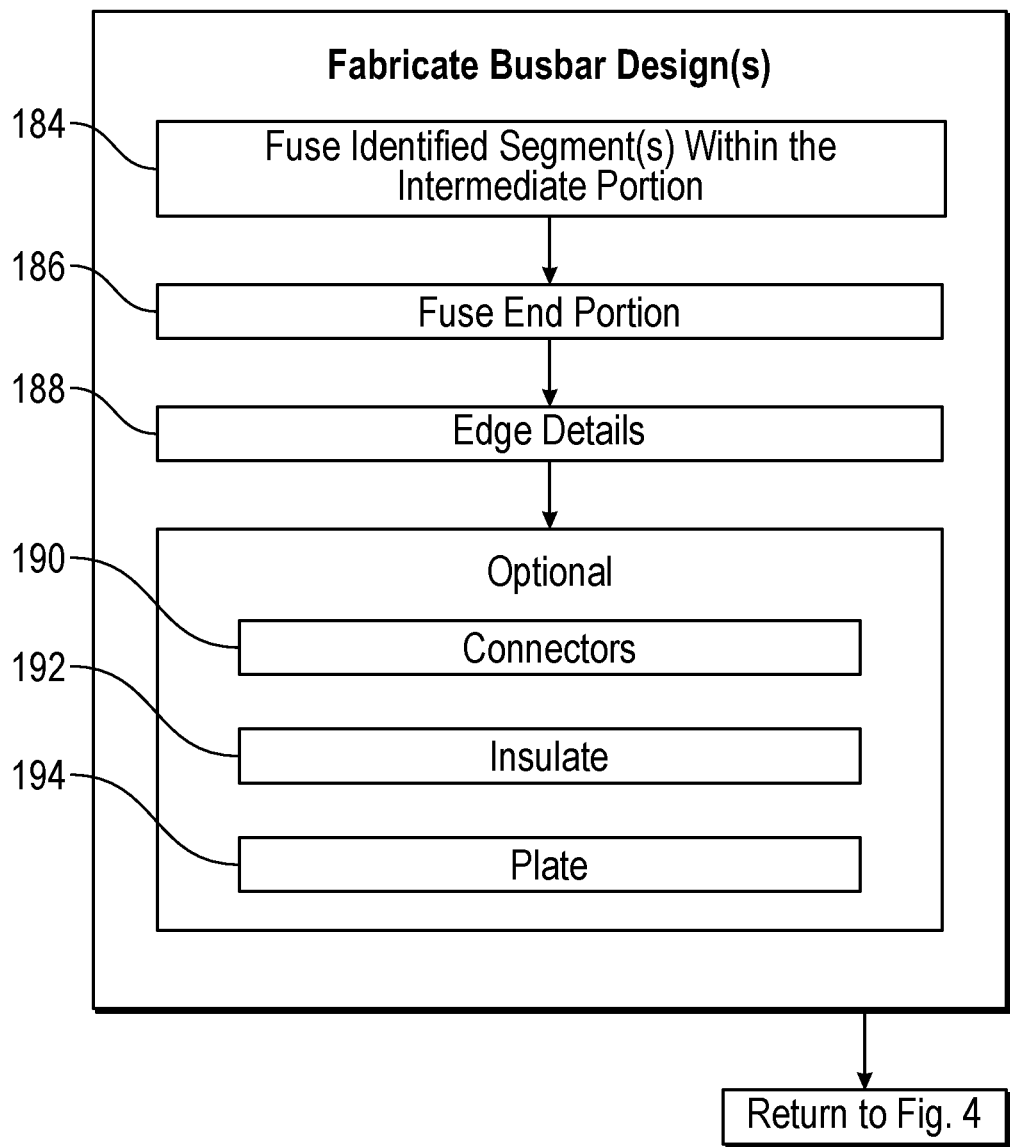
FIG. 25 is a flowchart showing the fabrication process of the inventive busbar design.
Figure 26:
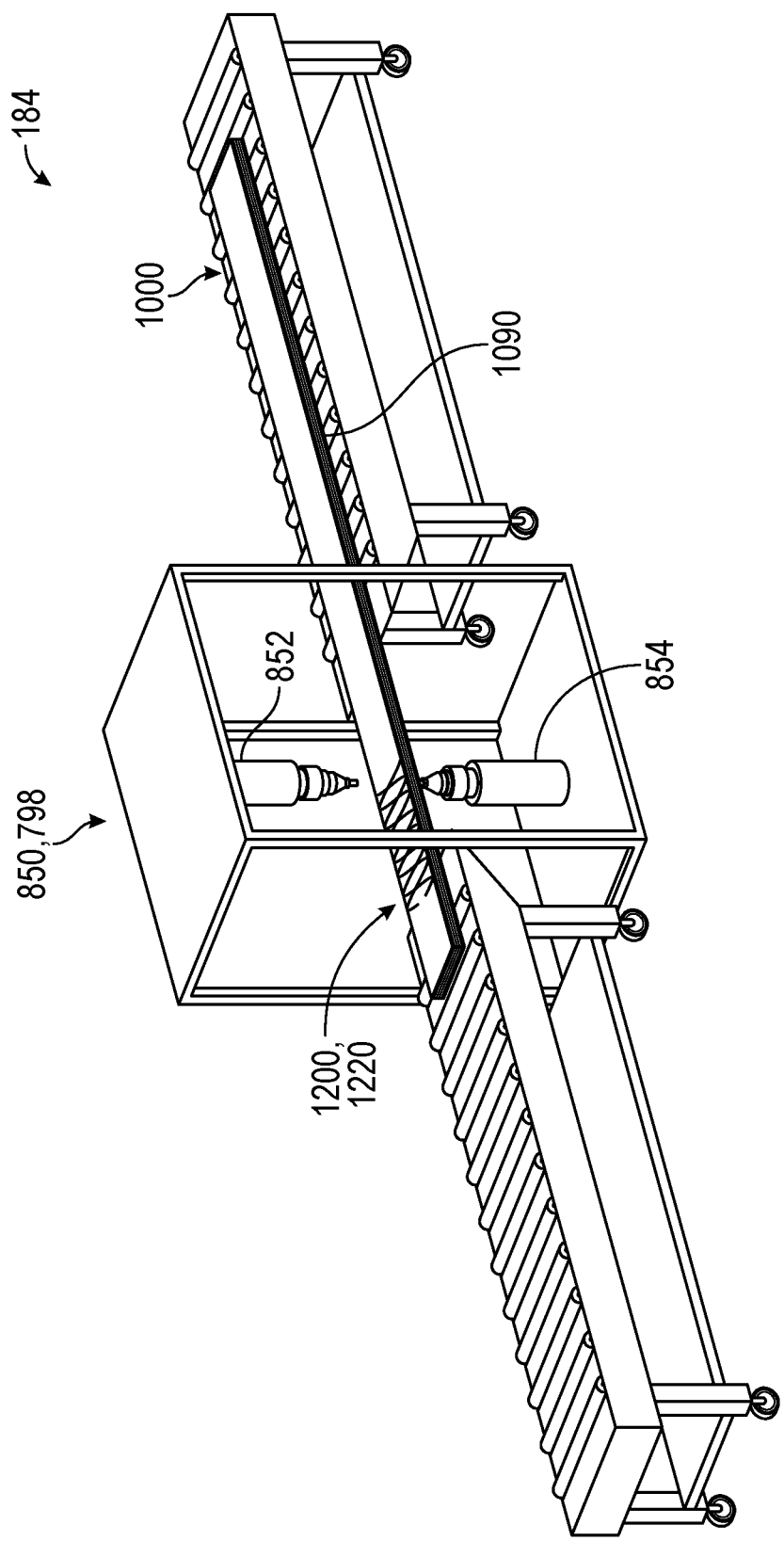
FIG. 26 shows a laser welding machine welding the intermediate portion of the busbar based upon the combined fusion pattern associated with the selected design.
Figure 27:
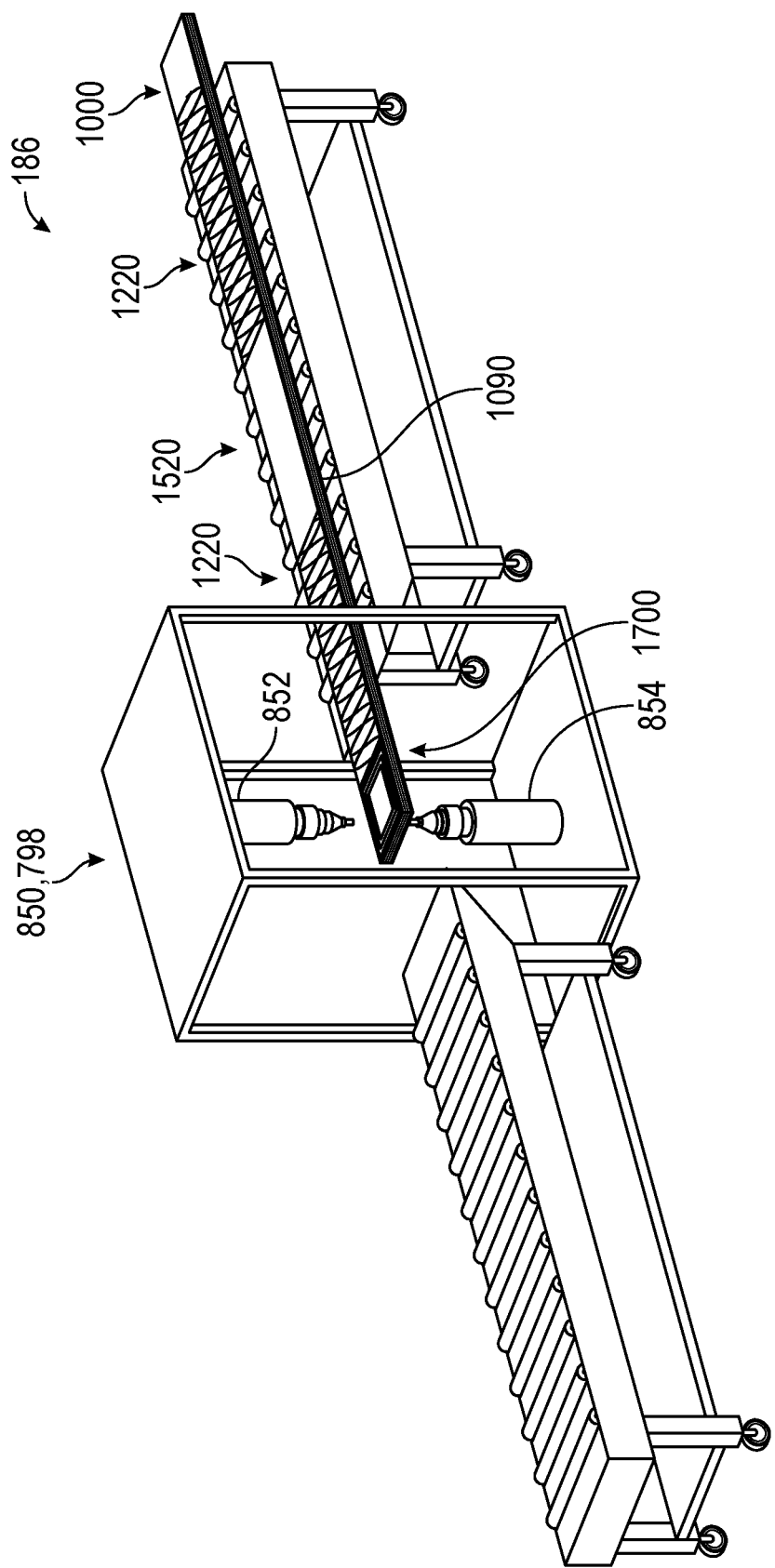
FIG. 27 shows a laser welding machine welding an end portion of the busbar based upon the combined fusion pattern associated with the selected design.

As shown in FIG. 25, the first step in this multiple step process 182 is obtaining a plurality of conductors 1090 and then fusing the identified segments 1220 within the intermediate portion 1200 according to the engineering model 100 in step 184. To perform this step 184, the busbar designer/manufacture obtains the conductors 1090 and then utilizes a machine 798 that is capable of performing the fusion method that was selected when creating the engineering model 100. For example, if the designer decided to use a laser welding fusion method, then the designer would utilize the laser welding machine 850 that is shown in at least FIGS. 26-28, 48A, 49A, 52-53. As shown in these Figures, the laser welding machine 850 includes two separate lasers 852, 854 that can simultaneously weld the busbar from the top and bottom of the busbar 1000. The two separate lasers 852, 854 are preferably aligned in a horizontal plane. However, it should be understood that the laser welding machine 850 may have other configurations, which include: (i) only one laser 852 that can interact with only one side of the busbar 1000 at a time, (ii) only one laser 852, but the light output from the laser is modified, using optics and mirrors, such that the laser can interact with both sides of the busbar 1000 at the same time, or (iii) two lasers 852, 854 that are not aligned. As shown in FIG. 26, after the designer acquires or obtains access to the laser welding machine 850, the designer will: (i) insert the conductors 90 that have been arranged according to the engineering model 100 into the machine and (ii) load in the engineering model 100. The laser welding machine 850 will then perform the weldment process that is described within the engineering model 100. For example, FIG. 26 shows the laser welding machine 850 creating welds 1600 based upon the top fusion pattern 452a that is shown in FIG. 23A. After the laser welding machine 850 performs the weldment process in step 186, the machine 850 performs the fuses the end portion(s) 1700 of the busbar 1000 according to the engineering model 100 in step 186. In particular, this step can be seen in connection with FIG. 27, where the end portions 1700 of the busbar 1000 are welded 1600 according to top fusion pattern 456a that is shown in FIG. 23A. In creating this fused segment 1220, the designer/manufacture has at least made this segment 1220 of the busbar more rigid or stiffer than the segment 1220 was before this welding process 1600 was performed.

Figure 16E:
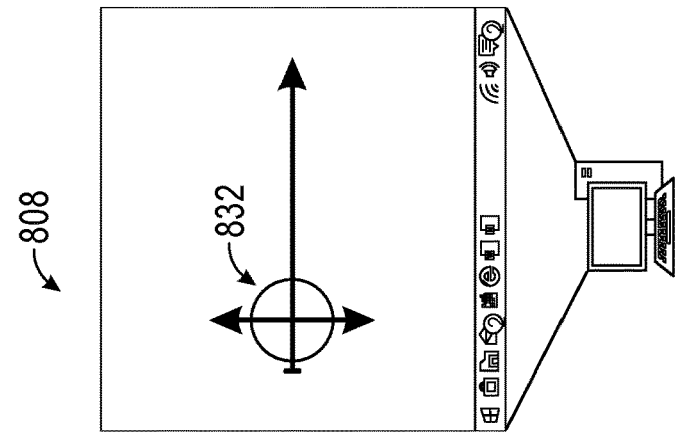
Figure 28:
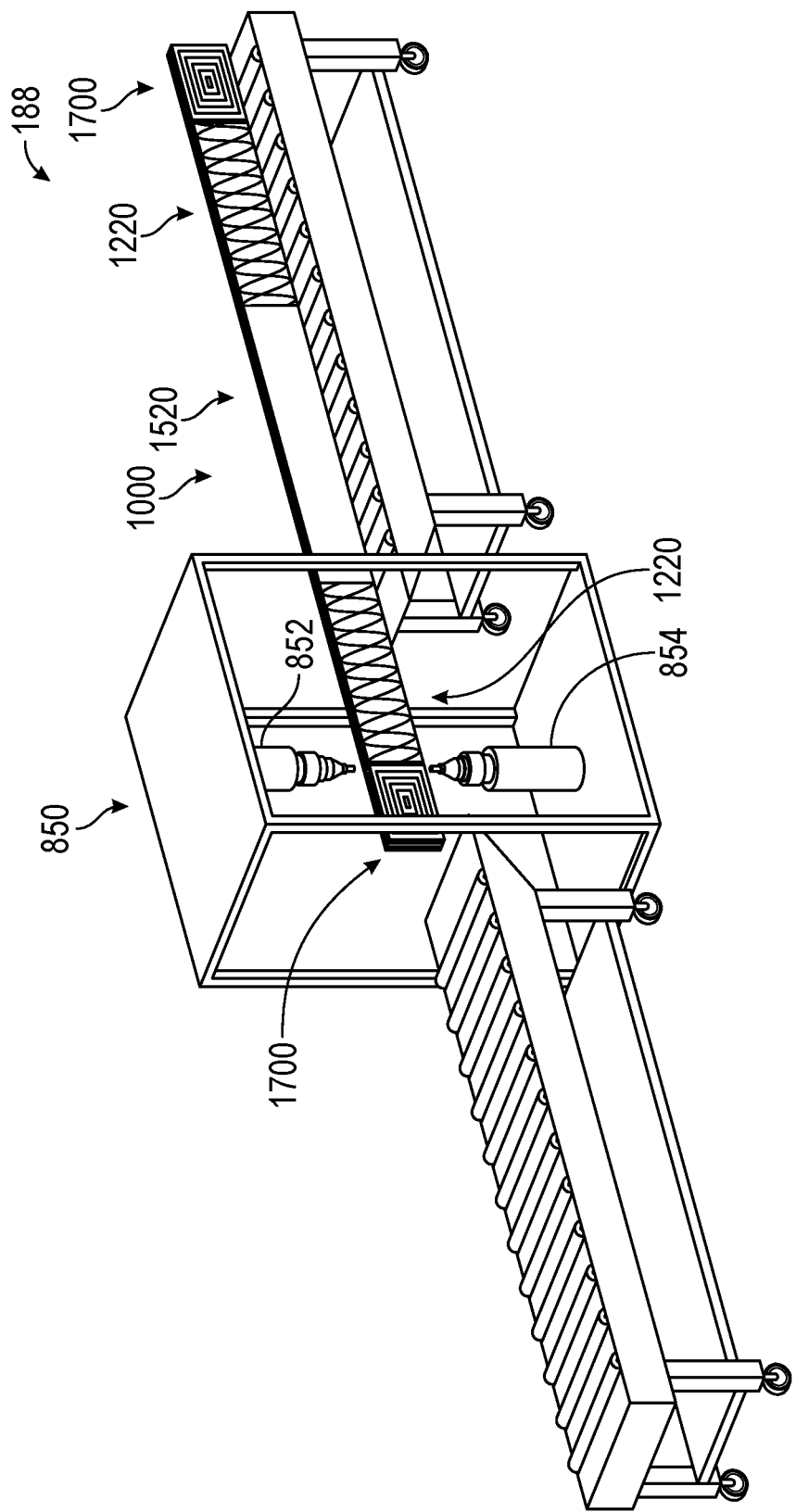
FIG. 28 shows a laser welding machine welding an edge detail associated with the selected design.

After the top and bottom surfaces of the busbar 1000 have undergone the weldment process in connection with steps 186, 187, the edge detail is added to the busbar 1000 in step 188. In the example that is shown in FIG. 28, the edge detail that was selected for this example is the edge weldment process 106 from FIG. 12C-12D. This edge detail may have been selected during the design phase because it: (i) help fuse the edge portions of the busbar 1000 that typically undergo a large amount of stress when the busbar 1000 is bent, and (ii) it helps ensure that any material that was forced to the edges of the busbar 1000 during the top and bottom weldment process is rounded off, which prevents the busbar 1000 from having sharp edges that can create holes within the insulation. Specifically, FIG. 28 show the welding machine 850 including a laser 852 that can create welds 1600 on the edges or sides of the busbar 1000. These welds 1600 followed on the previously selected circle pattern (FIG. 16E). It should be understood that this set may be omitted from the process or the welding pattern may be altered to a different pattern (e.g., increase the strength of the laser on the edge portions and decrease the laser in the center of the busbar 1000). It should be understood that the depth of the welds on the edges or sides may be varied within a busbar 1000 or may be varied for the specific application.

Figure 29:
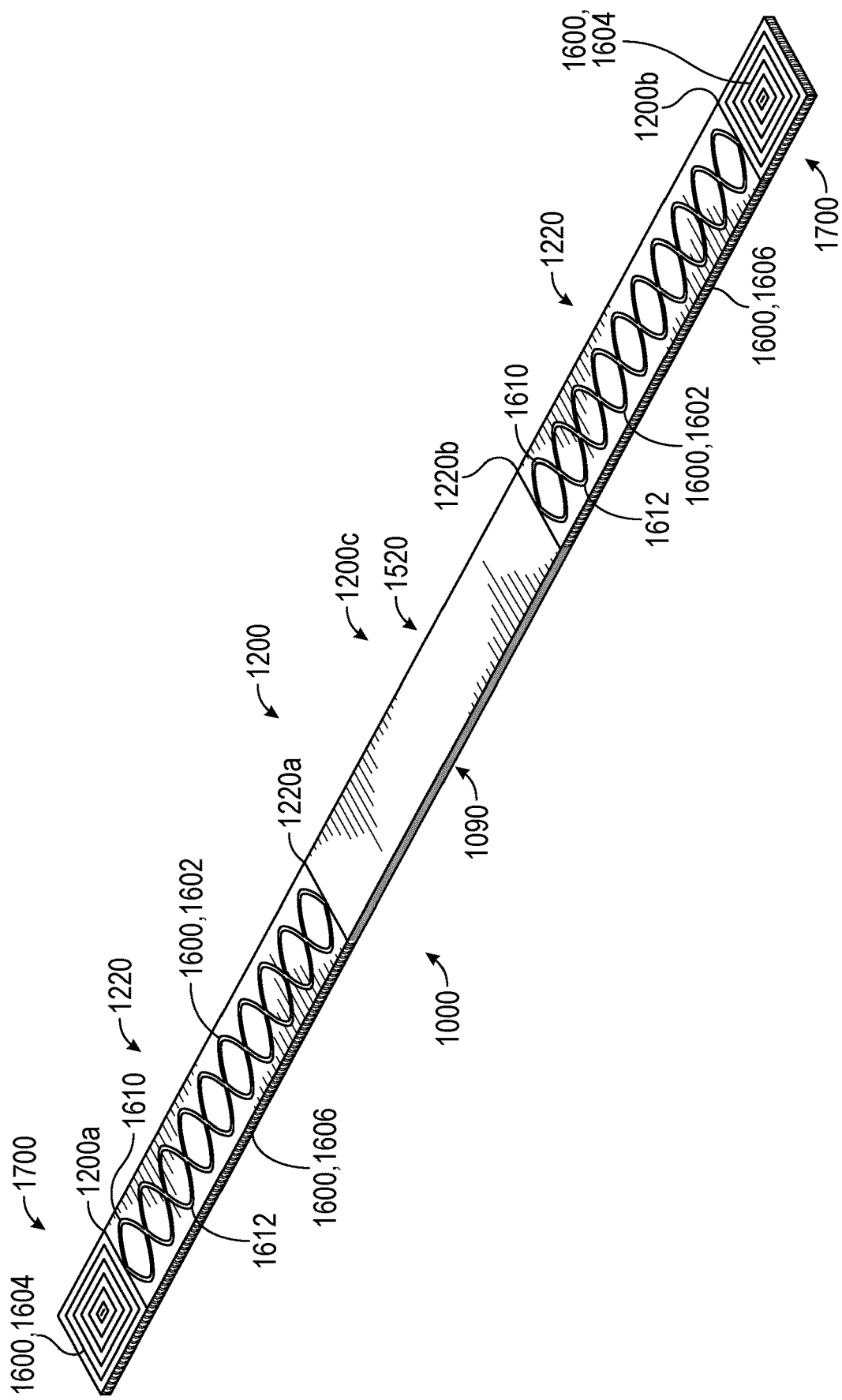
FIG. 29 is a perspective view of the inventive busbar with fused segments that have two combination surface patterns.
Figure 30:
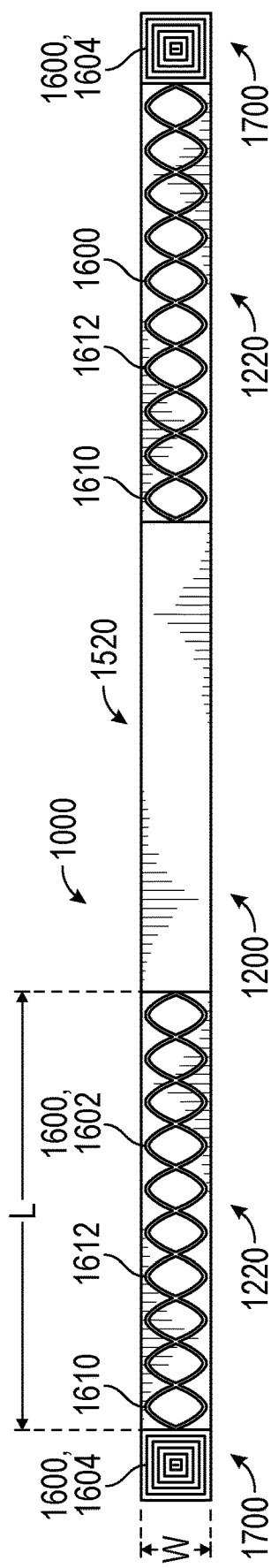
FIG. 30 is a top view of the busbar of FIG. 29.
Figure 31:
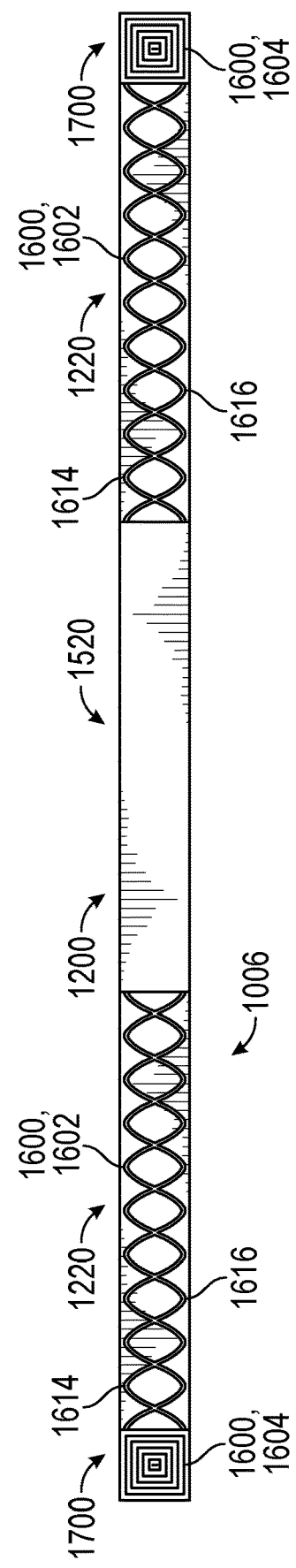
FIG. 31 is a bottom view of the busbar of FIG. 29.

The fabrication steps 184, 186, 188 lead to the formation of the busbar 1000 shown in FIGS. 29-35 based on the engineering model 100 that is shown in FIG. 23A. It should be understood that busbar 1000 is an exemplary embodiment of the inventive busbar and that other embodiments are disclosed within this application and are contemplated by this disclosure. FIGS. 29-35 show that the busbar 1000 includes: (i) an intermediate portion 1200 and (ii) two end portions 1700. Referring to FIG. 29, the intermediate portion 1200 extends between end boundary lines 1200a, 1200b, while the end portions 1700 extends outward from end boundary lines 1200a, 1200b. The intermediate portion includes: (i) two fused segments 1220 and (ii) one unfused segment 1520. Also, in the embodiment shown in FIG. 29, the fused segments 1220 extend between the end boundary lines 1200a, 1200b and an intermediate boundary line 1220a, 1220b. The unfused segment 1520 is not welded and thus contains an unsolidified region 1670. Accordingly, an extent of the individual conductors 1090 are visible within FIGS. 29-35. The fused segments 1220 were created from welds 1600 generated based on the top fusion pattern 453 and bottom fusion pattern 454 of the segment combination fusion pattern 452a, shown in FIG. 23A.

The welds 1600, 1602 contained within the fused segment 1220 include four waveforms 1610, 1612, 1614, 1616, wherein two waveforms 1610, 1612 are disposed on the top surface 1000a of the busbar 1000 and two waveforms 1614, 1616 are disposed on the bottom surface 1000b of the busbar 1000. Each of the four waveforms 1610, 1612, 1614, 1616 is a sine wave, has an amplitude that is less than the width of the busbar 1000, and a frequency that is consistent across the entire fused segment 1220. The top sine waves 1610, 1612 are arranged such that they are 180 degrees out of phase with each other. The bottom sine waves 1614, 1616 are arranged such that they are also 180 degrees out of phase with each other. In addition, the combination of the top sine waves 1610, 1612 is 90 degrees out of phase with the combination of the bottom sine waves 1614, 1616. Additionally, the sides or edges of the busbar 1000 also contain welds 1600, 1606 based upon the selected edge detail 106. Further, the end portions 700 were created from welds 1600 generated based on the top fusion pattern 457 and bottom fusion pattern 458 of the end combination fusion pattern 456a shown in FIG. 23A. Here, the top fusion pattern 457 and bottom fusion pattern 458 include concentric rectangles.

FIGS. 37-39 show cross-sectional views of the busbar 1000 shown in FIG. 37, where the top surface 1000a of the busbar 100 includes welds 1600, 1602, 1604. Cross-sectioning this busbar 1000 along the longitudinal center line 37-37, shows that: (i) welds 1602 create partially solidified regions 1650 in the fused segments 1220 of the intermediate portion 1200 of the busbar 1000, (ii) welds 1604 create a densified end portion 1700, and (iii) areas that did not undergo a weldment process remain unsolidified 1670. The partially solidified regions 1650 are formed within the fused segment 220 of the intermediate portion 200 because the weldment process combines some, but not all, of the conductors 1090 contained within weldment zone 1660 into a single consolidated conductor. Referring to FIG. 39, a partially solidified region 1650 extends from a first side 1000a of the busbar 1000 to a peak 1656 of the weld 1600. Wherein the weld peak 1656 is positioned at a point that is located between the first and second surfaces 1000a, 1000b of the busbar 1000 and preferably an appreciable distance inward from the first and second surfaces 1000a, 1000b. The partial solidification zone is a zone 1660 of the busbar 1000 that extends between the top surface 1000a and the bottom surface 1000b that has undergone a partial penetration weldment process. The partial solidification zone 1660 has a height that extends between the first and second surfaces 1000a, 1000b. Stated another way, the partial solidification zone 1660 has a height that is equal to fused segment height HF and is greater than the partially solidified height HP. The partial solidification zone 1660 has a width ZW that is equal to at least the diameter or cross-sectional width of the partially solidified region 1650.

The weld 1600 has a weld depth DW that extends from the first surface 1000a to the weld peak 1656. A weld depth DW in a partially solidified region 1650 has a partially solidified height HP. The partially solidified height HP is less than the total fused segment height or thickness HF of the busbar 1000. Because partially solidified height HP is less than the fused segment height HF, an unsolidified region 1670 is formed between the weld peak 1656 and the second surface 1000b of the busbar 1000. This unsolidified region 1670 has an unsolidified height HU, which extends between the second surface 1000b and the peak 1656 of the weld 1600. The unsolidified height HU is typically at least 10% of fused segment height HF and is preferably between 20% and 60% of fused segment height HF. On the other hand, partially solidified height HP is equal to at least 10% of the fused segment height HF, is preferably between 35% and 80% of the fused segment height HF, and is most preferably between 45% and 70% of the fused segment height HF.

In this exemplary embodiment, a partially solidified region 1650 may be created by solidifying between two and nine conductors 1090. Here, FIG. 39 shows that approximately seven of the ten conductors 1090 are solidified in the partially solidified region 1650. In other words, not all—approximately three—of the conductors 1090 are not solidified and thus these conductors 1090 are in the unsolidified region 1670. Stated another way, the intermediate portion 1200 of the busbar 1000 includes a plurality of conductors 1090 that traverse or spans the intermediate portion 1200 of the busbar 1200. The fused segment 1220 of the intermediate portion 1200 contains a partial solidification zone 1660 that extends between the upper most surface 1000a of the plurality of conductors and the lowermost surface of the plurality of conductors 1000b. A majority of the extents of the conductors 1090 contained within this partial solidification zone 1660 have been solidified into a single consolidated conductor to form a partially solidified region 1650. Likewise, a minority of the extents of the conductors 1090 contained within this partial solidification zone 1660 have unsolidified.

As best shown in FIG. 39, the partially solidified region 1650 contains varying fusing density, wherein a first or inner zone 1652 has a first fusing density and the second or outer zone 1654 has a fusing second density that is less than the first fusing density. The differences in density result from the configuration and operating conductions of the laser welding machine 850, where the laser beam loses strength as it penetrates into the busbar 1000. The less dense zone 1654 is created at a certain distance outward of the center of the weld 1600 or beyond the more dense zone 1652. It should be understood that this second zone 1654 may have a fusing density gradient, where it has a higher fusing density closest to the first zone 1652 and the lowest fusing density at a furthest point away from the first zone 1652. It also should be understood that the fusing density may be consistent or substantially consistent within this first zone 1652. Additional aspects of the partially solidified region 1650 and unsolidified region 1670 are presented in the definitions section at the outset of the detailed description.

In a first non-limiting example, the settings that may be used in connection with the laser welding machine 850, for a busbar 1000 that includes 10 copper conductors 1090 having a height or thickness HC that is equal to 0.01 inches or 0.254 mms, are: (i) laser type is a fiber laser, (ii) power of the laser is 2000 W, (iii) laser beam shape is a central core, (iv) there is no laser path, and (v) cycle time is set to 0.116 seconds. These settings for the machine 850 form a partially solidified region that extends approximately 56% of the way into the busbar 1000 and has a diameter of approximately 0.24 mm at its widest point. In another example, the settings that may be used in connection with the machine 850 for a busbar 1000 that includes 10 copper conductors 1090 having a height HC that is equal to 0.01 inches or 0.254 mm, are: (i) laser type is a fiber laser, (ii) power of the laser is 5000 W, (iii) laser beam shape is a central core with a ring, wherein the core has a power of 1500 W and the ring has a power of 3500 W, (iv) there is no laser path, and (v) cycle time was set to 0.079 seconds. These settings for the machine 850 form a partially solidified region 1650 that extends approximately 77% of the way into the busbar 1000 and has a diameter of approximately 0.732 mm at its widest point. In another example, the settings that may be used in connection with the machine 850, for a busbar 1000 that includes 10 copper conductors 1090 having a height HC that is equal to 0.01 inches or 0.254 mms, are: (i) laser type is a fiber laser, (ii) power of the laser is 5000 W, (iii) laser beam shape is a central core with a ring, wherein the core has a power of 1500 W and the ring has a power of 3500 W, (iv) there is no laser path, and (v) cycle time was set to 0.158 seconds. These settings for the machine 850 form a partially solidified region that extends approximately 79% of the way into the busbar 1000 and has a diameter of approximately 0.732 mm at its widest point.

In addition to containing the partially solidified regions 1650, the fused segment 1220 within the intermediate portion 1200 of the busbar 1000 contains unsolidified regions 1670. As shown in the Figures, a majority of the volume contained within the fused segment 1220 contains unsolidified regions 1670. The substantial volume of 1670 ensures that the busbar 1000 has properties that include attributes of rigid busbars 10 and flexible busbars 20. It should be understood that FIGS. 37-39 only show partially solidified regions 1650 because the cross-section 37-37 is taken along an extent of the busbar 1000 that does not contain overlapping or intersecting weld that extend from both the top and bottom of the busbar 1000. FIG. 37 also shows the cross-section of the end portions 1700 of the busbar 1000. Unlike the intermediate portion 1200, the end portions 1700 are intended to receive a connector and as such it is desirable for these areas to be fully solidified as a single consolidated conductor. As discussed above, the end portions 1700 are welded in manner that causes these portions to be densified (enough solidified surface area to equal 120% of the busbar's 100 cross sectional area) such that they can be coupled to a connector. Turning to FIGS. 40-43, the section plane of the busbar 1000 is offset from the longitudinal center 1000c of the busbar 1000 towards a peripheral edge 1000e and at the location where the top welds 1602 that were formed from the top surface 1000a intersect with the bottom welds 1602 that were formed from the bottom surface 1000b. These intersection locations form fully solidified regions 1690 because a significant extent of the conductors 1090 are solidified downward from the top surface 1000a and a significant extent of the conductors 1090 are solidified upward from the bottom surface 1000b. Accordingly, these significant extents of the conductors 1090 meet between the top and bottom surfaces 1000a, 1000b, typically in the midpoint region between the two surfaces 100a, 100b, and form a fully solidified region 1690. The weld depth DW in a fully solidified region 1690 has a fully solidified height HFS. The fully solidified height HFS is substantially equal to fused segment height HF of the busbar 1000. In certain exemplary embodiment, the fully solidified height HFS may be greater than the fused segment height HF when weldment material is deposited onto one of the two surfaces 100a, 100b creating a "dome-effect". Because weld depth DW is equal or greater than the fused segment height HF, an unsolidified region 1670 is not formed between weld and the second surface 1000b of the busbar 1000. In other words, all of the intermediate extents of the conductors 1090 that are positioned within the full solidification zone 1688 are solidified into a single consolidated conductor. Additional aspects of the fully solidified region 1690 are presented in the definitions section at the outset of the detailed description. Like the partially solidified zone 1660, the fully solidified zone 1688 is an area of the fused segment 1220 of the intermediate portion 1200 of the busbar 1000, where the zone extends between the top surface 1000*a* and the bottom surface 1000*b* that has undergone a partial penetration weldment process. The full solidification zone 1688 has a height that extends between the first and second surfaces 1000*a*, 1000*b*. Stated another way, the full solidification zone 1660 has a height that is equal to fused segment height HF and may be equal to the fully solidified height HFS The full solidification zone 1688 has a width ZW that is at equal to at least the diameter or cross-sectional width of the fully solidified region 1690.

Like the partially solidified region 1650, the fully solidified region 1690 contains varying fusing density, wherein a first or inner zone 1692 has a first fusing density and the second or outer zone 1694 has a second fusing density that is less than the first fusing density. The differences in fusing density result from the configuration and operating parameters of the machine 850, where the laser beam loses strength as it penetrates into the busbar 1000 and thus the less dense zone 1694 is created at a certain distance outward from the center of the weld 1600 or beyond the more dense zone 1694. It should be understood that this second zone 1694 may have a fusing density gradient, where it is has a higher fusing density closest to the first zone 1692 and the lowest fusing density a furthest point away from the first zone 1652. It also should be understood that the fusing density may be consistent or substantially consistent within this first zone 1652. As shown in FIGS. 42 and 43, the unsolidified region 1670 surrounds the fully solidified region 1690, such that the individual conductors 1090 in the unsolidified region 1670 remain distinct, un-fused components.

FIGS. 44-45 show a cross-sectional view of the busbar 1000 taken along section plane defined by line 45-45 of FIG. 44 and revealing multiple regions that have been partially and fully solidified. First, middle extent of FIG. 45 shows three partially solidified regions 1650, wherein the two outer regions 1650 are formed from the bottom weldment process and the middle region 1650 is formed from the top weldment process. Second, the opposed edge zones 1693 are solidified with edge welds 1606 resulting from the circular edge detail 106 contained in the busbar model 100 that was used to create busbar 1000. These edge welds 1606 form fully solidified edge regions 1693 that extend inward from the outer peripheral edges 1000*d*, 1000*e* of the busbar 1000. In particular, these fully solidified edge regions 1693 extend from a first peripheral edge 1000*d*, 1000*e* to the interior weld boundary 1696 and thus have a width WW, wherein WW may be between 0.2 mm to 5 mm or preferably between 0.2 mm to 1 mm. In addition to solidifying the edges 1000*d*, 1000*e* of the busbar 1000, this edge detail 106 also rounds off the corners 1698 of the busbar 1000. These rounded corners 1698 help reduce the probability that the conductors 1090 wear into or tear the insulation 1780.

Figure 46:
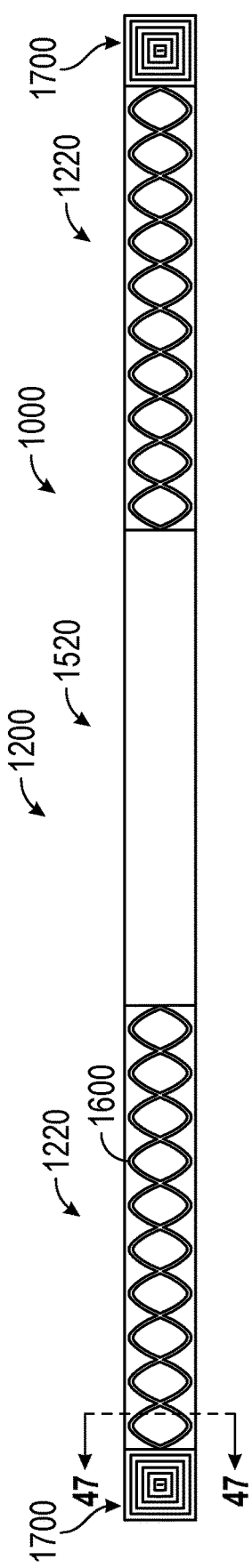
FIG. 46 is a top view of the busbar of FIG. 29.
Figure 47:
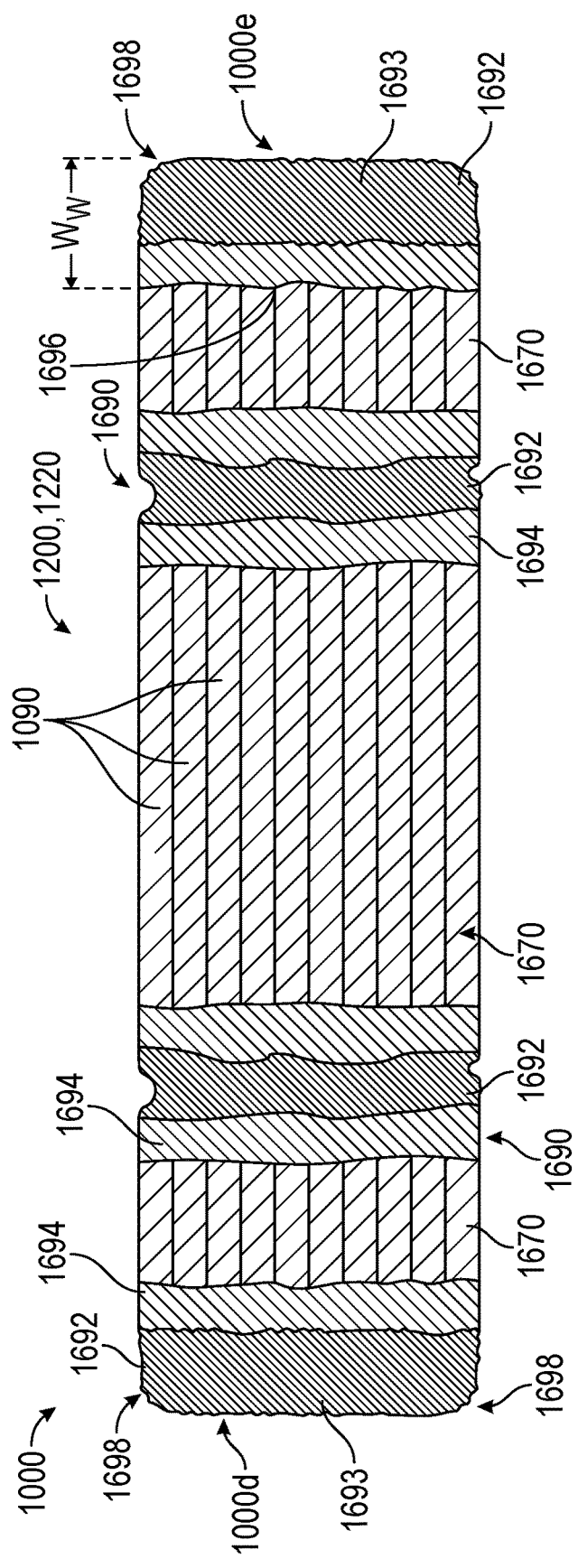
FIG. 47 is a cross-sectional view of FIG. 46 taken along line 47-47 of FIG. 46 showing a fused segment including fully solidified regions and unsolidified regions.

FIGS. 46-47 show a cross-sectional view of the busbar 1000 taken along a section plane denoted by line 47-47 of FIG. 46 and revealing multiple fully regions that have been fully solidified. First, the middle extent of FIG. 47 shows two fully solidified regions 1690 that are adjacent to unsolidified regions 1670. Second, the opposed edge zones 1693 are solidified with edge welds 1606 resulting from the circular edge detail 106 contained in the busbar model 100 that was used to create busbar 1000. These edge welds 1606 form fully solidified edge regions 1693 that extend inward from the outer peripheral edges 1000*d*, 1000*e* of the busbar 1000. In particular, these fully solidified edge regions 1693 extend from a first peripheral edge 1000*d*, 1000*e* to the interior weld boundary 1696 and thus have a width WW, wherein WW may be between 0.2 mm to 5 mm or preferably between 0.2 mm to 1 mm. In addition to solidifying the edges 1000*d*, 1000*e* of the busbar 1000, this edge detail 106 also rounds off the corners 1698 of the busbar 1000. These rounded corners 1698 help reduce the probability that the conductors 1090 wear into or tear the insulation 1780.

As shown in FIGS. 29-33, the busbar 1000 includes a fused segment 1220 that has a length, width, and height. The length extends between the end boundary lines 1200*a*, 1200*b* and intermediate boundary line 1220*a*, 1220*b*, the width extends between the edges of the busbar 1000*d*, 1000*e*, and the height extends between the top surface 1000*a* and bottom surface 100*b*. The length, width, and height dimensions collectedly define a fused segment volume V, which can be summed to determine a total fused segment volume of the busbar 1000. Each of the fused segment volumes contain a plurality of fully solidified regions 1690, a plurality of partially solidified regions 1650, a substantial unsolidified solidified region 1670. The fused segment volume also contains the unsolidified region 1670 that extends between and around the plurality of fully solidified regions 1690 and the plurality of partially solidified regions 1650. In the busbar 1000 that is shown in FIGS. 29-47, the unsolidified region 1670 occupies a majority of the fused segment volume, while the combination of the partially solidified regions 1650 and the fully solidified regions 1670 occupy a minority of the fused segment volume. Additionally, the partially solidified regions 1650 occupies more of the fused segment volume than the fused segment volume that is occupied by the fully solidified regions 1670. Moreover, the fully solidified region 1670 occupies less of the fused segment volume than the fused segment volume that is occupied by either of the partially solidified regions 1650 or unsolidified region 1670.

Further referring to the busbar 1000 that is shown in FIGS. 29-47, it should be understood that increasing the volume of the partially solidified regions 1650 within the fused segment volume: (i) will increase at least the localized stiffness in the fused segment 1220, (ii) tends to increase the stiffness of the intermediate portion 1200 of the busbar 1000, and (iii) tends to increase the overall stiffness of the busbar 1000. For example, creating these partially solidified regions 1650 will increase the modulus Young's modulus of the busbar above 115 gigapascals (GPa) at room temperature. It should also be understood that increasing the volume of the fully solidified regions 1690 within the fused segment volume: (i) will increase at least the localized stiffness in the fused segment 1220, (ii) tends to increase the stiffness of the intermediate portion 1200 of the busbar 1000, and (iii) tends to increase the overall stiffness of the busbar 1000. Increasing the volume of the fully solidified regions 1690 within the fused segment volume should have a greater effect on these stiffness parameters, as compared as solely increasing the volume of the partially solidified regions 1650. Further, adding a partially solidified region 1650 and/or fully solidified region 1690 to fused segment 1220 having only an unsolidified region 1670 will increase the localized and overall stiffness of the fused segment 1220. Moreover, it should further be understood that increasing the volume of both the partially solidified regions 1650 and the fully solidified regions 1690 within the fused segment volume: (i) will increase at least the localized stiffness in the fused segment 1220, (ii) tends to increase the stiffness of the intermediate portion 1200 of the busbar 1000, and (iii) tends to increase the overall stiffness of the busbar 1000.

Finally, it should be understood that increasing the volume of unsolidified region 1670 within the fused segment volume: (i) will increase at least the localized flexibility in the fused segment 1220, (ii) tends to increase the flexibility of the intermediate portion 1200 of the busbar 1000, and (iii) tends to increase the overall flexibility of the busbar 1000.

As discussed above, the intermediate portion 1200 may contain any number (e.g., 0-1000) of fused regions 1220 and any number (e.g., 0-1000) of unfused regions 1520. For example, the intermediate portion 1200 may only contain a single fused region 1220 or may only contain an unfused region 1520. Additionally, the fused segment 1220 may contain number of waveforms (e.g., 0-100), is preferably between 1-6, and most preferably is four 1610, 1612, 1614, 1618. As such, the fused segment 1220 may contain any number of partially solidified regions 1650 or fully solidified regions 1690. For example, the fused segment 1220 may be almost solid due to the fact it contains a high number of fully solidified regions 1690 or may almost be unsolidified because the fused segment only contains a single weld 1600 in a small volume (e.g., single laser dot). Further, any waveform type, frequency, and amplitude may be utilized in order to meet the customer specifications. Overall, the unfused segments 1520 may perform in a manner that is similar to a conventional flexible busbar 20 and the fused segment 1220 may perform in a manner that is similar to a conventional rigid busbar 10. These integrally formed segments 1220, 1520 provide significant benefits over conventional busbars 10, 20.

An optional step of forming the inventive busbar 1000 includes encasing the conductors 1090 in a protective material or insulation 1780 that encases a subset of the busbar 1000. The insulation 1780 may be a heat-shrunk material (e.g., CPX 100 EV from Shawcor). In alternative embodiments, the insulation 1780 may be tape or any other type of material that may be used to coat the busbar 1000. In a further alternative embodiment, the insulation 1780 may be formed around the busbar 1000 using an insulation machine 1782 that utilizes centering process 1784 that are shown in FIG. 48A-48D. Specifically, the use of this process 1784 helps prevent high scrap rate or marginally passing HI Pot parts, which are formed because the busbar 1000 can move within the cavity during the injection of the material that will act as an insulator 1780. The machine 1782 shown in FIGS. 48A-48D utilize biased pins 1786a, 1786b that hold the busbar 1000 within the center of the mold 1788. The pins 1786a, 1786b may be biased using a spring, magnet, or any other biasing mechanism. As shown in the transition from FIG. 48B to 48C, the pressure from the insertion of the insulation material 1790 will force the pins 1786a, 1786b outward from the center, which allows the busbar 1000 to be fully encapsulated by the insulator 1780 and substantially centered within the insulator 1780. Thus, reducing hot spots or scrap busbars. Finally, FIG. 48E shows finished busbar 1000 that has been removed from the mold 1788 and wherein the conductors 1090 of the busbar 1000 are surrounded by the insulator 1780.

The insulation 1780 may include an identification device, symbol, logo, or indicia (e.g., names, QR codes, or radio frequency identification devices ("RFID")) that is formed within the insulation 1780. These identification device, symbol, logo, or indicia may help manufacture ensure the busbars are installed in the right locations and aid in the track/inventory of the busbars 1000. It should be understood the insulation 1780 may include shielding properties that reduce the electromagnetic noise that is generated by these busbars 1000.

Figure 48:
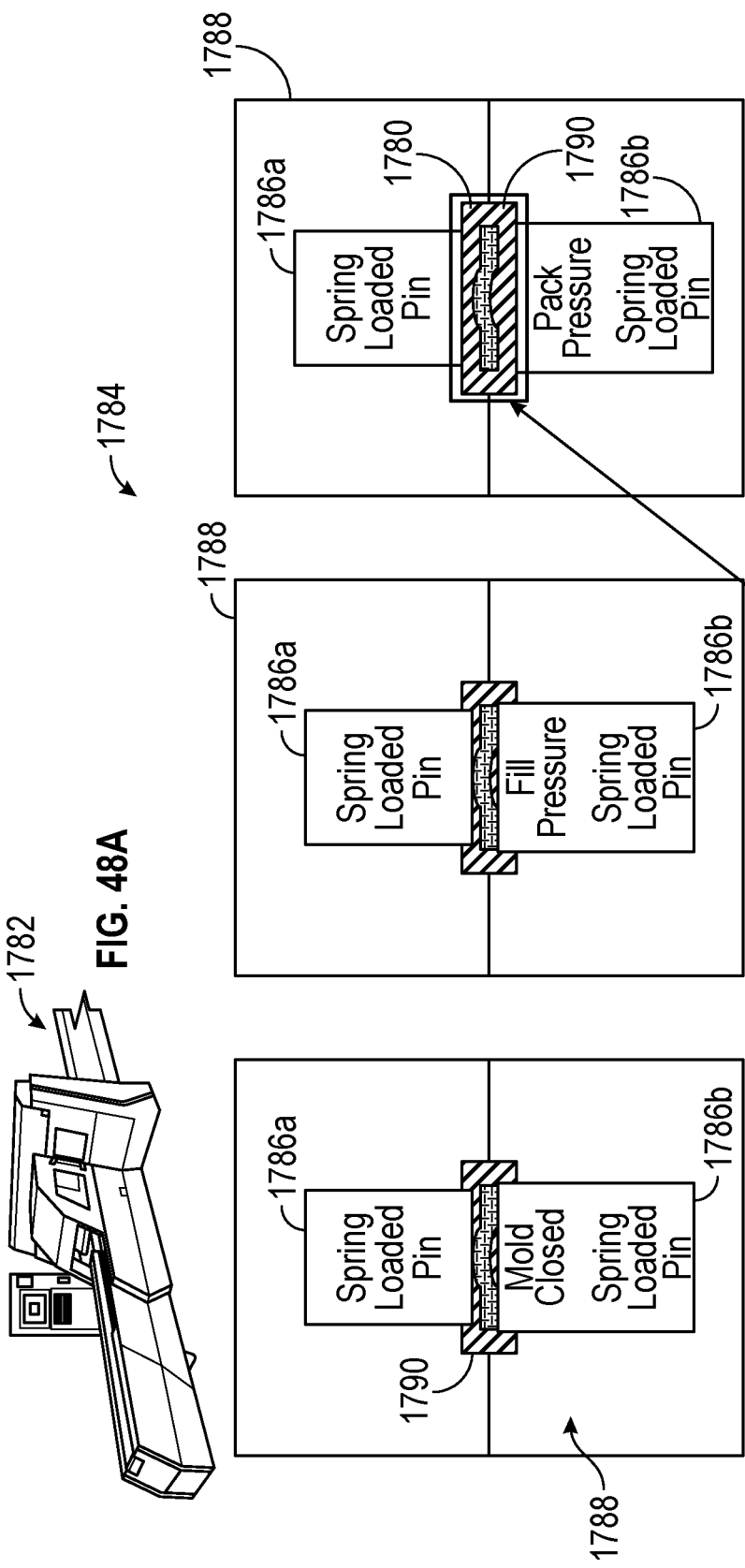
FIG. 48A is a perspective view of a busbar insulating machine.
FIG. 48B-48D shows the operation of the busbar insulating machine of FIG. 48A, wherein the insulating machine uses a cavity centering method to insulate the conductors of the busbar.
Figure 49:
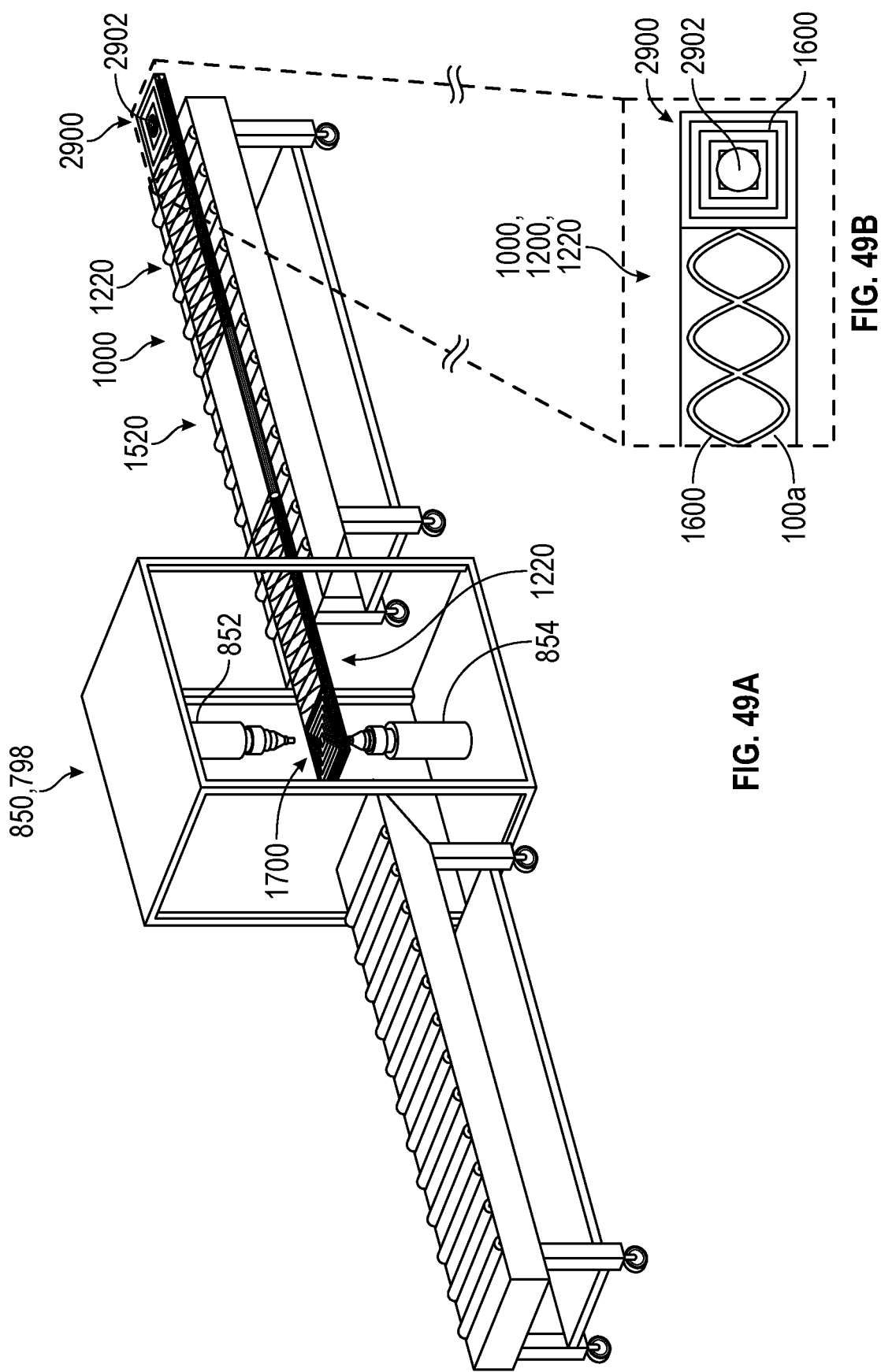
FIG. 49A shows a laser welding machine forming an opening within the busbar, wherein the opening is designed to receive a conventional elongated coupler.
FIG. 49B is a zoomed-in view of the busbar with an opening formed in the end portion.
Figure 50:
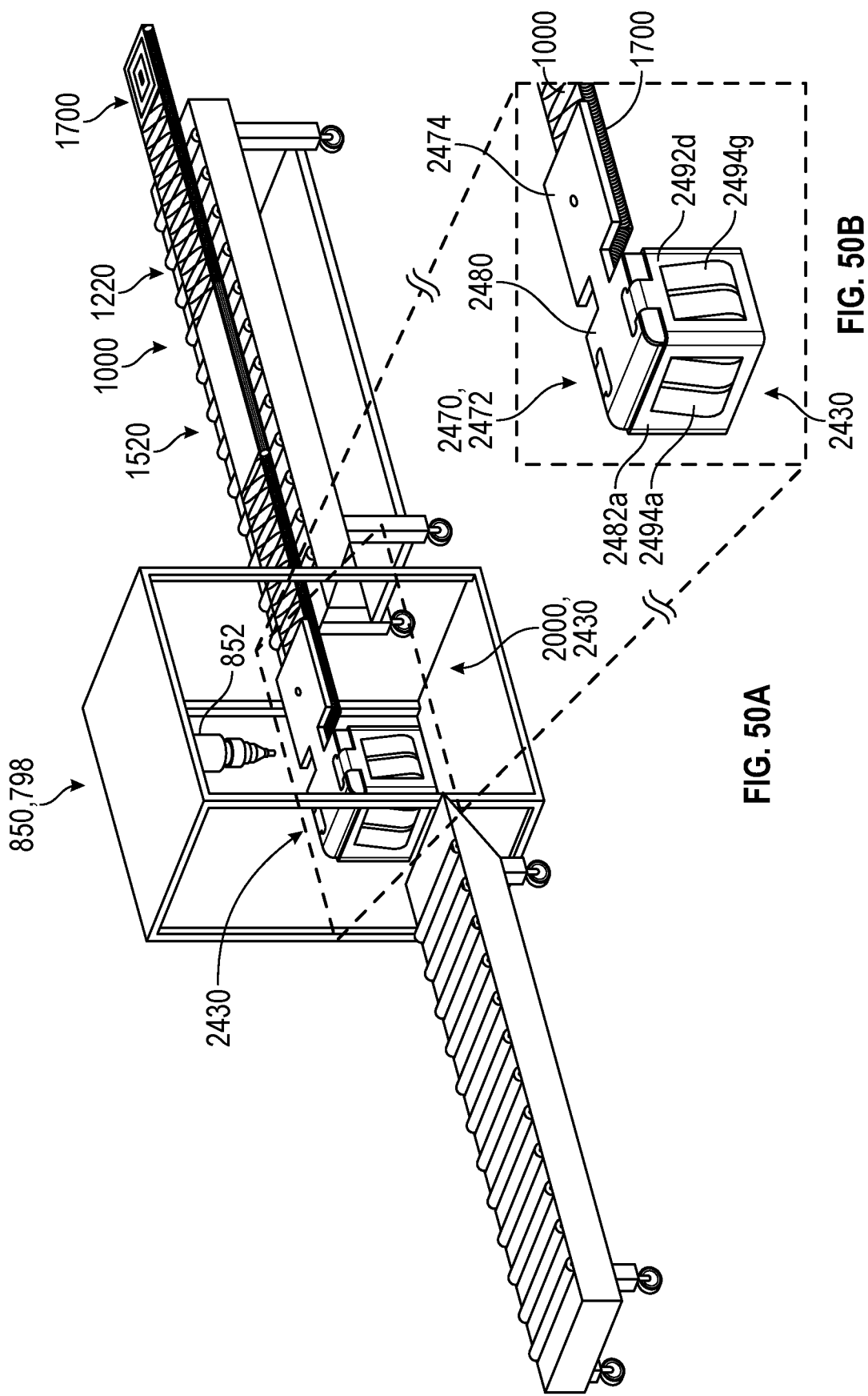
FIG. 50A shows a laser welding machine coupling an electrical connector assembly with an internal spring component to the busbar.
FIG. 50B is a zoomed-in view of the busbar with the electrical connector assembly with an internal spring component coupled thereto.

As shown in FIGS. 48A, 49A and after the top, bottom, and sides of the busbar 1000 are welded and the joints are formed, the end portions 500 of the busbar 1000 may be formed using the welding machine 850. In forming the end portions 500, a densification weld is created and then an attachment means is added thereto. The attachment means may be either an opening that is configured to receive a conventions coupler 24 or a boltless connector system 2000 that includes a spring member 440a, or any other attachment mechanism for use with a busbar.

The boltless connector system 2000 is described in a number of applications that are owned by the assignee of this application and are incorporated herein by reference. These application, include PCT/US2019/36127, PCT/US2019/36070, PCT/US2019/36010, and PCT/US2018/019787, U.S. patent application Ser. No. 16/194,891 and U.S. Provisional Applications 62/897,658, 62/988,972 and 63/058,061. At a high level, an extent of the system 2000 is shown in FIGS. 7, 49A-49B, 63-66, 79-81, 83-84, which provide various views of the male connector assembly 2200. The male connector assembly 2200 includes: (i) a male terminal receiver 2260, (ii) a male terminal assembly 2430. The male terminal receiver 2260 is formed from an arrangement of terminal receiver side walls 2262a-2262d. The side walls 2262a-2262d form a bowl shaped receiver 2266. The receiver 2266 is configured to snugly receive a majority of the male terminal assembly 2430. This configuration provides additional rigidity to the male terminal assembly 2430 and limits the exposed amount of the male terminal assembly 2430. However, the entire male terminal assembly 2430 is not enclosed within the male terminal receiver 2260 or the body 2226 because then the male terminal assembly 2430 would then be prevented from contacting the female terminal assembly 2800. Thus, to facilitate the coupling of the male terminal assembly 2430 to the female terminal assembly 2800, the side walls 2262a-2262d each have male terminal openings 2268a-2268d there through. The male terminal openings 2268a-2268d are disposed through an intermediate portion of the side walls 2262a-2262d and are configured to permit an extent of the male terminal assembly 2430 to extend through the side walls 2262a-2262d to enable the male terminal assembly 430 to contact the female terminal assembly 2800.

FIGS. 7, 49A-49B, 63-66 provide various views of the male terminal assembly 2430. Specifically, the male terminal assembly 2430 includes a spring member 2440a and a male terminal 2470. The male terminal 2470 includes a male terminal body 2472 and a male terminal connection member or plate 2474. The male terminal connection plate 2474 is coupled to the male terminal body 2472 and is configured to receive an extent of the busbar 1000 that connects the male terminal assembly 2430 to a device (e.g., an alternator) outside of the connector system 2000. The male terminal body 2472 includes: (i) an arrangement of male terminal side walls 2482a-2482d and (ii) a rear terminal wall 480. The arrangement of male terminal side walls 2482a-2482d are coupled to one another and generally form a rectangular prism. The male terminal side walls 2482a-2482d include: (i) a side wall portion 2492a, 2492c, which generally has a "U-shaped" configuration and (ii) contact arms 2494a-2494h. The side wall portions 2492a-2492d are substantially planar and have a U-shaped configuration with an intermediate segment. The contact arms 2494a-2494h extend: (i) from an extent of the intermediate segment of the side wall portion 2492a-2492d, (ii) away from the rear male terminal wall 2480, and (iii) across an extent of the contact arm openings.

The contact arms 2494a-2494h extend away from the rear male terminal wall 2480 at an outward angle. This configuration allows the contact arms 2494a-2494h to be deflected or displaced inward and towards the center of the male terminal 2470 by the female terminal assembly 800, when the male terminal assembly 2430 is inserted into the female terminal assembly 2800. This inward deflection is best shown in figures contained within PCT/US2019/036010. This inward deflection helps ensure that a proper mechanical and electrical connection is created by ensuring that the contact arms 2494a-2494h are placed in contact with the female terminal assembly 2800. The male terminal 2470 is typically formed from a single piece of material (e.g., metal). Therefore, the male terminal 2470 is a one-piece male terminal 2470 and has integrally formed features. To integrally form these features, the male terminal 2470 is typically formed using a die cutting process. However, it should be understood that other types of forming the male terminal 2470 may be utilized, such as casting or using an additive manufacturing process (e.g., 3D printing). In other embodiments, the features of the male terminal 470 may not be formed from one-piece or be integrally formed, but instead formed from separate pieces that are welded together.

Figure 66:
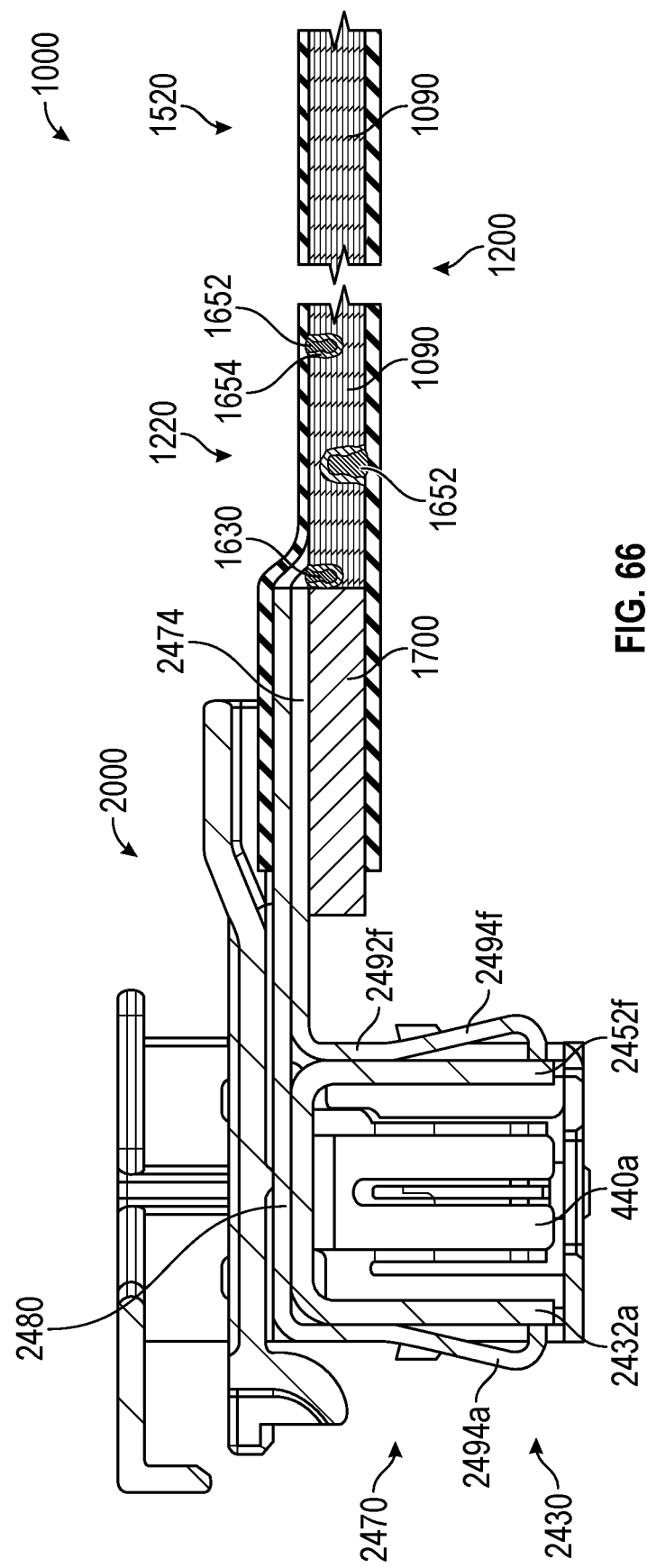
FIG. 66 is a cross-sectional view of the inventive busbar of FIG. 65 taken along line 66-66 of FIG. 65, and showing partially solidified regions and unsolidified regions of the fused segment of the busbar.

FIG. 66 show views of the spring member 2440a that is configured to function with the first embodiment of the male terminal 470. The spring member 2440a generally includes: (i) arched spring sections 2448a-448d and (ii) spring arms 2452a-2452h. The arched spring sections 2448a-448d extend between the rear extent of the spring member wall 2444 and the spring arms 2452a-2452h. The spring arms 2452a-2452h are not connected to one another. This configuration allows for omnidirectional of the spring arms 2452a-2452h, which facilitates in the mechanical coupling between the male terminal 2470 and the female terminal assembly 2800. The spring member 2440a is typically formed from a single piece of material (e.g., metal). To integrally form these features, the spring member 2440a is typically formed using a die forming process. As discussed in greater detail below and in PCT/US2019/036010, when the spring member 2440a is formed from a flat sheet of metal, installed within the male terminal 2470 and connected to the female terminal assembly 800, and is subjected to elevated temperatures, the spring member 440a applies an outwardly directed spring thermal force, STF, on the contact arms 2494a-2494h due in part to the fact that the spring member 2440a attempts to return to a flat sheet. However, it should be understood that other types of forming the spring member 2440a may be utilized, such as casting or using an additive manufacturing process (e.g., 3D printing). In other embodiments, the features of the spring member 2440a may not be formed from a one-piece or be integrally formed, but instead formed from separate pieces that are welded together.

Additionally, it should be understood that the connector system 2000 is T4/V4/S3/D2/M2, wherein the system 2000 meets and exceeds: (i) T4 is exposure of the system 100 to 150° C., (ii) V4 is severe vibration, (iii) Si is sealed high-pressure spray, (iv) D2 is 200 k mile durability, and (v) M2 is less than 45 Newtons of force is required to connect the male connector assembly 2200 to the female connector assembly 2600. In addition, it should be understood that the male terminal assembly 2430 and the female terminal assemblies 2800 disclosed within this application may be replaced with the male terminal assemblies and the female terminal assemblies disclosed within PCT/US2018/019787 or PCT/US2019/36010. In addition, the de-rating of some of these connectors is disclosed within PCT/US2020/14484.

Further, it should be understood that alternative configurations for connector systems 2000 are possible. For example, any number of male terminal assemblies 2430 may be positioned within a single male housing assembly 2220. For example, the male housing assembly 2220 may be configured to contain multiple (e.g., between 2-30, preferably between 2-8, and most preferably between 2-4) male terminal assemblies 2430. The female connector assembly 2600 may be reconfigured to accept these multiple male terminal assemblies into a single female terminal assembly 2800. Alternatively, the female connector assembly 2600 may be reconfigured to include multiple female terminal assemblies 2800, where each female terminal assembly 2800 receives a single male terminal assemblies 2430. Moreover, it should also be understood that the male terminal assemblies 2430 may have any number of contact arms 2494 (e.g., between 2-100, preferably between 2-50, and most preferably between 2-8) and any number of spring arms 2452 (e.g., between 2-100, preferably between 2-50, and most preferably between 2-8). As discussed above, the number of contact arms 2494 may not equal the number of spring arms. For example, there may be more contact arms 2494 then spring arms 2452. Alternatively, there may be less contact arms 2494 then spring arms 2452.

Instead of bending the busbar 1000 in-plane 750, two busbars 1000a, 1000b may be joined together to form a single busbar. This may be beneficial when the customer's application does not allow for the space required for an in-plane bend 750. Here, the two busbars 1002, 1004 are joined together at a defined angle (e.g., 90 degrees) use a "densification weld." A densification weld is designed to create enough comingled surface area to equal 120% of the busbar's 100 cross sectional area. This helps ensure that this area does not become a current restrictor and a heat generator. In the exemplary embodiment that is shown within FIGS. 67-72, this 90 degree weld is negligible to 10% less resistive that a straight busbar 1000 of equal length. This is extremely beneficial due to the fact that 90 bends cannot be achieved within conventional busbars without creating a resistive extent within the busbar.

Figure 22E:
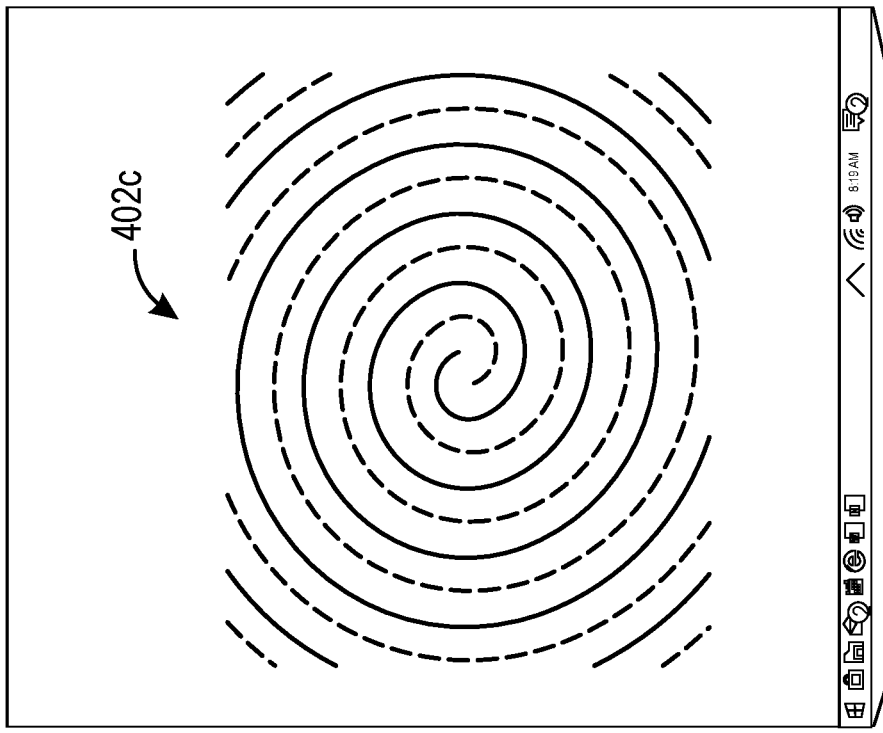
FIGS. 22D and 22E show alternative combined fusion patterns that may be disposed on a fused segment of the end portion of the busbar.
Figure 22D:
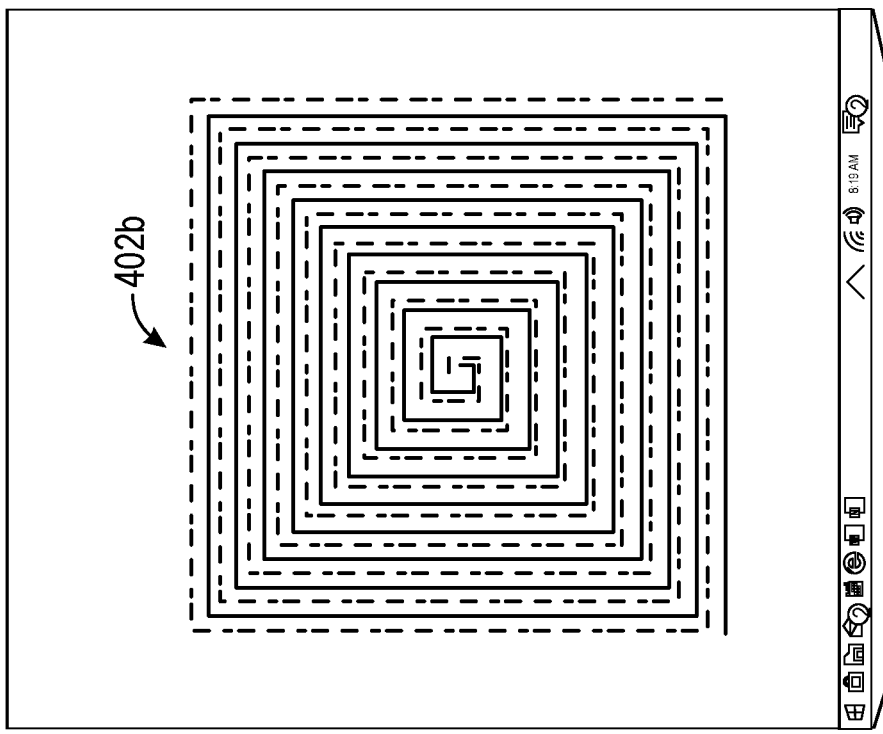
Figure 67:
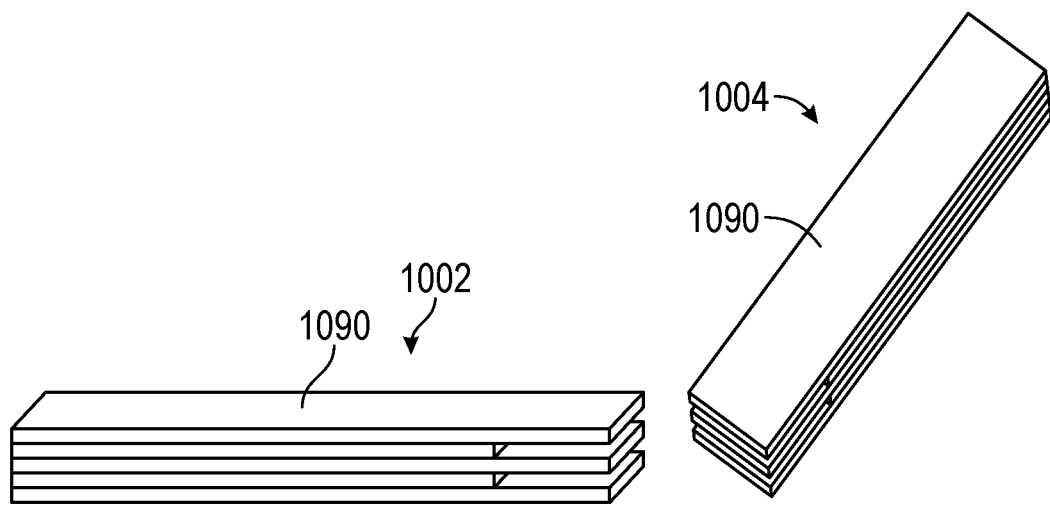
FIG. 67 shows two end portion configurations of busbars that may be utilized when joining the two busbars together in an "interleaved" configuration.
Figure 68:
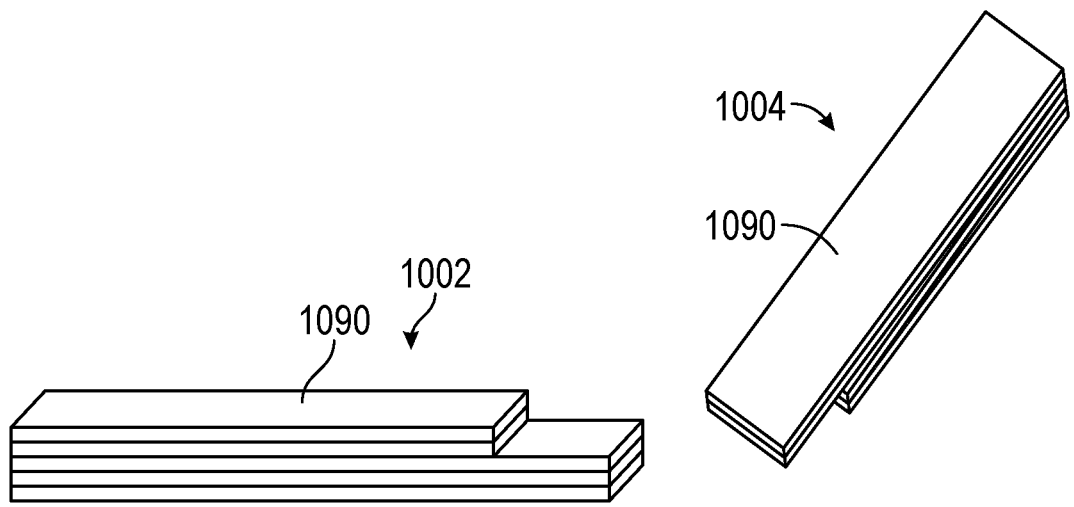
FIG. 68 shows two end portion configurations of busbars that may be utilized when joining the two busbars together in an "offset stack" configuration.
Figure 69:
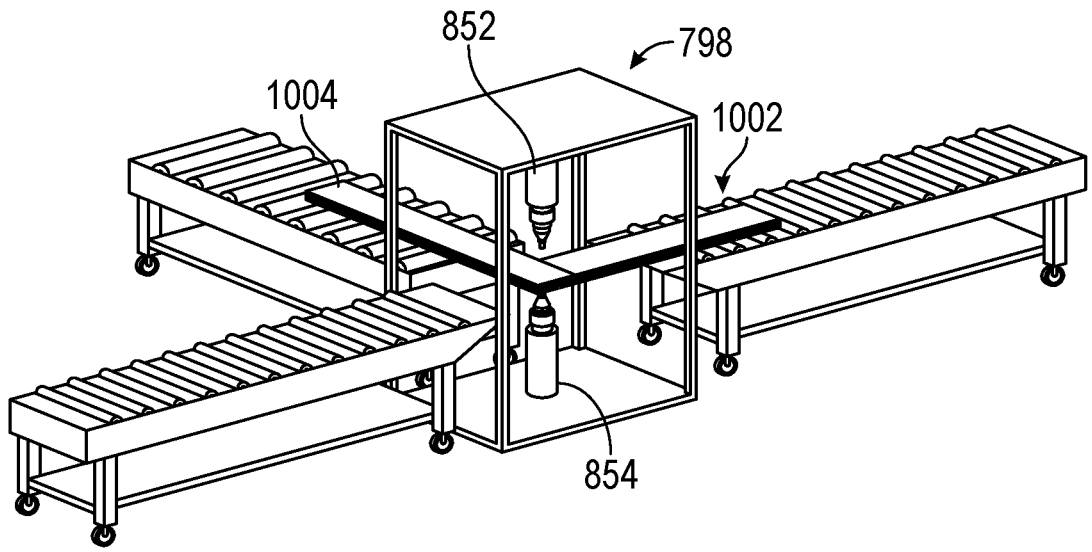
FIGS. 69-70 show a laser welding machines welding the end portions of two busbars at a junction region.
Figure 70:
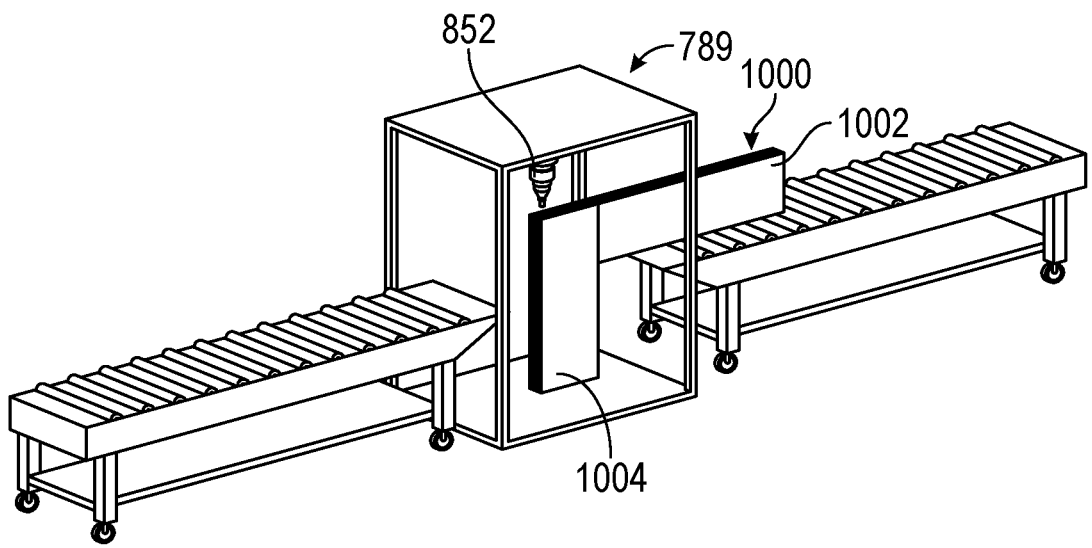
Figure 71:
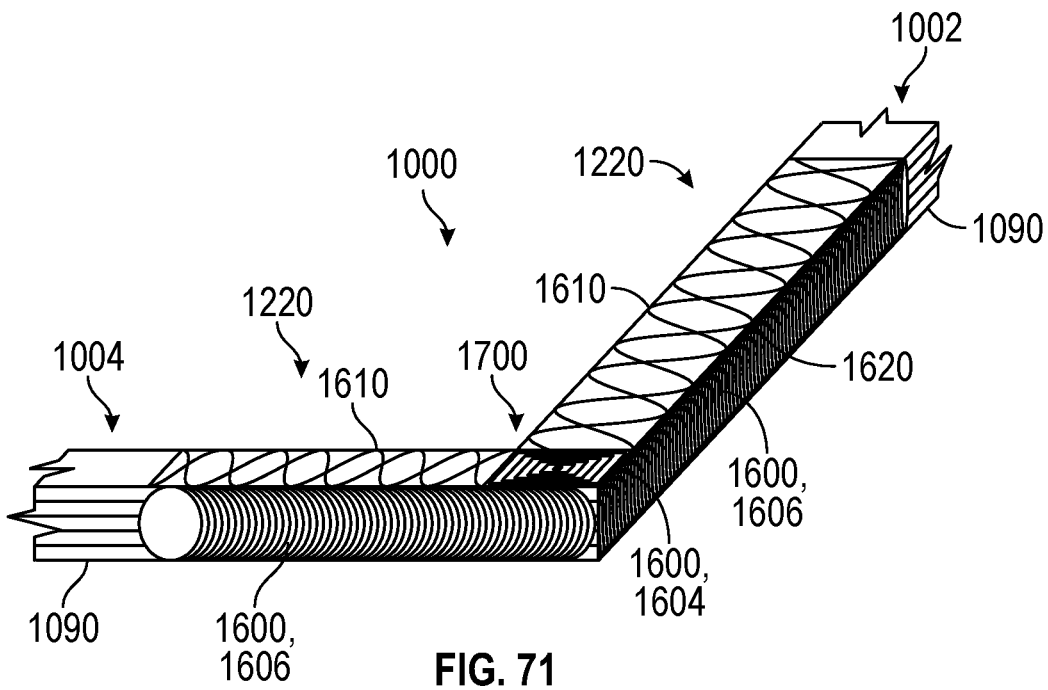
FIG. 71 shows two busbars that have been joined together at a junction region, wherein each busbar includes both a fused segment and a unfused segment.
Figure 72:
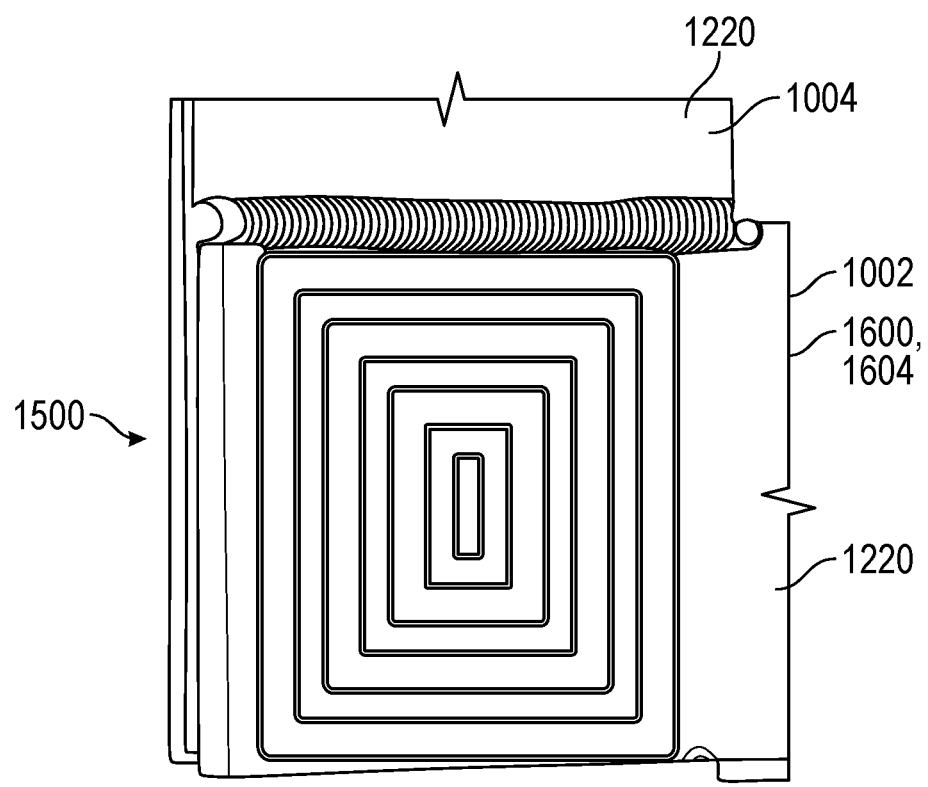
FIG. 72 shows a top view of the busbars shown in FIG. 54, wherein the busbars have been joined together using a "densification" weld and a "butt" weld.

When welding two busbars 1000 together at a defined angle, the conductors 90 contained within each side of the busbar may have an overlapping, dovetailing, or interweaving arrangement. Two examples of this arrangement are shown in FIGS. 67-68. Specifically, FIG. 67 shows two busbars 1002, 1004, where one busbar 1002 has a segment removed from two of the conductors 1090 and the other busbar 1004 has a segment removed from three of the conductors 90. These removed segments are cooperatively dimensioned to fit within one another. Alternatively, FIG. 68 shows two busbars 1002, 1004, where two segments have been removed from the first busbar 1002 and three segments have been removed from the second bus bar 1004. It should be understood that other overlapping, dovetailing, or interweaving arrangements are contemplated by this disclosure. Once the busbars have been arranged, the designer can welded to one another using the welding machine 789 that is shown in FIGS. 69-70. The combine fusion pattern that the welding machine 789 may utilize are shown in FIGS. 22C-22E.

As an alternative to utilizing a laser welding machine 850, the designer may have decided to use a resistance spot welding machine 901. The resistance spot welding machine 901 may include two fabrication modes 902a, 902b, wherein the first fabrication mode 902a is a prototype fabrication mode and the second fabrication mode 902b is a mass production fabrication mode. In the first or prototype fabrication mode 902a, the user controls the areas of the busbar 1000 that will be welded by manually feeding the busbar 1000 into the machine and then using a foot pedal to activate the machine 901. Upon activation, the machine 901 will force the electrified electrodes 909a, 909b into contact with the conductors 1090. This contact will cause the electricity from the electrodes 909a, 909b to form at least a partially solidify region 1650. This contact procedure can be performed multiple times by the designer to form the fused segment 1220 of the busbar 1000.

Figure 76:
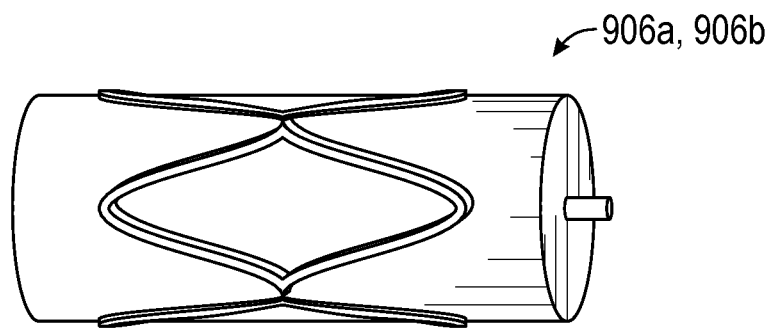
FIGS. 76-78 are exemplary embodiments of electrode rollers that are installed within the welding machine of FIG. 73 when the machine is in the mass production mode.
Figure 77:
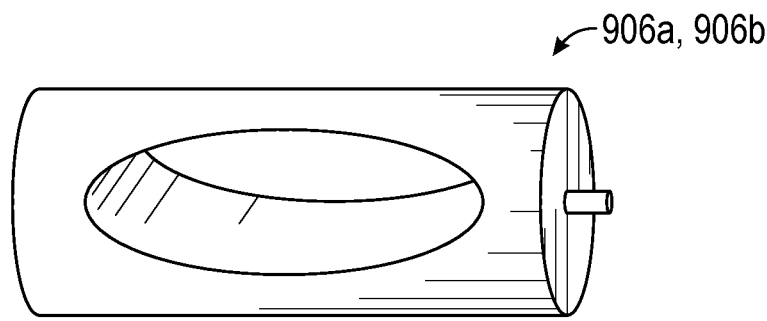
Figure 78:
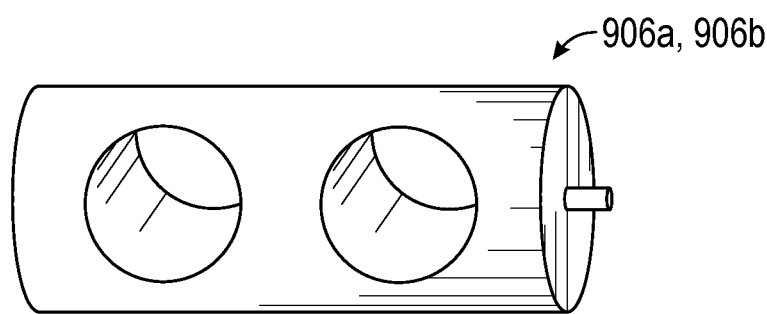

Alternatively, the if the designer selects the second or mass production fabrication mode 902b, then the designer will need to select the design of the roller electrodes 906a, 906b. Examples of these electrode designs are shown in FIGS. 76-78. In particular the roller electrodes 906a, 906b may have raised surfaces (FIG. 76) or may have recessed surfaces (FIG. 77-78). The raised surfaces will only make contact with the conductors 1090 of the busbar 1000 within these raised surfaces. This contact with the conductors 1090 by these raised surfaces will weld the busbar 1000 in these locations or areas. For example, the roller that is shown in FIG. 76 will form a pattern that contains two sine waves. In contrast, if the roller 906a, 906b has recessed extents then these extends will not come into contact with the busbar 1000 and the weld areas will be the remaining surface of the roller 906a, 906b. For example, the roller shown in FIG. 77 will weld all area within the busbar 1000 except for the area that will be contained within the oval area. It should be understood that the exemplary rollers 906a, 906b are only examples and are non-limiting.

Similar to the busbar 1000 as described above and shown in FIGS. 1-79, FIG. 79 show a second embodiment of a busbar 3000. For sake of brevity, the above disclosure in connection with busbar 1000 will not be repeated below, but it should be understood that across embodiments like numbers that are separated by 2000 represent like structures. For example, the disclosure relating to fused segment 1220 applies in equal force to fused segments 3220. Further, it should be understood that the functionality of busbar 3000 is similar to, or identical to, the functionality disclosed in connection with busbar 1000. The general properties of this second embodiment 3000 were identified in step 110 and shown in FIG. 14E. In particular, 14E shows that the busbar designer identified five fused segments 3220 and four unfused segments 5220. The bending of these fused segments 3220 is shown in FIG. 79, wherein four of these bends only have an in-plane 3750 aspect and the other bend has both an in-plane 3750 and out-of-plane aspects 3760. Like busbar 1000, busbar 3000 includes connectors 4000 that are identical to connectors 2000.

Similar to the busbar 1000 as described above and shown in FIGS. 1-79, FIG. 80 show a third embodiment of a busbar 5000. For sake of brevity, the above disclosure in connection with busbar 1000 will not be repeated below, but it should be understood that across embodiments like numbers that are separated by 4000 represent like structures. For example, the disclosure relating to fused segment 1220 applies in equal force to fused segments 5220. Further, it should be understood that the functionality of busbar 5000 is similar to, or identical to, the functionality disclosed in connection with busbar 1000. The general properties of this third embodiment 5000 were identified in step 110 and shown in FIG. 14F. In particular, 14F shows that the busbar designer identified five fused segments 5220 and four unfused segments 5220. The bending of these fused segments 5220 is shown in FIG. 80, wherein four of these bends only have an in-plane aspect 5750 and the other bend has both an in-plane 5750 and out-of-plane aspects 5760. In addition, an extent of the unfused segment 5520 is bent in this embodiment 5000. Like busbar 1000, busbar 5000 includes connectors 6000 that are identical to connectors 2000.

Figure 81:
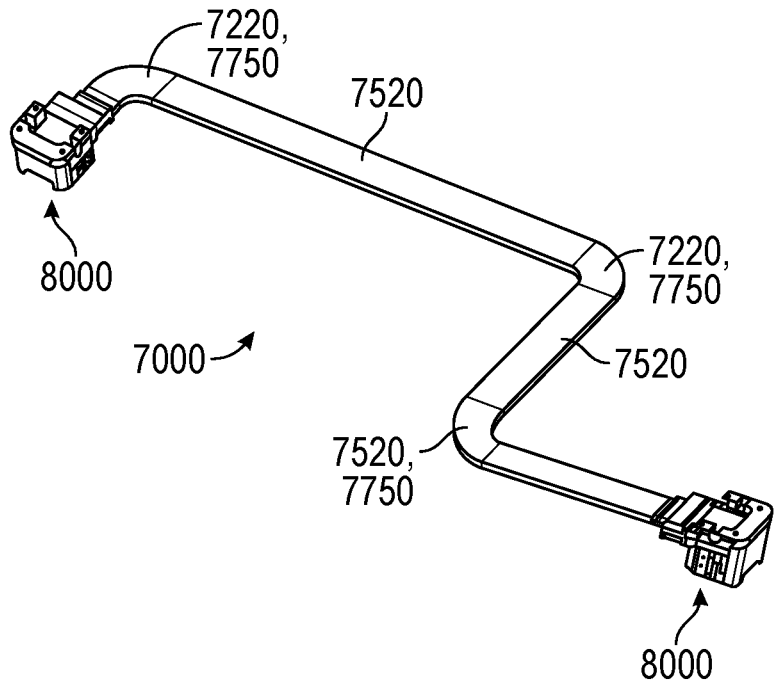
FIG. 81 is a perspective view of a fourth embodiment of the inventive busbar with the insulation extending between opposed electrical connector assemblies.

Similar to the busbar 1000 as described above and shown in FIGS. 1-79, FIG. 81 show a fourth embodiment of a busbar 7000. For sake of brevity, the above disclosure in connection with busbar 1000 will not be repeated below, but it should be understood that across embodiments like numbers that are separated by 6000 represent like structures. For example, the disclosure relating to fused segment 1220 applies in equal force to fused segments 7220. Further, it should be understood that the functionality of busbar 7000 is similar to, or identical to, the functionality disclosed in connection with busbar 1000. The general properties of this fourth embodiment 7000 were identified in step 110 and shown in FIG. 14G. In particular, 14G shows that the busbar designer identified three fused segments 7220 and three unfused segments 7220. The bending of these fused segments 7220 is shown in FIG. 81, wherein these three bends only have an in-plane aspect 7750. Like busbar 1000, busbar 7000 includes connectors 8000 that are identical to connectors 2000.

Figure 82:
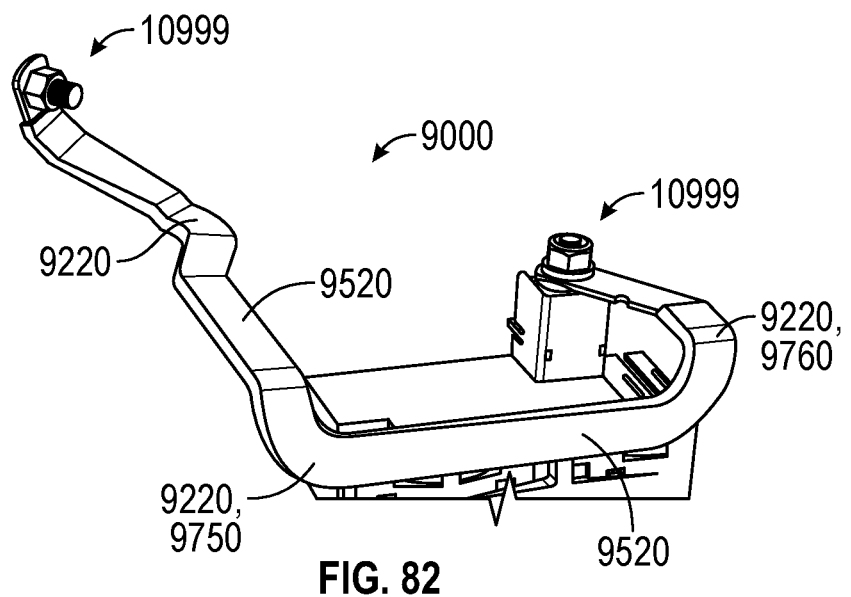
FIG. 82 is a perspective view of a fifth embodiment of the inventive busbar with the insulation extending between opposed bolt and nut connectors.

Similar to the busbar 1000 as described above and shown in FIGS. 1-79, FIG. 82 show a fourth embodiment of a busbar 9000. For sake of brevity, the above disclosure in connection with busbar 1000 will not be repeated below, but it should be understood that across embodiments like numbers that are separated by 8000 represent like structures. For example, the disclosure relating to fused segment 1220 applies in equal force to fused segments 9220. Further, it should be understood that the functionality of busbar 9000 is similar to, or identical to, the functionality disclosed in connection with busbar 1000. Unlike busbar 1000, busbar 9000 includes conventional bolted connectors 10,999.

C. Deliver and Install Busbar(s)

Figure 51:
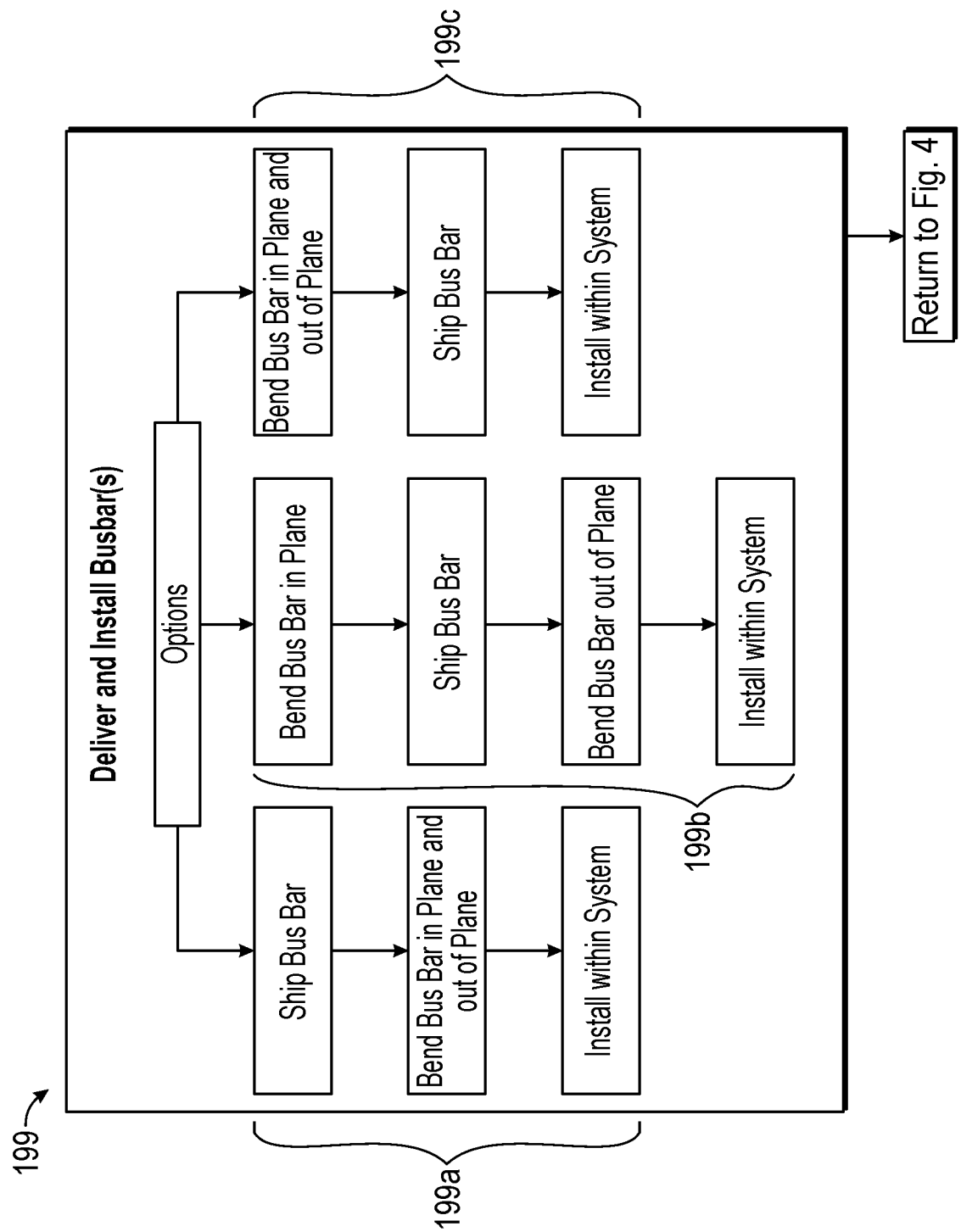
FIG. 51 is a flowchart showing options for delivery of the busbar to a customer and installation of the busbar.
Figure 52:
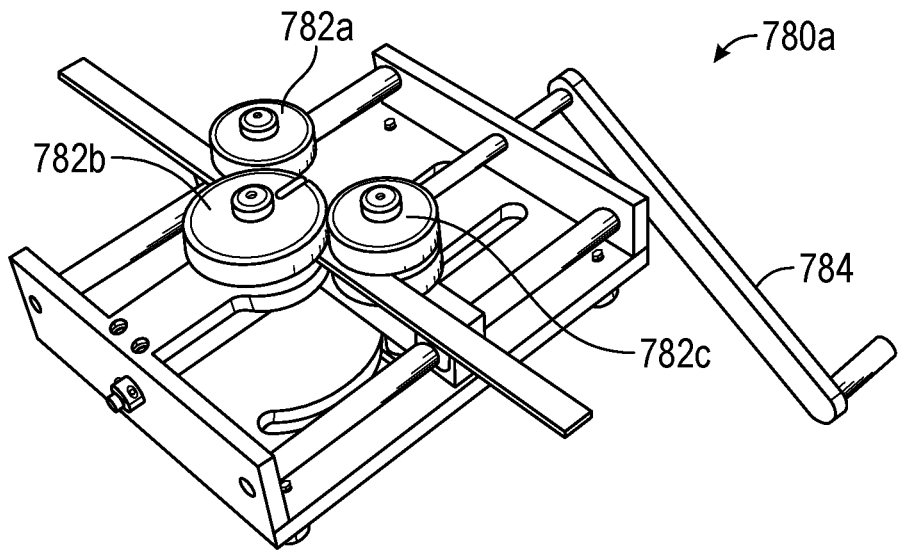
FIG. 52 is a first embodiment of a busbar bending machine that may be used during fabrication of busbar prototypes and testing thereof.
Figure 53:
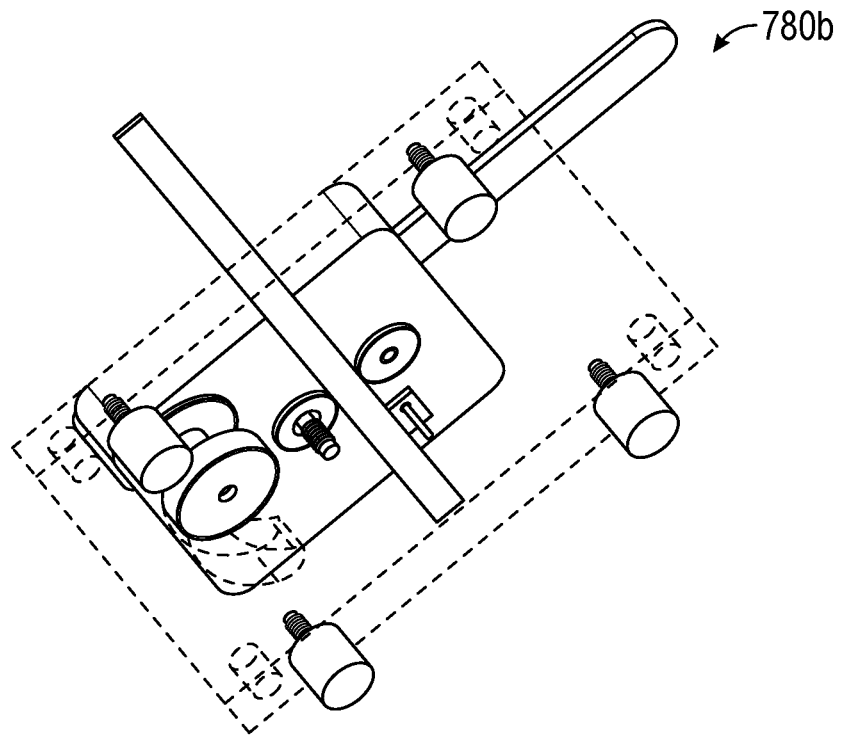
FIG. 53 is a second embodiment of a busbar bending machine that may be used during fabrication of busbar prototypes and testing thereof.

Once the busbar 1000 intermediate portion 1200 and end portions 1700 formed, there are a number of options for how the busbar 1000 can be delivered and installed within an environment, application, system, product, component or device. Specifically, FIG. 51 shows three different options 199a, 199b, and 199c. The first option 199a is where the busbar 1000 is shipped to the customer in a strait and flat configuration and the customer bends the bar 1000 to form all desired bends. Once the busbar 1000 contains the necessary bends, the busbar 1000 can be installed within the system (e.g., battery pack within a vehicle). The second option 199b is where the busbar 1000 is bent in-plane 1750 and then shipped to the customer. In this configuration, the busbar 1000 does not contain any bends in the Z direction and thus is substantially flat. Once the customer receives that busbar 1000, the customer can bend the busbar 1000 to form the out-of plane bends 1760. Once the busbar 1000 contains the necessary bends, the busbar 1000 can be installed within the system (e.g., battery pack within a vehicle). Shipping the busbar 1000 in connection with the first or second options 199a, 199b, reduces the probability that the busbar 1000 will be damaged. In addition, the package size of the busbars can drastically be reduced; thus, saving a considerable amount of money that would have been spent on shipping costs. Finally, in the third option 199c, the busbar 1000 can be shipped to the customer in a form that is ready to be installed within requiring the customer to perform additional bends.

To bend the busbar 1000 into the configuration that is desirable, the busbar 1000 may have: (i) one or more in-plane bends 1750, (ii) one or more out-of-plane bends 1760, or (iii) may have a combination of one or more in-plane 1750 and one or more out-of-plane 1760. As shown in the figures and discussed above, the in-plane bends 1750 are only formed within the fused segments 1220 of the busbar 1000. This helps ensure that the individual conductors within the busbar 1000 do not delaminate due to this bend. In other words, the in-plane bends 1750 are not formed within the unfused segments 1520 of the busbar 1000. In contrast, the out-of-plane bends 1760 may be formed within the fused segment 1220 or the unfused segment 1520. This is because the out-of-plane bends 1760 do not cause the same stresses to be placed on the conductors 1090 that the out-of-plane bends 1750 place on the conductors 1090. Thus, when the designer/manufacture is bending the busbar 1000 into its configuration for installation, the designer/manufacture must make sure that they are bending the busbar 1000 in the proper segments 1220, 1520. In addition, the busbar/manufacture must be able to apply the proper amount of force to bend the busbar 1000 in the desired shape. In an exemplary and non-limiting example, the pressure needs to bend an unfused segment 1520 of the busbar may require approximately 250 pounds of force. To bend a fused segment 1220 of the busbar 1000, the designer will need to apply more force than to bend an unfused segment, but less than the force then what would be required to bend a fully solidified busbar. For example, this force need to bend a fused segment 1220 may be between 250 pounds and 500 pounds.

Figure 55A:
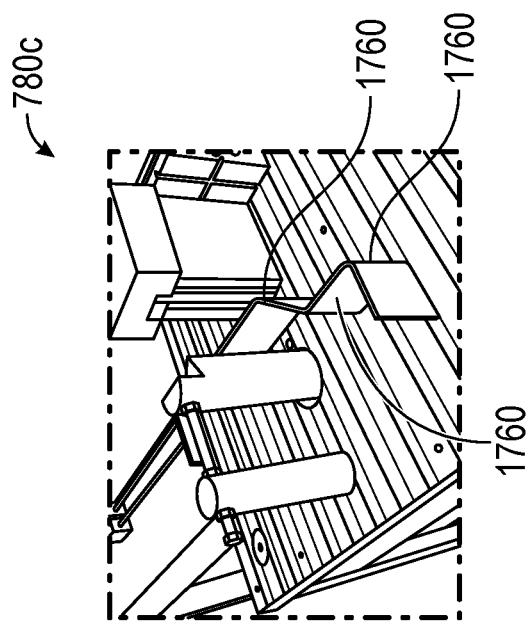
FIGS. 55A-55B show how the busbar bending machine of FIG. 66 may bend select portions of the busbar.
Figure 55B:
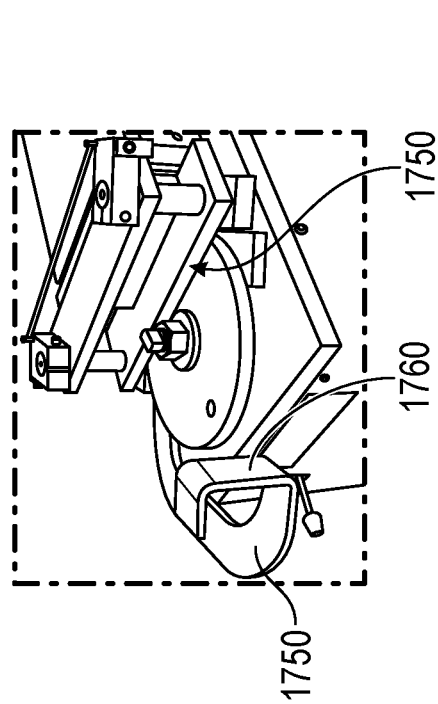
Figure 54:
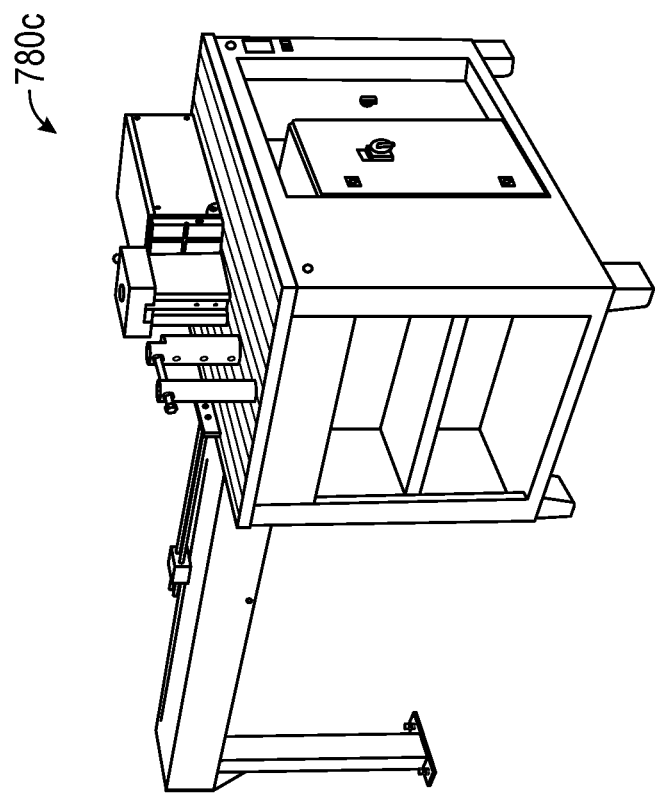
FIG. 54 is an embodiment of a busbar bending machine that may be used during mass production of the busbars.
Figure 56:
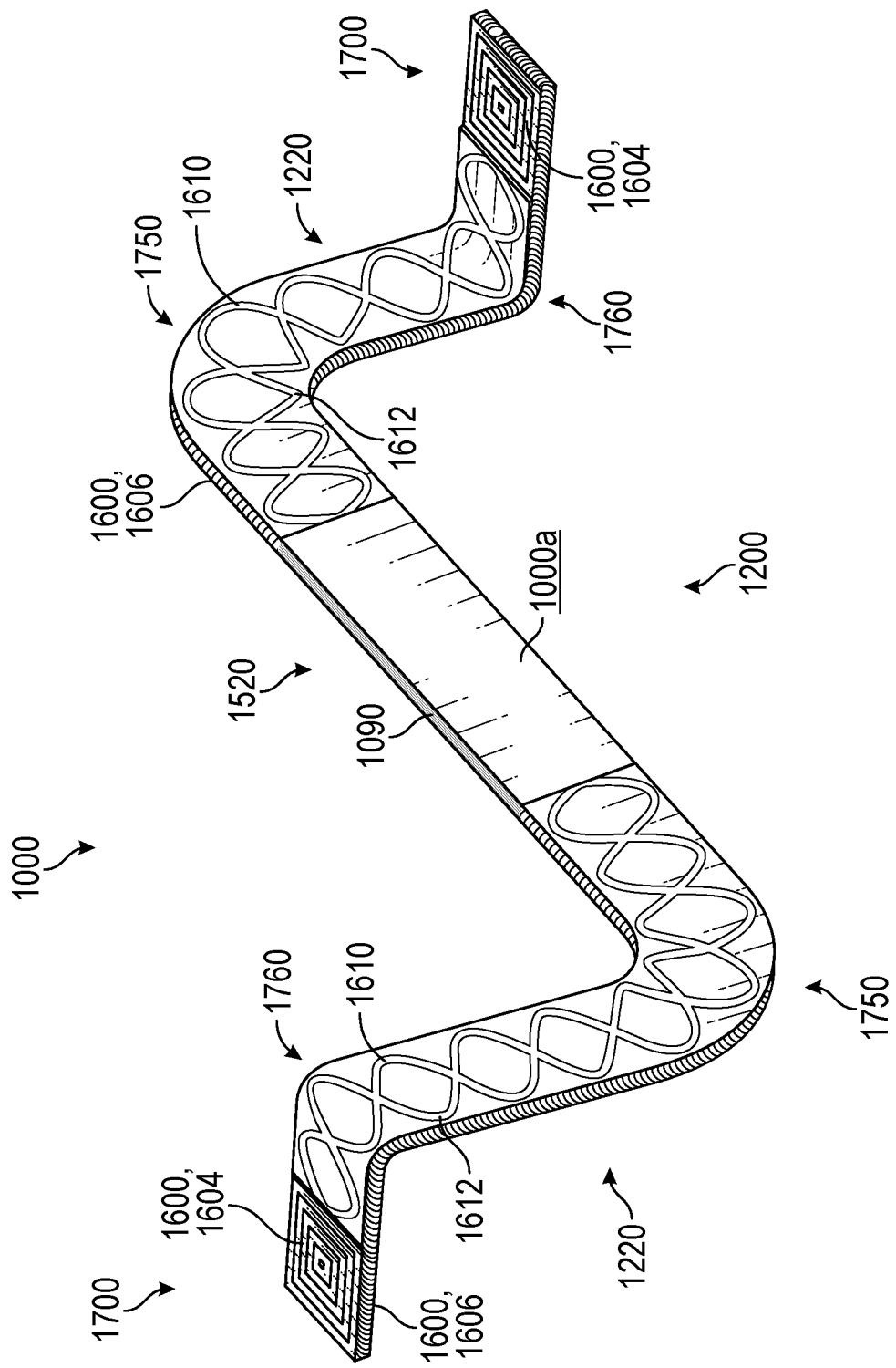
FIG. 56 is a perspective view of the inventive busbar with fused segments that have two combination surface patterns, the busbar being in a bent configuration and the insulation removed.
Figure 57:
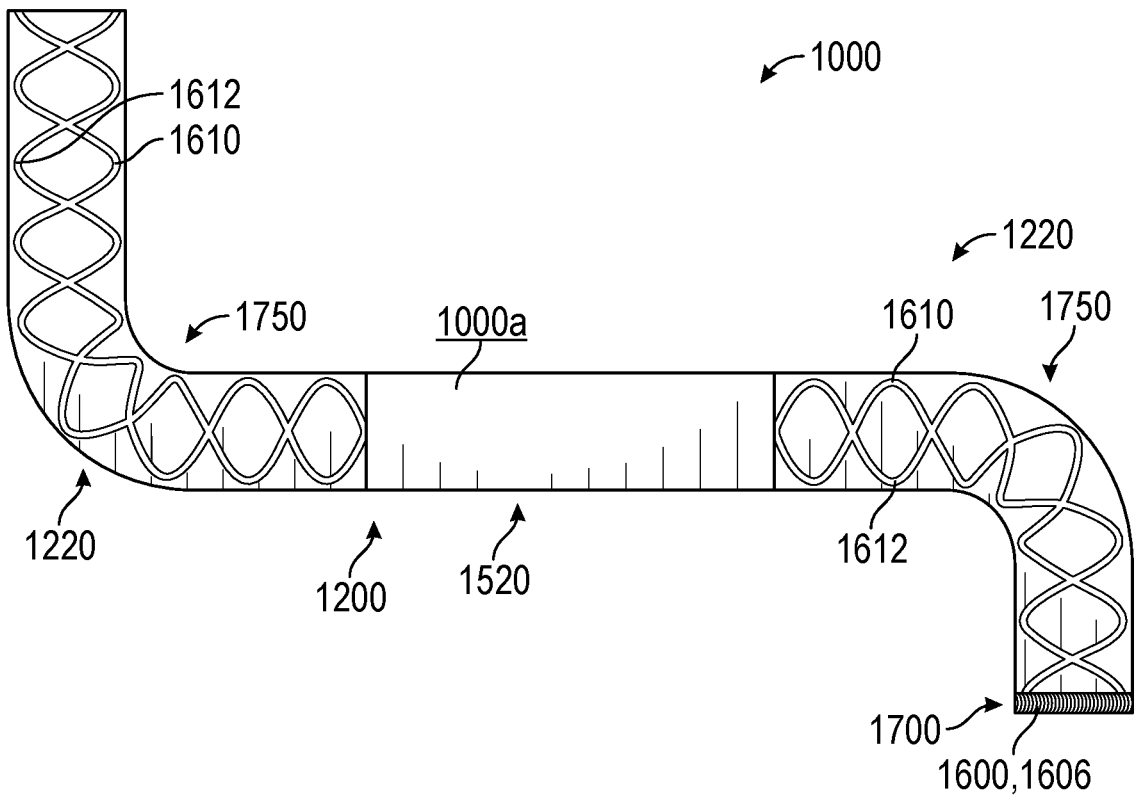
FIG. 57 is a first end view of the busbar of FIG. 56.
Figure 58:
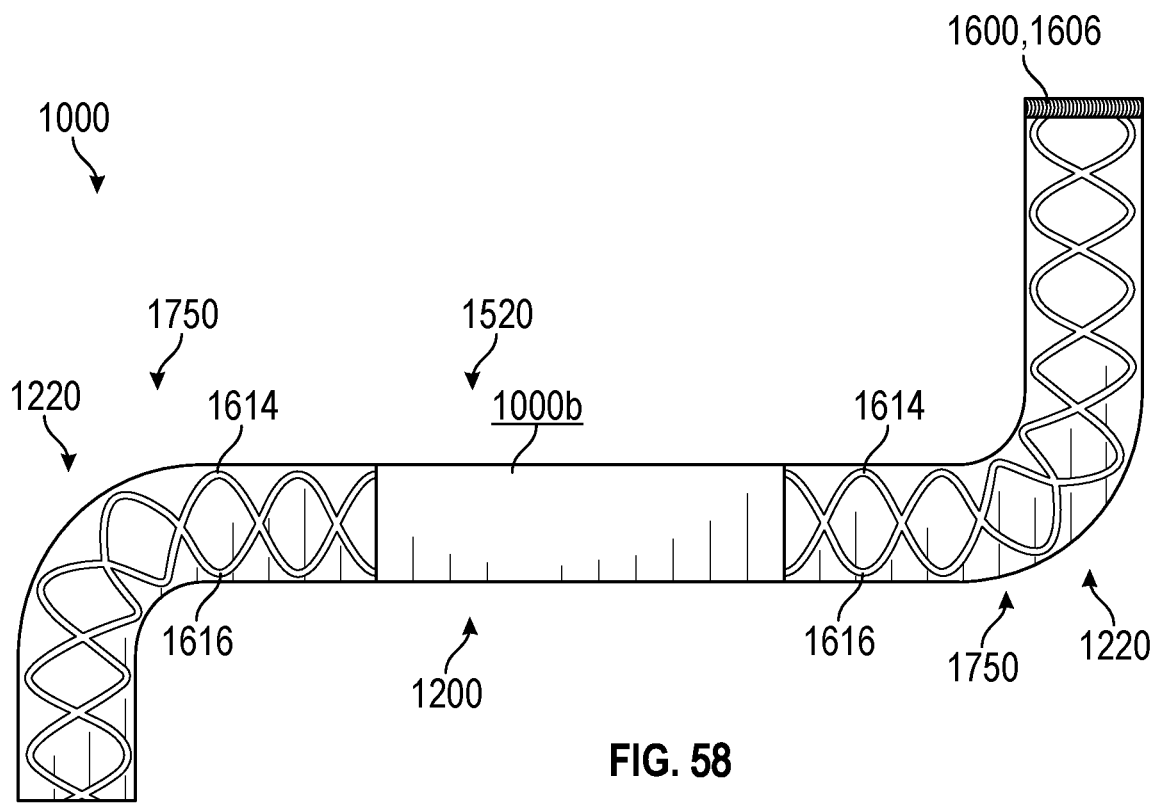
FIG. 58 is a second end view of the busbar of FIG. 56.
Figure 59:
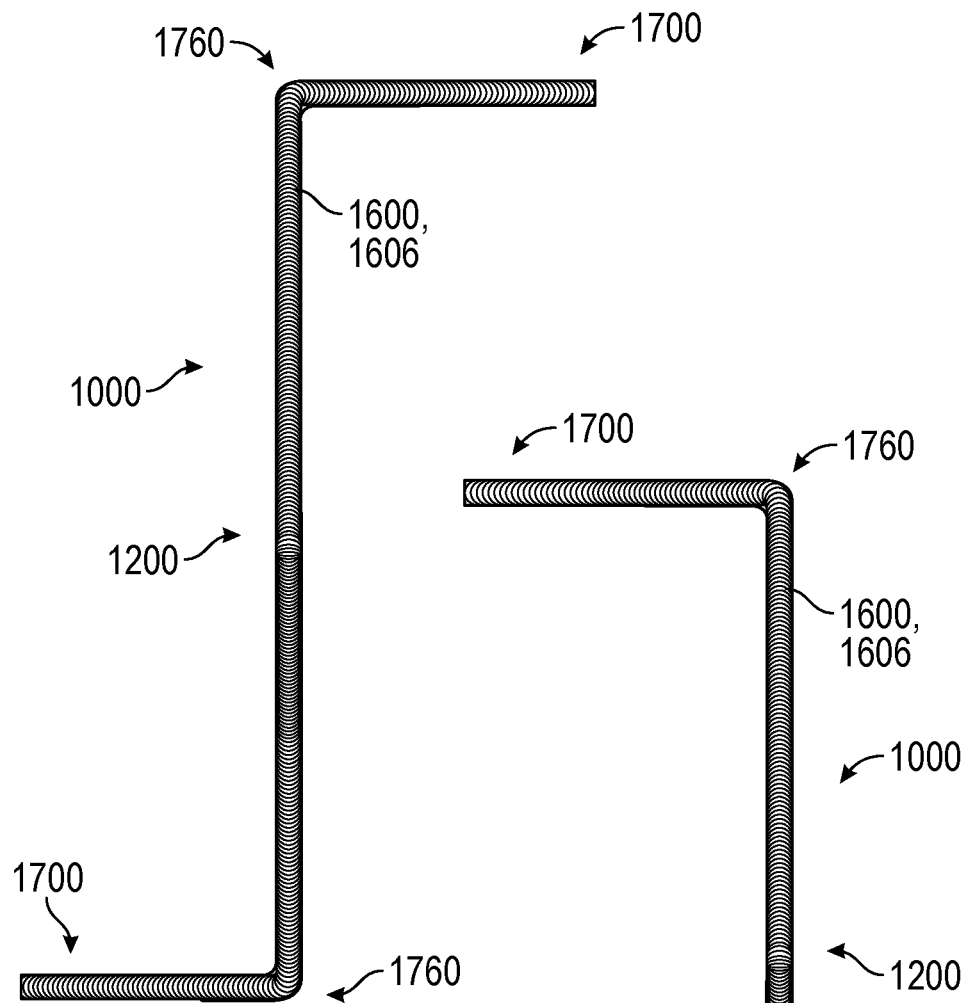
FIG. 59 is a first side view of the busbar of FIG. 56.
Figure 60:
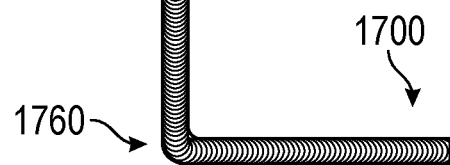
FIG. 60 is a second side view of the busbar of FIG. 56.
Figure 65:
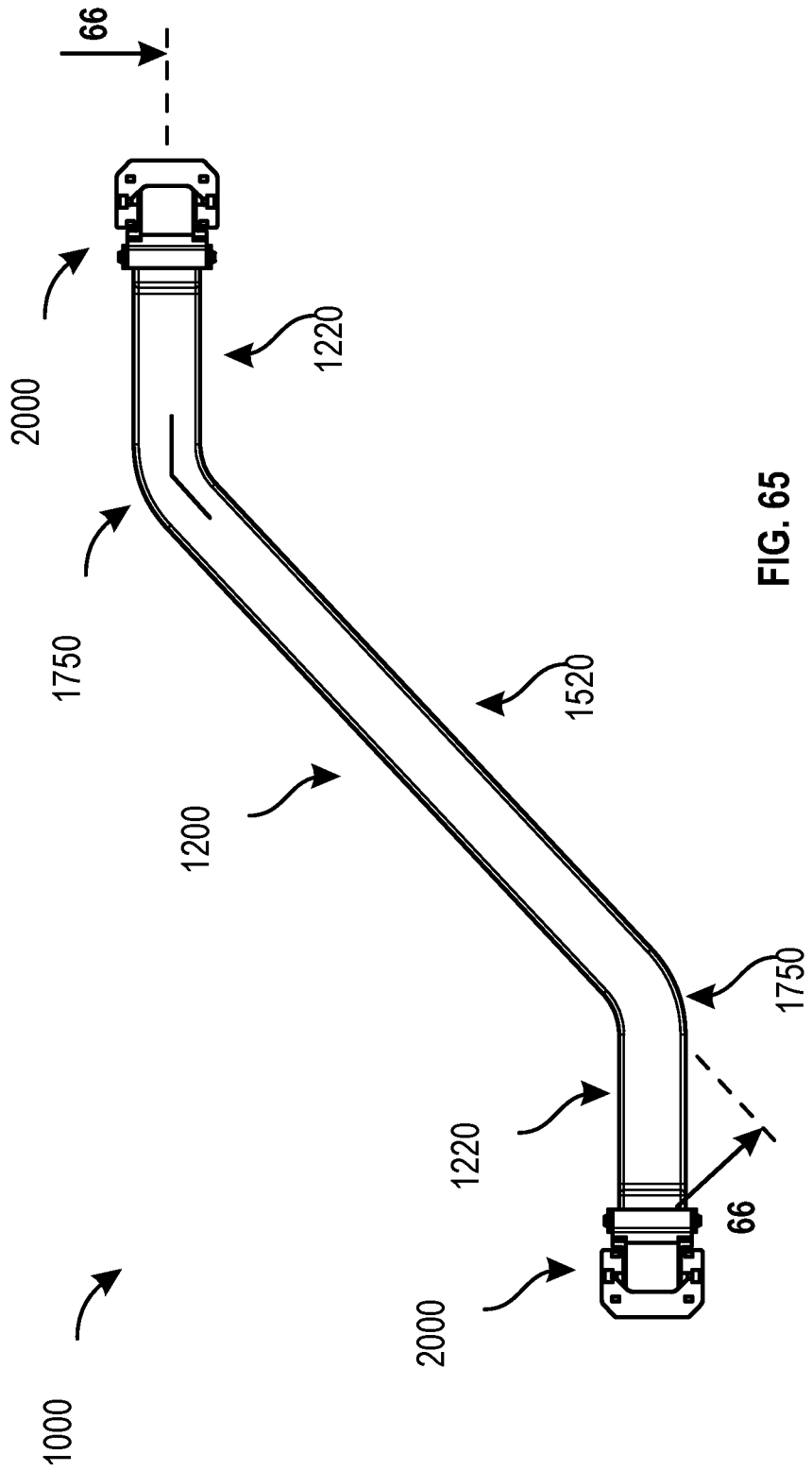
FIG. 65 is a top view of the busbar of FIG. 64.

To form these bends, the designer/manufacture may use any of the following machines 780a, 780b, or 780c that are shown in FIGS. 52-55B. In particular, FIGS. 780a, 780b show bending machines that are used to bend prototype busbars 1000, while FIGS. 54-55B show bending machines that are used to bend busbars 1000 that are manufactured using a mass production assembly. The prototype bending machine 780a include three spools 782a, 782b, 782c that have sides, which are configured to fully encase the busbar 1000 while bending. The middle spool 782b is attached to arm 784, which can be cranked down to apply downward pressure on the busbar 1000 in light of the positional relationship of the two end spools 782a, 782c. In other words, the middle spool 782b acts as a mandrel that bends the busbar 1000 in-plane 1750. The mass production machine 780c automates the functions of the prototype bending machines 780a, 780b. In particular, FIGS. 55A and 55B show how this mass production machine 780c can create both in-plane bends 1750 and out-of-plane bends 1760 in the busbar 1000. It should be understood that these are only examples of machines 780a-780c that may be utilized to bend the busbar 1000. For example, certain out-of-plane bends 1760 may not be bent by a machine and instead may be bent by hand.

Figure 83:
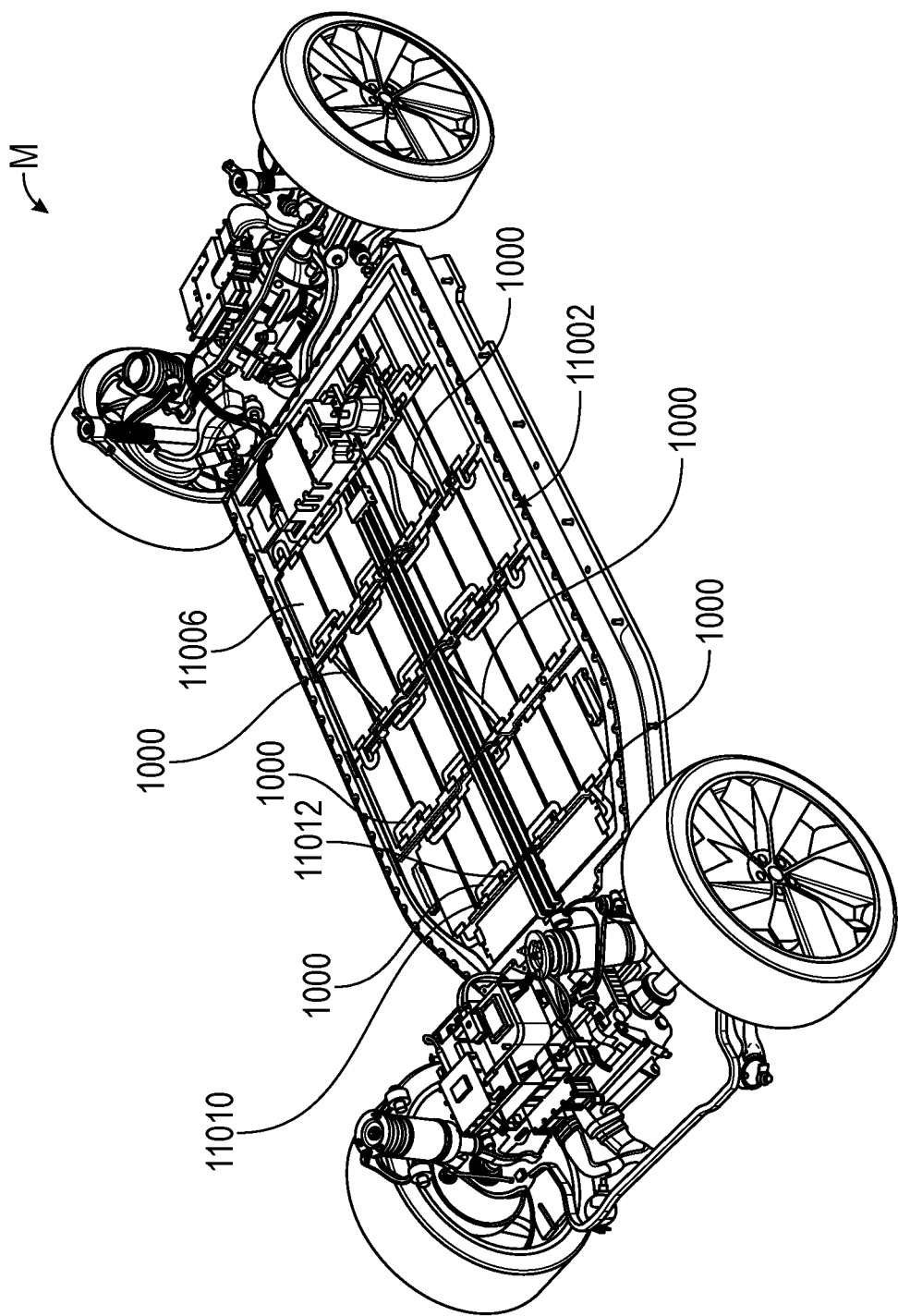
FIG. 83 is a perspective view of a battery pack installed within a skateboard of a vehicle, wherein the battery pack includes multiple inventive busbars electrically and mechanically connected to modules within the battery pack.
Figure 84:
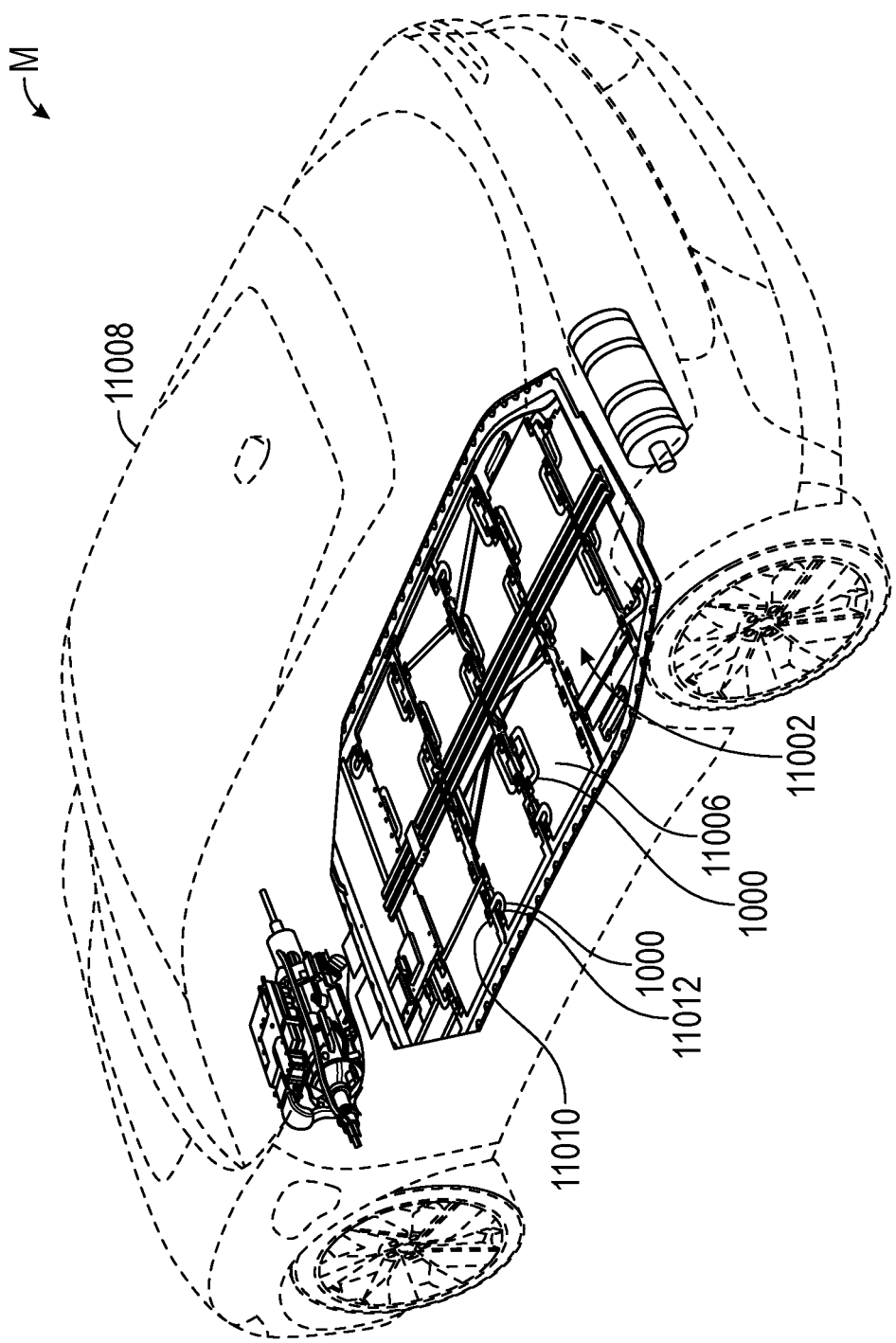
FIG. 84 is a perspective view of a vehicle having a battery pack, wherein the battery pack includes the multiple inventive busbars electrically and mechanically connected to modules within the battery pack.

FIGS. 83-84 show a motor vehicle environment M that includes a power distribution system 11000 that includes a number of components, such as a charger, a battery pack assembly 11002, a DC-DC converter, and an electrical motor. As shown in FIGS. 83-84, the battery pack assembly 11004 has a skateboard configuration, wherein the battery pack assembly 11002 has a plurality (e.g., 36) of battery pack modules 11006 that are arranged in a substantially linear configuration that is positioned at or below vehicle axle level and below a majority of the motor vehicle body 11008, when installed. The battery pack modules 11006 are formed from a plurality (e.g., 12) of cells, wherein the cells are coupled to one another to form a positive terminal 11010 and a negative terminal 11012 for each battery pack module 11006. The positive terminals 11010 of these battery pack modules 11006 are coupled to one another (e.g., in parallel and in series) using busbars 1000, 3000, 5000, 7000, 9000 in order to create a battery pack 11002 that supplies proper voltage levels for operation of the motor vehicle M. Like the positive terminals 11010, the negative terminals 11012 are similarly coupled together using busbars 1000, 3000, 5000, 7000, 9000. It should be understood that the busbars 1000, 3000, 5000, 7000, 9000 may be used in components contained within the motor vehicle environment M that are outside of the battery pack assembly 11002. In addition, the inventive busbars 1000, 3000, 5000, 7000 are PCTR compliant, which not only reduces the height requirements of the busbars, but also simplifies installation.

It may be desirable to gather the information obtained from fabricating and bending the busbars 1000, which have been made from an engineering model 100. This information can then be fed back into to the overall computer system in order to more accurately transform the non-engineering model 68a-68h into an engineering model 100 and test the engineering model 100. For example, the information that may be fed back into the computer system can include: (i) whether the fusion method caused too may fully solidified regions, (ii) whether the fusion method did not cause the partially solidified regions to extent to a desirable depth, (iii) bending forces required to bend the fused segments 1220, (iv) electrical properties of the fused segments, (v) whether the fused segment 1220 delaminated during bending, or (vi) other relevant information. The computer system may take this information and alter the FE model used within the testing. As this FE model is able to closely predict how the busbars 1000 will operate when they are fabricated, the designer may utilize this FE model to help transform the non-engineering model 68a-68h into an engineering model 100. It should be understood that the information that is fed back into the computer system may be fitted and/or analyzed with a learning algorithm or a neural network. This analysis can then be used to modify the FE model in order to improve its accuracy, which in turn will allow for more accurate creation of the engineering models 100, which will result in cheaper, better performing, and more durable busbars 1000.

MATERIALS AND DISCLOSURE THAT ARE INCORPORATED BY REFERENCE

PCT Application Nos. PCT/US2020/49870, PCT/US2020/14484, PCT/US2020/13757, PCT/US2019/36127, PCT/US2019/36070, PCT/US2019/36010, and PCT/US2018/019787, U.S. patent application Ser. No. 16/194,891 and U.S. Provisional Applications 62/897,658 62/897,962, 62/897,962, 62/988,972, 63/051,639, 63/058,061, 29/749,790 and 29/749,813, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc. Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

This inventive busbar 1000 described herein includes many advantages over other busbar system that currently exists. Some of these advantages include: i) using less material, ii) weighing less, iii) providing sufficient current paths, which allows the busbars to carry more current without a substantial rise in temperature, iv) the ability to be shipped in a substantially flat configuration, which reduces shipping costs and reduces the chance the busbar may be deformed, v) can have bolt or boltless configurations, wherein the boltless configurations reduce labor costs associated with installation, vi) does not require special molds or fabrication techniques to enable the busbar 1000 to be custom fitted to a specific application, vii) does not require the combination of multiple different materials, which also increases the amount of current the buss bar 100 can handle without a substantial rise in temperature, viii) has a low profile configuration, which allows the designer to reduce the height of the battery pack, and ix) can be formed into complex geometries at or near the place the busbar is installed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, within the intermediate portion 1200 the busbar 1000 may not contain an unfused segment 1520 and may only contain fused segments 1220. It is intended by the following claims to claim any and all applications, modifications and variations that fall within the true scope of the present teachings. Other implementations are also contemplated.

While some implementations have been illustrated and described, numerous modifications come to mind without significantly departing from the spirit of the disclosure; and the scope of protection is only limited by the scope of the accompanying claims.

Headings and subheadings, if any, are used for convenience only and are not limiting. The word exemplary is used to mean serving as an example or illustration. To the extent that the term includes, have, or the like is used, such term is intended to be inclusive in a manner similar to the term comprising as comprising is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A busbar for electrically connecting components in a device, the busbar comprising:
a plurality of conductors arranged to provide two opposed end portions and an intermediate portion extending between said opposed end portions; and
wherein the intermediate portion includes a fused segment that includes a region where all conductors are fused together to form a single consolidated conductor.

2. The busbar of claim 1, wherein the plurality of conductors in the fused segment are arranged in a vertical stack having an uppermost conductor and a lowermost conductor that define a fused segment height extending there between, and
wherein the region extends between the uppermost conductor and the lowermost.

3. The busbar of claim 1, wherein the fused segment of the intermediate portion has a length, a width and a height that collectively define a fused segment volume; and
wherein an unsolidified region occupies a majority of the fused segment volume and the region occupies a minority of the fused segment volume.

4. The busbar of claim 1, wherein the intermediate portion of the busbar has a stiffness and the region occupies a first volume; and
wherein increasing the volume of the region increases the stiffness of the intermediate portion of the busbar.

5. The busbar of claim 1, wherein the fused segment is a first fused segment, the region is a first solidified region, and the unsolidified region is a first unsolidified region; and wherein the intermediate portion further comprises a second fused segment that includes (i) a second solidified region where all conductors are fused together, and (ii) a second unsolidified region where all conductors are not fused together.

6. The busbar of claim 5, wherein the first fused segment has a length, a width and a height that collectively define a first fused segment volume and the second fused segment has a length, a width and a height that collectively define a second fused segment volume; and wherein the first solidified region occupies a first percentage of the first fused segment volume and the second solidified region occupies a second percentage of the second fused segment volume, and wherein the first percentage is less than the second percentage.

7. The busbar of claim 1, wherein the region is formed by an application of a laser to peripheral edges of the plurality of conductors of the intermediate portion of the busbar.

8. The busbar of claim 1, wherein the intermediate portion includes an interior weld boundary located between the region and the unsolidified region; and wherein a width that extends between a peripheral edge of the plurality of conductors of the intermediate portion and the interior weld boundary is less than 5 mm.

9. The busbar of claim 1, wherein the intermediate portion includes an interior weld boundary located between the region and the unsolidified region; and wherein a width that extends between a peripheral edge of the plurality of conductors of the intermediate portion and the interior weld boundary varies along the length of the busbar.

10. The busbar of claim 1, wherein the intermediate portion of the busbar includes an upper edge and a lower edge; and wherein said upper and lower edges are rounded-off by an application of a laser to peripheral edges of the plurality of conductors of the intermediate portion of the busbar.

11. The busbar of claim 1, wherein the region prevents the plurality of conductors from delaminating from one another when the intermediate portion of the busbar is bent in-plane.

12. The busbar of claim 1, wherein the conductors in at least one of the end portions are fused together to form a single consolidated conductor.

13. The busbar of claim 1, wherein the end portions are fused together by an application of a laser to both (a) an upper surface of an uppermost conductor of the end portion of the busbar, and (b) a lower surface of a lowermost conductor of the end portion of the busbar.

14. A busbar for electrically connecting components in a device, the busbar comprising:

a plurality of conductors arranged: (i) to provide two opposed end portions and an intermediate portion, and (ii) in a vertical stack with an uppermost conductor and a lowermost conductor;

wherein each end portion includes a region where all conductors positioned between the uppermost conductor and the lowermost conductor are fused together to form a single consolidated conductor.

15. The busbar of claim 14, wherein the region is formed by an application of a laser.

16. The busbar of claim 14, wherein the region is formed by an application of a laser, wherein the laser follows a combined pattern that includes a top fusion pattern and a bottom fusion pattern.

17. The busbar of claim 16, wherein the combined pattern is determined based on the type of connector that will be coupled to the end portion.

18. The busbar of claim 15, wherein the laser is applied to at least one of (a) an upper surface of the uppermost conductor of the end portion of the busbar, and (b) a lower surface of the lowermost conductor of the end portion of the busbar.

19. The busbar of claim 14, wherein the intermediate portion of the busbar includes peripheral edges; and wherein a laser is applied to the peripheral edges of the intermediate portion of the busbar to form a solidified region where all conductors are fused together to form a single consolidated conductor.

20. The busbar of claim 19, wherein the solidified region helps prevent the plurality of conductors from delaminating from one another when the intermediate portion of the busbar is bent.

21. The busbar of claim 19, wherein the intermediate portion includes an interior weld boundary located between the solidified region and the unsolidified region; and wherein a width that extends between a peripheral edge of the plurality of conductors of the intermediate portion and the interior weld boundary, and wherein said width: (i) varies along the length of the busbar, and (ii) is less than 5 mm.

* * * * *